US005480130A

United States Patent [19]

Suzuki et al.

[11] Patent Number: 5,480,130

[45] Date of Patent: Jan. 2, 1996

[54] DEVICE FOR FURTHER PROCESSING AFTER COPYING

[75] Inventors: Kaoru Suzuki, Yamatokoriyama; Tadahiro Ando; Hiroshi Naka, both of Naka; Mitsutoshi Sawada, Yamatokoriyama; Tomonori Ohata, Osaka; Hiroshi Miura, Yamatokoriyama; Masayoshi Nakabayashi, Wakayama; Eiiti Ando, Higashiosaka, all of Japan

[73] Assignee: Sharp Kabushiki Kaisha, Osaka, Japan

[21] Appl. No.: 429,819

[22] Filed: Apr. 27, 1995

Related U.S. Application Data

[62] Division of Ser. No. 247,750, May 23, 1994, Pat. No. 5,435,535, which is a division of Ser. No. 982,320, Nov. 25, 1992, Pat. No. 5,344,130.

[30] Foreign Application Priority Data

| | | | |
|---|---|---|---|
| Nov. 25, 1991 | [JP] | Japan | 3-309009 |
| Nov. 25, 1991 | [JP] | Japan | 3-309012 |
| Nov. 29, 1991 | [JP] | Japan | 3-316299 |
| Nov. 29, 1991 | [JP] | Japan | 3-316306 |
| Dec. 9, 1991 | [JP] | Japan | 3-324712 |
| Dec. 9, 1991 | [JP] | Japan | 3-324715 |
| Feb. 26, 1992 | [JP] | Japan | 4-039793 |
| Feb. 27, 1992 | [JP] | Japan | 4-041135 |
| Mar. 16, 1992 | [JP] | Japan | 4-058250 |
| Mar. 26, 1992 | [JP] | Japan | 4-068534 |

[51] Int. Cl.[6] ............................ B42B 2/00; B65G 57/00; B65H 31/30

[52] U.S. Cl. ............................................ 270/53; 414/790.3

[58] Field of Search ........................ 270/53, 58; 271/213, 271/215, 217, 218; 414/790.3

[56] References Cited

U.S. PATENT DOCUMENTS

| | | | |
|---|---|---|---|
| 5,021,837 | 6/1991 | Uto et al. | 270/53 X |
| 5,098,074 | 3/1992 | Mandel et al. | 270/53 |
| 5,137,265 | 8/1992 | Sato et al. | 270/53 |
| 5,201,517 | 4/1993 | Stemmle | 270/53 |
| 5,288,062 | 2/1994 | Rizzolo et al. | 270/53 |
| 5,385,340 | 1/1995 | Hiroi et al. | 270/53 |
| 5,409,201 | 4/1995 | Kramer | 270/53 |

FOREIGN PATENT DOCUMENTS

| | | | |
|---|---|---|---|
| 3-95065 | 4/1991 | Japan | 271/213 |

*Primary Examiner*—John E. Ryznic
*Attorney, Agent, or Firm*—David G. Conlin; Kevin J. Fournier

[57] ABSTRACT

A sheet finishing and stacking apparatus includes a sheet transport path which stacks sheets onto a stapler tray, the stack is finished by a stapler, and a discharge roller and a pushed out member transport the stack onto a discharge tray. The discharge tray is driven in a vertical direction as stacks of sheets are deposited thereon. While the push-out member is delivering the stack to the discharge tray, an auxiliary lower discharge plate extends along a direction of the push-out member to prevent the stack from buckling. In another embodiment, the discharge tray is temporarily lowered and then raised back to an upper limit as the push-out member delivers the stack to the discharge tray.

12 Claims, 113 Drawing Sheets

DEVICE FOR FURTHER PROCESSING AFTER COPYING

This is a Divisional Application of U.S. Application No. 08/247,750 filed May 23, 1994, now U.S. Pat. No. 5,435, 535, which is a Divisional Application of U.S. Application No. 07/982,320 filed Nov. 25, 1992 (now U.S. Pat. No. 5,344,130.

FIELD OF THE INVENTION

The present invention relates to a device for further processing after copying, provided in image forming apparatuses such as copying machines, laser printers, etc., such process being the binding and/or punching of a plurality of copied sheets.

BACKGROUND OF THE INVENTION

Recently, many copying machines are combined with automatic document feeders and devices for further processing after copying such as binding or punching the copied sheets in order to automate the process. The automatic document feeder is placed on a document tray of the copying machine, for example, for transporting a plurality of documents one by one onto the document tray of the copying machine. The device for further processing after copying is for carrying out a process after copying, such as stapling, punching, etc., on every predetermined number of sheets fed from the copying machine.

The device disclosed in Japanese Laid-Open Publication 144370/1990 (Tokukaihei 2-144370) as an example of the conventional device for further processing after copying has the following arrangement. As shown in FIG. 89(*a*), first, the copied sheets S being transported from the side of a main body 301 are stacked on a stapler plate 302 where the copied sheets S are aligned. Then, the sheets S are bound by a stapler 303 provided within the device. Thereafter, the bound set of sheets S is sandwiched between discharge rollers 304 and 305 to be discharged onto a discharge tray 306.

The device is also provided with first and second transport paths 308*a* and 308*b*, whose lengths are different, placed between an entry opening 307 for the sheets S on the side of the main body 301 and the stapler plate 302. Furthermore, a deflector 309 is provided at a branch point between the first and the second transport paths 308*a* and 308*b* so as to switch the transport path for the sheet either to the first path 308*a* or to the second path 308*b*. Here, the first path 308*a* is set longer than the second path 308*b*, and the downstream of the first path 308*a* joins again the second path 308*b*. A discharge roller 310 is provided at the end of the path for releasing the sheets S onto the stapler plate 302 through the path.

As shown in FIG. 89(*a*), when binding a plurality of sets of sheets S, the device for further processing after copying operates as follows while a predetermined binding operation is carried out on a first set of sheets S on the stapler plate 302, a first sheet $S_1$ of the next set fed from the main body 301 is transported through the first path 308*a*, and a second sheet $S_2$ of the next set is transported through the second path 308*b*. With this arrangement, the second sheet $S_2$ is stacked on the first sheet $S_1$ so as to be discharged onto the stapler plate 302 through the discharge roller 310 at the same time as shown in FIG. 89(*b*). As a result, the time loss due to the time required for binding the first set of sheets S can be reduced, thereby permitting a faster binding process.

The first and the second sheets $S_1$ and $S_2$ released onto the stapler plate 302 at the same time are sandwiched between the rollers 304 and 305. In this state, the ends of the sheets $S_1$ and $S_2$ are respectively aligned by rotating the discharge roller 305 in an opposite direction to its rotation direction for discharging the sheets S.

As described, the first transport path 308*a* is set longer than the second transport path 308*b* so as to release the first and the second sheets $S_1$ and $S_2$ onto the stapler plane 302 at the same time. This arrangement enables a faster process for binding a plurality of sheets S. However, in the case of adopting sheets S of a large size, the transport paths must be set long in order to maintain the above arrangement. This makes the size of the device larger. In order to avoid the device being made larger, the first and the second transport paths 308*a* and 308*b* may be curved instead of being straight. However, this makes the transport paths for the sheets S complicated, and is likely to create the problem of lowering the quality of the bound set of sheets S by being creased.

With the above arrangement, when aligning the ends of the discharged sheets $S_1$ and $S_2$, the sheets $S_1$ and $S_2$ are sandwiched between the rollers 304 and 305, and are aligned by rotating the discharge roller 305 in the opposite direction. However, it is difficult to precisely align a stack of the sheets $S_1$ and $S_2$, thereby lowering the quality of the bound set of sheets S.

The device for further processing after copying having the above configuration is shown in FIGS. 90(*a*)(*b*) and FIG. 91. In the case of the staple mode wherein the sheets S being transported from the side of the main body 301 are bound before being discharged out of the device, the copied sheets S, which have been transported from the side of the main body 301 through the transport path 311, are aligned on the stapler plate 312 as shown in FIG. 90(*a*). Then, the sheets S are bound by the stapler 313 provided within the device, thereafter the bound set of sheets S is discharged onto a discharge tray 316 using the rotation of a discharge roller 314 and the forward motion of a push-out member 315.

On the other hand, in the case of the offset mode wherein the sheets S being transported from the side of the main body are discharged one by one out of the device without being further processed after copying, the sheets S are discharged as follows. As shown in FIG. 90(*b*), a driven roller 317 placed above the discharge roller 314 is rotated so as to be in contact with the discharge roller 314. Then, the copied sheets S being transported through the transport path 311 from the side of the main body 301 are sandwiched between the rollers 314 and 317 to be directly discharged onto the discharge tray 316.

Further, the device shown in FIG. 91 is provided with an offset tray 324 for placing thereon the sheets S in the offset mode separately from a staple tray 329 for placing thereon the sheets S in the staple mode. With this arrangement, in the case of the offset mode, with a path switching operation of the deflector 322, first the sheets S being transported from the side of the main body 301 are passed through the first transport path 321a. Then, the sheets S are sandwiched between the discharge rollers 323 to be discharged onto the discharge tray 324. On the other hand, in the staple mode, with the path switching operation of the deflector 322, the sheets S being transported through the second transport path 321*b* are aligned on the stapler plate 325. Then, the sheets S are bound by the stapler 326 provided in the device, and are discharged onto the discharge tray 329 with the rotation of the discharge roller 327 and the forward motion of the push-out member 328.

In the conventional device shown in FIGS. 90(*a*)(*b*), the sheet transporting direction in the offset mode is different from the sheet transporting direction in the staple mode, and the sheets S are discharged onto the same discharge tray 316 in both modes. However, since the tray angle of the discharge tray 316 is constant, the ability to discharge sufficient in both modes is difficult to be obtained. Moreover, there is a level difference between the discharge roller 314 and the stapler plate 312 which causes the buckling and the creasing of the bound set of sheets S.

On the other hand, in the device of FIG. 91 provided with the offset tray 324 and the stapler tray 329, the tray angles are separately set for the trays 324 and 329 so as to satisfy the ability to discharge in both modes. However, since the relative positions between the stapler tray 329 and the stapler plate 325 are not improved, the problem that the quality of the sheets is lowered due to the creasing of the bound set of sheets S still exists.

Furthermore, the discharge tray 316 of the device shown in FIGS. 90(*a*)(*b*) has a recessed portion **316*a* shown in FIG. 93 at the corner on the side of the device so that the stapled corners St of the bound set of sheets S drop by the dead weight of the corners St into the recessed portion 316*a*. In this way, the preciseness in aligning the bound sets of sheets S on the discharge tray 316** can be improved.

As described, the alignment of the bound sets of sheets S on the discharge tray 316 can be improved by making the stapled corners St of the bound sets of sheets S drop into the recessed portion **316*a* by the dead weight of the corners St. However, with the above arrangement, the number of the corners St drop into the recessed portion 316*a* differs depending on the number of the bound sets of sheets S to be placed on the discharge tray 316 and on the material used for the sheets S. For this reason, in the case where the number of the bound sets of sheets S to be placed is large, or thicker paper is used for the sheets S, since there is a limit which the recessed portion 316*a* can accept the stapled corners St dropped by the dead weight of the corners St, the stapled corners St may be pushed back, which reduces the preciseness in aligning the bound sets of sheets S. The acceptable number of the stapled corners St to be dropped into the recessed portion 316*a* may be slightly improved by making larger the area of the recessed portion 316*a*. However, the area of the recessed portion 316*a* to be formed on the discharge tray 316 also has a limit. Therefore, it is difficult to accurately drop the stapled corners St into the recessed portion 316*a***.

SUMMARY OF THE INVENTION

A first object of the present invention is to provide a device for further processing after copying which permits a plurality of sheets to be processed in a shorter time.

A second object of the present invention is to provide a device for further processing after copying which permits a plurality of sheets to be processed in a shorter time and which ensures the quality of the processed sheets.

A third object of the present invention is to provide a device for further processing after copying which permits an improved ability to discharge the processed sheets out of the device.

A fourth object of the present invention is to provide a device for further processing after copying which permits a more precise alignment of the processed sheets discharged out of the device.

In order to achieve the first object, the device for further processing after copying in accordance with the present invention includes at least the following means:

(a) sheet holding means for placing thereon a plurality of sheets;

(b) a transport path for guiding the sheets fed into the device to the sheet holding means, the transport path being branched into a first path and a second path;

(c) path switching means for switching the transport path for the sheets either to the first path or the second path, the path switching means being provided at a branch point between the first path and the second path of the transport path;

(d) sheet transport means for transporting the sheets through the transport path;

(e) transport control means for controlling the transportation of the sheets to the sheet holding means by controlling respective operations by the sheet transport means and the path switching means; and (f) means for processing after copying which carries out a predetermined process on a plurality of sheets stacked on the sheet holding means; and (g) sheet discharge means for discharging the sheets processed by the means for processing after copying from the sheet holding means.

Further, the device for further processing after copying of the present invention operates as follows. While a current set of sheets is being processed by the means for processing after copying, the transport control means stops transporting a first sheet of the next set to be fed into the device through the first path, and transports a second sheet of the next set through the second path so as to release the first sheet and the second sheet of the next set onto the sheet holding means at the same time when the first processed set has been discharged.

According to the above arrangement, with a control of the transport control means, while the current set of sheets is being processed, the transportation of the first sheet of the next set is temporarily stopped. As a result, the first and the second sheets of the next set are released onto the sheet holding plate at the same time. This permits a reduction in time loss due to the process after copying without making the device larger nor lowering the quality of the processed sheets even when sheets of a large size are adopted, and also permits a faster process after copying.

In replace of the above (b), (c), and (e), the device for further processing after copying of the present invention may employ a single transport path and further include air suction means, which enables a sheet to adhere to it using air and also be released onto the sheet holding means from the transport path, and suction control means for controlling a sheet suction by the air suction means.

According to the above arrangement, with the control of the suction control means, the first sheet of the next set to be fed into the device is temporarily held by adhering it to the air suction means. As a result, the first and the second sheets of the next set are released onto the sheet holding plate at the same time. This permits a faster process after copying.

In replace of the above (b), (c), and (e), the device for further processing after copying of the present invention may employ a single transport path and further includes support means which temporarily supports the sheet and releases the sheet, and support control means for controlling the operation for supporting the sheets by the support means.

According to the above arrangement, with the control of the support control means, the first sheet of the next set to be fed into the device is temporarily supported by the support means. As a result, the first and the second sheets of the next set are released onto the sheet holding plate at the same time. This permits a faster process after copying.

In replace of the above (b) and (c), the device for further processing after copying may include a transport path for guiding the sheets fed into the device to the sheet holding means, the transport path being divided into upper and lower paths, and path switching means for switching the transport path either to the upper path or the lower path.

In order to achieve the second object, the device for further processing after copying of the present invention includes at least the following means in addition to the above (a) through (g):

(h) a first end aligning means for aligning ends of the first sheet of the next set; and (i) a second end aligning means for aligning ends of the second sheet of the next set.

According to the above arrangement, the first and the second sheets of the next set, released onto the sheet holding means at the same time, are aligned respectively by the first and the second end aligning means. In this way, the alignment of the ends of respective sheets can be done separately but at the same time. This permits to more precisely align the ends of the sheets and to ensure the high quality of the processed sheets.

In order to achieve the third object, the device for further processing after copying of the present invention includes at least the following means in addition to the above (a) and (f):

(j) sheet push-out means for pushing out the sheets processed by the means for processing after copying, to be discharged out of the device through the discharge opening;

(k) a discharge tray, provided at a lower level than a sheet discharge opening of the device, for placing thereon the sheets pushed out by the sheet push-out means;

(l) auxiliary upper discharge means capable of moving upward and downward between a forward position to the sheet holding means and a retreat position, the forward position being a position for controlling an upward buckling of the sheet due to a push-out operation by the sheet push-out means; and (m) control means which controls the movement of the auxiliary upper discharge means so as to control the upward buckling of the sheet by moving the auxiliary upper discharge means upward to the forward position.

According to the above arrangement, when pushing out the sheets, processed by the means for processing after copying, onto the discharge tray by the sheet push-out means, the upward buckling of the processed sheet is controlled as the control means controls the movement of the upper discharge member drive means. As a result, an ability to discharge the processed sheets out of the device can be improved.

Furthermore, a still improved ability to discharge the processed sheets can be achieved by arranging the above (j) so as to further include a push-out member and a sheet contact face rotating member. The push-out member is capable of moving upward and downward, and is provided so that the sheet contact face can rotate both in the sheet pushing out direction and an opposite direction to the sheet pushing out direction. The sheet contact face rotating member rotates the sheet contact face in the sheet pushing out direction as the sheet is pushed out by the upward motion of the push-out member.

With this arrangement, when the sheets placed on the sheet holding means are pushed upward by the push-out member onto the discharge tray, the sheet contact face of the push-out member rotates in the sheet pushing out direction so as to prevent the lower ends of the sheets from being caught by the sheet contact face or the sheet holding means, thereby permitting an improved ability to discharge the sheets.

In order to achieve the fourth object, the device for further processing after copying of the present invention including the above (a), the binding means in replace of the above (f) for binding a plurality of sheets placed on the sheet holding means by stapling the corner, a discharge roller in replace of the above (g), and a discharge tray, provided under the discharge roller of the device, having the recessed portion for dropping the stapled corners placed so as to face the discharge roller, for placing thereon the sheets discharged by the discharge roller, further includes at least the following means:

(n) drive means for driving the discharge tray up and down so as to sandwich the sheets between the discharge tray and the discharge roller.

According to the above arrangement, the discharge tray with the recessed portion for the discharge roller formed on the attached side of the device is moved up and down by the drive means so as to sandwich the bound set of sheets with the stapled corner between the discharge tray and the discharge roller, and the stapled corner is pressed into the recessed portion of the discharge tray. In this way, the stapled corners of the sheets placed on the discharge tray can be surely prevented from being pushed back, thereby improving the preciseness in aligning the sheets placed on the discharge tray.

BRIEF DESCRIPTION OF THE DRAWINGS

FIG. 27(*b*) is a perspective view showing the air suction means.

FIG. 90(*b*) is an explanatory view showing a process in an offset mode with the conventional device for further processing after copying.

FIG. 118 is a side view showing the structure of the sheet contact portion of the push-out unit.

FIG. 119 is an explanatory view showing the sheet contact portion when the sheets are pushed out by the push-out unit.

FIG. 120 is a view showing the entire configuration of the device for further processing after copying of another embodiment of the present invention.

Figure 121A:
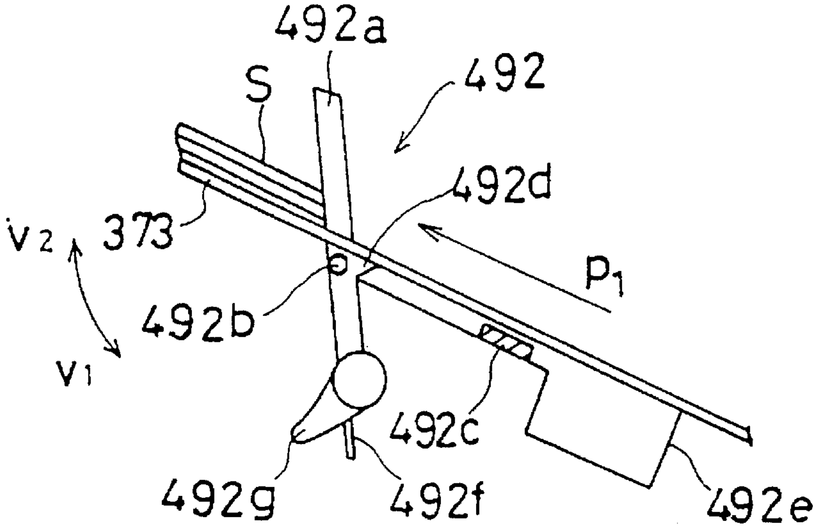
Figure 121B:
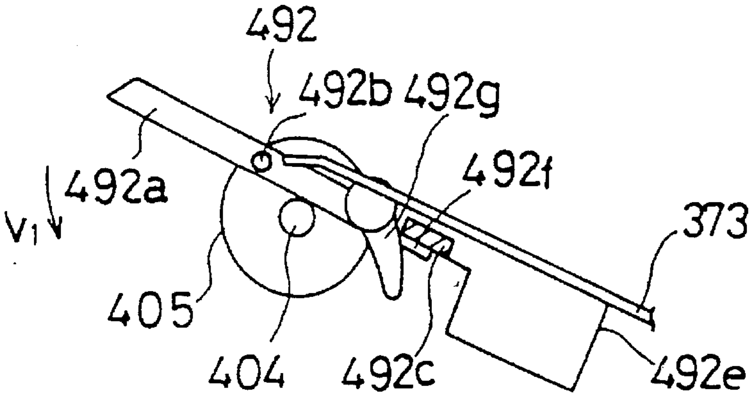
Figure 121C:
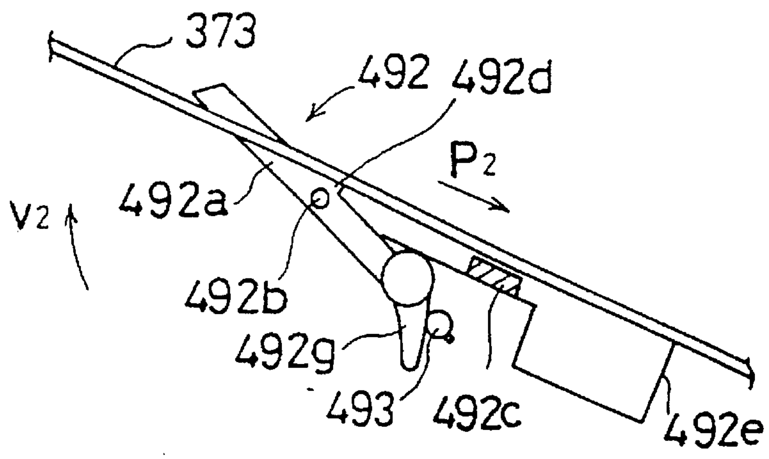

FIGS. 121(*a*)(*b*)(*c*) are explanatory views respectively showing the operations by the push-out member in the device for further processing after copying.

Figure 120:
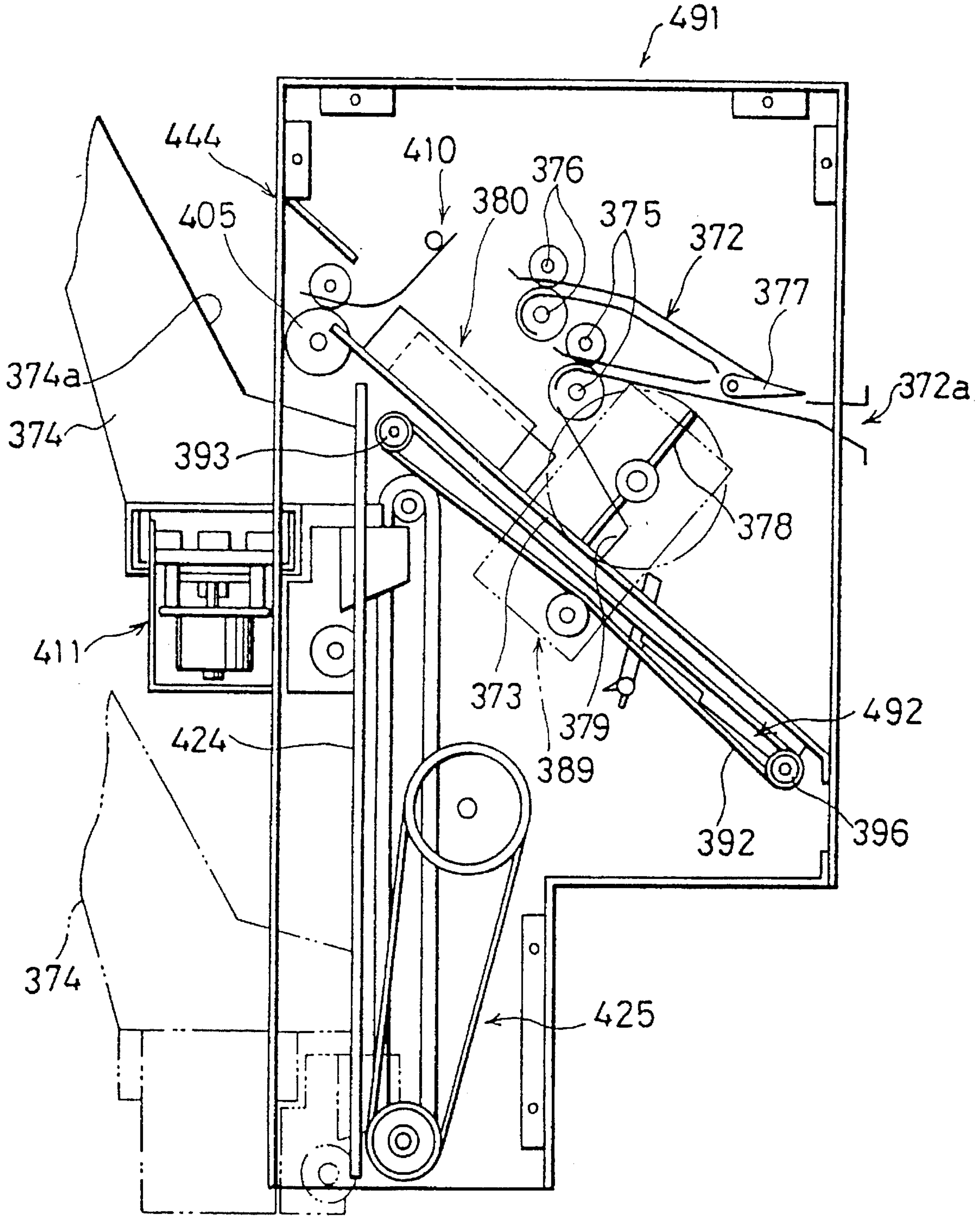
Figure 122:
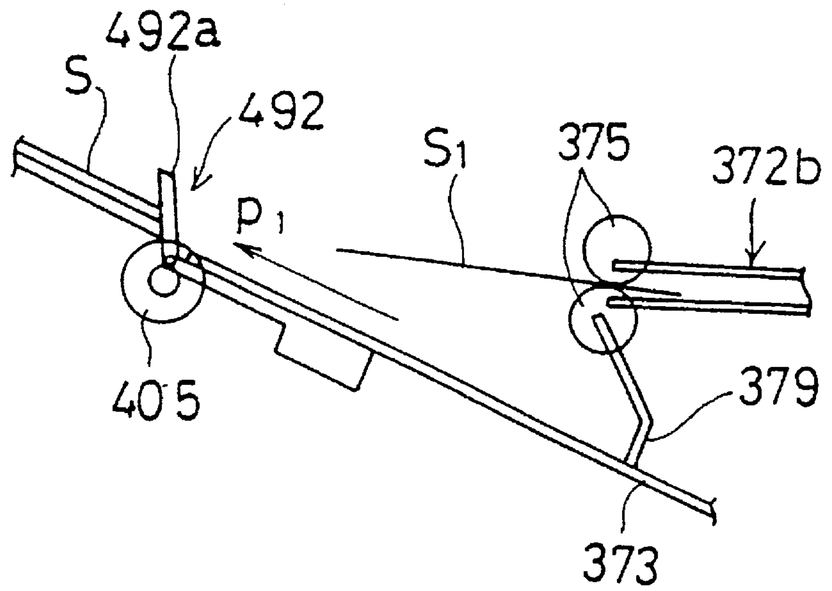
Figure 122:
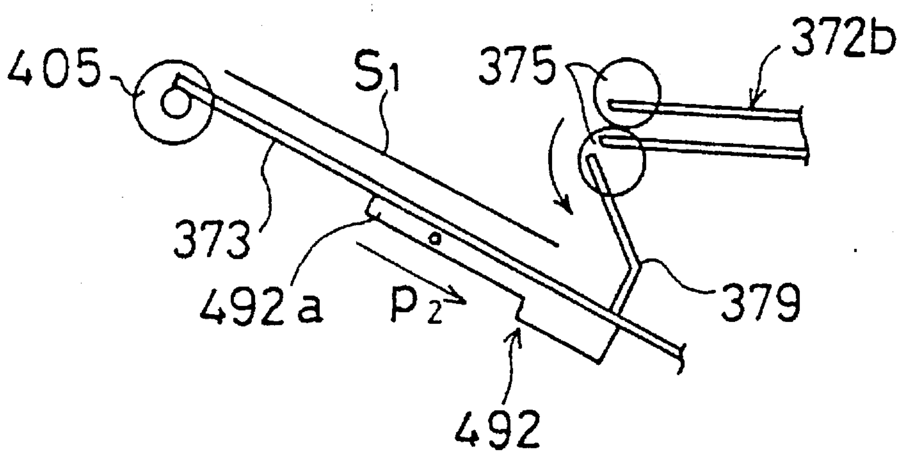

FIGS. 122(*a*)(*b*) are explanatory views respectively showing the relative positions between the push-out member and the sheets discharged through the transport path of the device for further processing after copying of FIG. 120.

Figure 123:
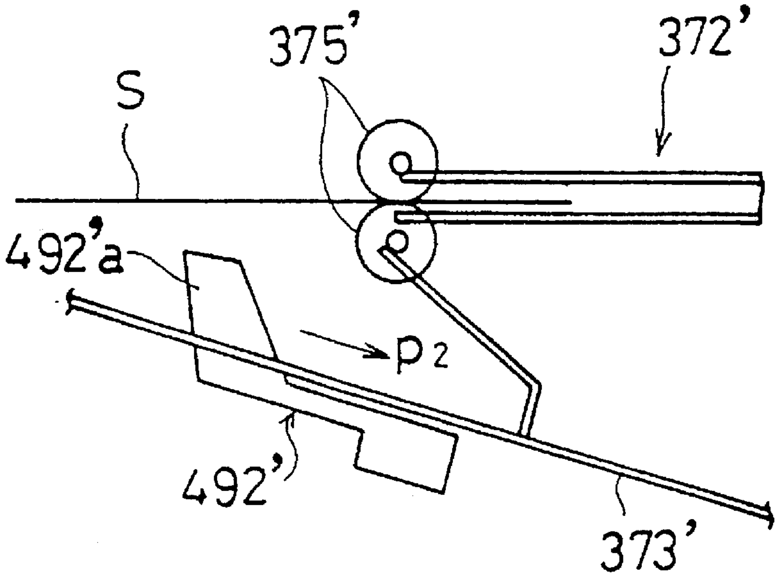
Figure 123:
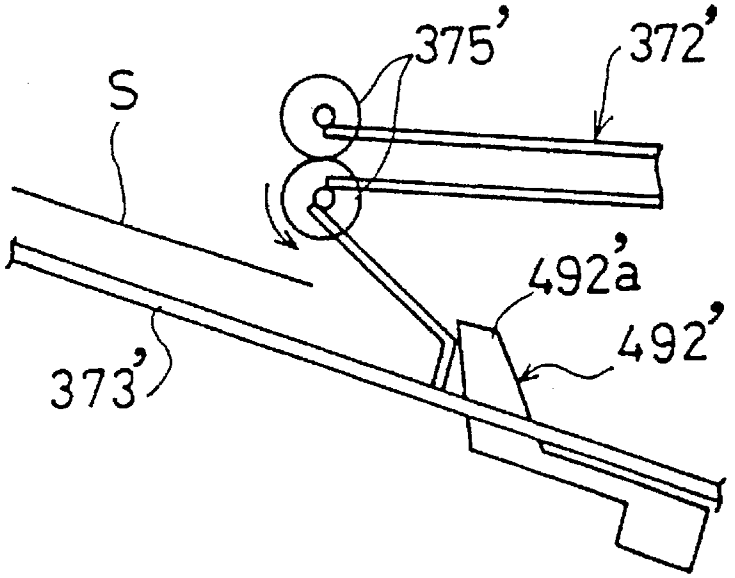

FIGS. 123(*a*)(*b*) are explanatory views respectively showing the relative positions between the push-out member and the sheets discharged through the transport path of the conventional device for further processing after copying.

Figure 124:
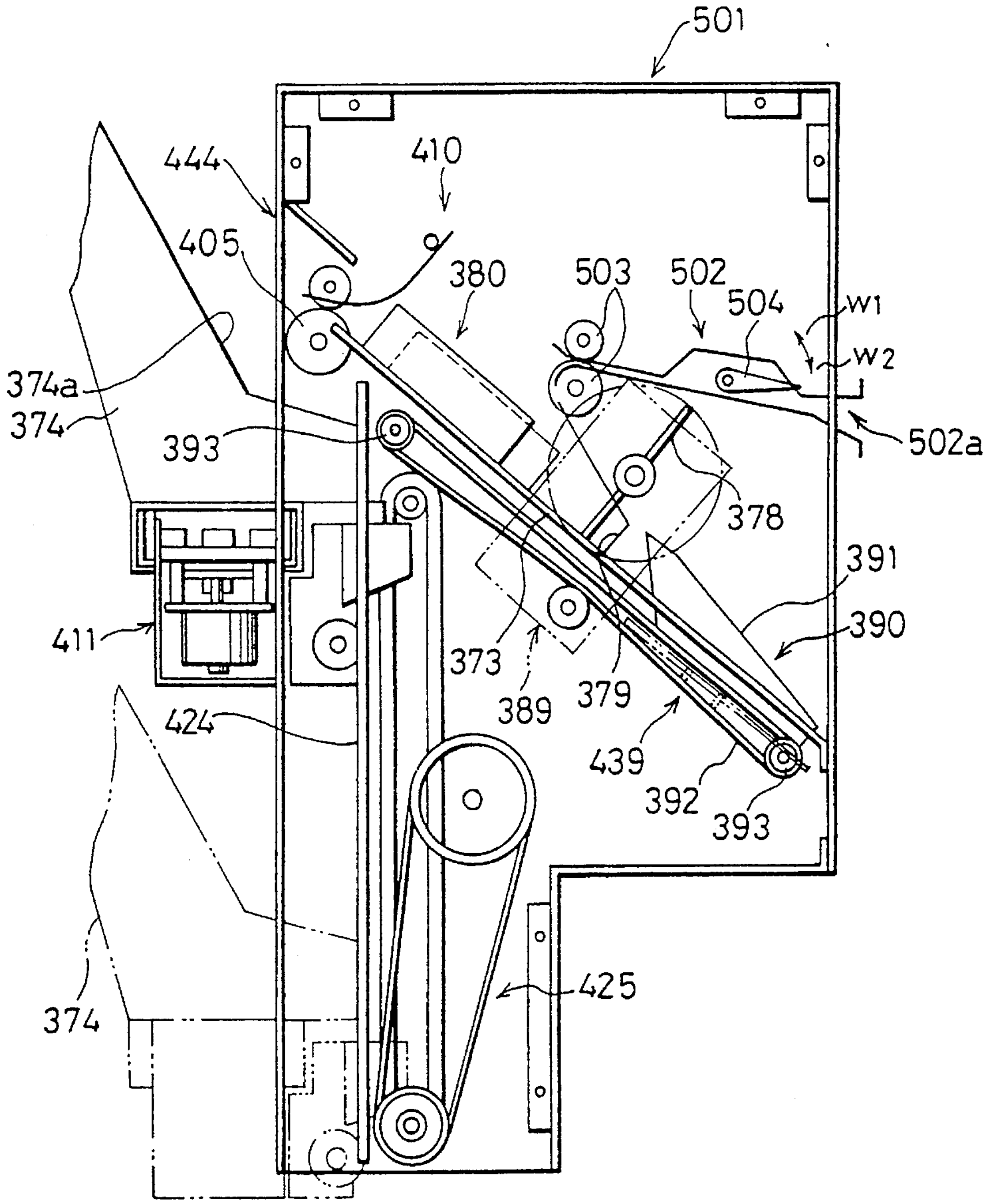

FIG. 124 is a view showing the entire configuration of the device for further processing after copying of another embodiment of the present invention.

Figure 125:
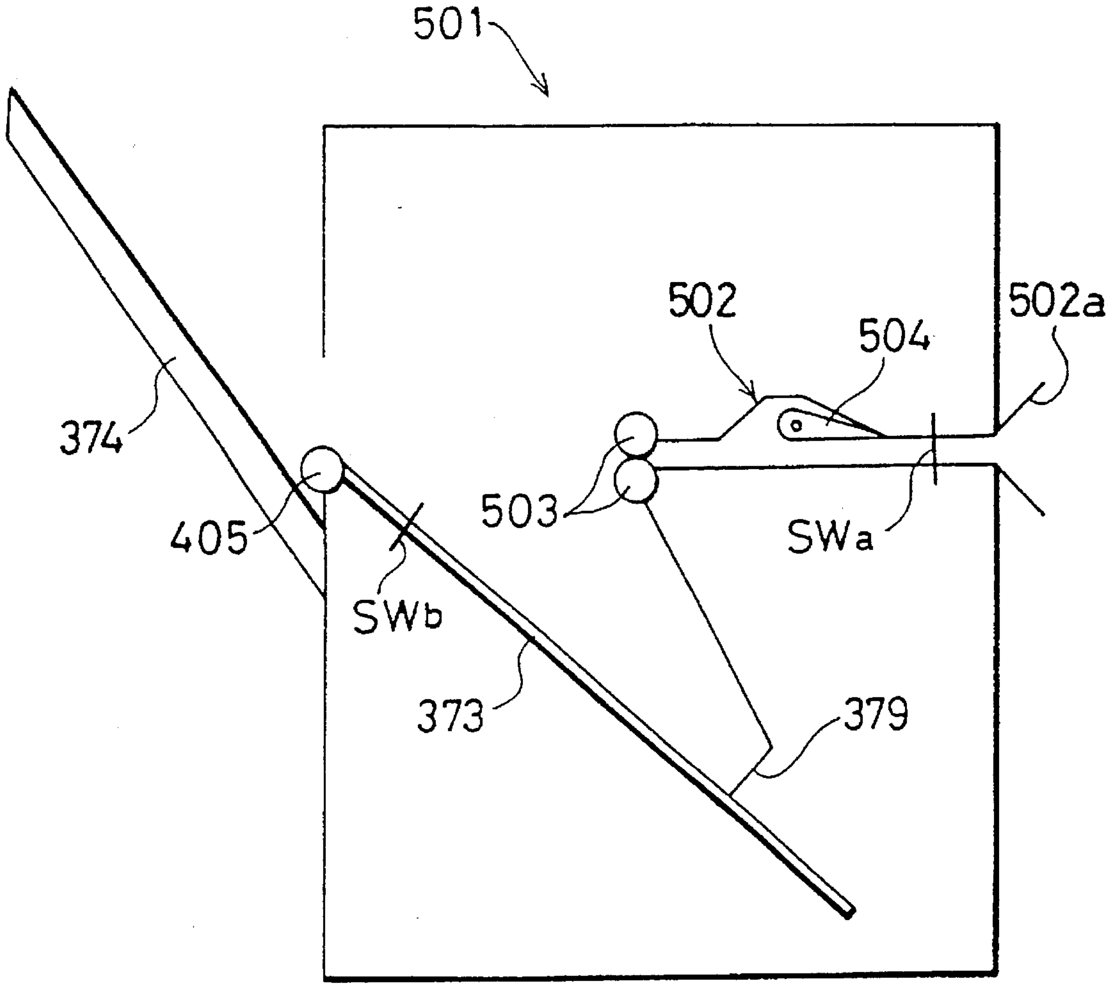

FIG. 125 is an explanatory view showing the sheet detection switches respectively provided along the transport path and the stapler plate of the device for further processing after copying of FIG. 120.

Figure 126:
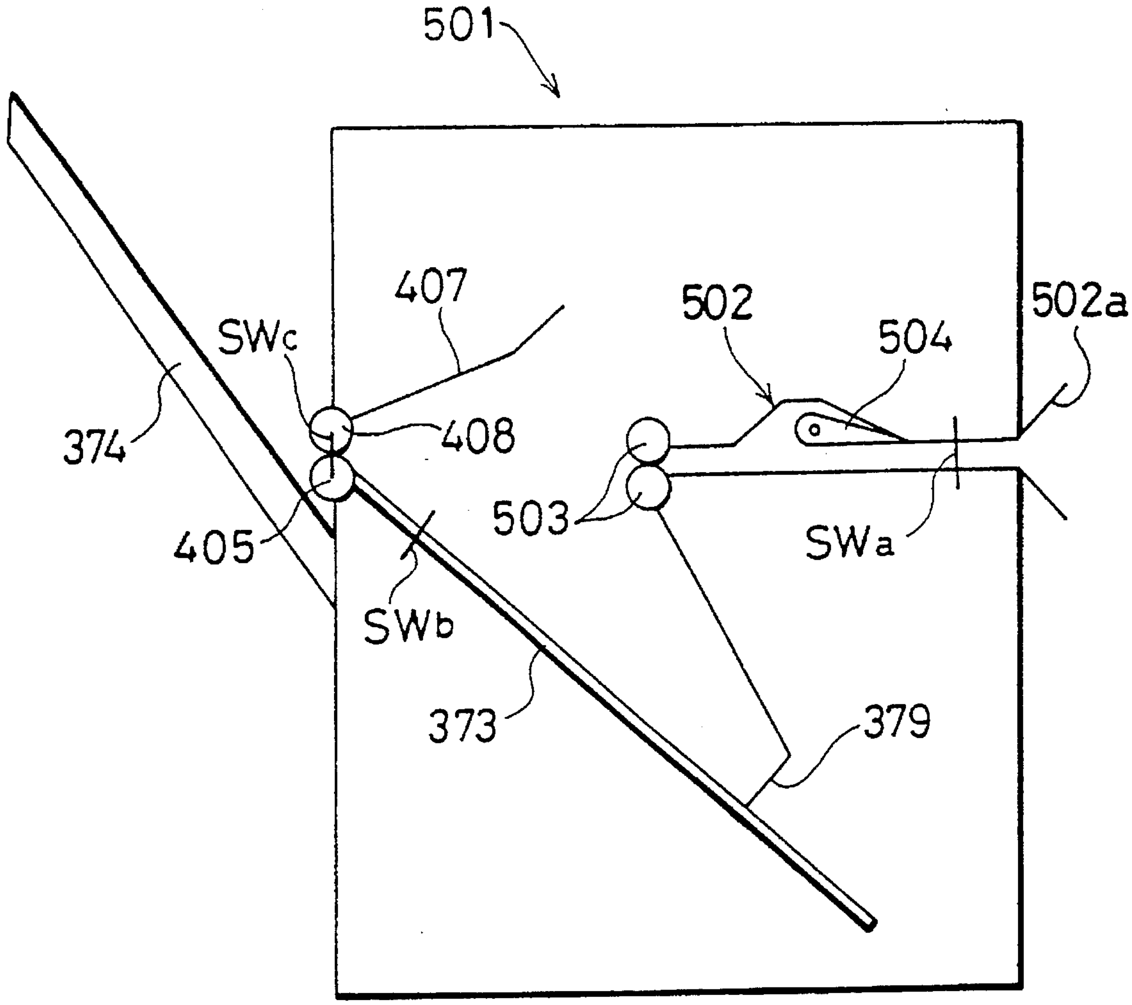

FIG. 126 is an explanatory view showing a sheet detection switch composed of the discharge roller and the driven roller of the device for further processing after copying of FIG. 120.

Figure 127:
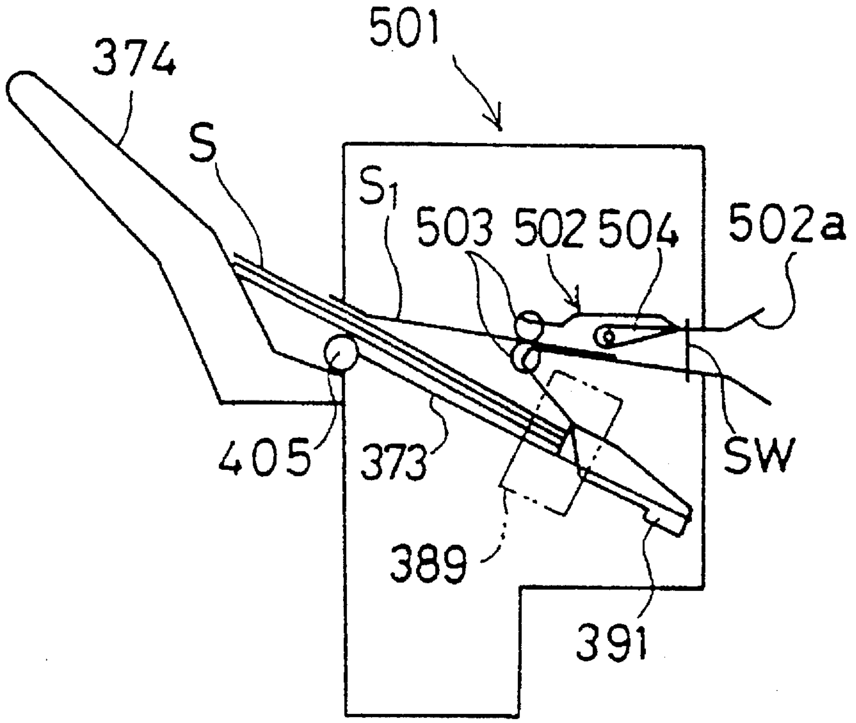
Figure 127:
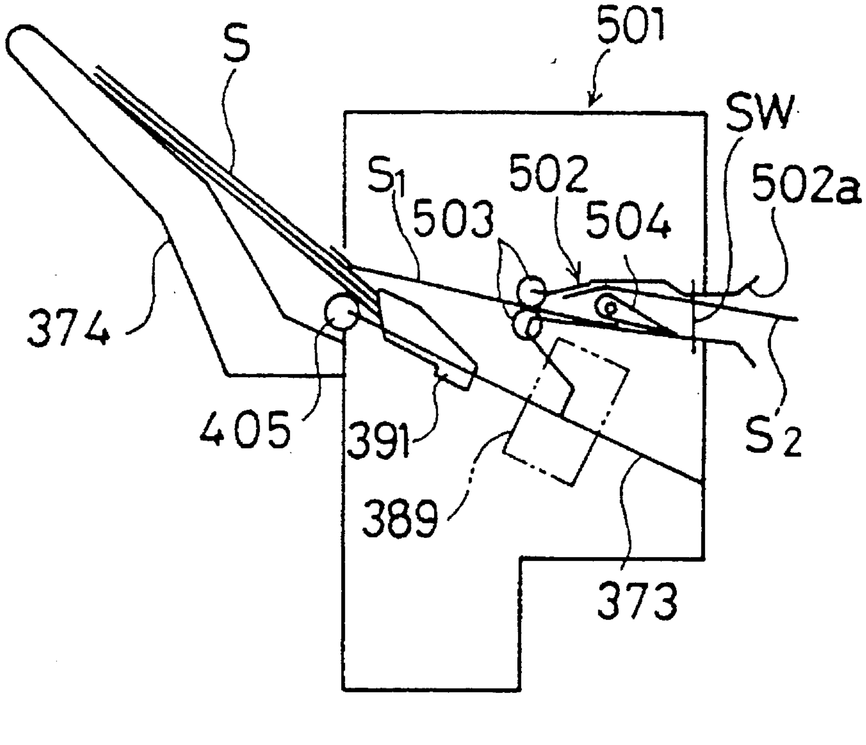

FIGS. 127(*a*)(*b*) are explanatory views respectively showing the sheet transport operations through the transport path in the multiple staple mode.

DESCRIPTION OF THE EMBODIMENT

[EMBODIMENT 1]

The following description will discuss an embodiment of the present invention with reference to FIGS. 1 through 25. The embodiment is given through the case where a device for further processing after copying is contained in a copying machine.

Figure 1:
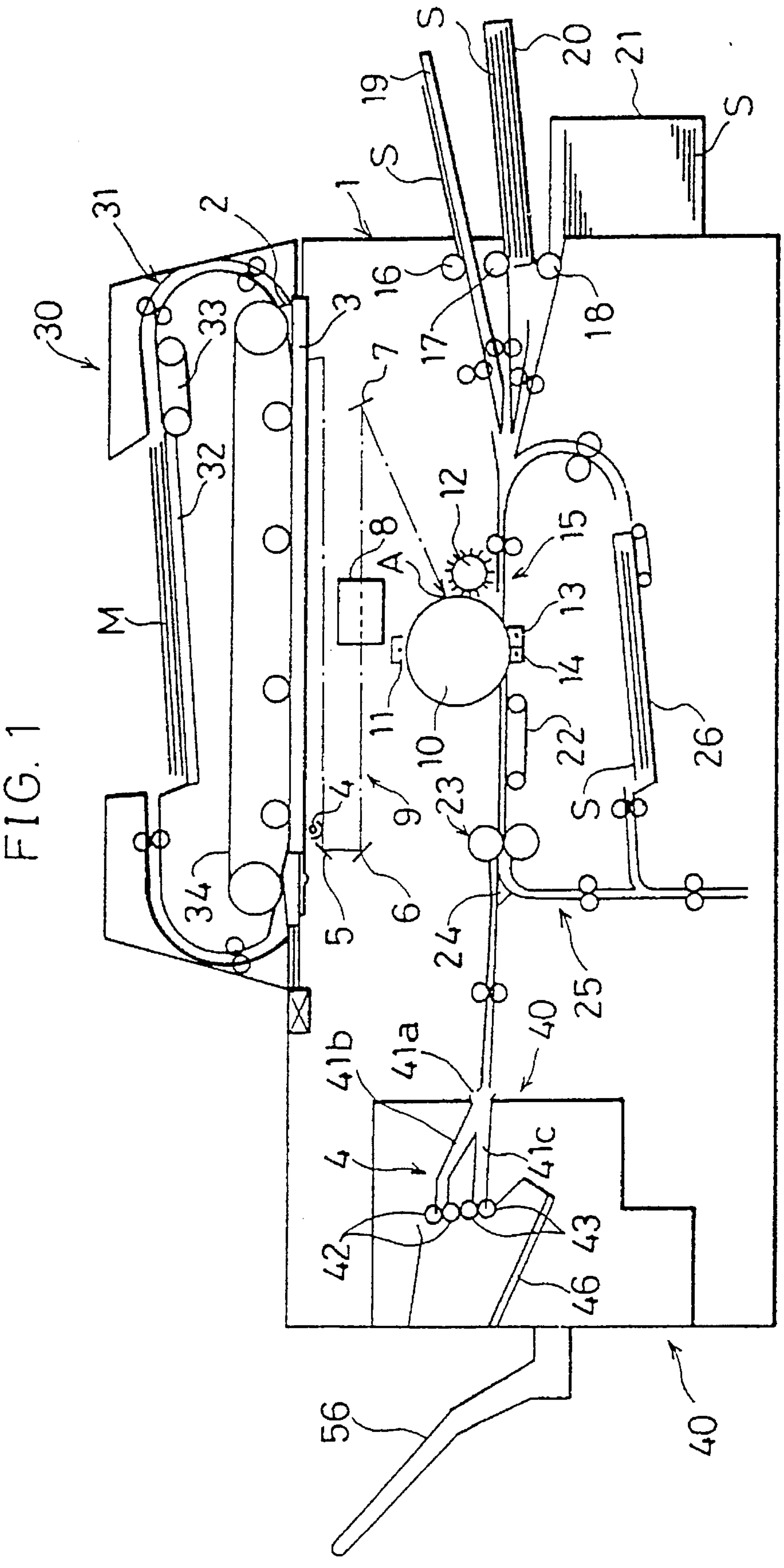
FIG. 1 is a longitudinal sectional view showing a copying machine adopted in an embodiment of the present invention.

As shown in FIG. 1, the copying machine adopted in the present embodiment has a main body 1 which copies an image on a document M to a sheet S. Further, a document feeder 30 is provided above the main body 1, which transports the document M to an exposure area 2 formed on the top surface of the main body 1.

A glass plate 3 having the exposure area 2 formed on the surface thereof is placed on the upper side of the main body 1. Further, an optical system 9 and a photoreceptor drum 10 are placed under the glass plate 3. The optical system 9 includes a light source 4, mirrors 5, 6, and 7, and a lens 8. The optical system 9 is provided for scanning the document M using a light emitted from the light source 4, the document M being transported to the exposure area 2 by the document feeder 30 (to be described later). Further, a reflected light is projected onto an exposure point A on the surface of the photoreceptor drum 10 through mirrors 5, 6 and 7, and the lens 8. As a result, a static latent image is formed on the surface of the photoreceptor drum 10 which is uniformly charged by a main charger unit 11 (to be described later), the static latent image corresponding to the image on the document M.

A main charger unit 11, a developer unit 12, a transfer charger 13, and a separation charger 14 are provided along the circumference of the photoreceptor drum 10. As described, the main charger unit 11 charges the surface of the photoreceptor drum 10 to a predetermined electric potential. The developer unit 12 develops the electrostatic latent image formed on the surface of the photoreceptor drum 10 to be a toner image. Then, the transfer charger 13 transfers the toner image onto the sheet S which has been transported through a sheet transport path 15 (to be described later). In addition, the separation charger 14 is provided for separating the sheet S, whereon the toner image is to be transferred, from the photoreceptor drum 10.

A sheet transport path 15 is provided under the photoreceptor drum 10, for transporting the sheets S, whereon the toner image is to be transferred. Further, a feed board 19, a feed cassette 20, and a feed deck 21 are placed on the upstream of the sheet transport path 15, respectively provided with feed rollers 16, 17 and 18. It is arranged such that the sheets S placed on the feed plate 19 or the feed deck 21, or the sheets S stored in the feed cassette 20 are fed to the photoreceptor drum 10 through the sheet transport path 15. On the downstream of the sheet transport path 15, a transport belt 22 and a fuser 23 are provided. The transfer belt 22 transports the sheet S whereon the toner image has been transferred. The toner image is made permanent on the sheet S by the fuser 23.

On the downstream of the fuser 23, a deflector 24 is provided by which a feeding path of the sheet is branched into both a path connected to a device 40 for further processing after copying (to be described later), and a re-transport path 25. The re-transport path 25 serves as a recirculation path through which the sheet S, whereon the toner image has been transferred by the photoreceptor drum 10, is transported again to the photoreceptor drum 10. Further, an intermediate tray 26 is provided along the path, which allows copying on both sides of the sheet S.

The document feeder 30 has a document transport path 31 for transporting the document M to the exposure area 2 formed on the top surface of the main body 1. The document transport path 31 serves as a recirculation path, and is provided with a document tray 32 (whereon the document M is placed), a feed belt 33, and a transport belt 34. The feed belt 33 is provided for feeding the document M placed on the document tray 32 to the exposure area 2 in order. The transport belt 34, which forms a transport path between the glass plate 3 and itself, is in contact with the glass plate 3 having the exposure area 2 formed on the surface thereof. The document feeder 30 feeds the document M placed on the document tray 32 to the exposure area 2. Further, the document feeder 30 sets the document M at a predetermined position on the glass plate 3 by the transport belt 34 so that the document M becomes ready to be scanned by the described light source 4.

Further, the copying machine adopted in the present embodiment is provided with the device 40 for further processing after copying at the lower end of the sheet transport path 15.

Figure 2:
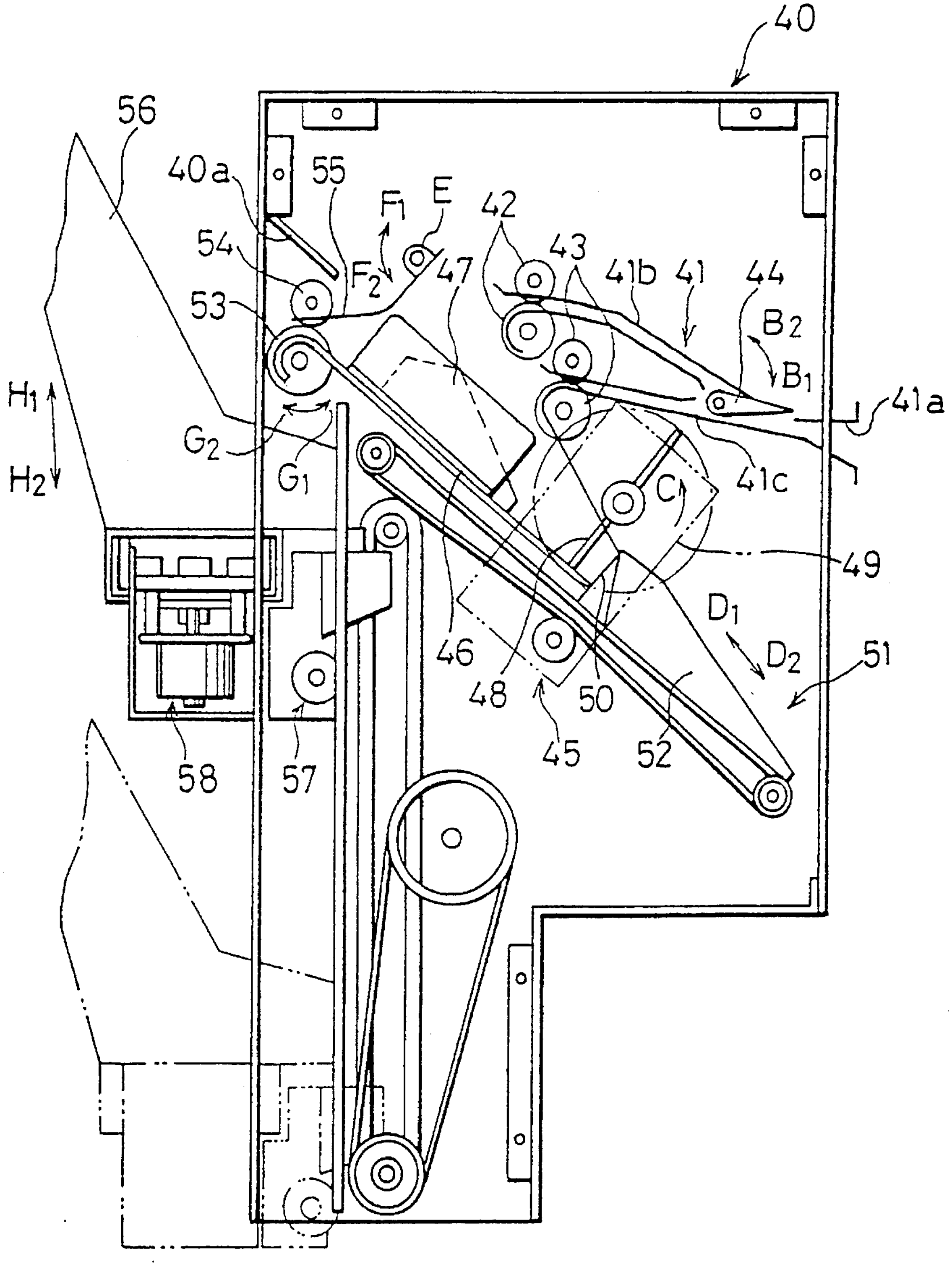
FIG. 2 is a longitudinal sectional view showing the device for further processing after copying contained in the copying machine.

As shown in FIG. 2, the device 40 of the present embodiment is provided with a transport path 41 (to be described later), binding means 45 (means for processing after copying), sheet discharge means 51, and a discharge tray 56. The transport path 41 transports the sheet S fed from the main body 1 within the device 40. The binding means 45 arranges the sheets S and bind them using a stapler. The sheet discharge means 51 discharges the arranged and bound set of sheets S from the device 40. The bound set of sheets S discharged from the device 40 is placed on the discharge tray 56.

The transport path 41 has an entry opening 41*a* formed on one end thereof, through which the sheets S are fed from the main body 1. The transport path 41 is branched into upper and lower paths, i.e., a bypass 41*b* (second path) and a main pass 41*c* (first path). The transport path 41 is further provided with a pair of upper and lower transport rollers 42 and 43 (sheet transport means), placed at respective ends of the bypass 41*b* and the main pass 41*c*, and a deflector 44 placed at a branch point between the bypass 41*b* and the main pass 41*c*. The deflector 44, which serves as a means for switching the path, is capable of rotating in the direction of $B_1$–$B_2$, and switches the transport path for the sheet S either to the bypass 41*b* or to the main pass 41*c*.

Figure 3:
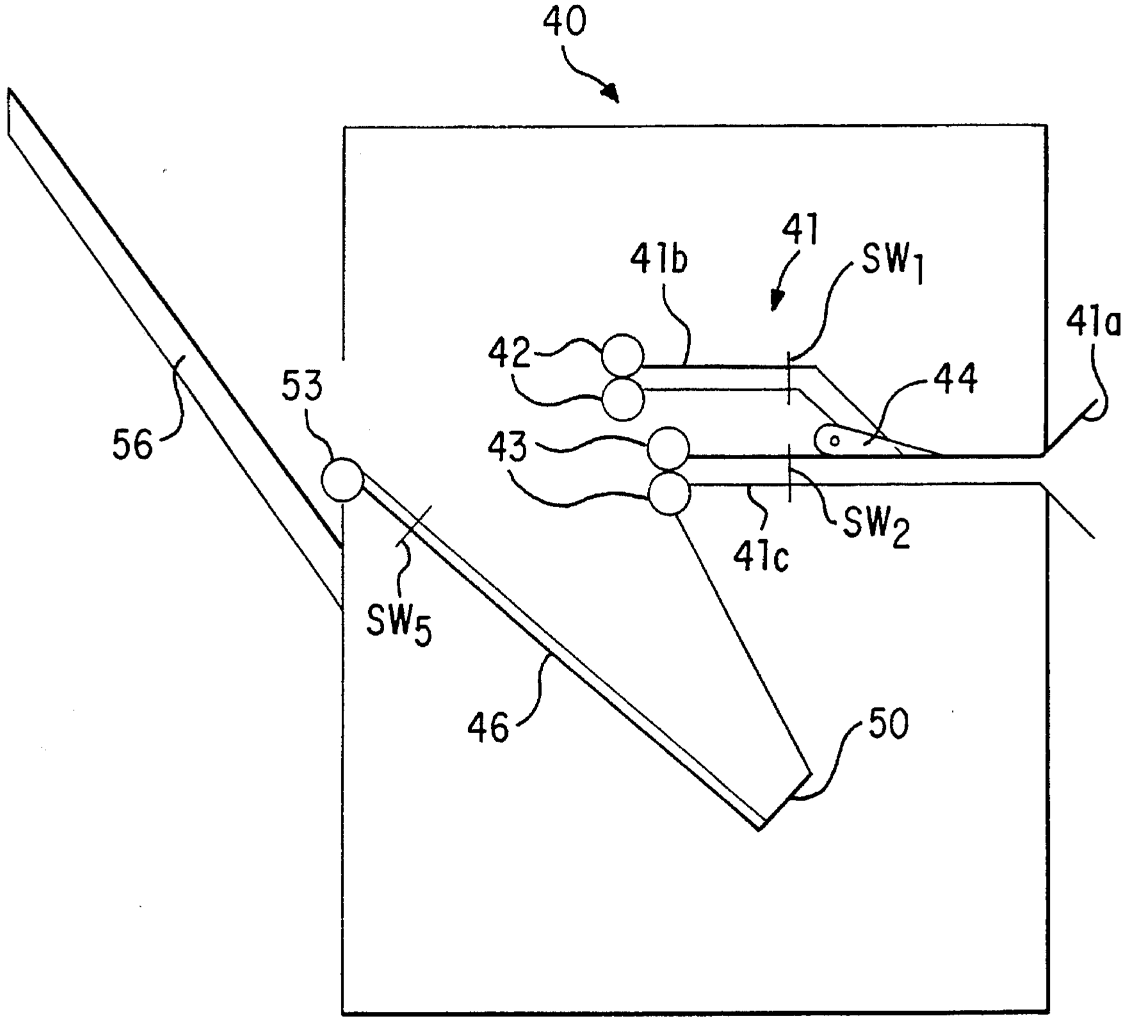
FIG. 3 is an explanatory view showing each sheet detection switch provided along a transport path of the device for further processing after copying.
Figure 4:
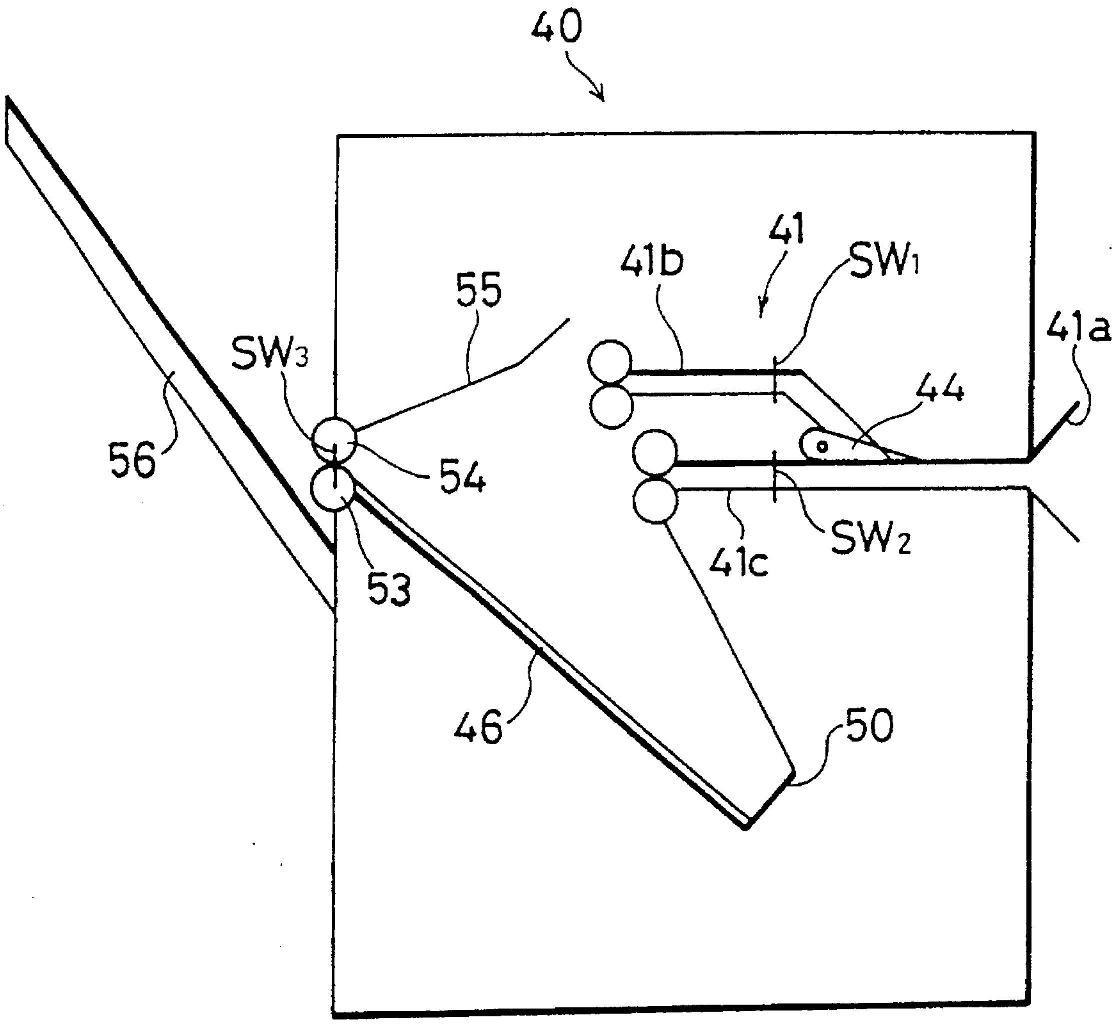
FIG. 4 is an explanatory view showing a sheet detection switch composed of discharge rollers of the device for further processing after copying.

As shown in FIG. 3, the transport path 41 is provided with sheet detection switches $SW_1$ and $SW_2$ (for detecting the sheet S), respectively placed along the bypass 41*b* and the main pass 41*c*. With the respective detections of the sheets S by the sheet detection switches $SW_1$ and $SW_2$, and another sheet detection switch (not shown) provided on the stapler plate 46 (to be described later), the rotation of the transport roller 43 is controlled. The rotation of the transport roller 43 is also controlled by a timer (not shown).

Namely, the transport control means of the present invention is composed of sheet detection switches $SW_1$ and $SW_2$, and another sheet detection switch (not shown) for detecting the sheets S, provided on the stapler plate 46 (to be described later).

The binding means 45 is composed of the stapler plate 46 (whereon the process after copying is carried out), an edge aligner 47, a paddler 48, and a stapler 49.

The stapler plate 46, placed under the transport path 41, is provided with a discharge opening 40*a* having one end attached to the side surface of the device 40. The other end of the stapler plate 46 is placed at a lower level than the end attached to the side surface so as to form a slope. The sheets S to be bound (stapled) are placed on the stapler plate 46. As mentioned earlier, the sheet detection switch (not shown) on the stapler plate 46 is provided for detecting whether or not the sheet S exists on the stapler plate 46.

The edge aligner 47, provided at substantially the center of the stapler plate 46, is capable of moving up and down in the direction perpendicular to the sheet surface of FIG. 2. The edge aligner 47 is provided for aligning the sides of the sheets S placed on the stapler plate 46. The paddler 48, which is capable of moving in the direction of arrow C, is provided so that a blade section is in contact with the lower end surface of the stapler plate 46. The paddler 48 is provided for aligning the ends of the sheets S placed on the stapler plate 46.

The stapler 49 is placed beside the stapler plate 46 having the paddler 48 attached thereto. The stapler 49 is provided for binding the sheets S placed on the stapler plate 46. A stopper 50 is also provided at the lower end of the stapler plate 46 which aids the paddler 48 in aligning the ends of the sheets S by stopping the rear edges of the sheets S.

The sheet discharge means 51 is composed of a push-out member 52 and discharge rollers 53 and 54.

The push-out member 52 is placed along an extended line from the lower end of the stapler plate 46, and is capable of moving forward and backward in the direction of $D_1$–$D_2$ along the top surface of the stapler plate 46. The push-out member 52 pushes out the sheet S, placed on the stapler plate 46, towards the discharge opening 40*a* after the sheets S are bound. The discharge roller 53 is placed so that its rotation axis is supported by the upper end of the stapler plate 46, and is capable of rotating in the direction of $G_1$–$G_2$. On the other hand, the discharge roller 54 is provided so that its rotation axis is supported by the end of an arm member 55, the other end being capable of rotating around a fulcrum E in the direction of $F_1$–$F_2$.

When it is set in the staple mode (to be described later), the discharge roller 53 serves to aid in aligning the ends of the sheets S, placed on the stapler plate 46, by rotating in the direction of $G_1$. On the other hand, the discharge roller 54 discharges the bound set of sheets S by rotating in the direction of $G_1$ after the sheets S are bound. When it is set in the offset mode (to be described later), the discharge roller 54 is arranged so as to sandwich the sheets S between the discharge roller 53 and itself, and discharges the sheet S onto the discharge tray 56 directly from the transport path 41 as the arm member 55 rotates in the direction of $F_2$ with the rotation of the discharge roller 53 in the direction of $G_1$. In addition, in the offset mode, the discharge rollers 53 and 54 become the sheet detection switch $SW_3$ for detecting the sheet S when they are in contact with one another.

The discharge tray 56 is fitted in the device 40 under the discharge roller 53. An elevator unit 57 and a shift unit 58 are provided in the vicinity of the portion attached to the device. Therefore, the discharge tray 56 can move both in the up-down direction of $H_1$–$H_2$ and in the direction perpendicular to the plane of FIG. 2, so that the position of the discharge tray 56 is adjusted according to the sheets S to be held.

Figure 5:
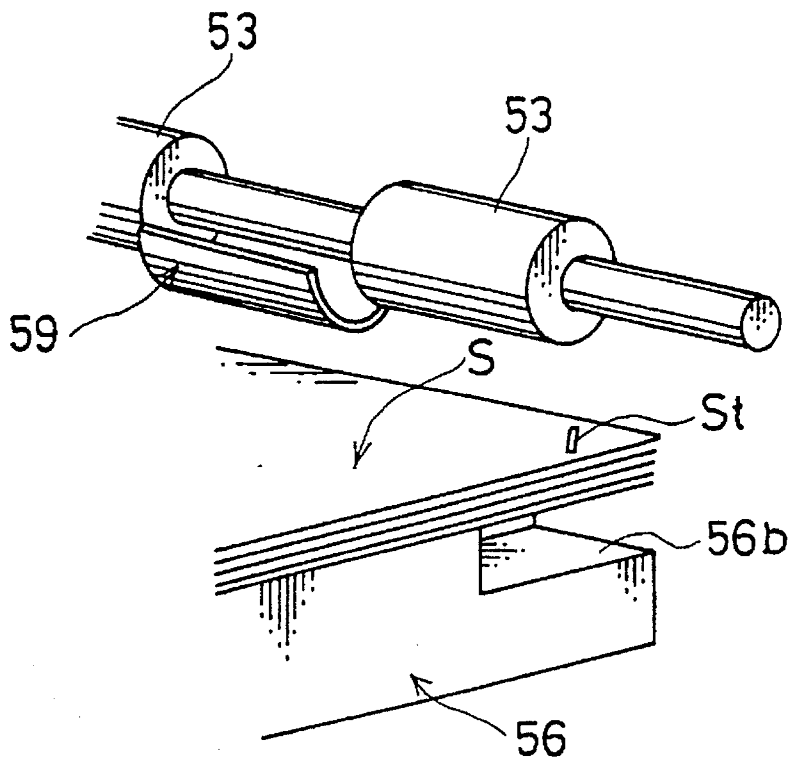
FIG. 5 is a perspective view showing an actuator provided on the discharge roller.
Figure 6A:
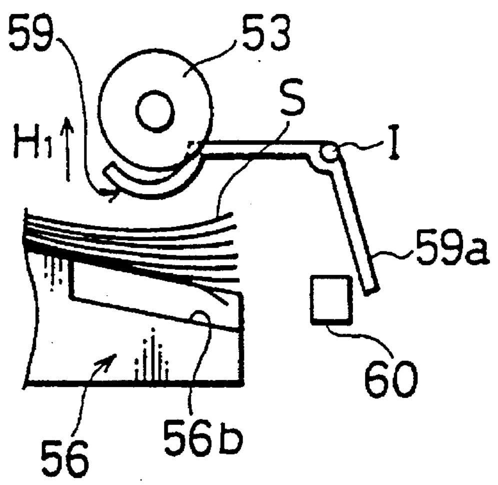
FIGS. 6(*a*)(*b*) are explanatory views respectively showing upper limit detecting operations for the discharge tray by the actuator.
Figure 6B:
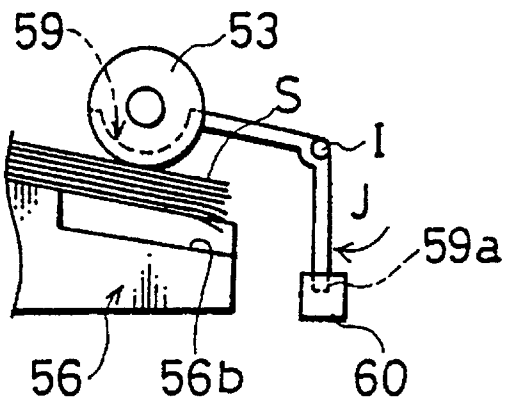

The forward motion of the discharge tray 56 in the direction of $H_1$ has an upper limit detected by the actuator 59 provided on the discharge roller 53 as shown in FIG. 5. Furthermore, as shown in FIGS. 6(*a*)(*b*), the actuator 59 rotates in the direction of J around a fulcrum I with the forward motion of the discharge tray 56 in the direction of $H_i$ so as to insert an edge part of the actuator 59 into a sensor 60. As a result, the discharge tray 56 is stopped at the position where the sheet S is sandwiched between the discharge roller 53 and itself.

Figure 7:
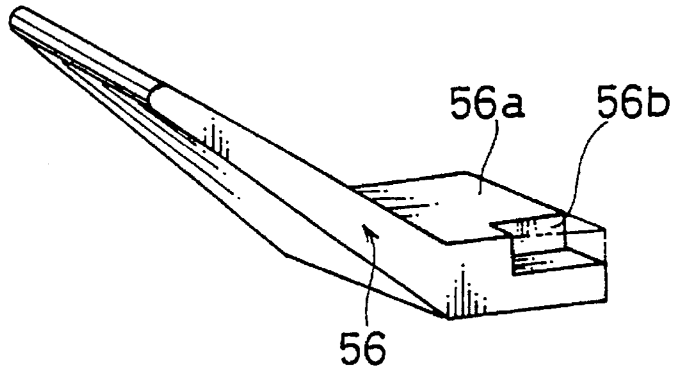
FIG. 7 is a perspective view showing a recessed portion formed on the discharge tray.

The portion attached to the device of the discharge tray 56 is made concave so as to form a resting face 56*a* for the discharge roller 53. Furthermore, the corner of the surface facing the discharge roller 53 is recessed as shown in FIG. 7 to be a recessed portion 56*b* so that the stapled corners St of complete sets (to be described later) drop into the recessed portion 56*b*. The support face 56*c* for the sheets of the discharge tray 56 is set parallel to the top surface of the stapler plate 46.

Figure 8:
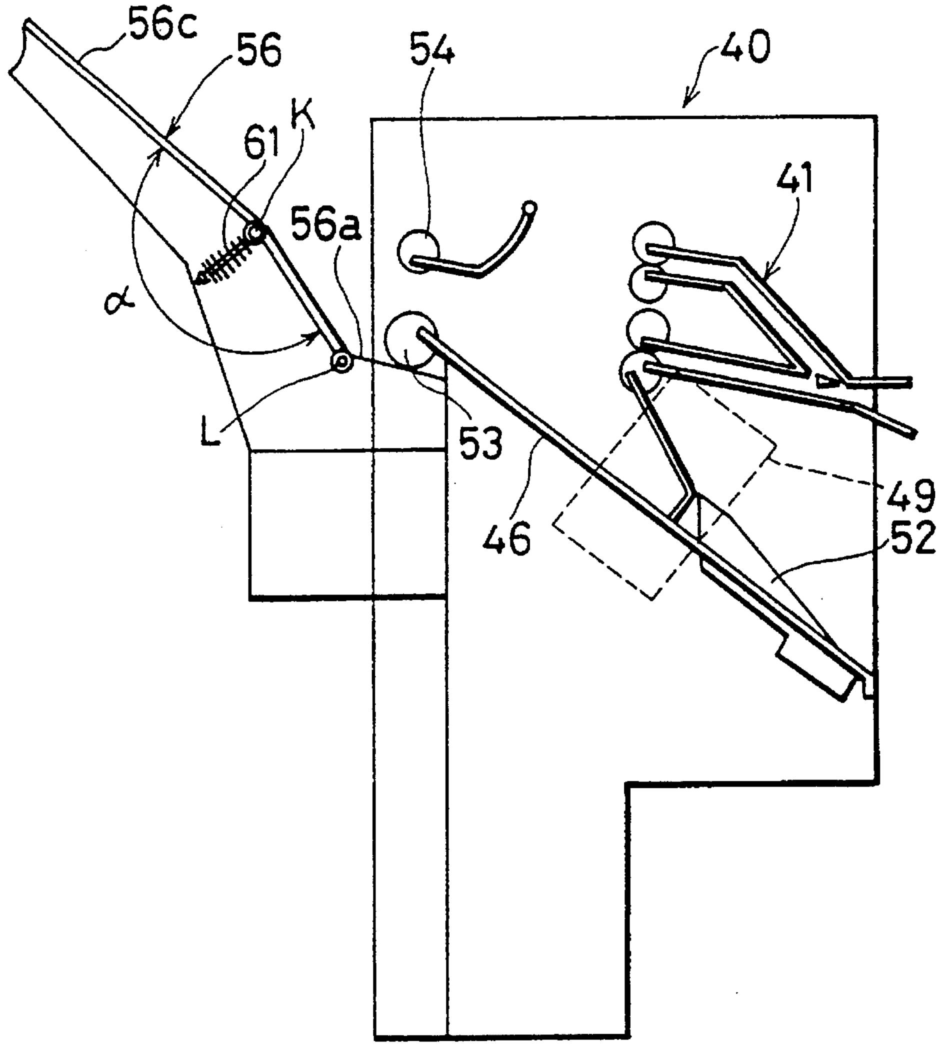
FIG. 8 is a longitudinal sectional view showing a spring provided on the discharge tray.

As shown in FIG. 8, the discharge tray 56 is arranged as follows. The support face 56*c* is provided at the lower end of the resting face 56*a* so as to be capable of rotating around a fulcrum K. Further, the resting face 56*a* is provided so as to be capable of rotating around the corner L at the upper end of the resting face 56*a*. Furthermore, a spring 61 (angle change means) is provided at the fulcrum K so that the tray angle α between the support face 56*c* and the resting face 56*a* varies in response to the sheets S placed on the discharge tray 56.

With the above arrangement of the device 40, the following will explain the process for transporting the sheets S. Here, the explanation is given for each of an offset mode, a single staple mode, and a multiple staple mode. In the offset mode, the sheets S transported from the main body 1 are discharged one by one onto the discharge tray 56 without being further processed. Whereas, in the single staple mode, the sheets S, transported from the main body 1, go through a predetermined binding process. Then, the bound set of sheets S (hereinafter referred to as a complete set) is discharged onto the discharge tray 56, and accordingly, a plurality of complete sets are discharged set by set in the multiple staple mode.

Figure 9:
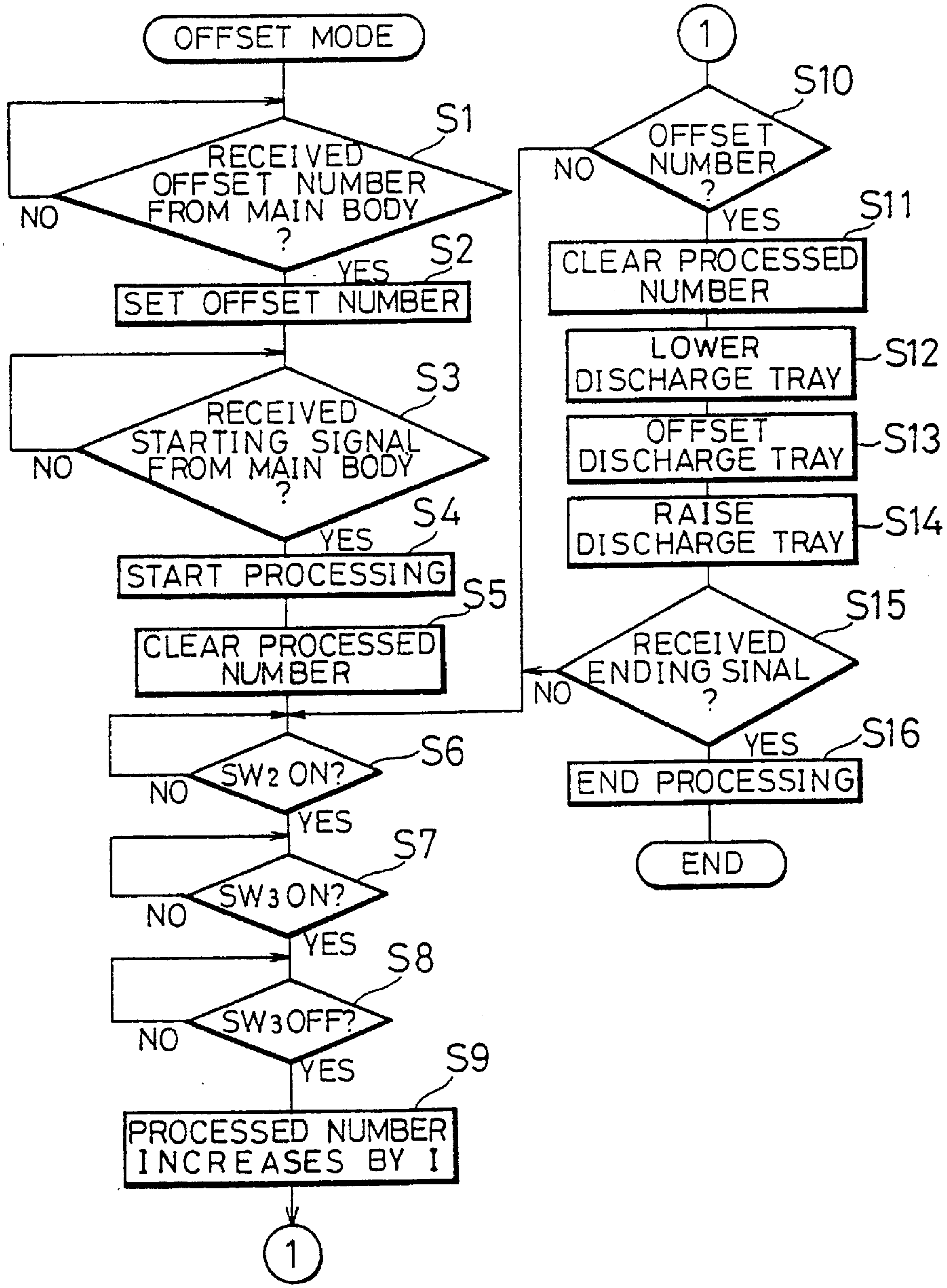
FIG. 9 is a flow chart showing a process in an offset mode with a device for further processing after copying.

The flowchart of FIG. 9 explains the process in the offset mode. First, the device 40 receives a signal of an offset number from the main body 1 (S1). Then, the offset number is set in the device 40 (S2). Next, the device 40 receives a signal to start the operation from the main body 1 (S3). Then, the process is started (S4), and the processed number is cleared (S5).

The sheet S, whereon the image on the document M is copied in the main body 1, is fed into the device 40 through the entry opening 41*a*. It passes through the main pass 41*c*, and is sandwiched between the discharge rollers 53 and 54. Then, it is discharged onto the discharge tray 56. This transportation of the sheet S through the main pass 41*c* is detected as the sheet detection switch $SW_2$ is turned ON (S6). Similarly, the transporting and passing of the sheet S between discharge rollers 53 and 54 are detected as the sheet detection switch $SW_3$ is turned ON (S7) and OFF (S8). Then, the processed number increases by 1 (S9).

Then, it is determined whether or not the processed number coincides with the offset number (S10). If not, the sequence goes back to S6. If so, the processed number is cleared (S11). Thereafter, the descending of the discharge tray 56 (S12), setting of the offset number (S13), and ascending of the discharge tray 56 (S14) are executed in order.

Then, it is determined whether or not the device 40 received a signal to stop the operation from the main body 1 (S15). If not, the sequence goes back to S6. If so, the process is ended (S16), and the above sequence in the offset mode is terminated.

Figure 10:
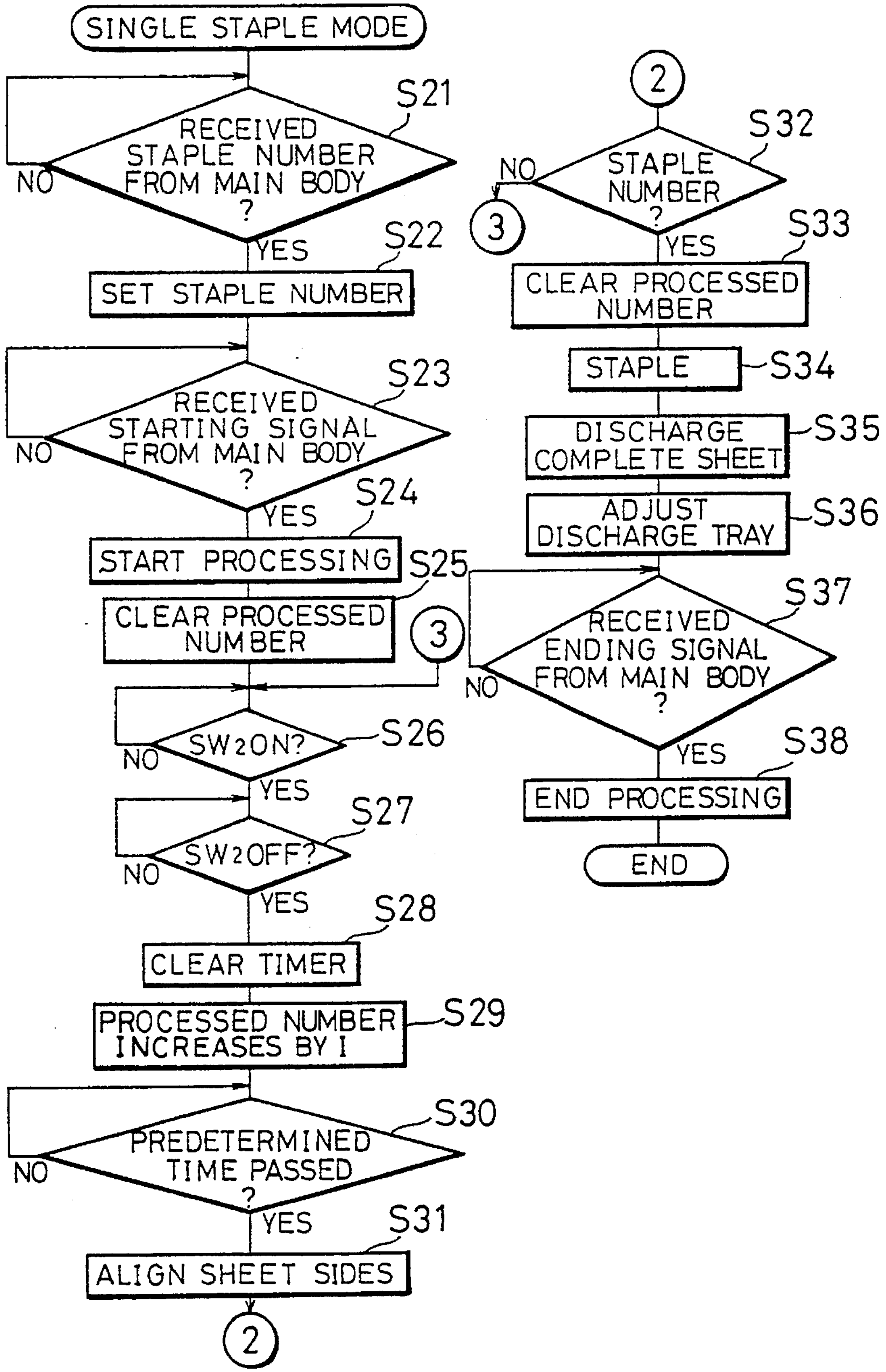
FIG. 10 is a flow chart showing a process in a single staple mode with a device for further processing after copying.
Figure 11:
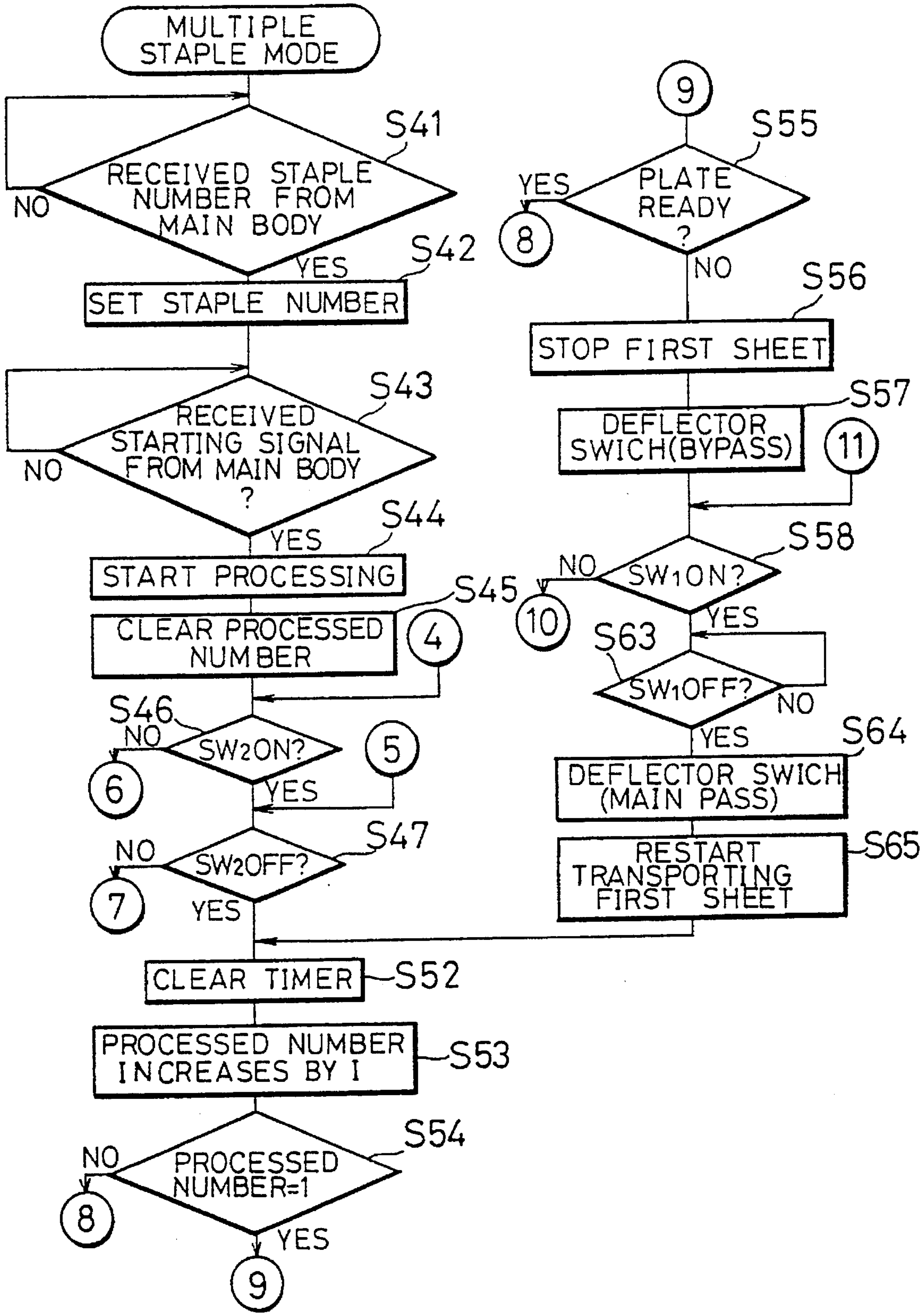
FIG. 11 is a flow chart showing a part of a process in a multiple staple mode with the device for further processing after copying.
Figure 12:
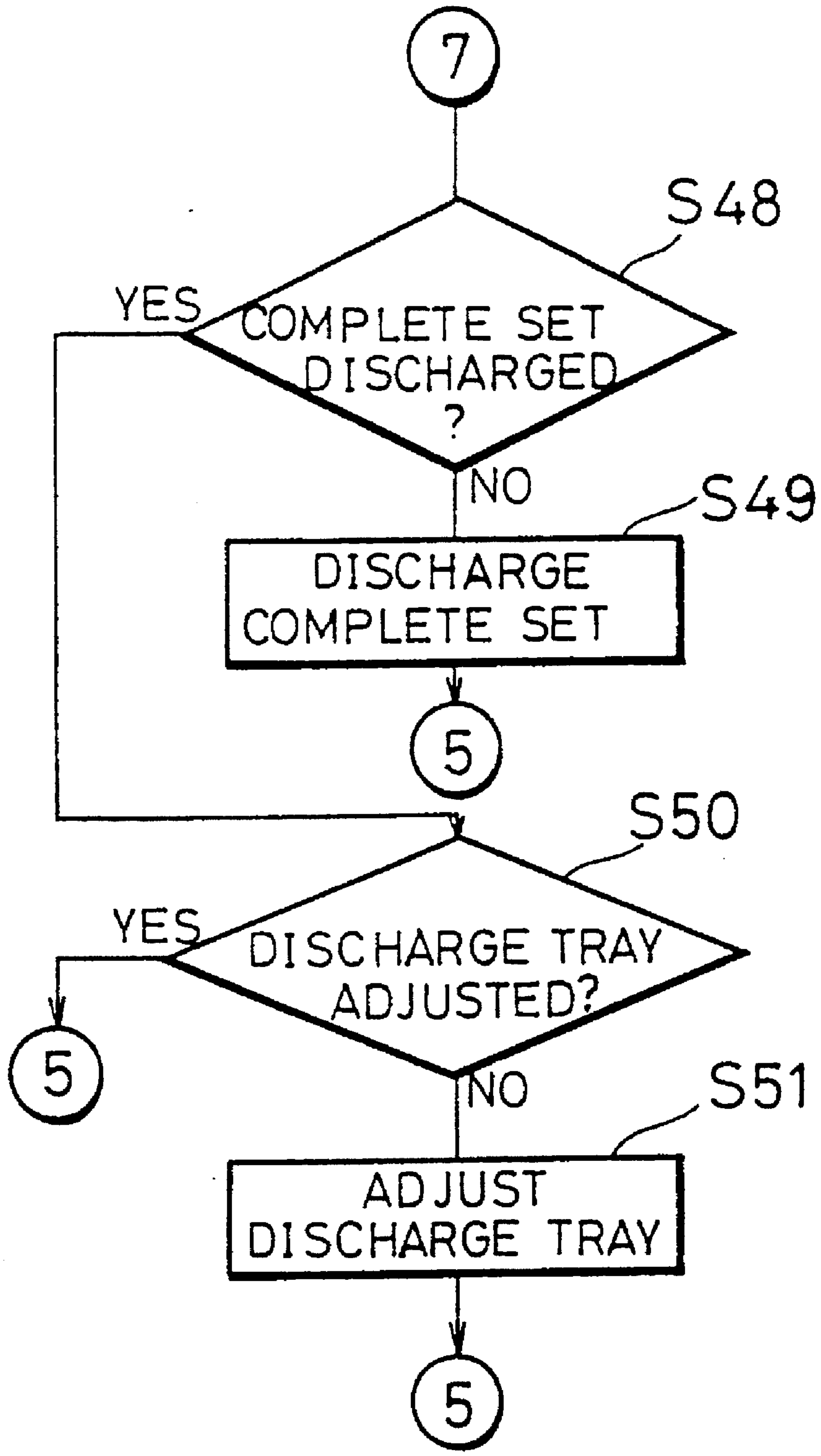
FIG. 12 is a flow chart showing a part of a process in a multiple staple mode with the device for further processing after copying.
Figure 13:
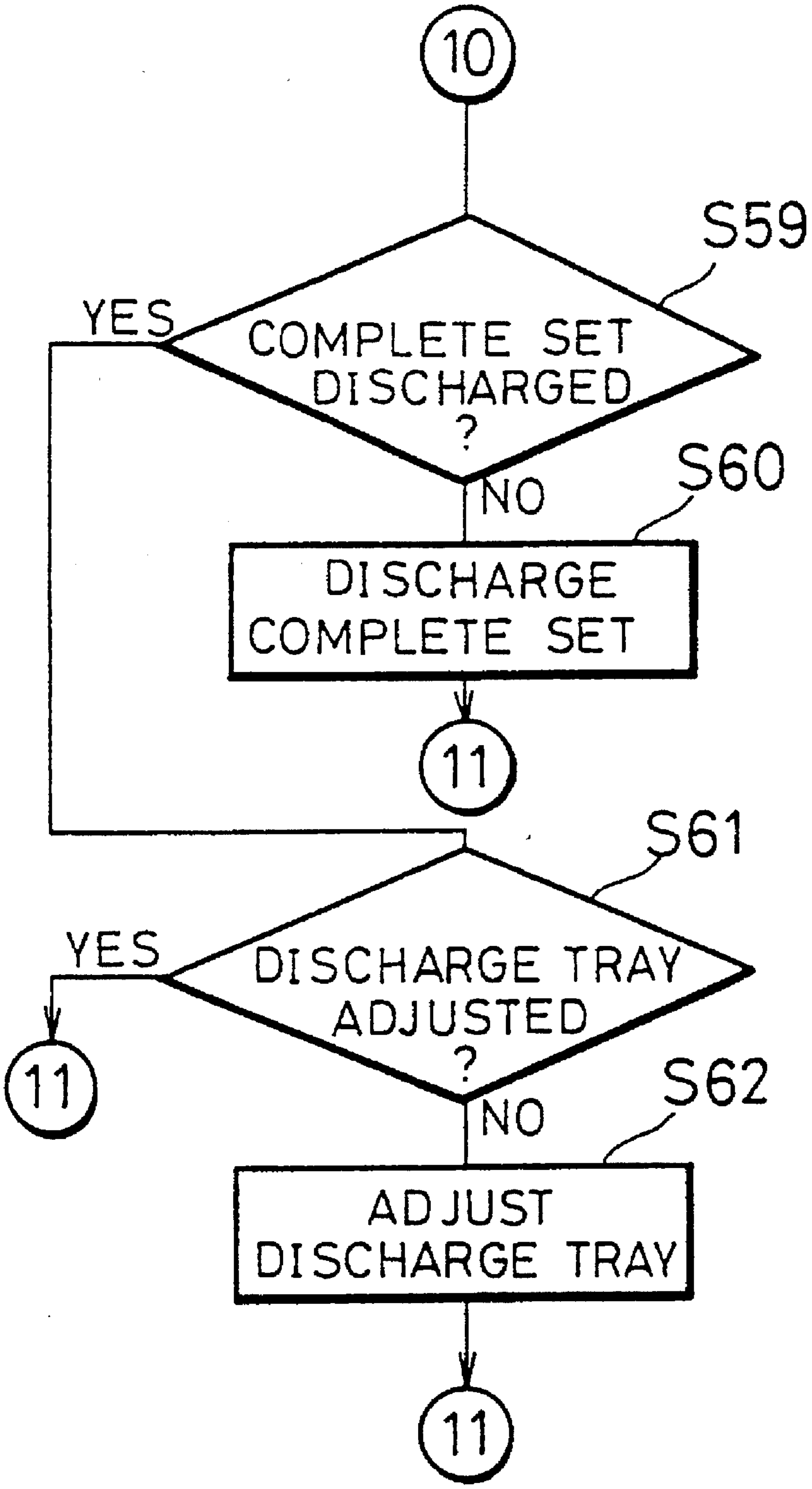
FIG. 13 is a flow chart showing a part of a process in a multiple staple mode with the device for further processing after copying.
Figure 14:
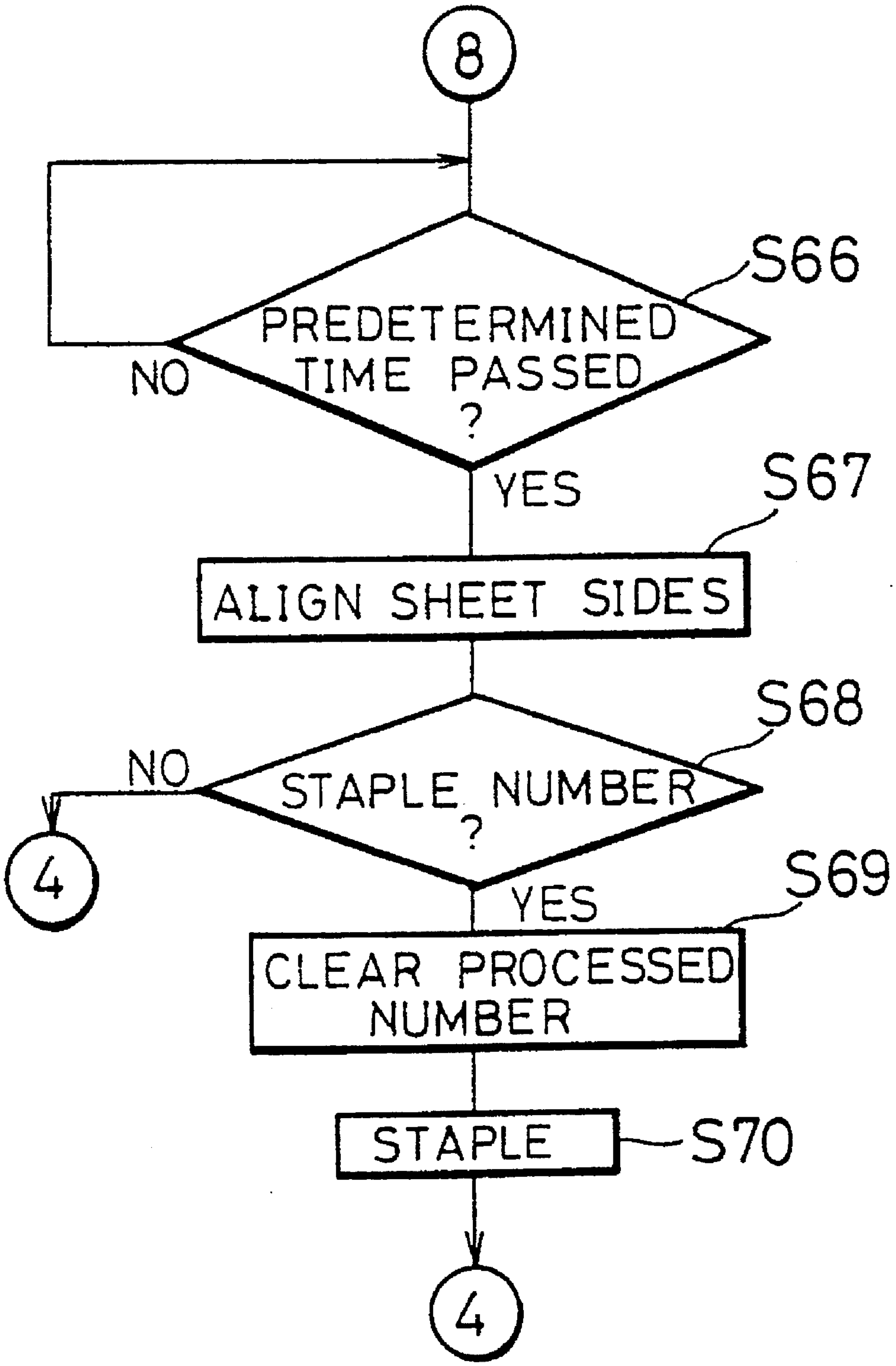
FIG. 14 is a flow chart showing a part of a process in a multiple staple mode with the device for further processing after copying.
Figure 15:
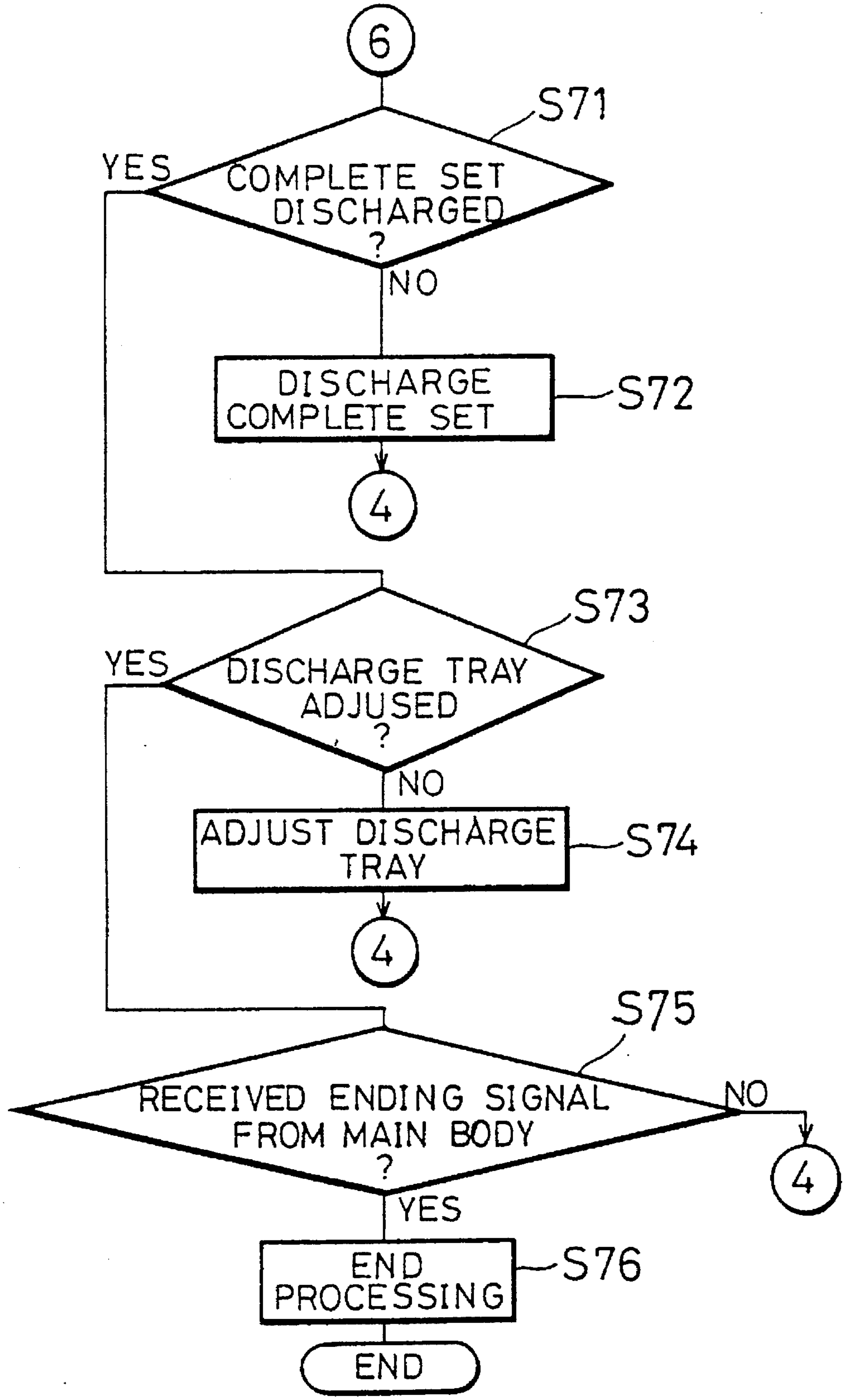
FIG. 15 is a flow chart showing a part of a process in a multiple staple mode with the device for further processing after copying.

The flow chart of FIG. 10 explains the process in the single staple mode. First, the device 40 receives a number of sheets to be stapled from the main body 1 (S21). Then, the number is set in the device 40 (S22). Next, the device 40 receives a signal to start the operation from the main body 1 (S23). Then, the process is started (S24), and the processed number is cleared (S25).

The sheet S, whereon the image on the document M is copied in the main body 1, is fed into the device 40 through the entry opening 41a, and passes through the main pass 41*c*. Then, it is discharged onto the stapler plate 46. This transportation of the sheet S through the main pass 41*c* is detected as the sheet detection switch $SW_2$ is turned ON (S26) and OFF (S27). As a result, the timer set in the device 40 is cleared (S28). Then, the processed number increases by 1 (S29). After a predetermined time set by the timer has passed (S30), it is determined that the discharge of the sheet S onto the stapler plate 46 has completed, and the sides of the sheets S, placed on the stapler plate 46, are aligned by the edge aligner 47 (S31).

Then, it is determined whether or not the processed number coincides with the offset number (S32). If not, the sequence goes back to S26. If so in S32, the processed number is cleared (S33). Then, with the rotation of the paddler 48 in the direction of C, and the rotation of the discharge roller 53 in the direction of $C_2$, the ends of the sheets S, placed on the stapler plate 46, are aligned, and the sheets S are bound by the stapler 49 (S34).

Then, the complete set is discharged onto the discharge tray 56 from the stapler plate 46 using the forward motion of the push-out member 52 in the direction of $D_1$ and the rotation of the discharge roller 53 in the direction of $G_1$ (S35). Then, after the discharge tray 56 has been adjusted (S36), the device 40 receives a signal to end the operation from the main body 1 (S37). Then, the process is ended (S38), and the above sequence in the staple mode is terminated (single).

The flow charts of FIGS. 11 through 15 explain the process in the multiple staple mode. First, the device 40 for further processing after copying receives a number of sheets to be stapled from the main body 1 (S41). Then, the number is set in the device 40 (S42). Next, the device receives a signal to start the operation from the main body 1 (S43). Then, the process is started (S44), and the processed number is cleared (S45).

Each of the sheet S, whereon the image on the document M is copied in the main body 1, is fed into the device 40 through the entry opening 41*a*, and passes through the main pass 41*c*. Then, the sheets S are discharged onto the stapler plate 46. This transportation of the sheets S through the main pass 41*c* is detected as the sheet detection switch $SW_2$ is turned ON (S46). Then, it is checked whether or not the sheet detection switch $SW_2$ is turned OFF (S47).

If the sheet detection switch $SW_2$ is still turned ON in S47, the sequence moves on to S48 where it is determined whether or not the complete set has been discharged from the stapler plate 46. If not in S48, the complete set is discharged onto the discharge tray 56 using the push-out member 52 and the discharge roller 53 (S49). Then, the sequence goes back to S47. On the other hand, if the complete set has been discharged from the stapler plate 46, the sequence moves on to S50 where it is determined whether or not the adjustment of the discharge tray 56 has been completed. If so, the sequence directly goes back to S47. If not, the discharge tray 56 is adjusted (S51) before the sequence moves on to S47. When it is detected that the sheet detection switch $SW_2$ is turned OFF in S47, the timer set in the device 40 is cleared (S52), and then the processed number increases by 1 (S53).

Then, it is checked whether or not the processed number is 1 (S54). If not, the sequence skips to S66 (to be described later). If so, the sequence moves on to S55 where it is determined whether or not the stapler plate 46 is ready. If so, the sequence skips to S66. If not, the rotation of the transport roller 43 is stopped so as to stop the transportation of the sheet S (S56). Then, the deflector 44 is rotated in the direction of $B_1$ so as to switch the transport path for the sheet S to the bypass 41*b* (S57).

Next, it is determined whether or not the second sheet S is being transported through the bypass 41*b* by detecting whether or not the sheet detection switch $SW_1$ is turned ON (S58). When it is detected that the sheet detection switch $SW_1$ is not turned ON in S58, the sequence moves on to S59 where it is determined whether or not the complete set has been discharged. If not, the complete set is discharged on the discharge tray 56 using the push-out member 52 and the discharge roller 53 (S60). Then, the sequence goes back to S58. If so, the sequence moves on to S61 where it is determined whether or not the adjustment of the discharge tray 56 has been completed. If so, the sequence directly moves back to S58. If not, the discharge tray 56 is adjusted (S62) before the sequence moves back to S58. Then, immediately after the sheet detection switch $SW_1$ is turned ON in S58, the sheet detection switch $SW_1$ is turned OFF in preparation for the next set of sheets (S63). With the detection of the OFF state of the switch $SW_1$, the deflector 44 rotates in the direction of $B_2$, and the transport path for the sheets S is switched to the main pass 41*c* (S64). In the meantime, with the rotation of the transport roller 43, the transportation of the first sheet $S_1$ is restarred (S65). As a result, the first sheet S having passed through the main pass 41*c*, and the second sheet S having passed through the bypass 41*b* are discharged on the stapler plate 46 at the same time.

Then, the sequence moves back to S52 where the timer set in the device 40 is cleared, and the processed number increases by 1 (S53). Then, the sequence moves on to S54. In S54, if it is detected that the processed number is not 1, the sequence skips to S66 where it is determined whether or not a predetermined time set by the timer has passed. After the predetermined time set by the timer has passed, it is determined that the sheet S has been discharged onto the stapler plate 46, and the sides of the sheets S, placed on the stapler plate 46, are aligned by the edge aligner 47 (S67). Then, it is determined whether or not the processed number coincides with the number of sheets S to be stapled (S68). If not, the sequence goes back to S46. If so, the processed number is cleared (S69). Then, with the rotation of the paddler 48 in the direction of C, and the rotation of the discharge roller 53 in the direction of $G_2$, the ends of the sheets S, placed on the stapler plate 46, are aligned, and the sheets S are bound using the stapler 49 (S70). Then, the sequence moves back to S46.

If the sheet S is no longer detected by the sheet detection switch $SW_2$ in S46, the sequence moves on to S71 where it is determined whether or not the complete set has been discharged from the stapler plate 46. If not, the complete set is discharged onto the discharge tray 56 using the push-out member 52 and the discharge roller 53 (S72). Then, the sequence goes back to S46. If so, the sequence moves on to S73 where it is determined whether or not the adjustment of the discharge tray 56 has been completed. If not, the discharge tray 56 is adjusted (S74) before the sequence moves on to S46. If so, the sequence moves on to S75 where it is determined whether or not the device 40 receives a signal to end the operation from the main body 1. If not, the sequence moves back to S46. If so, the process is ended (S76), and the above sequence in the multiple staple mode is terminated.

The device 40 for further processing after copying of the present embodiment is arranged as follows. In the multiple staple mode, if the ON state of the sheet detection switch $SW_1$ is not detected (S58) within a predetermined time after the time set by the timer is cleared (S52), the rotation of the transport roller 43 is automatically restarted. In this way, only the first sheet $S_1$ can be discharged onto the stapler plate 46 without waiting for the synchronous discharge of the second sheet S.

As described, the device 40 for further processing after copying has the transport path 41 which is branched into the bypass 41*b* and the main pass 41*c*. Further, the deflector 44 is placed at the branch point between the bypass 41*b* and the main pass 41*c*. Along the paths 41*b* and 41*c*, the sheet detection switches $SW_1$ and $SW_2$ are respectively provided, and the sheet detection switch (not shown) is provided on the stapler plate 46 in order to control the rotation of the transport roller 43.

With the above arrangement of the device 40 for further processing after copying, when it is set in the multiple staple mode, while the first set of sheets S is being bound on the stapler plate 46, the first sheet $S_1$ of the second set is being transported through the main pass 41*c*. Thereafter, the rotation of the transport roller 43 is stopped so as to temporarily stop the transportation of the sheet $S_1$ as shown in FIG. 16(*a*).

Figure 16A:
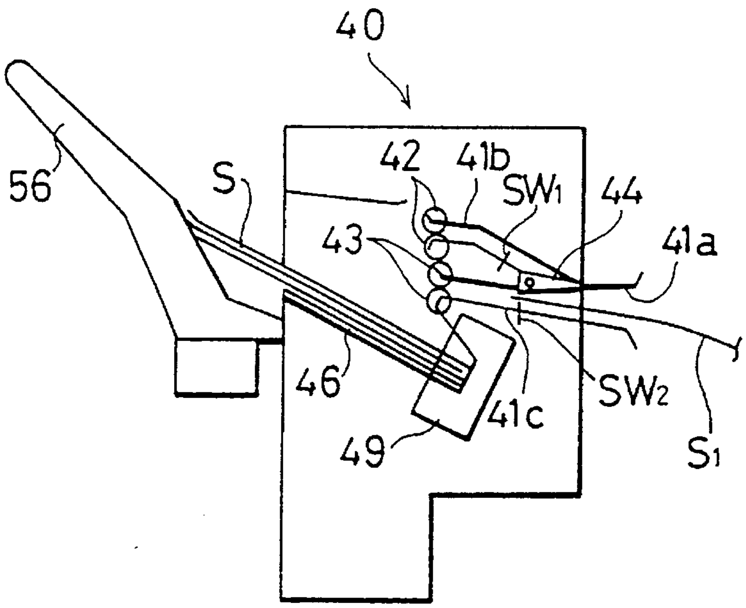
FIGS. 16(*a*)(*b*)(*c*) are explanatory views respectively showing sheet transporting operations through the transport path in the multiple staple mode.
Figure 16B:
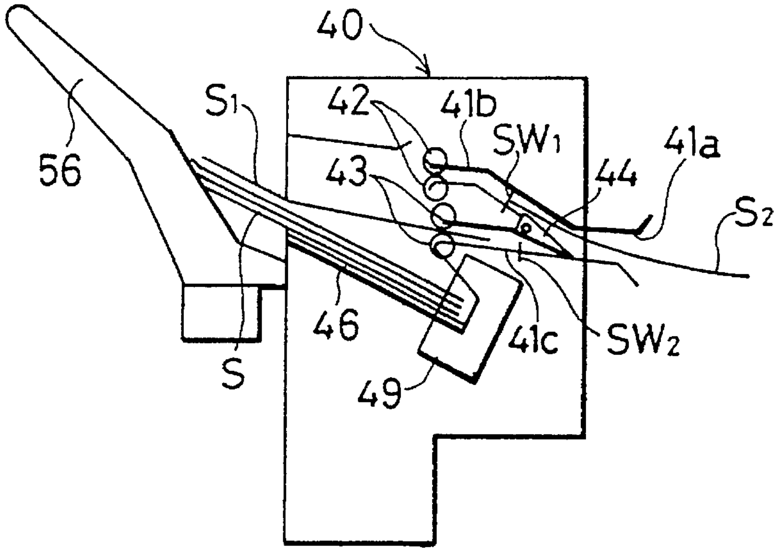
Figure 16C:
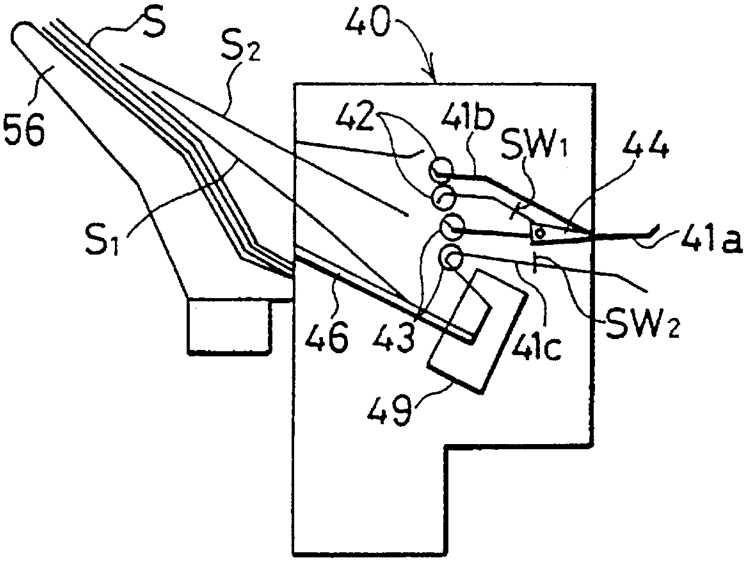

As shown in FIG. 16(*b*), with the switch of the deflector 44, a second sheet $S_2$ of the second set is transported through the bypass 41*b* so as to reduce the time loss due to the time required for binding the first set of sheets S. Then, the rotation of the transport roller 43 is restarred so as to restart the transportation of the first sheet $S_1$. As a result, the first sheet $S_1$ and the second sheet $S_2$ are discharged onto the stapler plate 46 (wherefrom the first set of sheets S was discharged), at the same time as shown in FIG. 16(c).

The sheets $S_1$ and $S_2$ discharged at the same time onto the stapler plate 46 are sandwiched between the rollers 53 and 54 with the rotation of the arm member 55 in the direction of $F_2$. In this state, the end of the first sheet $S_1$ is aligned by the rotation of the discharge roller 53 in the direction of $G_2$; whereas, the end of the second sheet $S_2$ is aligned by the rotation of the paddler 48 in the direction of C. This means that the respective ends of the sheets $S_1$ and $S_2$ being stacked on the stapler plate 46 are aligned separately, and a precise alignment can be obtained. As a result, high quality binding operations can be maintained.

In addition, the timer for controlling the rotation of the transport roller 43 is provided in the described device 40 for further processing after copying. Therefore, when it is set in the multiple staple mode, even if the second sheet $S_2$ is not transported through the bypass 41*b* within the predetermined time as a result of being stuck in the device, the first sheet $S_1$ is automatically discharged onto the stapler plate 46. This avoids the external force from the transport roller 43 being exerted on the sheet for a long time, which prevents a change in the shape of the first sheet $S_1$.

The following will describe the process for aligning the sheets S placed on the discharge tray 56 using the discharge roller 53 and the discharge tray 56. The explanation will be given through the case of the multiple staple mode in which precise alignment of the sheets is necessary.

Figure 17A:
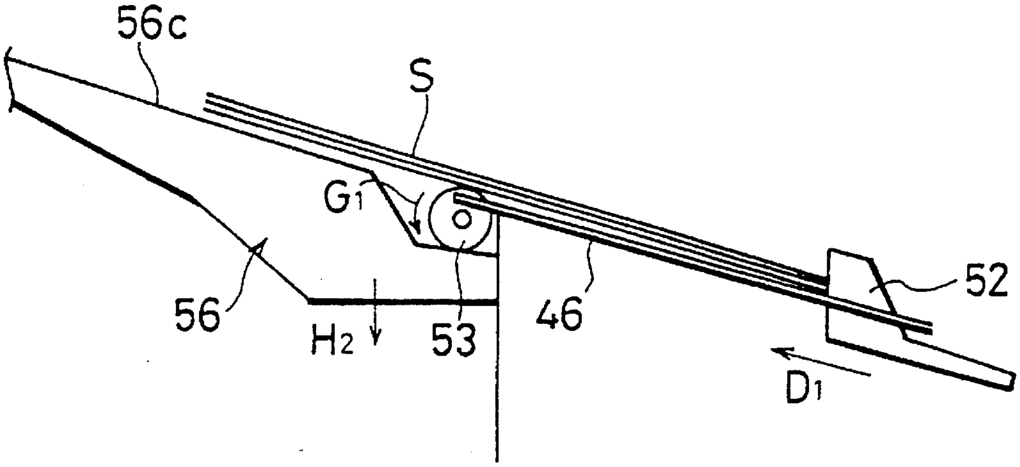
FIGS. 17(*a*)(*b*)(*c*) are explanatory views respectively showing bound sheets aligning operation on the discharge tray in the multiple staple mode.
Figure 17B:
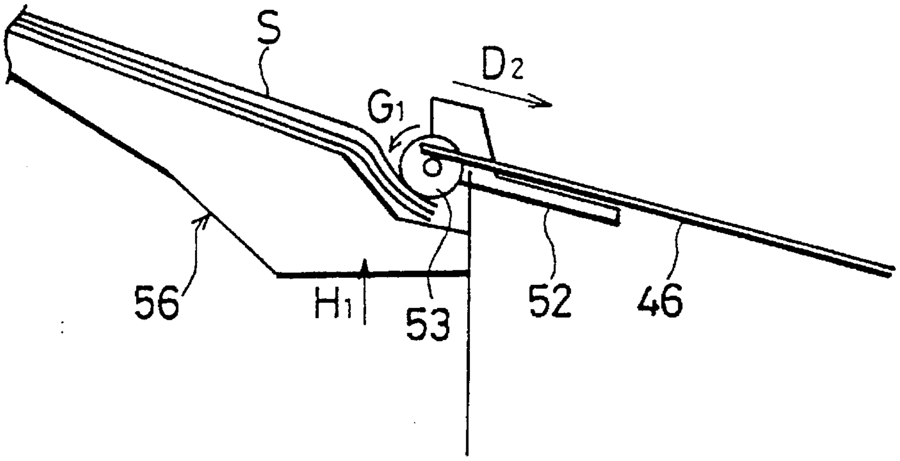
Figure 17C:
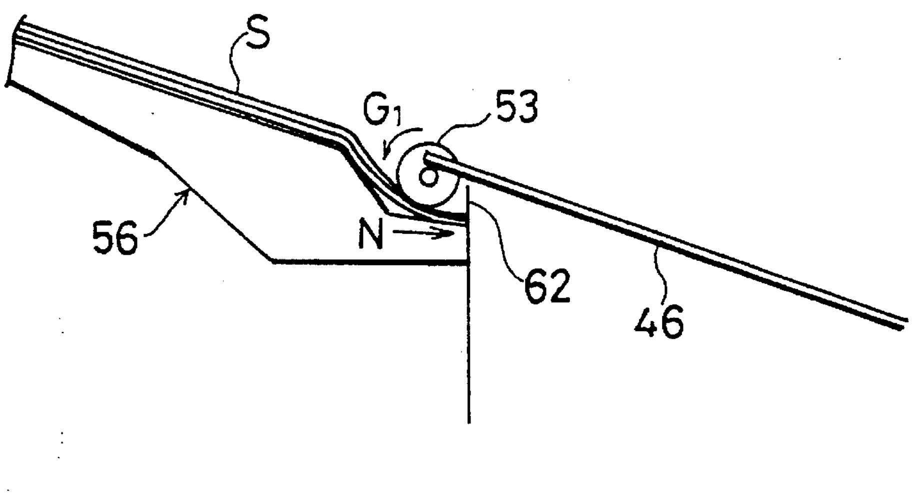

First, as shown in FIG. 17(*a*), the complete set of sheets S having gone through the binding process on the stapler plate 46 is discharged on the support face 56*c* using both a forward motion of the push-out member 52 in the direction of $D_1$, and the rotation of the discharge roller 53 in the direction of $G_1$. When the complete set has been discharged onto the support face 56*c*, the discharge tray 56 moves downward in the direction of $H_2$ for the maximum number of complete sets set beforehand.

Next, as shown in FIG. 17(*b*), the push-out member 52 moves downward in the direction of $D_2$ after discharging the complete set as described above, in preparation for the next binding process. On the other hand, the discharge tray 56, which supports the complete set, moves upward in the direction of $H_1$ to the position at which the complete set is sandwiched between the discharge roller 53 and itself. Then, as shown in FIG. 17(*c*), the complete set, which is sandwiched between the discharge roller 53 and the discharge tray 56, is transported in the direction of N with the rotation in the direction of $G_1$ of the discharge roller 53. In the meantime, the rear edge of the complete set is aligned by the stopper 62, and the set of sheets is aligned on the discharge tray 56.

Figure 18:
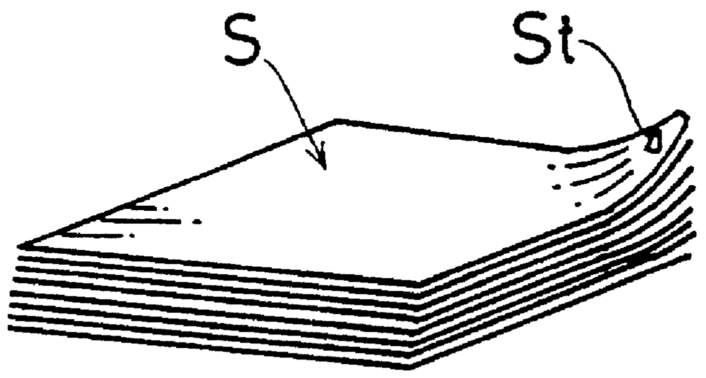
FIG. 18 is a perspective view showing a plurality sets of bound sheets being stacked.
Figure 19:
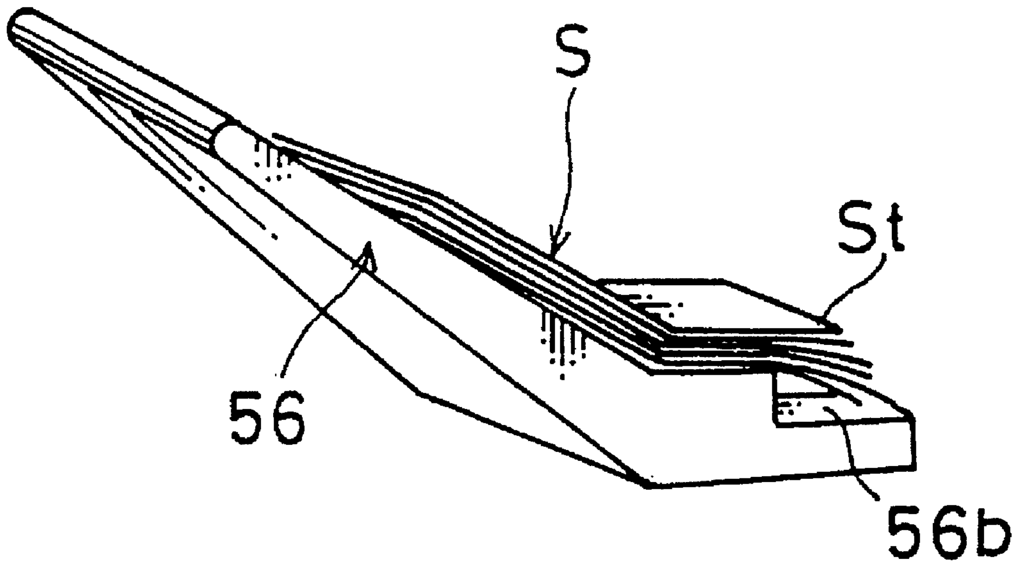
FIG. 19 is a perspective view showing the bound sheets stacked on the discharge tray.
Figure 20A:
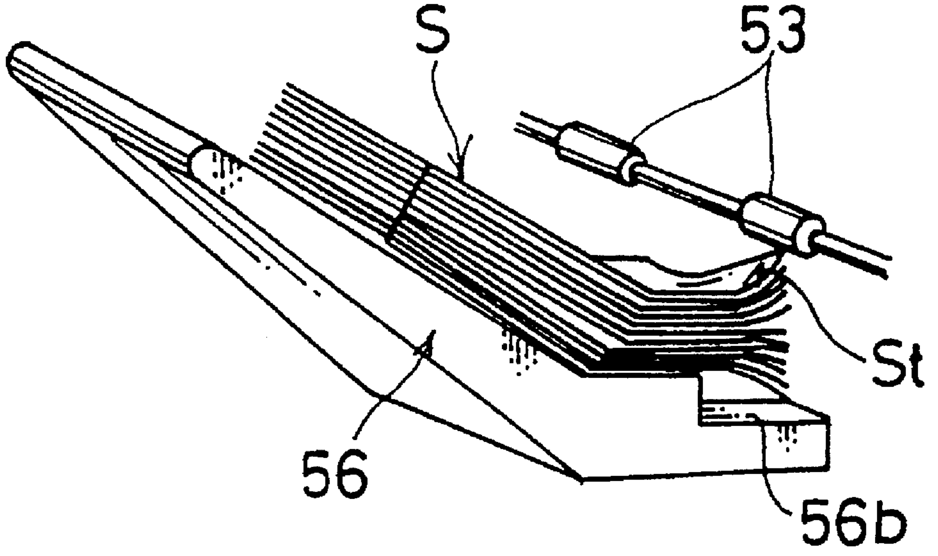
FIGS. 20(*a*)(*b*) are explanatory views respectively showing the bound sheets sandwiched between the discharge roller and the discharge tray.
Figure 20B:
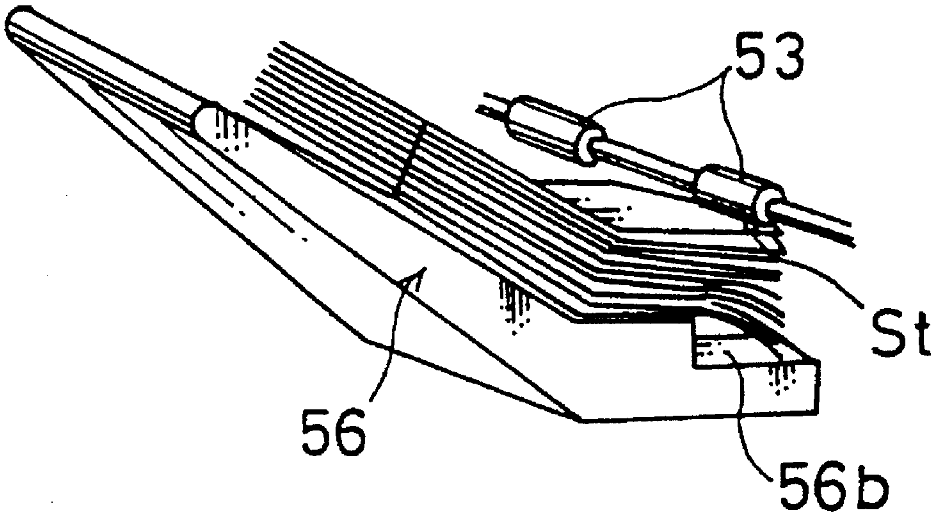

In the above process for aligning the complete sets on the discharge tray 56, the stapled corner St of the complete set becomes thicker than the other part of the complete set as a plurality of complete sets are stacked as shown in FIG. 18. However, by the dead weight of the complete set, the stapled corners St of the complete sets fall into the recessed portion 56*b* as shown in FIG. 19. Moreover, even when the stapled corner St of the complete set cannot fall in the recessed portion 56*b* by its dead weight as shown in FIG. 20(*b*), by pressing the complete set by the discharge roller 53 onto the discharge tray 56, the stapled corner St is pressed into the recessed portion 56*b*. In this way, the lowering of the quality of the binding operation on the discharge tray due to the spring of the stapled corner St can be prevented.

Furthermore, when the complete set is placed on the discharge tray 56 thus described the discharge tray 56 of the device for further processing after copying 40 is arranged such that a spring 61 shrinks according to the volume of the complete set placed on the support face 56*c*, and the tray angle α between the support face 56*c* and the resting face 56*a* changes.

Figure 21A:
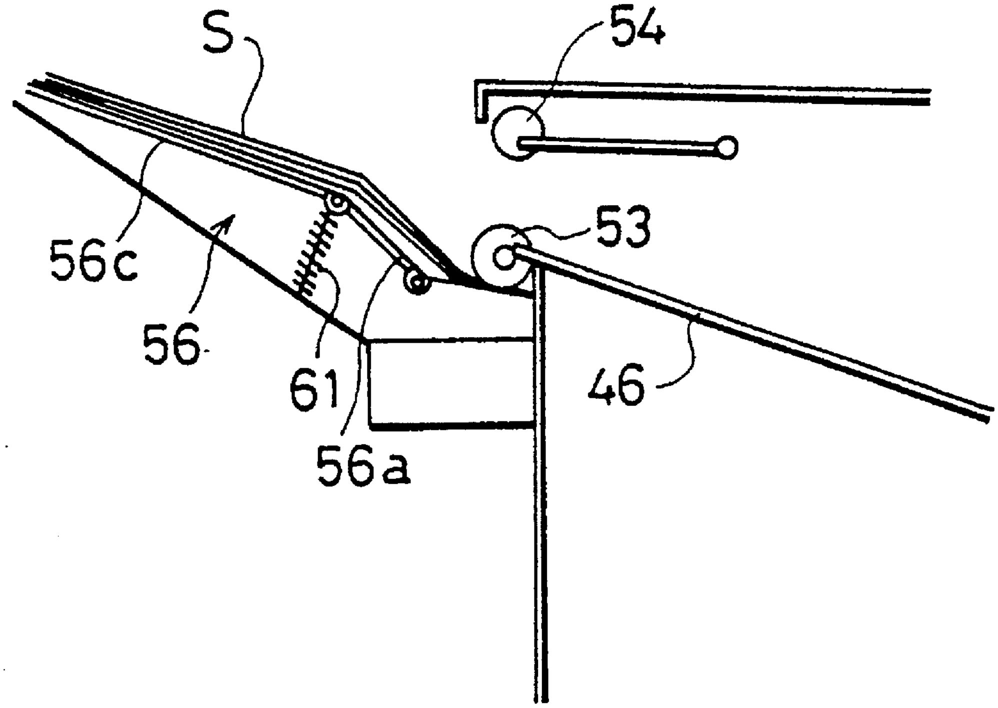
FIGS. 21(*a*)(*b*) are explanatory views respectively showing a tray angle between a support face and a resting face, which varies depending on the volume of the bound sheets to be stacked on the discharge tray.
Figure 21B:
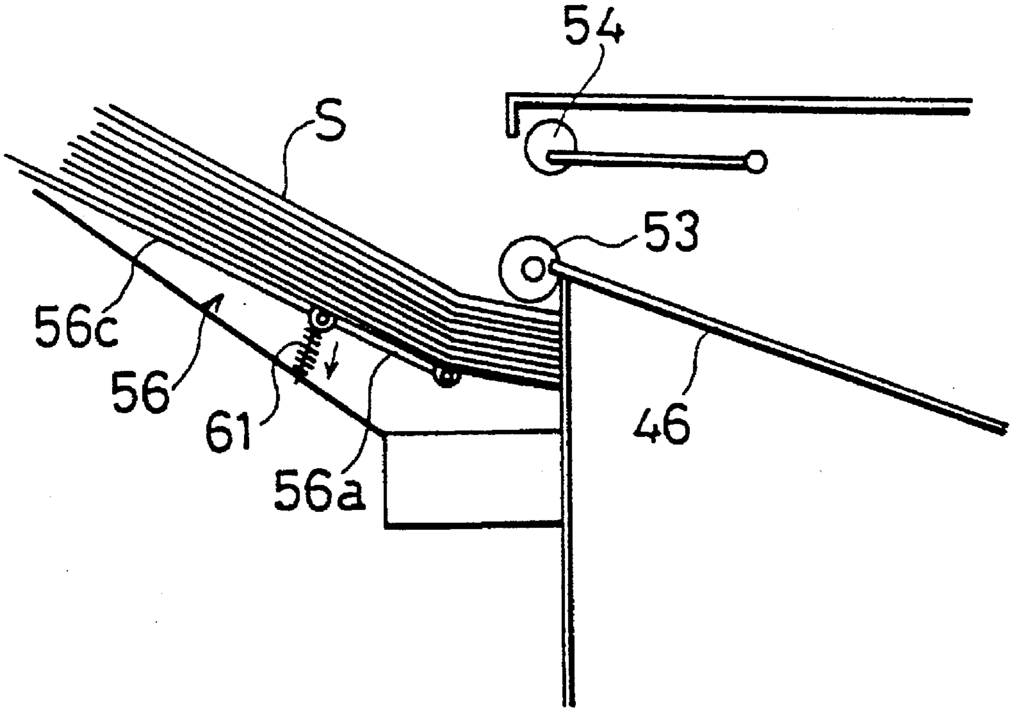
Figure 22:
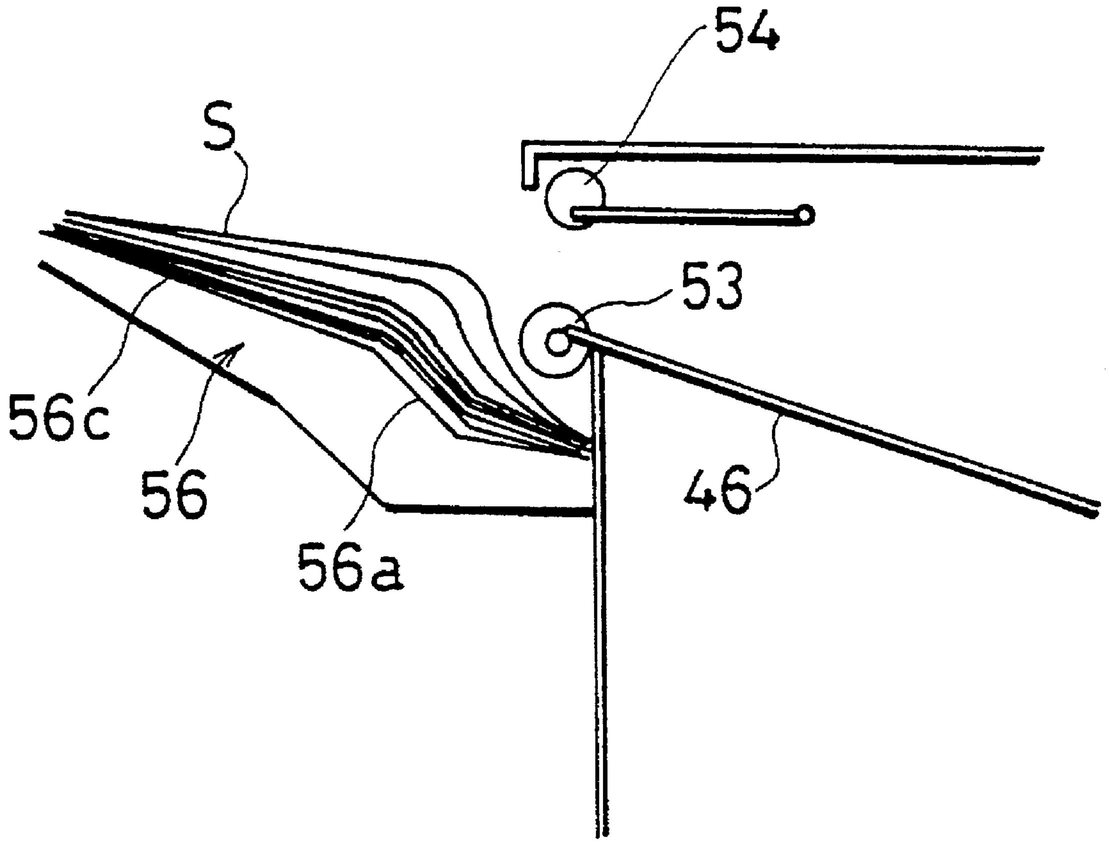
FIG. 22 is an explanatory view showing a buckling of the bound sheets on the discharge tray due to a level difference between the support face and the resting face.

With this arrangement, when the volume of the complete set on the discharge tray 56 is small as shown in FIG. 21(*a*), the spring 61 hardly shrinks. Therefore, the support face 56C of the discharge tray 56 is on substantially the same plane as the top surface of the stapler plate 46 so as to support the complete set to be appropriately discharged from the stapler plate 46.

On the other hand, when the volume of the complete sets on the discharge tray 56 is large as shown in FIG. 21(*b*), the spring 61 shrinks by the dead weight of the complete set. As a result, the tray angle α between the support face 56*c* and the resting face 56*a* becomes substantially 180°. This prevents the bulge of the sheets S due to the difference in the slopes between the support face 56*c* and the resting face 56*a*.

In addition, the present invention is not intended to be limited to the above preferred embodiment, it can be varied in many ways within the scope of the present invention. For example, according to the arrangement of the present embodiment, with the upward motion of the discharge tray 56, which supports the complete set in the upward direction, the complete set is sandwiched between the discharge roller 53 and the discharge tray 56, and the present invention is not intended to be limited to this arrangement.

Figure 23:
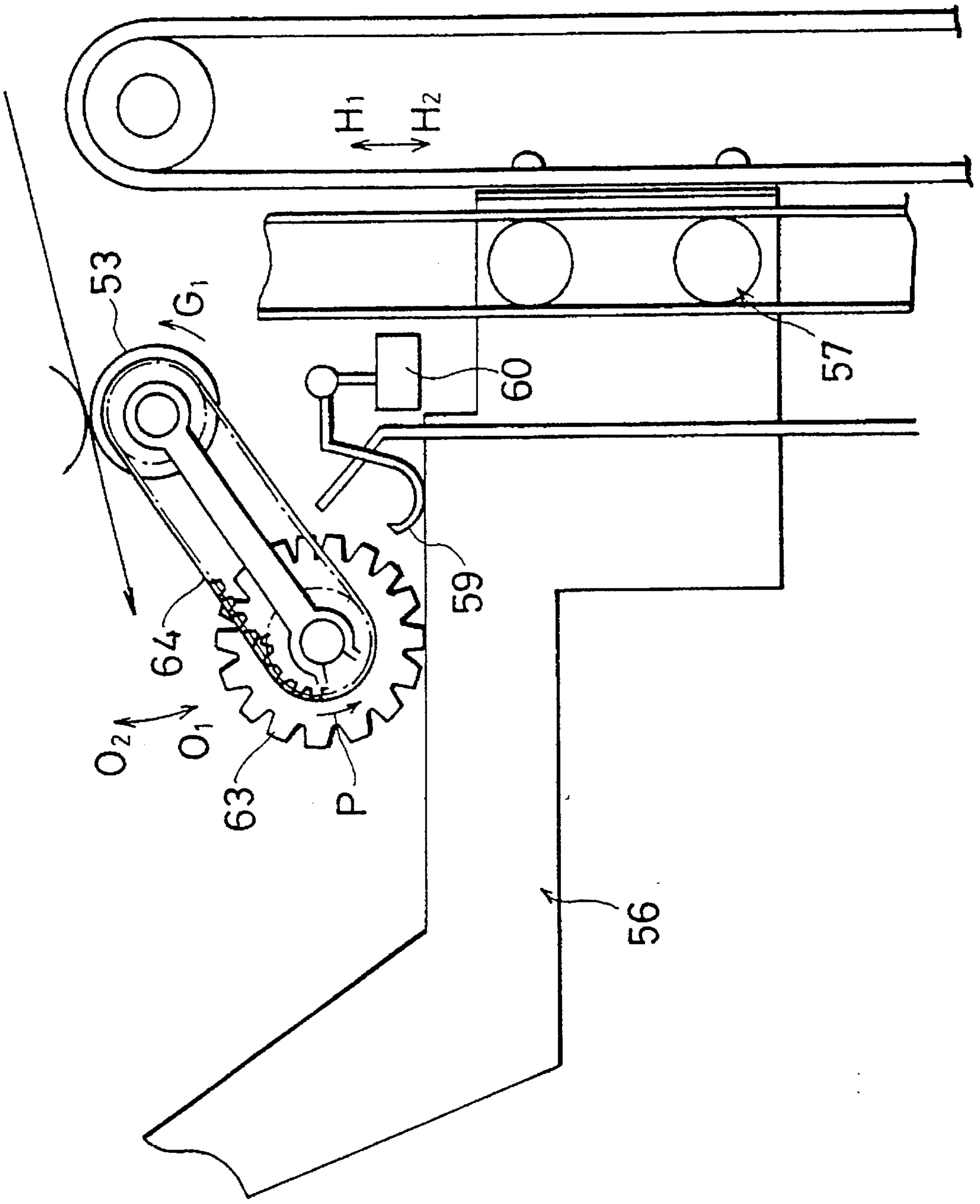
FIG. 23 is a longitudinal sectional view showing a sponge roller capable of rotating around the rotation axis of the discharge roller.
Figure 24:
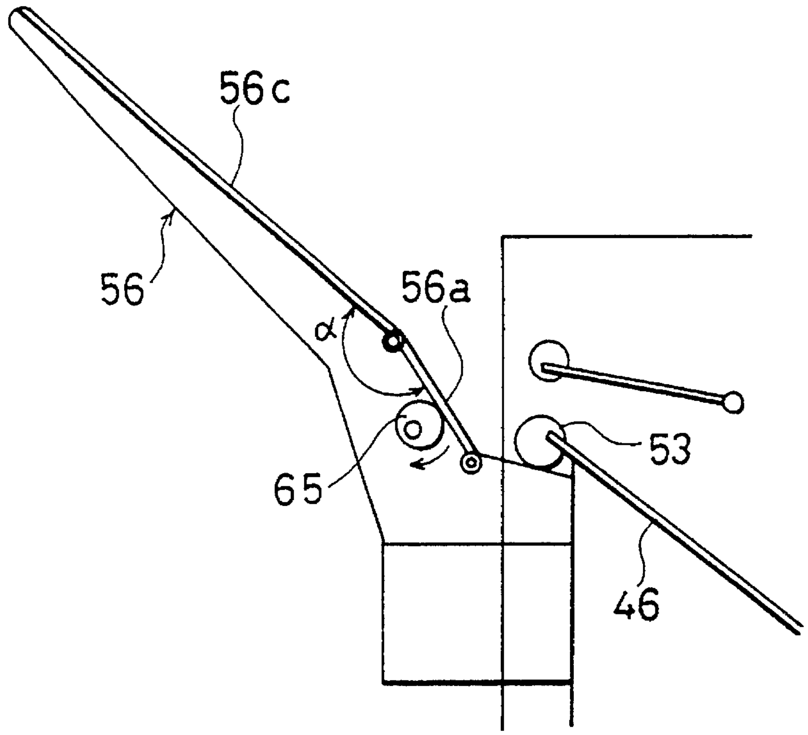
FIG. 24 is an explanatory view showing an angle change means composed of a cam unit.
Figure 25:
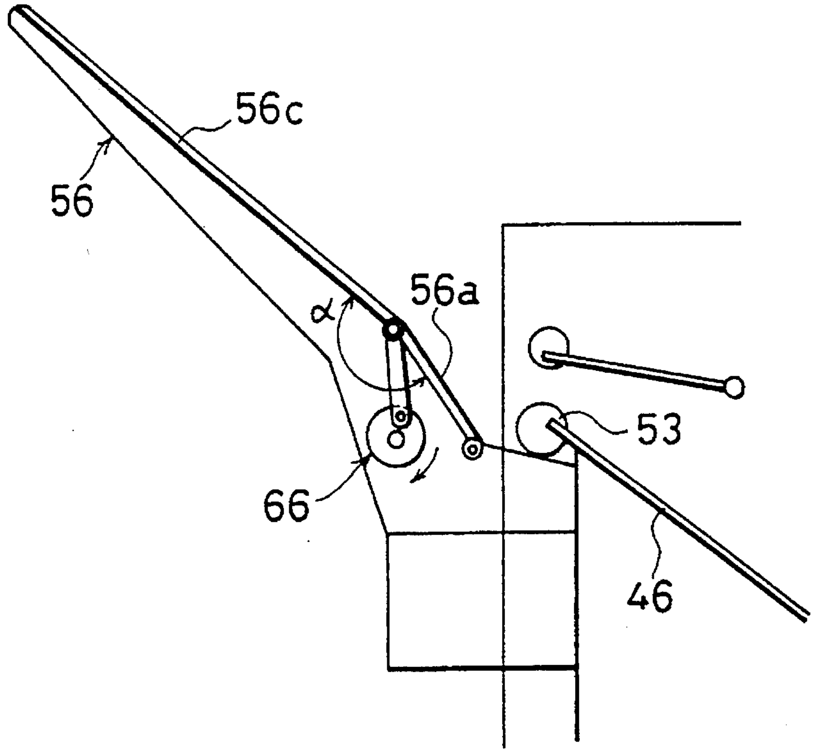
FIG. 25 is an explanatory view showing an angle change means composed of a crank unit.

Other than the above arrangement, for example, as shown in FIG. 23, if a sponge roller 63 is provided, so as to be capable of rotating in the direction of $O_1$–$O_2$ around the rotation axis of the discharge roller 53, and an interlocking belt 64 is provided so as to surround the sponge roller 63 and the discharge roller 53, the sponge roller 63 rotates in the direction of $O_1$ by its dead weight and rotates in the direction of $G_1$ with the rotation in the direction of $G_1$ of the discharge roller 53 so as to sandwich the complete set on the discharge tray 56 between the sponge roller 63 and the discharge roller 53 in aligning the complete sets.

With the above arrangement, the sponge roller 63, which sandwiches the complete set between the discharge tray 56 and itself is capable of rotating in the direction of $O_1$–$O_2$. Therefore, even if a deviation occurs in the stop position of the discharge tray 56, the sponge roller 63 absorbs the deviation. As a result, the pressing force exerted on the complete set can be maintained substantially constant.

Moreover, as to the angle change means, which varies the tray angle α between the support face 56*c* and the resting face 56*a* of the discharge tray 56, it is not intended to be limited to the spring 61. Other than the spring 61, for example, counting means (not shown) can be provided for counting the volume of the complete set placed on the discharge tray 56. In this case, for example, by controlling the driving of the cam unit 65 of FIG. 24 or the crank unit 66 of FIG. 25, the tray angle α can be automatically controlled.

As a note, the present invention does not intend to be limited to the above preferred embodiment, it can be varied in many ways within the scope of the present invention. In the above embodiment, the transport control means for controlling the rotation of the transfer roller 43 is composed of the sheet detection switches $SW_1$ and $SW_2$, and the sheet detection switch (not shown) provided on the stapler plate 46. However, the transport control means is not limited to the above arrangement. For example, by controlling the rotation of transfer roller 42 as well as the rotation of the transfer roller 43, the first sheet $S_1$ being transported through the main pass 41*c* and the second sheet $S_2$ can be discharged at the same time with a more subtle timing.

[EMBODIMENT 2]

Figure 26:
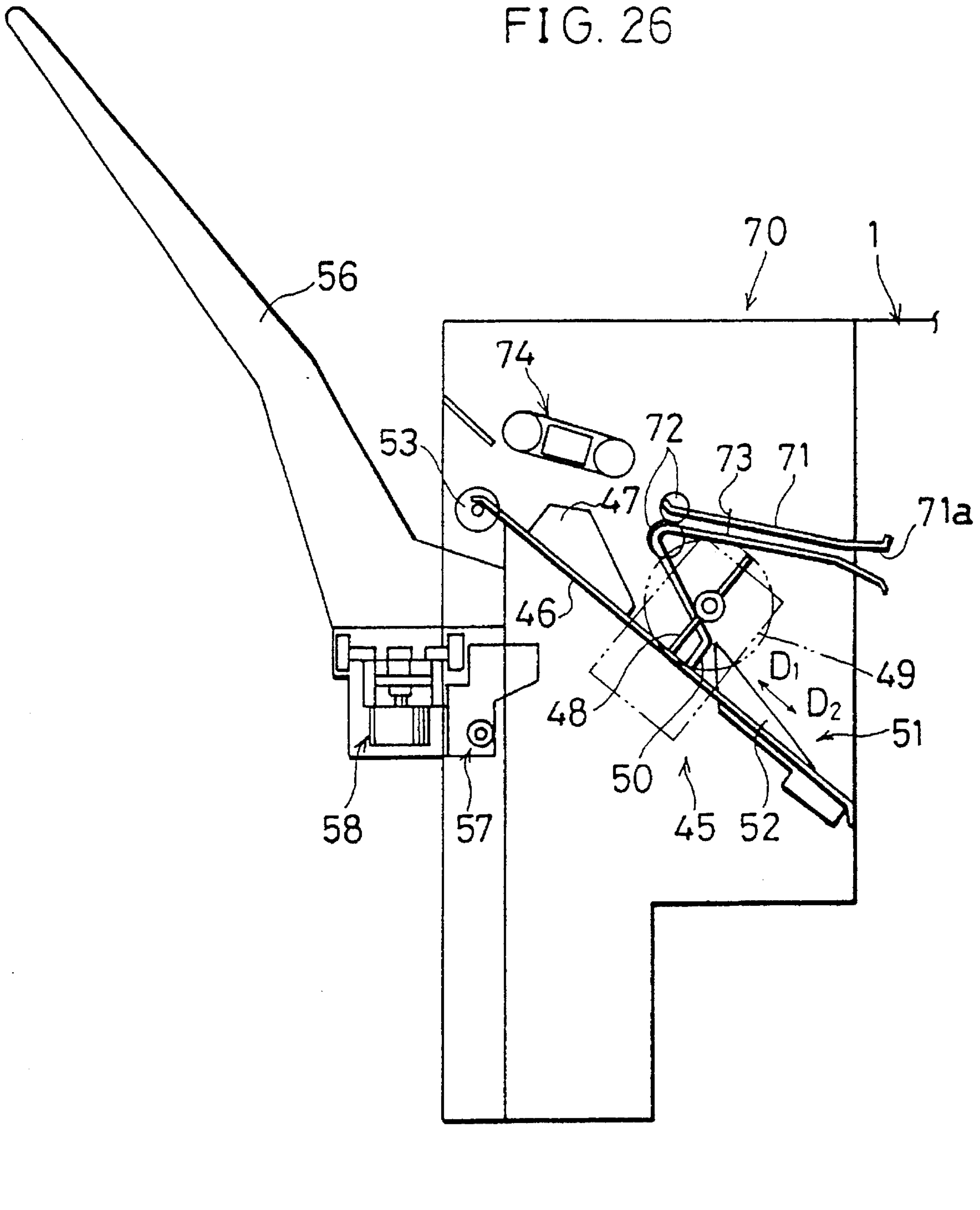
FIG. 26 is an explanatory view showing a device for further processing after copying used in another embodiment of the present invention.
Figure 27:
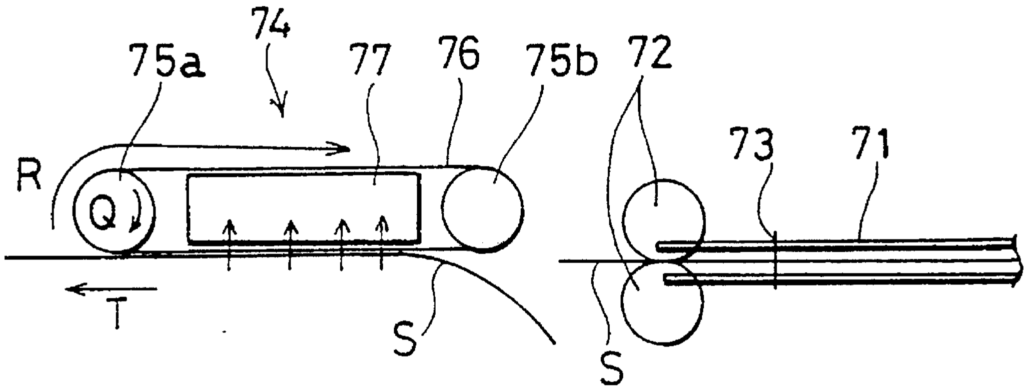
FIG. 27(*a*) is a longitudinal sectional view showing an air suction means of the device for further processing after copying.
Figure 27:
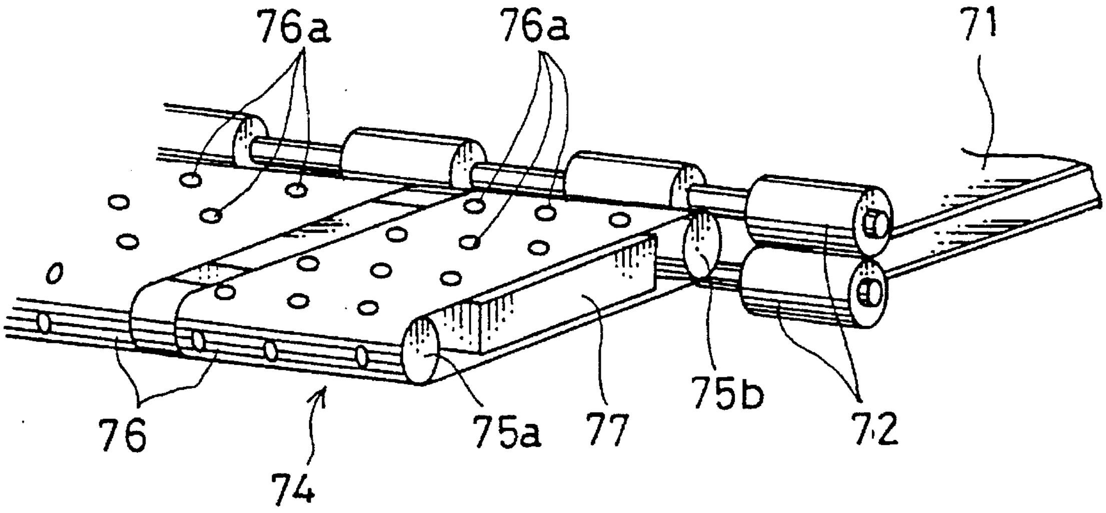
Figure 28A:
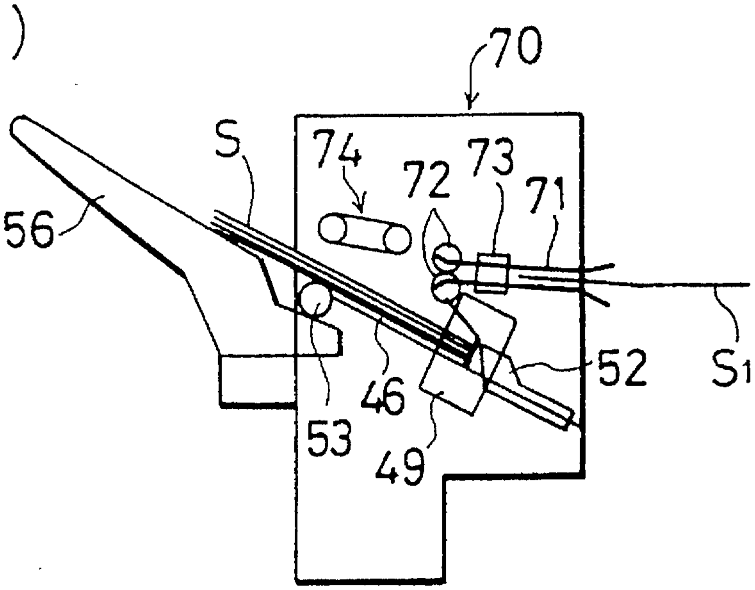
FIGS. 28(*a*)(*b*)(*c*) are explanatory views respectively showing the operations by the air suction means in multiple staple mode.
Figure 28B:
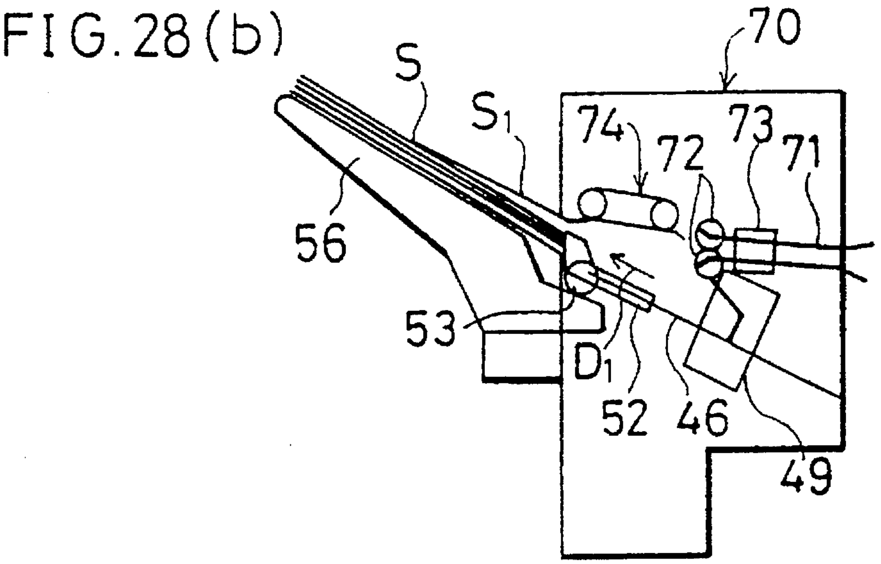
Figure 28C:
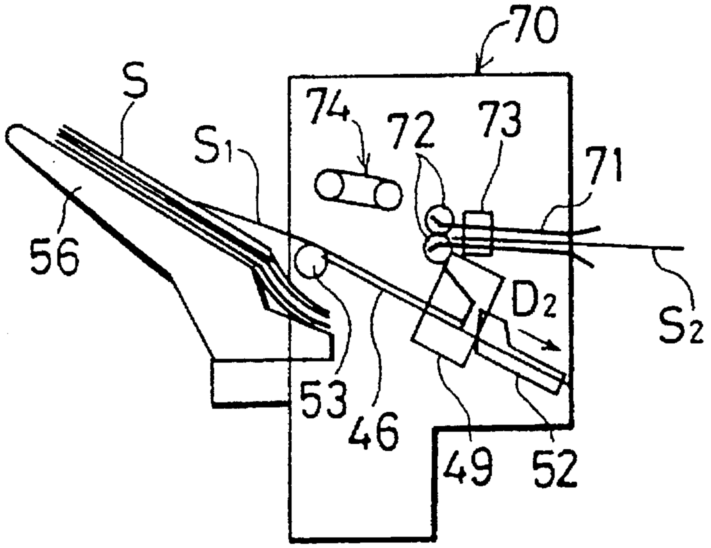

The following description will discuss another embodiment of the present invention with reference to FIGS. 26 through 28(*a*)(*b*)(*c*). For convenience, members having the same function as in the first embodiment will be designated by the same code and their description will be omitted.

As shown in FIG. 26, the device 70 for further processing after copying of the present embodiment is provided with a transport path 71 for transporting the sheets S within the device 70, and an air suction means 74 which enables the sheet S to adhere to it using air and also to be released.

The transport path 71 is composed of a linear path having an entry opening 71*a* at one end through which the sheet S is fed from the main body 1. On the other end of the linear path, a pair of upper and lower discharge rollers 72 are provided for discharging the sheets S fed through the entry opening 71*a* onto the stapler plate 46. A sheet detection sensor 73 for detecting the sheet S is provided along the transport path 71, which controls the driving of the air suction means 74 (to be described later).

The air suction means 74 is placed above the stapler plate 46 along the extended line of the transport path 71. The air suction means 74 is composed of a driving axis 75*a* capable of rotating in the direction of Q, an auxiliary driving axis 75*b*, a plurality of belt members 76, and an air suction member 77 as shown in FIGS. 27(*a*)(*b*).

The axis 75*a* and the axis 75*b* are placed with a predetermined interval in between, each axis being parallel to the axis of the discharge roller 72. Each of the belt members 76 has a plurality of holes 76*a* on the entire surface, and each goes around the axis 75*a* and the axis 75*b*. The belt members 76 are placed so as to be parallel to one another with a predetermined interval in each direction of the axis 75*a* and the axis 75*b*. The air suction member 77 is provided between the axis 75*a* and the axis 75*b* so as to pierce the space surrounded by the belt member 76. On the bottom surface of the air suction member 77, an air suction section is provided.

The sheets S discharged from the transport path 71 adhere to the bottom surface of the belt members 76 by the air suction means 74 using the absorption from the air suction member 77. The air suction means 74 also holds the rear edge of the sheet S by slightly transporting the sheet S in the direction of T when the belt member 76 moves in the direction of R with the rotation of the drive axis 75*a* in the direction of Q.

With the above arrangement of the device 70 for further processing after copying, the process for transporting the sheets S in the multiple staple mode will be described below.

As shown in FIG. 28(*a*), while a predetermined binding operation is carried out on the first complete set which has been bound on the stapler plate 46, the first sheet $S_1$ of the next set transports through the transport path 71 from the main body 1. This transportation of the first sheet $S_1$ is detected by the sheet detection sensor 73, then after a predetermined time, the driving of the air suction means 74 is controlled so as to hold the first sheet $S_1$ on the air suction means 74.

As shown in FIG. 28(*b*), while the first sheet $S_1$ is held on the air suction means 74, the first complete set, which has been bound on the stapler plate 46, is discharged onto the discharge tray 56 using the upward motion in the direction of $D_1$ of the push-out member 52. Next, as shown in FIG. 28(*c*), with the downward motion of the push-out member 52 in the direction of $D_2$, the stapler plate 46 is set for the next binding process. Then, immediately after the sheet detection sensor 73 detects the second sheet $S_1$, the first sheet $S_1$ is released from being absorbed by the air suction means 74, the first sheet $S_1$ is then placed on the stapler plate 46. Then, the second, third, fourth . . . sheets are discharged from the transport path 71 in order onto the stapler plate 46.

As described, in the device 70 for further processing after copying of the present embodiment, the air suction means 74 is provided above the stapler plate 46, which enables the sheet S to adhere to it using air and also to be released. With this arrangement of the device 70 for further processing after copying, when it is set in the multiple mode, the air suction means 74 holds the respective first sheets $S_1$ of the following sets of sheets to reduce the time loss due to the binding operation on the stapler plate 46. Therefore, faster binding operations can be achieved in the multiple binding mode.

[EMBODIMENT 3]

Figure 29:
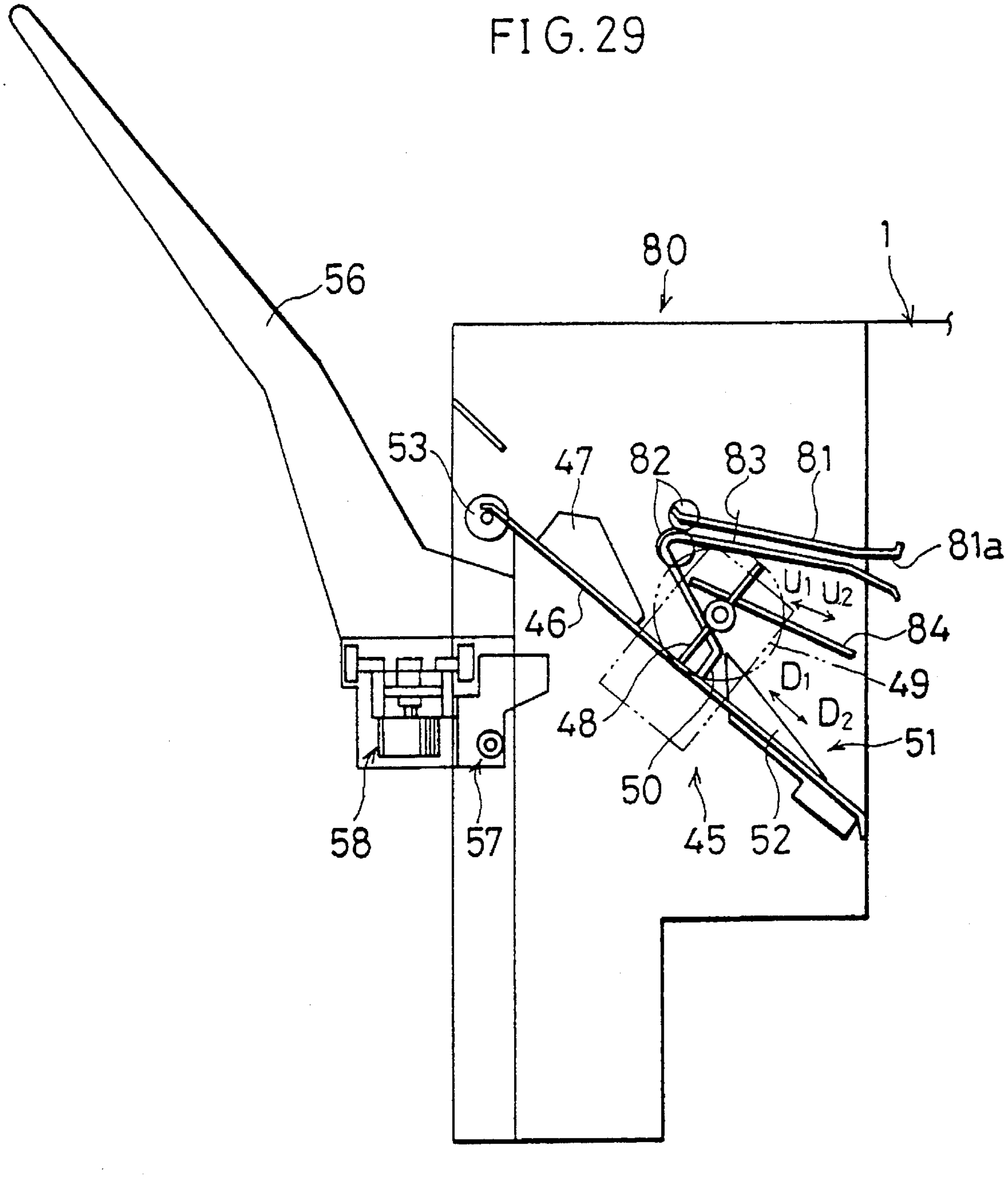
FIG. 29 is an explanatory view showing a device for further processing after copying used in another embodiment of the present invention.
Figure 30A:
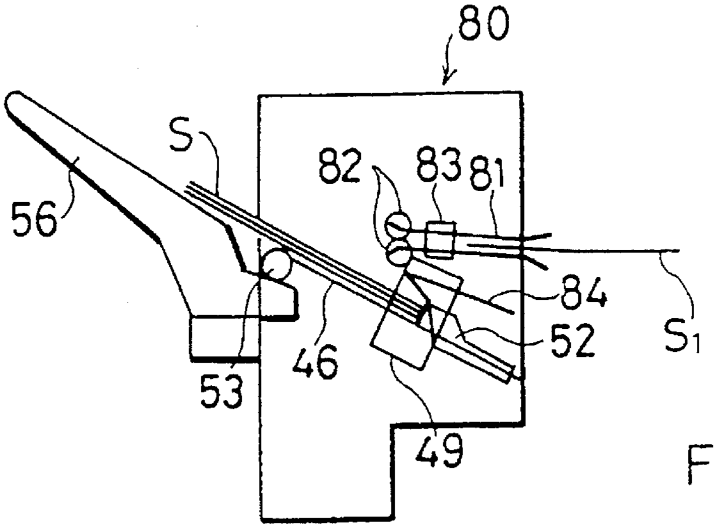
FIGS. 30(*a*)(*b*)(*c*)(*d*) are explanatory views respectively showing the operations by a sheet support plate of the device for further processing after copying.
Figure 30B:
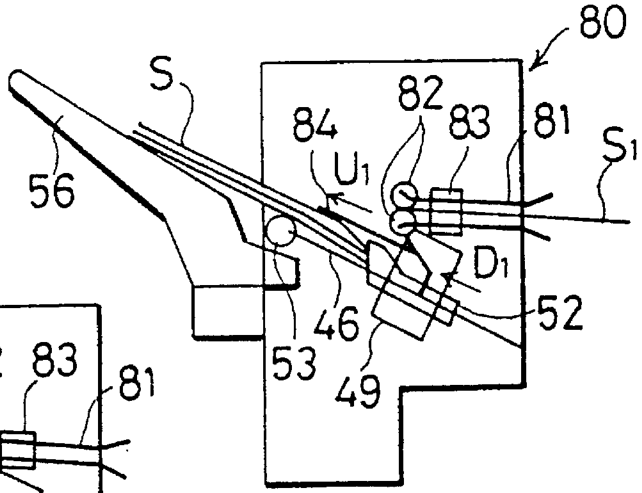
Figure 30C:
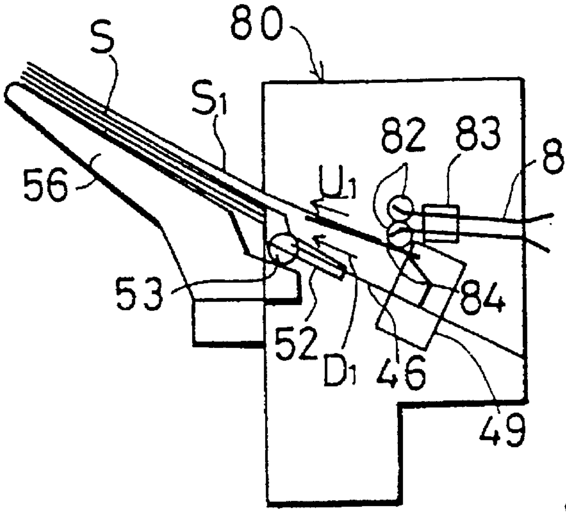
Figure 30D:
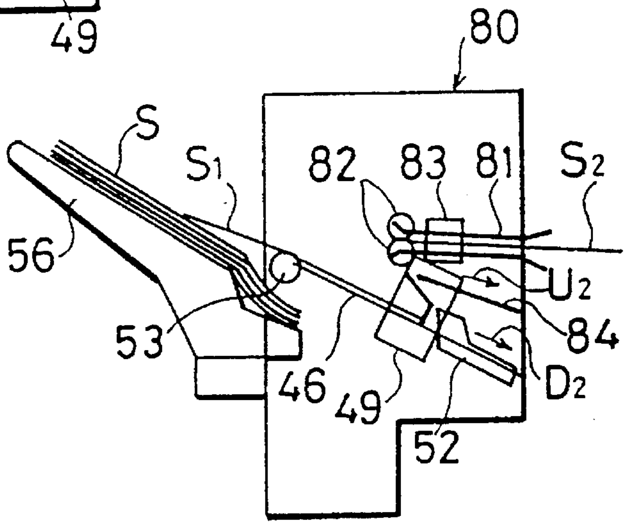

The following description will discuss another embodiment of the present invention with reference to FIGS. 29 through 30(*a*)(*b*)(*c*)(*d*). For convenience, members having the same function as in the first embodiment will be designated by the same code and their description will be omitted.

As shown in FIG. 29, a device 80 for further processing after copying of the present embodiment is provided with a transport path 81 for transporting the sheets S within the device 80 and a sheet support plate 84 (support means) which temporarily holds the sheets S and releases them from the hold state.

The transport path 81 is composed of a linear path having an entry opening 81*a* at one end through which the sheets S are fed from the main body 1. On the other end of the linear path, a pair of upper and lower discharge rollers 82 are provided for discharging the sheets S fed through the entry opening 81*a* onto the stapler plate 46. A sheet detection sensor 83 is provided along the transport path 81 for detecting the sheet S, which controls the driving of the sheet support plate 84 (to be described later).

The sheet support plate 84 can move back and forth in the direction of $U_1$–$U_2$ between the transport path 81 and the stapler plate 46. When the sheet support plate 84 is in a forward motion in the direction of $U_1$, it moves above the stapler plate 46 and holds the sheet S discharged from the transport path 81. On the other hand, when the sheet support plate 84 is in a backward motion in the direction of $U_2$, it releases the hold state of the sheet S.

With the above arrangement of the device 80 for further processing after copying, the process for transporting the sheets S in the multiple staple mode will be described below.

As shown in FIG. 30(*a*), while a predetermined binding operation is carried out on the first set of the sheets S on the stapler plate 46, a first sheet $S_1$ of the next set of sheets S is being transported through the transport path 81 from the main body 1. This transportation of the first sheet $S_1$ is detected by the sheet detection sensor 83. With this detection, the sheet support plate 84 moves forward in the direction of $U_1$. Then, as shown in FIG. 30(*b*), the sheets S are discharged onto the discharge tray 56 by an upward motion of the push-out member 52 in the direction of $D_1$ after the binding operation is carried out on the stapler plate 46. On the other hand, the first sheet $S_1$ transported through the transport path 81 is discharged onto the sheet support plate 84 by the discharge roller 82 as shown in FIG. 30(*c*).

As shown in FIG. 30(*d*), with a downward motion of the push-out member 52 in the direction of $U_2$, the next binding operation on the stapler plate 46 is set ready. Thereafter, when the sheet detection sensor 83 detects the second sheet $S_2$, the first sheet $S_1$ is released from being absorbed by the sheet support plate 84, the first sheet $S_1$ is then placed on the stapler plate 46. Then, the second, third, fourth . . . sheets are fed from the transport path 81 onto the stapler plate 46.

As described, the device 80 for further processing after copying of the present embodiment, the sheet support plate 84 is provided above the stapler plate 46, which holds the sheet S and releases the hold state of the sheet S. With this arrangement of the device 80 for further processing after copying, when it is set in the multiple binding mode, the respective sheets $S_1$ of the following sets are temporarily held by the sheet support plate 84 to reduce the time loss due to the binding operation on the stapler plate 46. Therefore, faster binding operations can be achieved in the multiple binding mode.

[EMBODIMENT 4]

Figure 31:
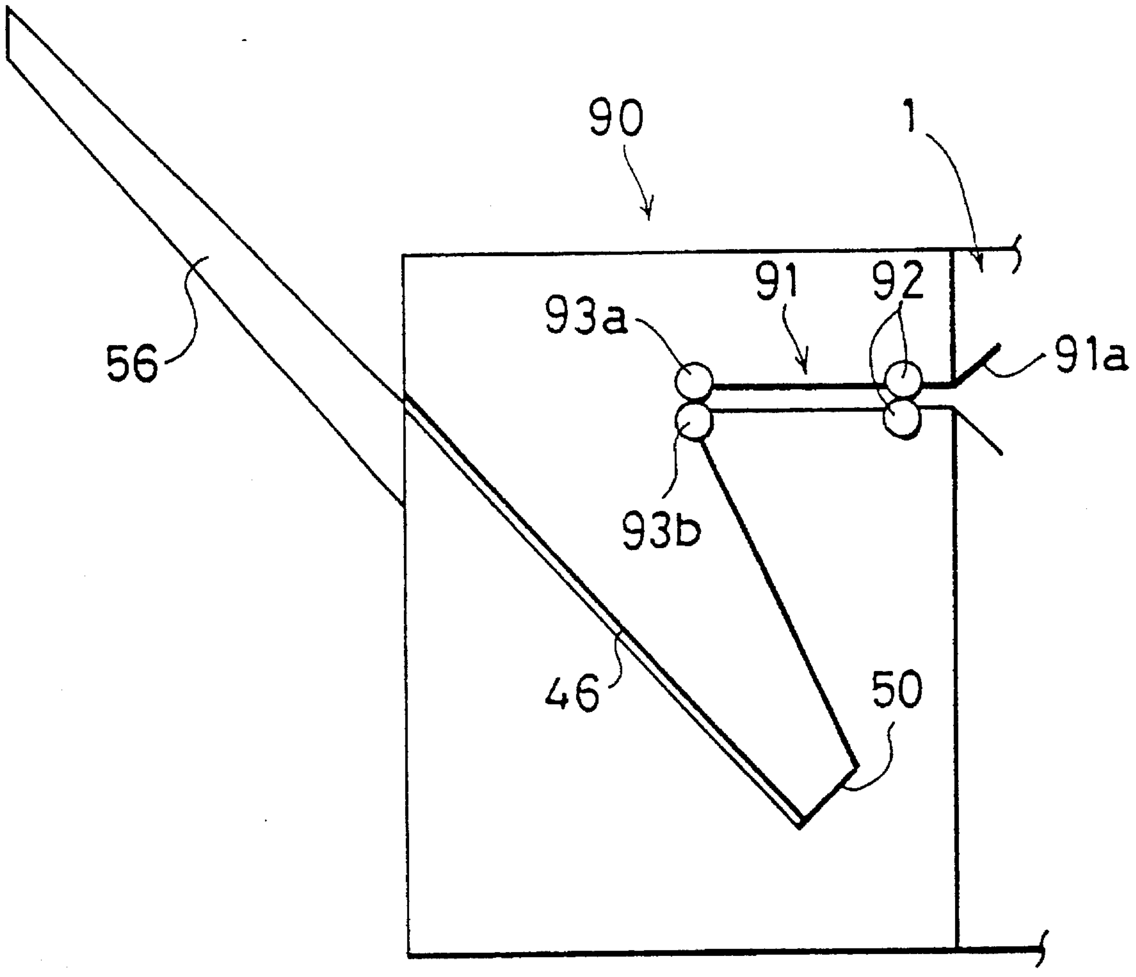
FIG. 31 is an explanatory view showing a device for further processing after copying used in another embodiment of the present invention.
Figure 32:
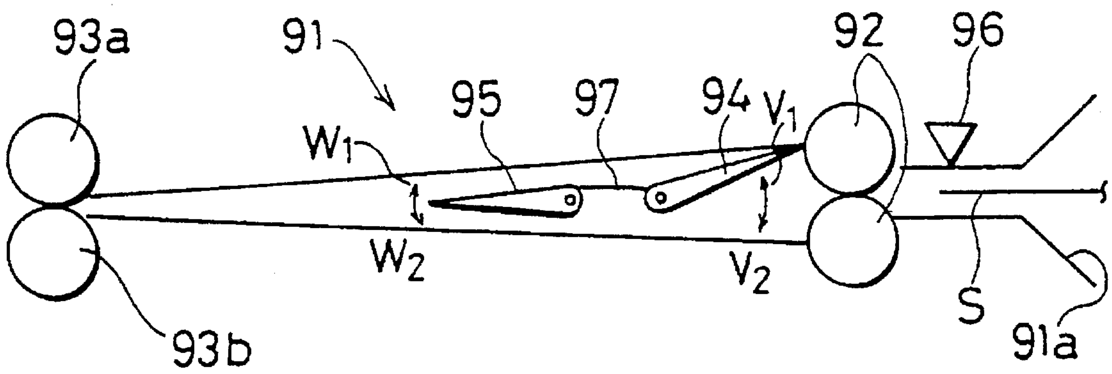
FIG. 32 is an explanatory view showing a transport path of the device for further processing after copying.
Figure 33:
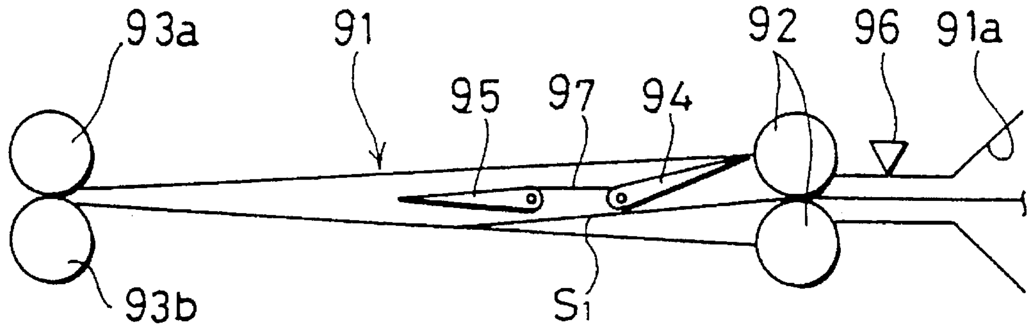
FIGS. 33(*a*)(*b*)(*c*) are explanatory views respectively showing the sheet transport operations through the transport path.
Figure 33B:
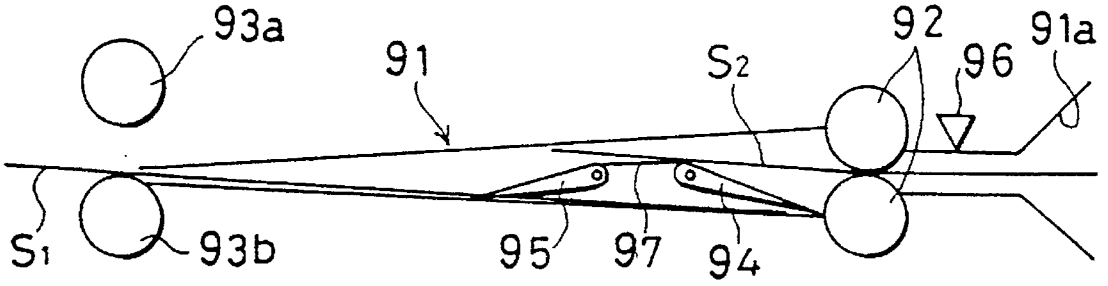
Figure 33C:
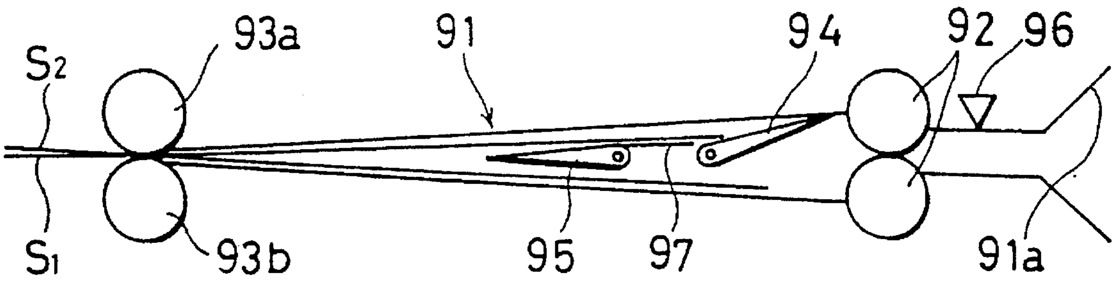

The following description will discuss another embodiment of the present invention with reference to FIGS. 31 through 33(*a*)(*b*)(*c*). For convenience, members having the same function as in the first embodiment will be designated by the same code and their description will be omitted.

As shown in FIG. 31, a device 90 for further processing after copying is provided with a transport path 91 which is arranged as follows. The transport path 91 is composed of a linear path having an entry opening 91*a* and a pair of upper and lower feed rollers 92 at one end, so that the sheets S are fed into the device 90 from the main body 1. On the other end of the linear path, a pair of upper and lower discharge rollers 93*a* and 93*b* are provided for discharging the sheets S fed through the entry opening 91*a* onto the stapler plate 46.

The discharge rollers 93*a* and 93*b* are arranged as follows. While the sheet S is sandwiched between the discharge rollers 93*a* and 93*b*, the discharge roller 93*a* is driven, thereby discharging the sheet S. On the other hand, when the discharge roller 93*a* separates from the discharge roller 93*b* and the discharge roller 93*a* stops rotating, the discharging operation of the sheets S is stopped.

As shown in FIG. 32, the device 90 for further processing after copying has a deflector 94 as a path switching means and a sheet pressing member 95 provided along the path between the feed rollers 92 and the discharge rollers 93*a* and 93*b*. Furthermore, a sheet detection sensor 96 is provided along the path between the entry opening 91*a* and the feed rollers 92.

The deflector 94, which rotates in the direction of $V_1$–$V_2$, is provided so that the leading edge of the deflector 94 is at the side of feed rollers 92. On the other hand, the sheet pressing member 95, which rotates in the direction of $W_1$–$W_2$, is provided so that the leading edge of the sheet pressing member 95 is at the side of the discharge rollers 93*a* and 93*b*. Furthermore, a dividing plate 97 is provided between the deflector 94 and the sheet pressing member 95, which divides the path into the upper part and the lower part.

The sheet detection sensor 96 detects the sheets S fed through the entry opening 91*a*. With the detection of the sheet S by the sheet detection sensor 96, the rotation of the deflector 94, the rotation of the sheet pressing member 95, and the discharge roller 93*a* are controlled.

With the above arrangement, the following will describe the process for transporting the sheets S through the transport path 91 of the device for further processing after copying 90. The explanation is given through the case where the first and the second sheets of the second set are transported through the transport path 91 in the multiple staple mode. Other operations of the device 90 are fundamentally the same as the device 40 for further processing after copying of the first embodiment, thus the explanations thereof shall be omitted here. As shown in FIG. 33(*a*), when all of the sheets S of the first set are discharged on the stapler plate 46, the deflector 94 rotates in the direction of $V_1$, and the sheet pressing member 95 rotates in the direction of $W_1$, thereby forming the transport path below the dividing plate 97. Then, the first sheet $S_1$ of the next set fed through the entry opening 91*a* is transported through the path provided below the dividing plate 97 by the feed rollers 92. Next, after a predetermined time from when the sheet detection sensor 96 detects the rear edge of the first sheet $S_1$, the discharge rollers 93*a* and 93*b* are released from the contact state with the sheet $S_1$ interposed in between as shown in FIG. 33(*b*). In the meantime, the discharge roller 93*a* stops rotating, thereby stopping the transportation of the first sheet $S_1$. In this state, the sheet pressing member 95 holds the first sheet $S_1$ in the path by rotating in the direction of $W_2$, and the deflector 94 switches the transport path provided above the dividing plate 97 by rotating in the direction of $V_2$.

Then, the second sheet $S_2$ fed through the entry opening 91*a* is transported through the path provided above the dividing plate 97. Next, after a predetermined time from when the sheet detection sensor 96 detects the rear edge of the second sheet $S_2$, the sheet pressing member 95 releases the hold state of the second sheet $S_2$ in the path by rotating in the direction of $W_1$, and the deflector 94 switches the transport path to the path provided below the dividing plate 97 by rotating in the direction of $V_1$. The discharge roller 93*a* starts rotating with the first and the second sheet $S_1$ and $S_2$ interposed between the discharge roller 93*b* and itself, the first sheet $S_1$ and the second sheet $S_2$ are superimposed and discharged onto the stapler plate 46 at the same time.

As described, the device 90 for further processing after copying has the transport path 91 composed of a linear path. Further, the deflector 94 and the dividing plate 97 are provided along the transport path 91 so that the transport path for the sheets S can be switched either to the upper path or to the lower path having the dividing plate 97 as a border.

With this arrangement of the device 90 for further processing after copying, it is not necessary to divide the transport path into the main pass and the bypass, and the time loss due to the binding operation in the multiple mode can be reduced, thereby achieving faster binding operations in the multiple mode.

[EMBODIMENT 5]

The following description will discuss another embodiment of the present invention with reference to FIGS. 34 through 44. For convenience, members having the same function as in the first embodiment will be designated by the same code and their description will be omitted.

Figure 34:
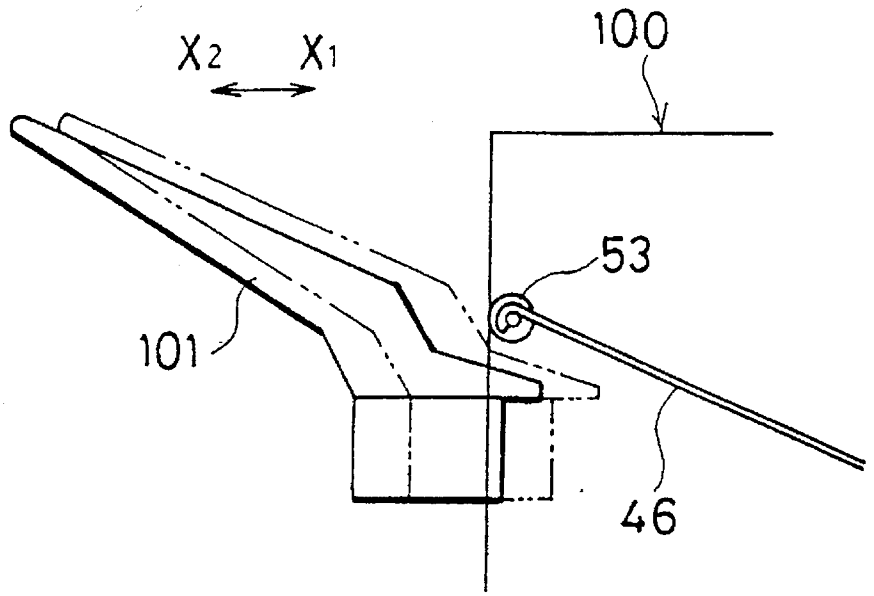
FIG. 34 is an explanatory view showing the back and forth shift of the discharge tray of a device for further processing after copying adopted in another embodiment of the present invention.

A device 100 for further processing after copying of the present embodiment is provided with a discharge tray 101 as shown in FIG. 34. The discharge tray 101 is fitted below the discharge roller 53 in the device 100. Furthermore, an elevator unit, a shift unit, and a back-forth moving unit (not shown) are provided in the vicinity of the connected portion.

Therefore, the discharge tray 101 can move up and down, back and forth (in the direction of $X_1$–$X_2$), and in the direction perpendicular to the plane of FIG. 34, in order to adjust the position of the tray according to the sheet S to be held.

Figure 35:
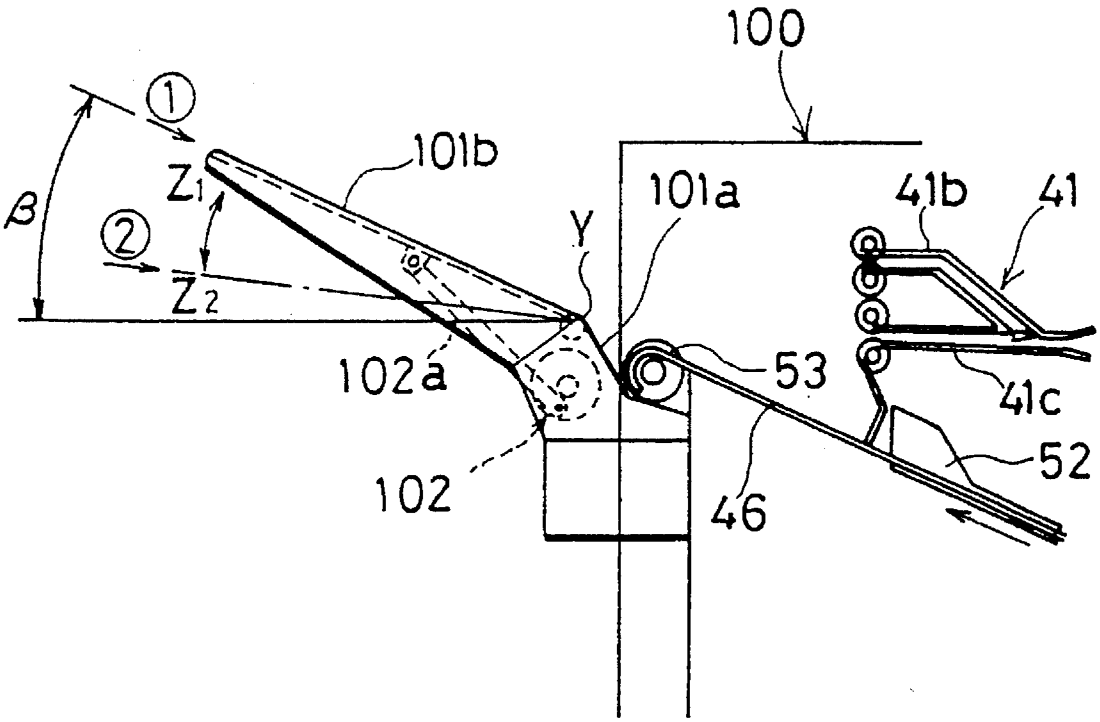
FIG. 35 is an explanatory view showing a tray angle of the discharge tray.

As shown in FIG. 35, the portion, which is fitted to the device 100, of the discharge tray 101 is recessed to be a falling section 101*a* of the discharge roller 53. On the other hand, the support face 101*b* for the sheet S in the discharge tray 101 is provided so as to be capable of rotating around a fulcrum Y in the direction of $Z_1$–$Z_2$ at the boundary portion of the falling section 101*a*. Furthermore, one end of a connecting rod 102*a* of the crank unit 102 is attached to the bottom surface of the support face 101*b* so that the tray angle β varies in response to the motion of the crank unit 102.

Figure 36:
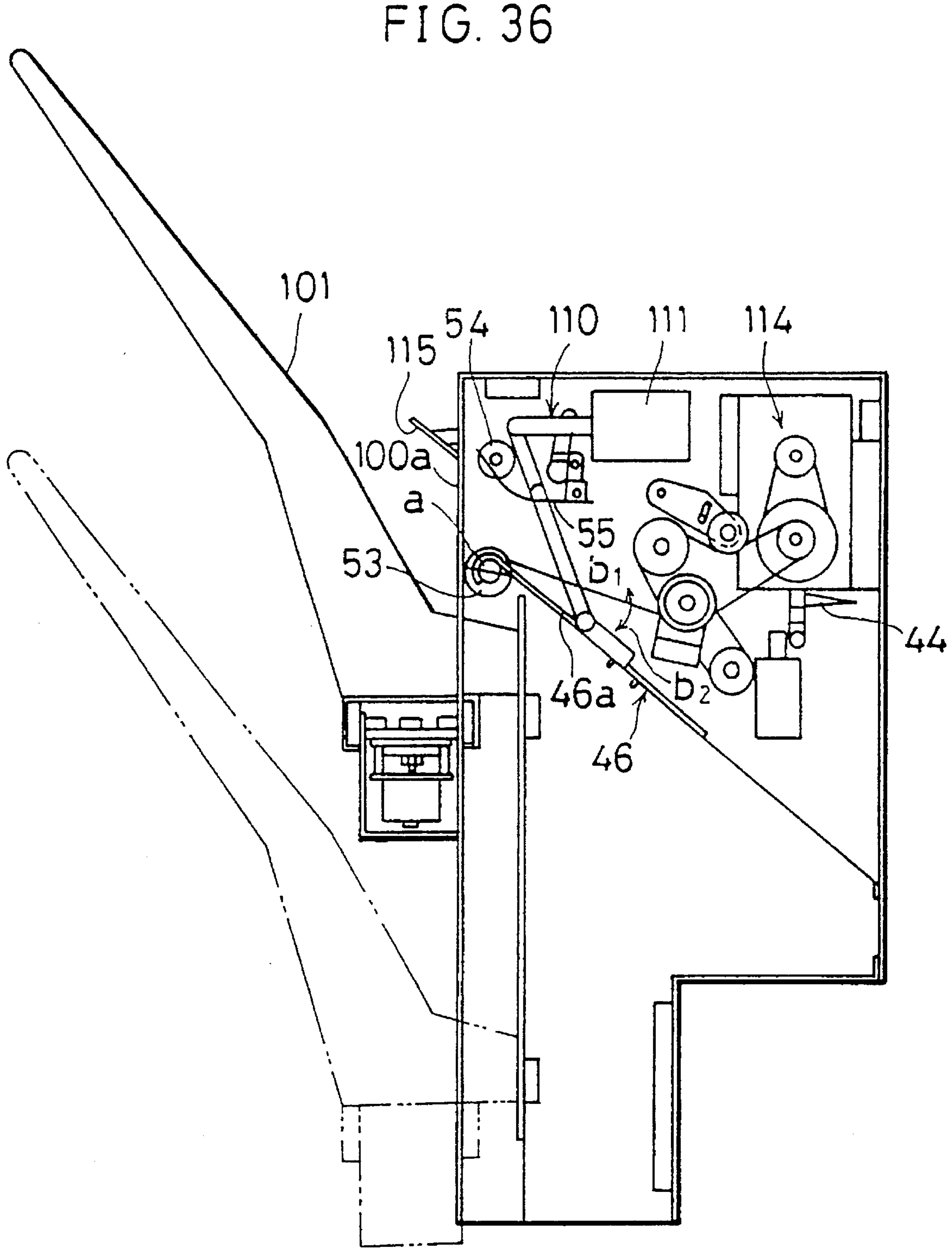
FIG. 36 is a longitudinal sectional view showing a guide plate of a stapler plate of the device for further processing after copying.

As shown in FIG. 36, the stapler plate 46 of the processing means 45 is provided so that a portion of the plate 46 is capable of rotating around a fulcrum a in the direction of $b_1$–$b_2$. Furthermore, when the stapler plate 46 rotates in the direction of $b_1$ by the plate moving mechanism 110 (to be described later), the above portion becomes a guide plate 46*a* for the sheet S, which connects the main pass 41*c* of the transport path 41 and the discharge tray 101.

Figure 37:
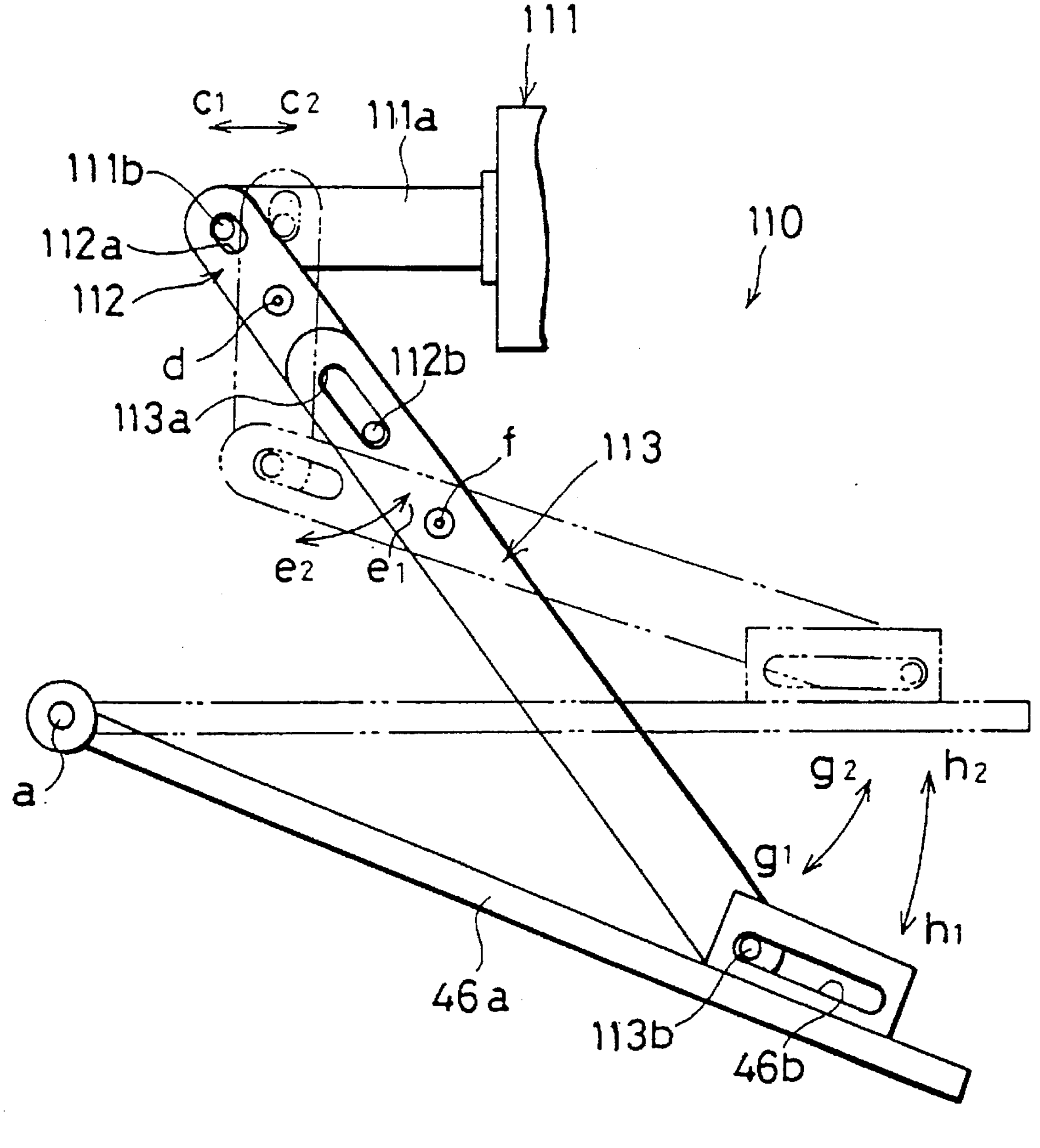
FIG. 37 is an explanatory view showing a rotating operation of the guide plate by the plate moving mechanism.

As shown in FIG. 37, the plate moving mechanism 110 is provided with a guide solenoid 111, a first arm member 112, and a second arm member 113. The guide solenoid 111 is provided with a movable iron core 111*a* which can move back and forth in the direction of $c_1$–$c_2$. The first arm member 112 is connected so as to be movable around a fulcrum d in the direction of $e_1$–$e_2$. Similarly, the second arm member 113 is connected so as to be movable around a fulcrum f in the direction of $g_1$–$g_2$. The guide solenoid 111 has a projected portion at the leading edge of the movable iron core 111*a*. The first and the second arm members 112 and 113 are respectively provided with holes 112*a* and 113*a* at respective ends thereof, and pins 112*b* and 113*b* at the other ends thereof.

The plate moving mechanism 110 is arranged as follows. The pin 111*b* of the guide solenoid 111 is fitted into the hole 112*a* of the first arm member 112. The pin 112*b* of the first arm member 112 is fitted into the hole 113*a* of the second arm member 113. Similarly, the pin 113*b* of the second arm member 113 is fitted into a hole 46*b* of the flange section formed on the guide plate 46*a*. With this arrangement, when the movable iron core 111*a* moves forward in the direction of $c_1$, the guide plate 46*a* rotates in the direction of $h_1$ with the rotation of the first arm member 112 in the direction of $e_1$ and with the rotation of the second arm member 113 in the direction of $g_1$, thereby setting the stapler plate 46*a* at the predetermined position.

On the other hand, when the movable iron core 111*a* moves backward in the direction of $c_2$, the guide plate 46*a* rotates in the direction of $h_2$ with the rotation of the first arm member 112 in the direction of $e_2$, and with the rotation of the second arm member 113 in the direction of $g_2$, thereby placing the stapler plate 46 between the main pass 41*c* and the discharge tray 56.

As shown in FIG. 36, the device 100 for further processing after copying is provided with a drive unit 114 placed above the deflector 44, and a safety guide 115*a* placed above the discharge opening 100*a*. The drive unit 114 serves as a drive source for various components such as the guide plate 46*a*. The safety guide 115 prevents the user from touching the device 100 by mistake through the discharge opening 100*a*.

With the above arrangement of the device 100 for further processing after copying, respective operations of the guide plate 46*a* and the discharge tray 56 will be described in both offset and staple modes.

Figure 38:
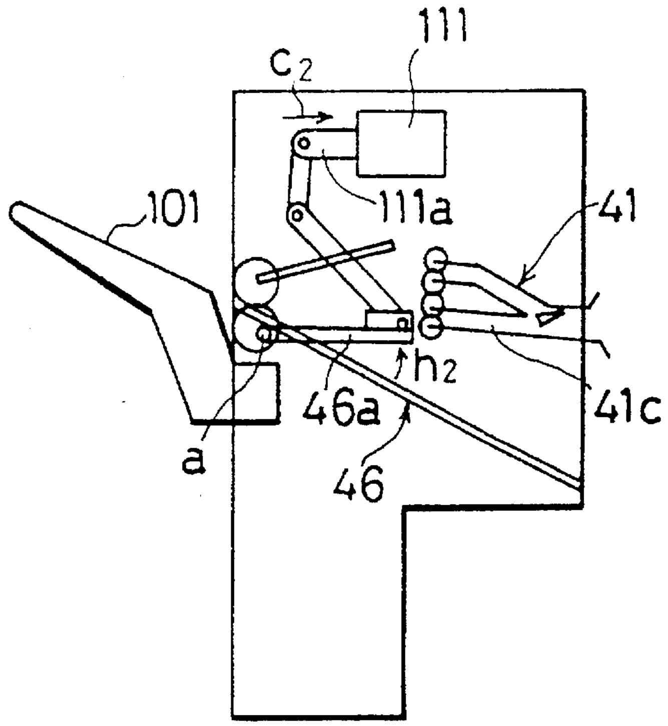
FIG. 38 is an explanatory view showing a rotating operation of the guide plate in the offset mode.

In the offset mode, first the guide plate 46*a* rotates in the direction of $h_2$ around the fulcrum a with the backward motion of the movable iron core 111*a* in the direction of $C_2$ of the guide solenoid 111 of the plate moving mechanism 110 as shown in FIG. 38. Then, the guide plate 46*a* is placed at the position which connects the main pass 41*c* and the discharge tray 101. Furthermore, the discharge tray 101 rotates in the direction of $Z_2$ with the motion of the crank unit 102, and the tray angle β is adjusted to the position indicated by ② in FIG. 35. In the meantime, the position of the discharge tray 101 is adjusted in an up-down direction by the motion of the elevator unit.

Figure 39:
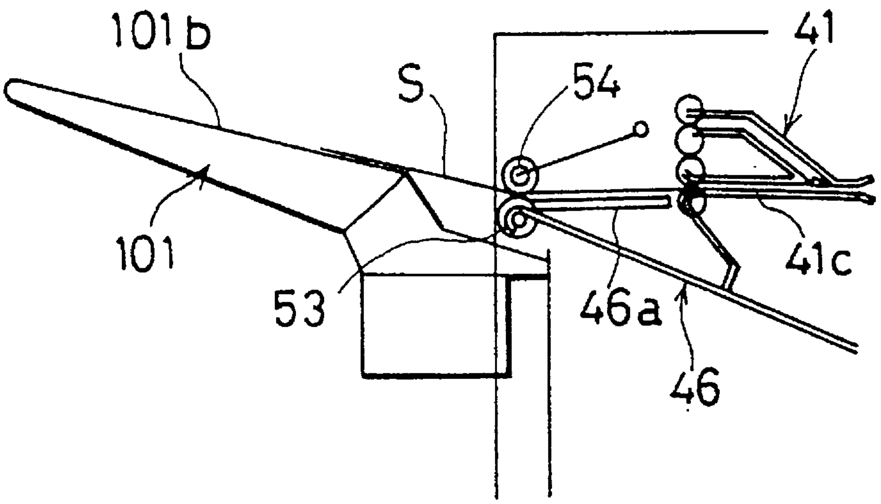
FIG. 39 is an explanatory view showing the position of the discharge tray in the offset mode.

With this arrangement, as shown in FIG. 39, the sheet S, fed through the main pass 41*c*, passes between the rollers 53 and 54 with the guidance of the guide plate 46*a*. Thereafter, the sheet S, which is smoothed out by being sandwiched between the rollers 53 and 54, is discharged on the support face 101*b* of the discharge tray 101. The tray angle β of the discharge tray 101, adjusted to the position ②, is set such that the discharge tray 101 forms an upward slope with respect to the line connecting the main pass 41*c* and the contact portion between the rollers 53 and 54, and that the sheet S which has been smoothed out can be appropriately supported.

Figure 40:
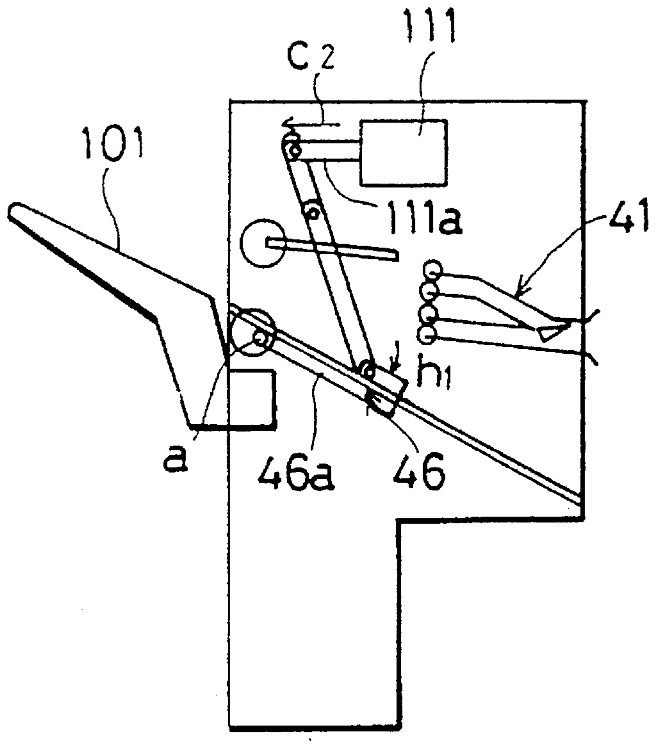
FIG. 40 is an explanatory view showing a rotating operation of the guide plate in the staple mode.

In the staple mode, first the guide plate 46*a* rotates in the direction of $h_1$ around the fulcrum a with the forward motion in the direction of $c_1$ of the movable iron core 111*a* of the guide solenoid 111 of the plate moving mechanism 110 as shown in FIG. 40. Then, the guide plate 46*a* is placed at the predetermined position on the stapler plate 46. Furthermore, the discharge tray 101 rotates in the direction of $Z_1$ with the motion of the crank unit 102, and the tray angle β is adjusted to the position indicated by ① in FIG. 35. In the meantime, the position of the discharge tray 101 is adjusted in an up-down direction by the motion of the elevator unit. The discharge tray 101 is further moved by the back-forth moving unit in the direction of $X_1$, so as to be placed at such a position that the space between the releasing portion 101*a* and the discharge roller 53 is reduced.

Figure 41:
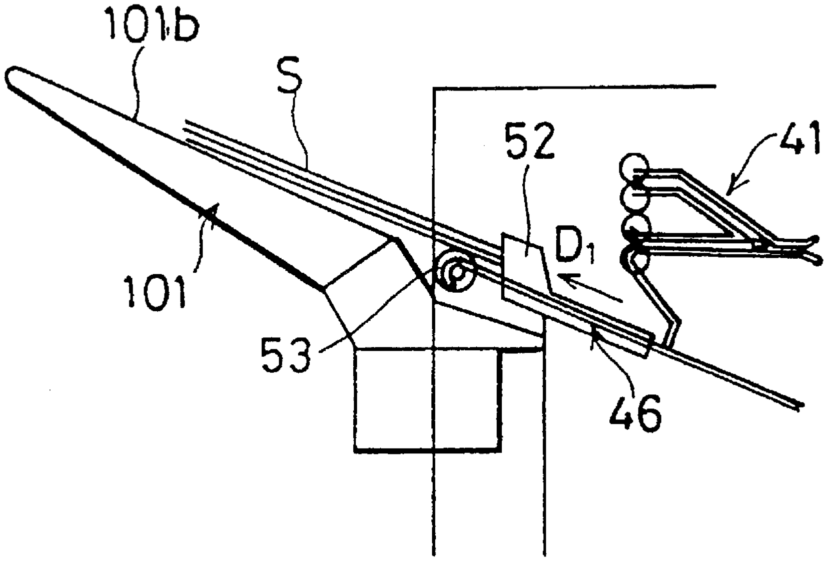
FIG. 41 is an explanatory view showing the position of the discharge tray in the staple mode.
Figure 42:
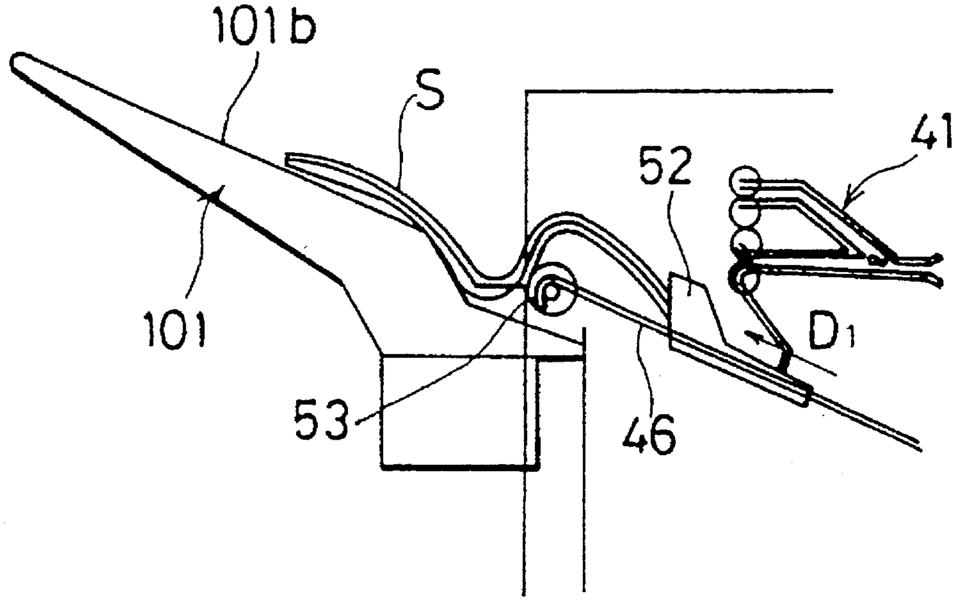
FIG. 42 is an explanatory view showing the case where the sheets drop into a resting face of the discharge tray.
Figure 43:
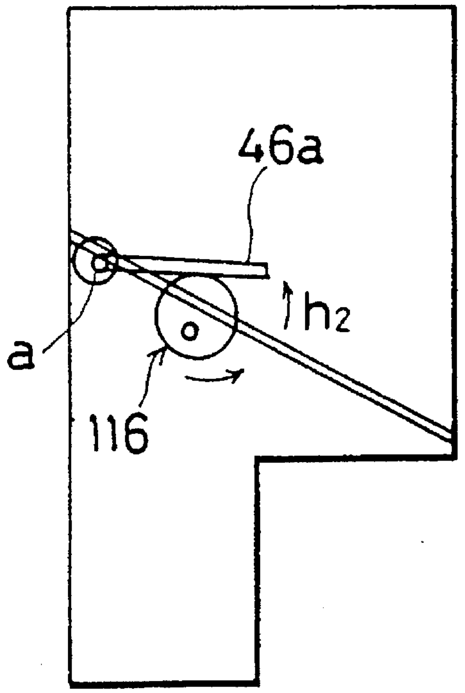
FIG. 43 is an explanatory view showing a plate moving mechanism of a cam unit.
Figure 44:
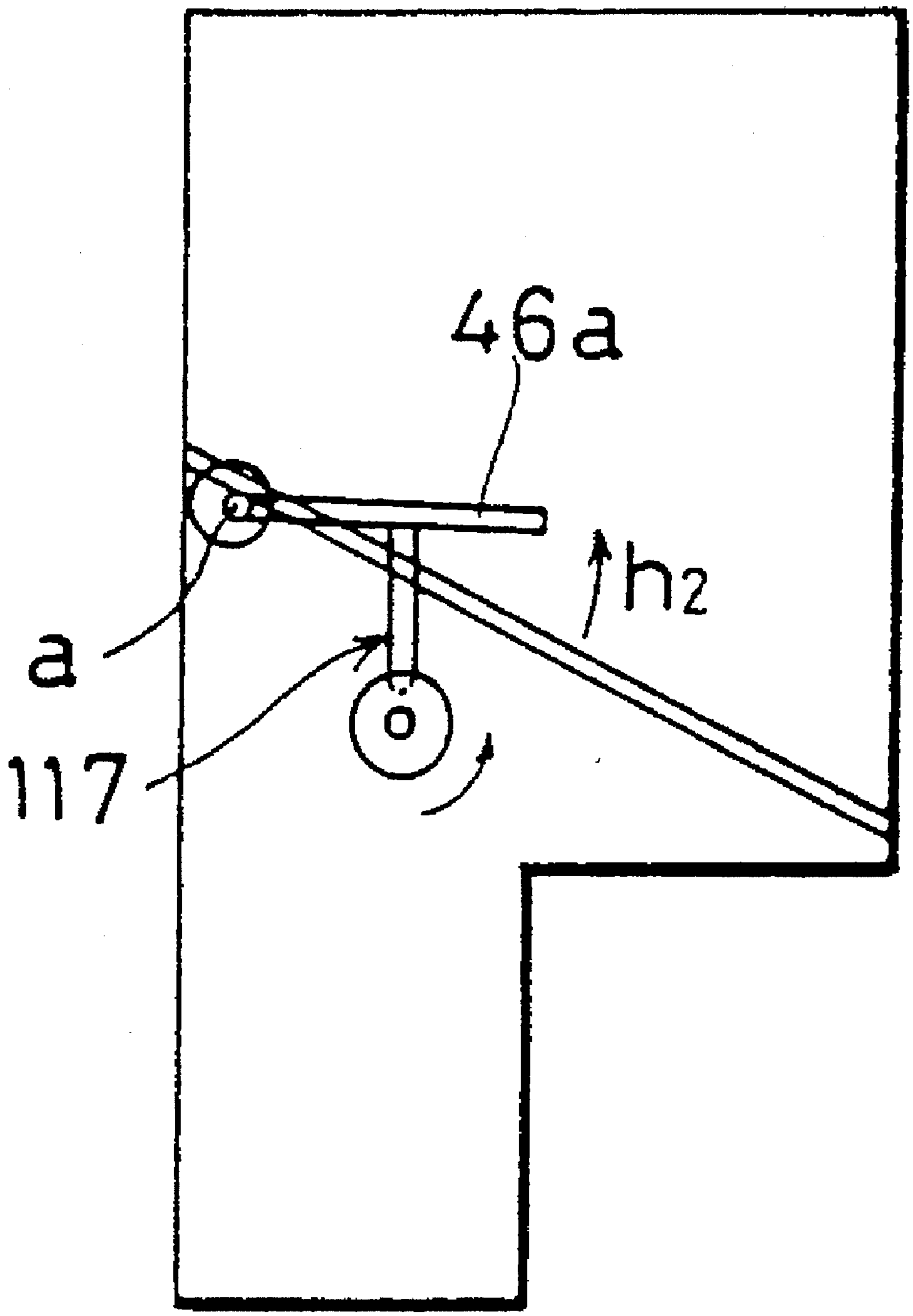
FIG. 44 is an explanatory view showing a plate moving mechanism of a crank unit.

With this arrangement, with the upward motion of the push-out member 52 in the direction of $D_1$, the sheets S, having gone through the predetermined binding process on the stapler plate 46, are discharged onto the support face 101*b* of the discharge tray 101 which is set at such a position that the space between the discharge tray 101 and the discharge roller 53 is reduced as shown in FIG. 41.

The tray angle β of the discharge tray 101, which is adjusted to the positions ①, is set the same angle with the slope of the stapler plate 46. In this way, the support face 101*b* of the discharge tray 101 is placed on the same plane as the top surface of the stapler plate 46, and appropriately supports the complete set discharged from the stapler plate 46. Moreover, the movement of the discharge tray 101 in the direction of $X_1$ reduces the space between the releasing portion 101*a* of the discharge tray 101, and the discharge roller 53. As a result, an entrance of the complete set into the space (shown in FIG. 42) can be prevented, thereby improving the quality of the complete set and the discharging operation.

As a note, the present invention does not intend to be limited to the above preferred embodiment, it can be varied in many ways within the scope of the present invention. In the above embodiment, the plate moving mechanism 110 composed of the guide solenoid 111, and the first and the second arm members 112 and 113, is used for the plate moving mechanism 110 which moves the guide plate 46*a* up and down. However, the present invention does not intend to be limited to this mechanism. Other than this mechanism, for example, the cam unit 116 of FIG. 43, or the crank unit 117 of FIG. 44 may be used.

[EMBODIMENT 6]

The following description will discuss another embodiment of the present invention with reference to FIGS. 45 through 69. The present embodiment is given through the case where a device for further processing after copying is contained in a copying machine which serves as an image forming apparatus.

Figure 47:
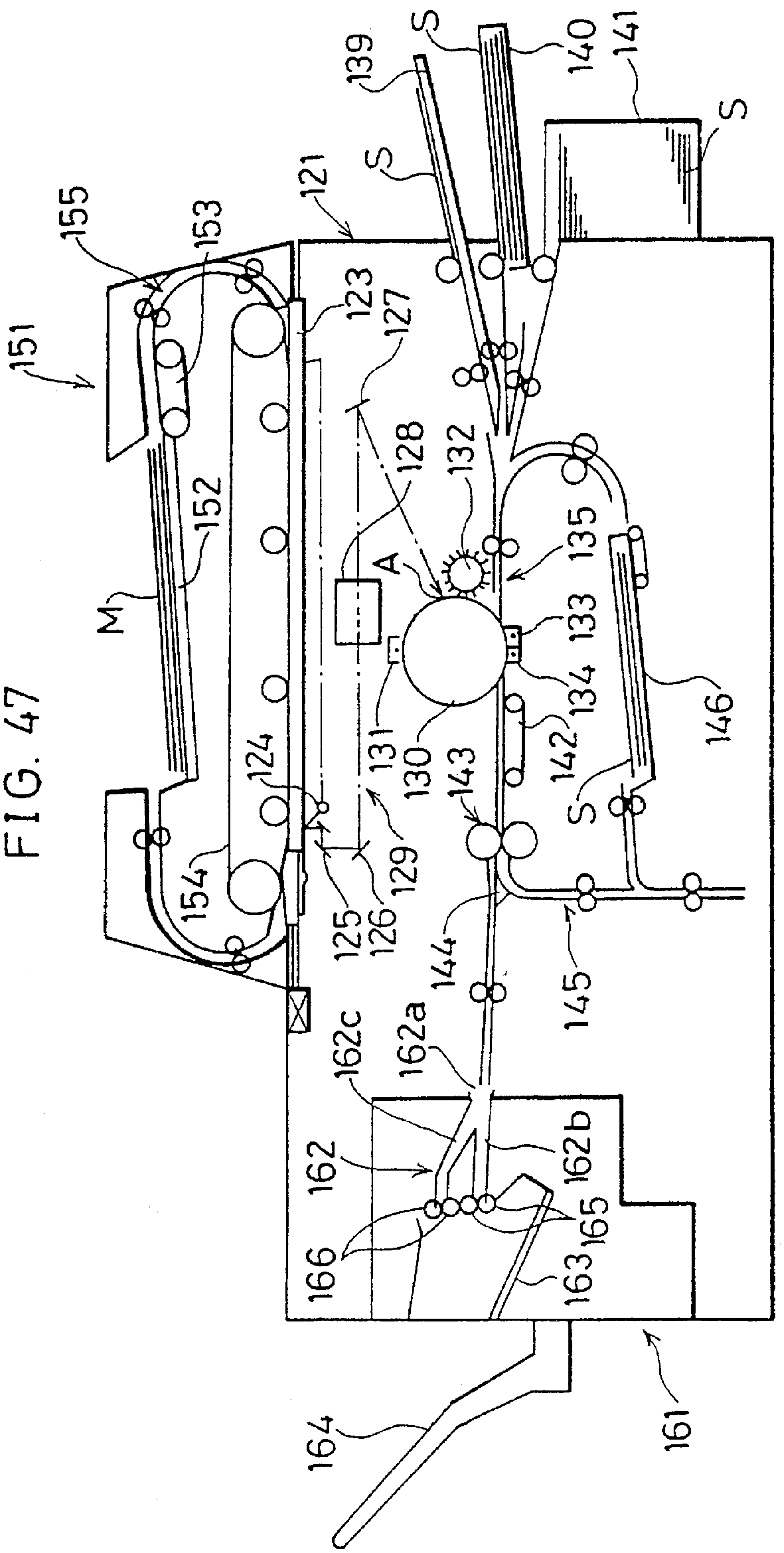
FIG. 47 is a view showing an entire configuration of a copying machine equipped with the device for further processing after copying of FIG. 45.

As shown in FIG. 47, a device 161 for further processing after copying is provided in a main body 121 of a copying machine. Further, a RDH (Recirculating Document Handler) 151, which is a kind of automatic document feeder, is provided on the main body 121, which transports a document M to a glass plate 123.

The glass plate 123 is placed on the upper side of the main body 121. Further, an optical system 129 and a photoreceptor drum 130 are placed under the glass plate 123. The optical system 129 includes a light source 124, mirrors 125, 126, and 127, and a lens 128. The optical system 129 is provided for scanning the document M using a light emitted from the light source 124, the document M being transported onto the glass plate 123 by the RDH 151. Further, the reflected light is projected onto an exposure point A on the surface of the photoreceptor drum 130 through mirrors 125, 126 and 127, and the lens 128. As a result, a static latent image is formed on the surface of the photoreceptor drum 130 which is uniformly charged by a main charger unit 131, the static latent image corresponding to the image on the document M.

A main charger unit 131, a developer unit 132, a transfer charger 133, and a separation charger 134 are provided along the circumference of the photoreceptor drum 130. The developer unit 132 develops the electrostatic latent image formed on the surface of the photoreceptor drum 130 to be a toner image. Then, the transfer charger 133 transfers the toner image onto the sheet S. Then, the separation charger 134 separates the sheet S from the photoreceptor drum 130.

A sheet transport path 135 is provided under the photoreceptor drum 130, for transporting the sheets S to the photoreceptor drum 130. Further, a feed board 139, a feed cassette 140, and a feed deck 141, for feeding the sheets S, are placed respectively on the upstream of the sheet transport path 135. On the downstream of the sheet transport path 135, a transport belt 142 and a fuser 143 are provided. The transfer belt 142 transports the sheets S whereon the toner image has been transferred. The toner image is made permanent on the sheet S by the fuser 143.

On the downstream of the fuser 143, a deflector 144 is provided by which the feeding path of the sheet S is branched into both a path connected to the device 161 for further processing after copying, and a re-transport path 145. The re-transport path 145 serves as a recirculation path through which the sheet S, whereon the toner image has been transferred by the photoreceptor drum 130, is transported again to the photoreceptor drum 130. Further, an intermediate tray 146 is provided along the path, which allows copying on both sides of the sheet S.

The RDH 151 includes a document tray 152 (located on top), a feed belt 153 (placed at one end of the document tray 152), and a feed belt 154 (placed on the glass plate 123), which are all connected by a document feed path 155 serving as a recirculation path. The RDH 151 feeds the document M placed on the document tray 152 onto the glass plate 123 by the feed belt 153. Further, the RDH 151 sets the document M to a predetermined position on the glass plate 123 by the transport belt 154, and sends back the document M onto the document tray 152 after the document M has been scanned by the optical system 129.

Figure 45:
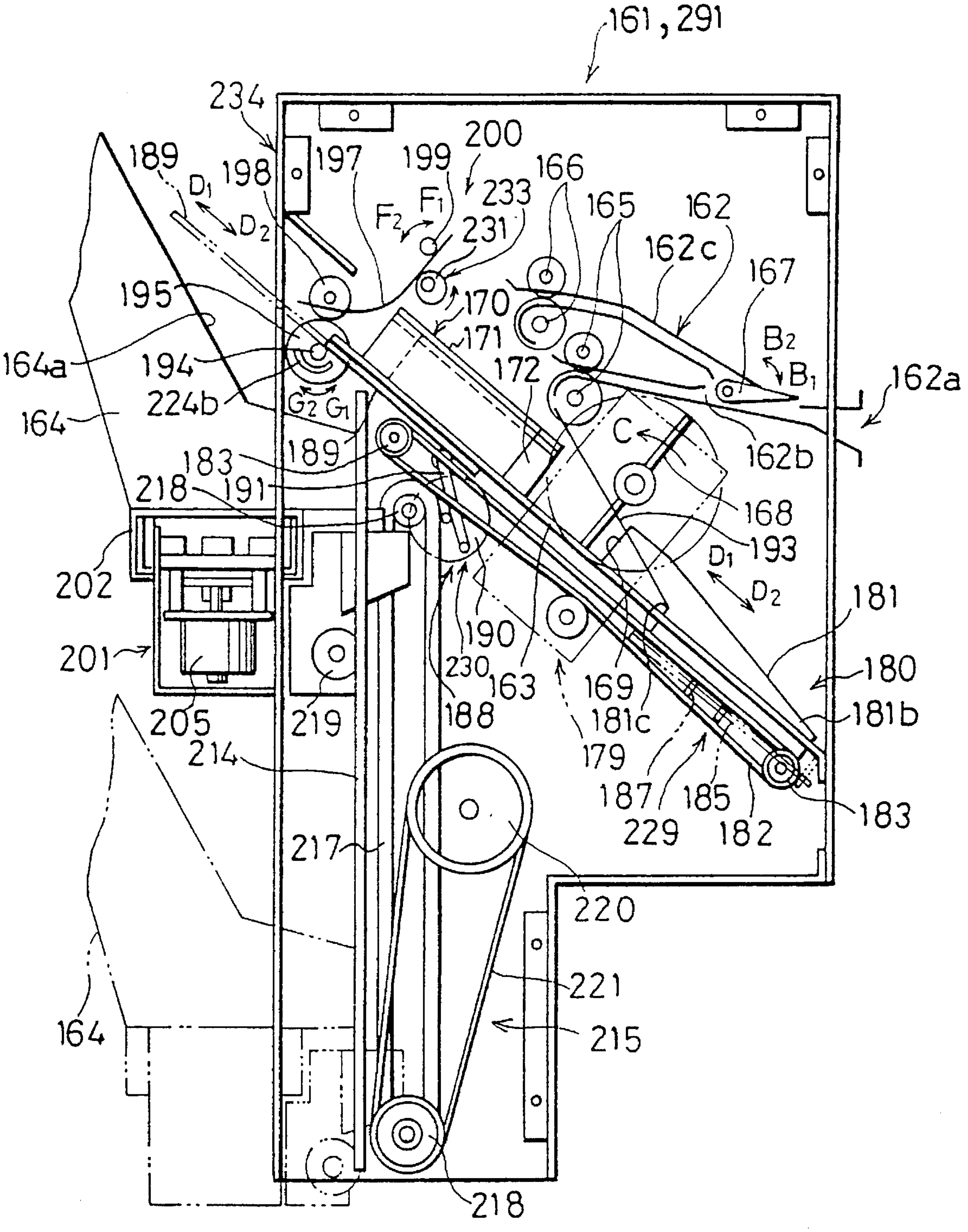
FIG. 45 is a view showing an entire configuration of a device for further processing after copying of another embodiment of the present invention, and is an enlarged view of the essential part of FIG. 46.
Figure 46:
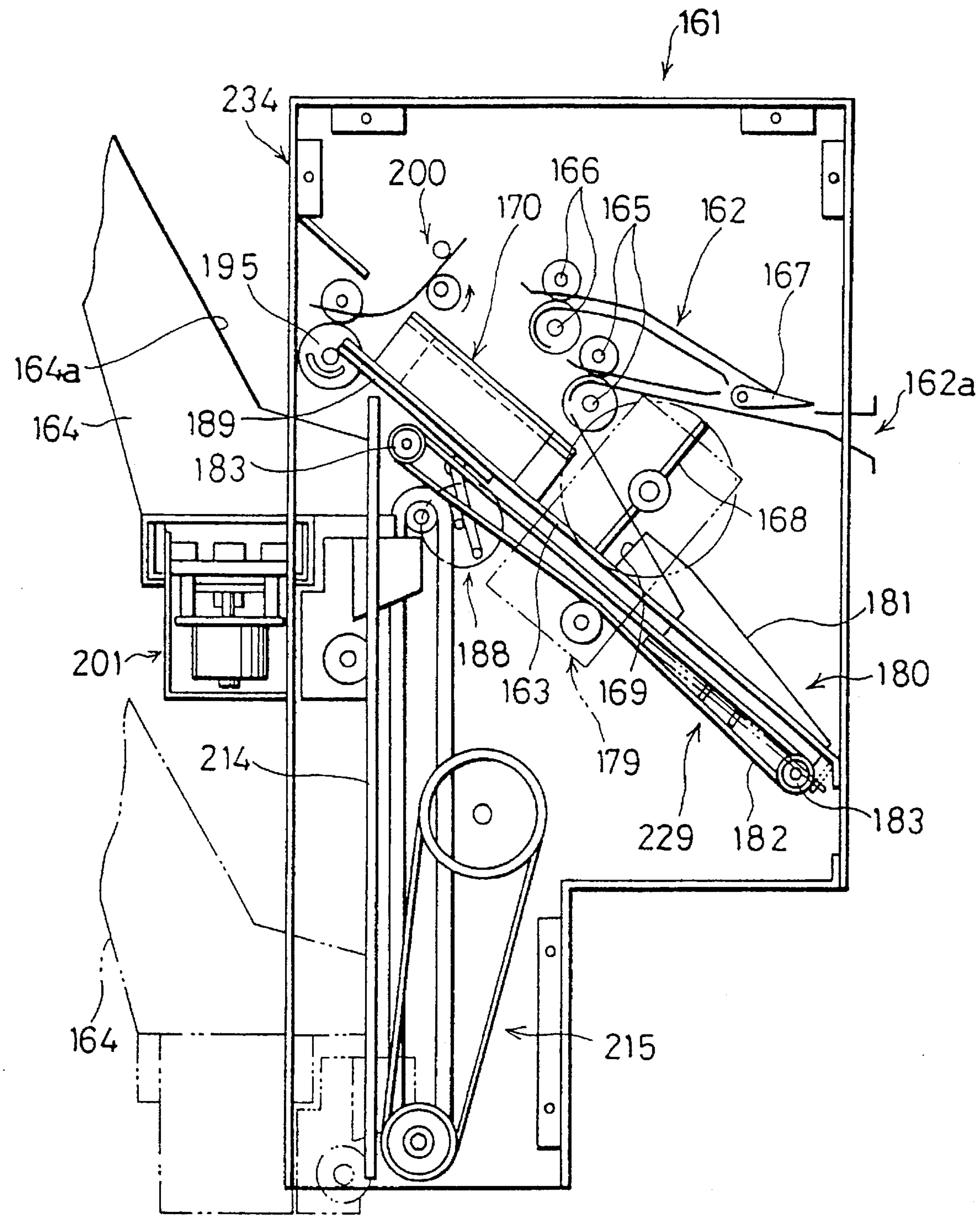
FIG. 46 is a view showing an entire configuration of the device for further processing after copying.

As shown in FIGS. 45 and 46, the device for further processing after copying 161 of the present embodiment is provided with a transport path 162, which transports the sheet S fed from the main body 121 within the device 161. In the transport direction of the sheet S through the transport path 162, a stapler plate 163 is provided on which the sheets S are to be placed. Furthermore, the discharge tray 164 is provided in the transport direction for the sheets S from the stapler plate 163.

Figure 48:
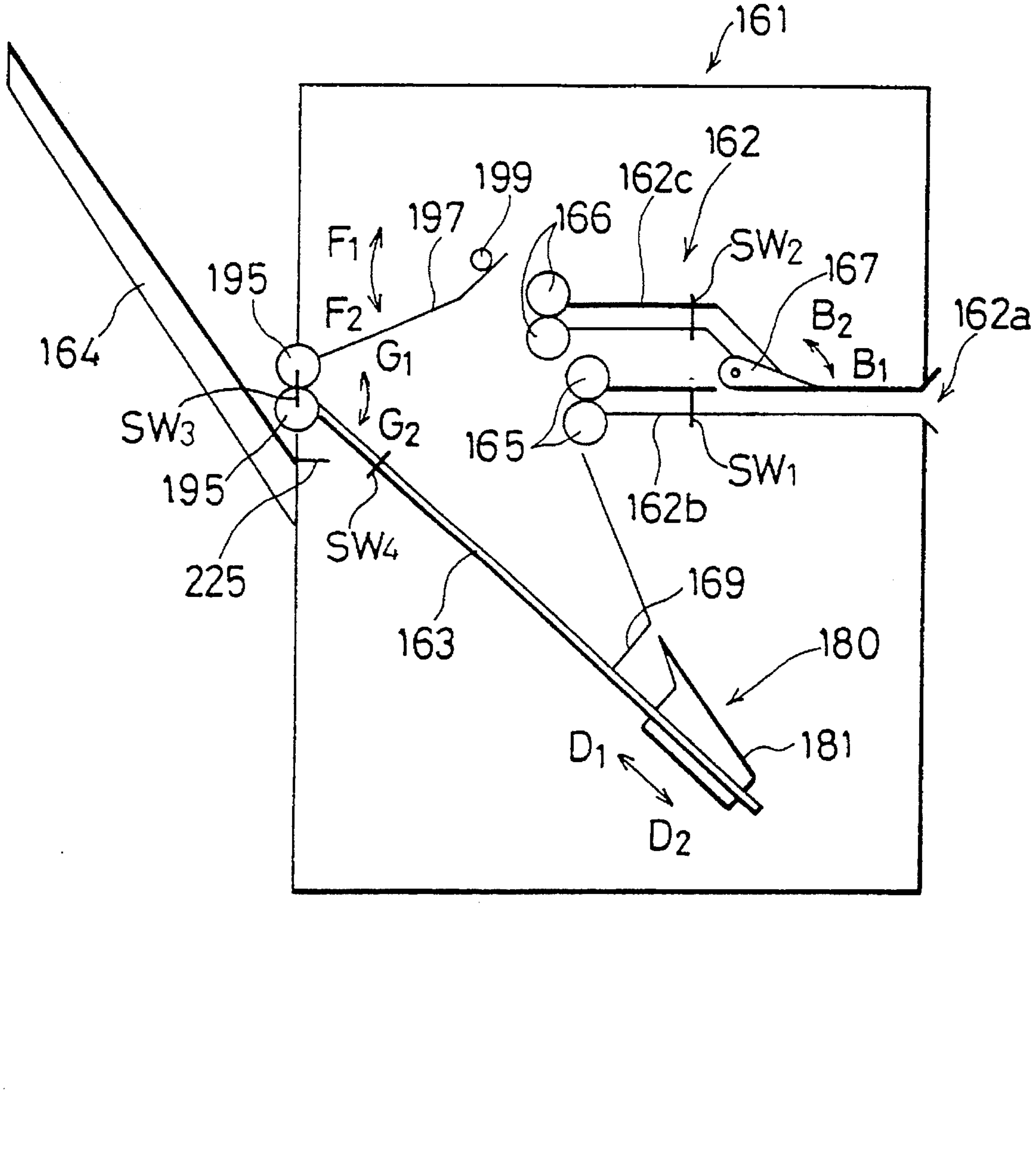
FIG. 48 is an explanatory view showing the respective positions of the detection switches of the device for further processing after copying of FIG. 45.

The transport path 162 has an entry opening **162*a* formed on one end thereof, through which the sheets S are fed from the main body 121. The transport path 162 is branched into upper and lower paths, i.e., a bypass 162*c* and a main pass 162*b*. The transport path 162 is further provided with a pair of upper and lower transport rollers 165 and transport rollers 166, placed at respective ends of the bypass 162*c* and the main pass 162*b*, and a deflector 167 placed at a branch point between the bypass 162*c* and the main pass 162*b*. The deflector 167, which serves as a means for switching the path, is capable of rotating in the direction of $B_1$–$B_2$, and switches the transport path for the sheet S either to the bypass 162*c* or to the main pass 162*b*. As shown in FIG. 46, the transport rollers 165 and 166 are driven by the transport roller drive unit 228, and the deflector 167 is driven by the deflector drive unit 227. As shown in FIG. 48, for detecting the sheets S, the sheet detection switches $SW_1$ and $SW_2$ are respectively provided along the main pass 162*b* and the bypass 162*c***.

The stapler plate 163 is provided for placing thereon the sheets S to be bound (stapled) among those passed through the transport path 162. The stapler plate 163 is arranged such that the front portion in the transport direction of the sheets S is placed at a higher level than the end portion so as to form a slope. Further, the front portion reaches to the vicinity of the discharge opening 234 for the sheet S. A paddler 168 is provided on the stapler plate 163 such that the lower end of the blade section thereof is in contact with the top surface of the stapler plate 163 while being rotated in the direction of C. When the paddler 168 rotates, the blade section thereof releases the sheets S to the position where the rear edges of the sheets S are in contact with the stopper 169, thereby aligning the ends of the sheets S.

Figure 49:
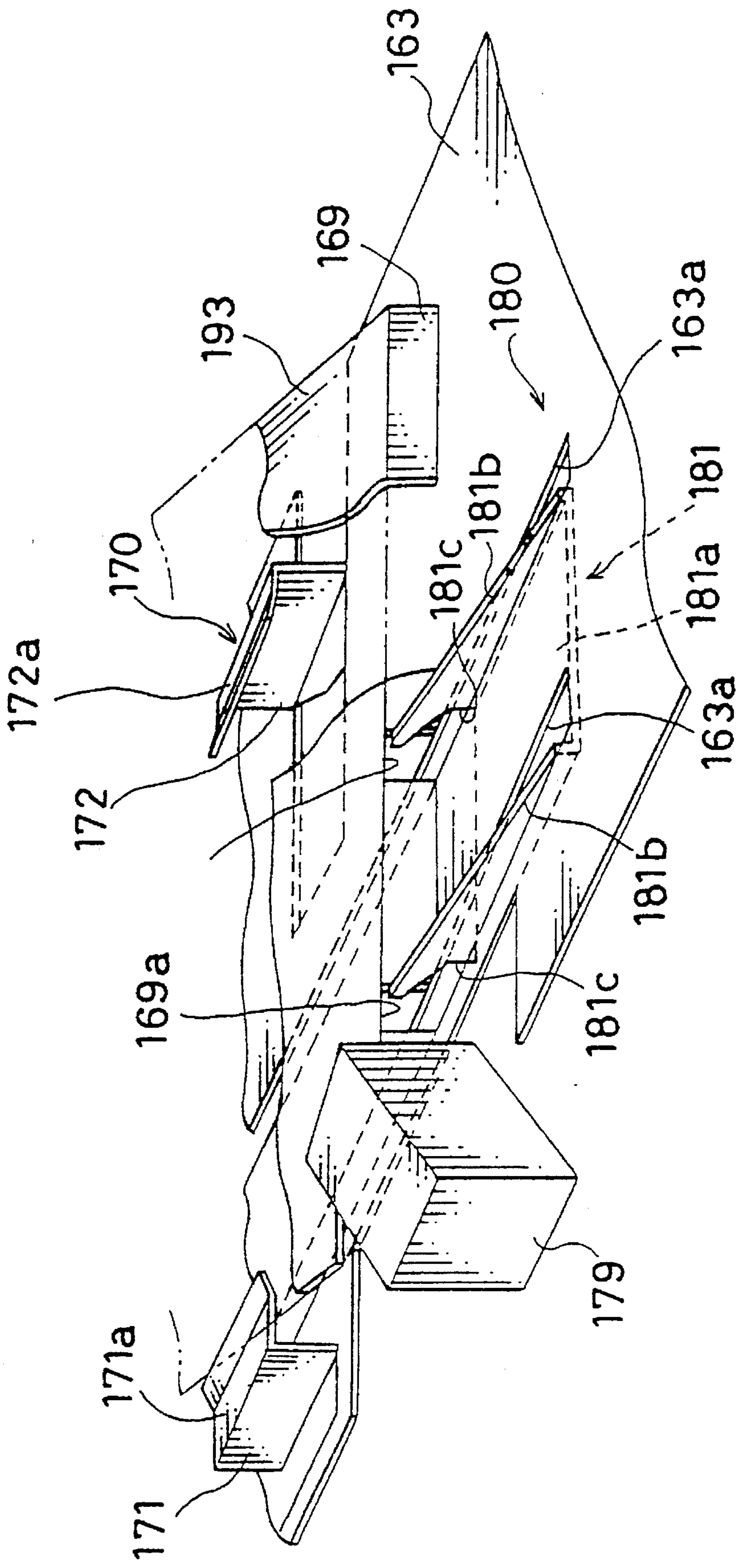
FIG. 49 is a perspective view showing the structure of the stapler plate without the paddler of FIG. 45 when looking at the back diagonally from the top.
Figure 50:
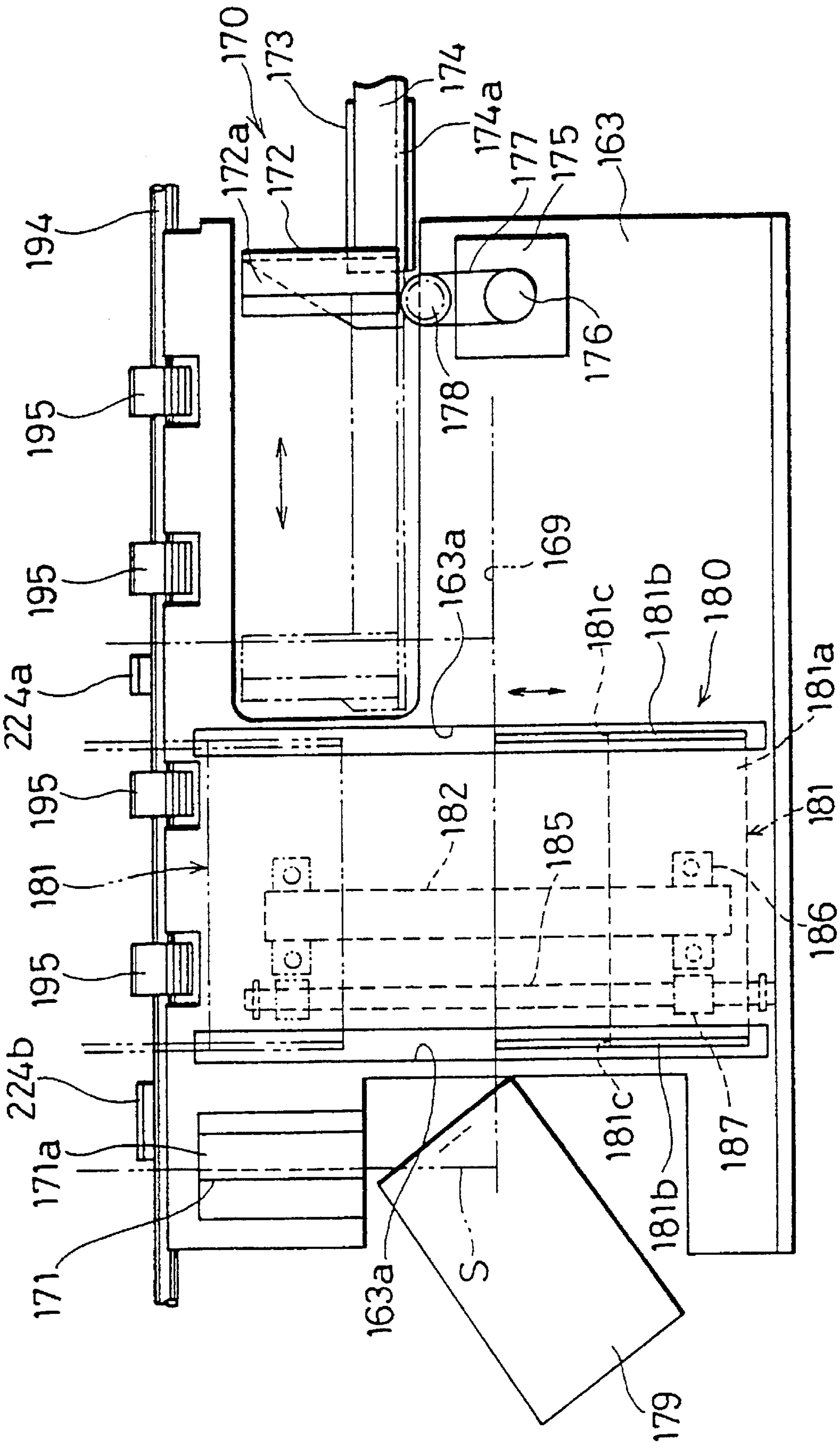
FIG. 50 is a plan view showing the push-out unit of FIG. 45.

As shown in FIGS. 49 and 50, an edge aligner 170 (aligning unit) is provided on the sides of the stapler plate 163. The edge aligner 170 is composed of a positioning plate 171 and a side aligning plate 172, each serving as a sheet aligning member. The positioning plate 171 is fixed to one side of the stapler plate 163. The side aligning plate 172 moves in the widthwise direction of the sheet S so as to align the sides of the sheets S. The positioning plate 171 and the side aligning plate 172 are respectively provided with upper sheet guide pieces **171*a* and 171*b* which extend from the top ends of the plates 171 and 172 so as to face one another. The upper sheet guide pieces 171*a* and 171*b* are provided so as to prevent the sheets S from buckling upward when the sheets S are discharged from the stapler plate 163 onto the discharge tray 164 by a push-out unit 180** (to be described later).

As shown in FIG. 50, the side aligning plate 172 is provided on a support plate 174 which is movable in the widthwise direction of the stapler plate 163 by a guide rail 173. Along the side of the support plate 174, a rack gear **174*a* is provided. Furthermore, the power from a side aligning plate drive motor 175** is transmitted to the rack gear

174*a* via a pulley 176, a belt 177 and a pinion gear 178. As a result, the side aligning plate 172 is moved in the widthwise direction of the stapler plate 163, and aligns the sheets S so as to fit them to the reference position set by the positioning plate 171. When the edge aligning plate 172 aligns the sheets S, the edge aligning plate drive motor 175 is controlled by the control unit 226 (to be described later), which serves as the control means. Therefore, the edge aligning plate 172 aligns the sheets S according to the width of the sheets S.

At the back of the positioning plate 171 in the edge aligner 170, a stapler 179 is provided, which staples the corner between the stopper 169 side and the positioning plate 171 side of the sheets S aligned on the stapler plate 163.

As shown in FIGS. 49 and 50, the push-out unit 180 (sheet push-out means) is provided at the bottom of the stapler plate 163. The push-out unit 180 is composed of a push-out member 181 (sheet push-out member) and a push-out member drive unit 229 (push-out member drive means) in FIG. 45. The push-out member 181 is provided for pushing out the sheets S, placed on the stapler plate 163, onto the discharge tray 164. The push-out member drive unit 229 pushes up the sheet S on the stapler plate 163 in the direction of $D_1$, and moves downward in the direction of $D_2$ along the stapler plate 163 as shown FIG. 45. The push-out member drive unit 229 is provided with a push-out belt 182 connected to a push-out member 181, belt support rollers 183, and a push-out member drive motor 184, and it is also provided with a guide shaft 185, a connection member 186, and a sliding member 187 as shown in FIG. 50.

The push-out member 181 has a base plate 181*a* with edges 181*b* of the same length along the sides thereof. Furthermore, sheet contact faces 181*c* are respectively provided in front of the edges 181*b*, so that the rear edges of the sheets S are in contact therewith. The push-out member 181 is arranged such that the edges 181*b* are projected through slots 163*a* formed on the stapler plate 163. The push-out belt 182, provided under the stapler plate 163, is supported so as to be moved in the direction of $D_1$–$D_2$ parallel to and along the top surface of the stapler plate 163 by belt support rollers 183. The push-out belt 182 is connected to the base plate 181*a* of the push-out member 181 by the connection member 186. Furthermore, the push-out member drive motor 184 is connected to either one of the belt support rollers 183. The guide shaft 185 is supported so as to be parallel to the bottom surface of the stapler plate 163. As the sliding member 187, which is capable of sliding along the guide shaft 185, is connected to the base plate 181*a* of the push-out member 181, the push-out member 181 is guided by the guide shaft 185, and the push-out member 181 can move both upward and downward in the direction of $D_1$–$D_2$.

Figure 51:
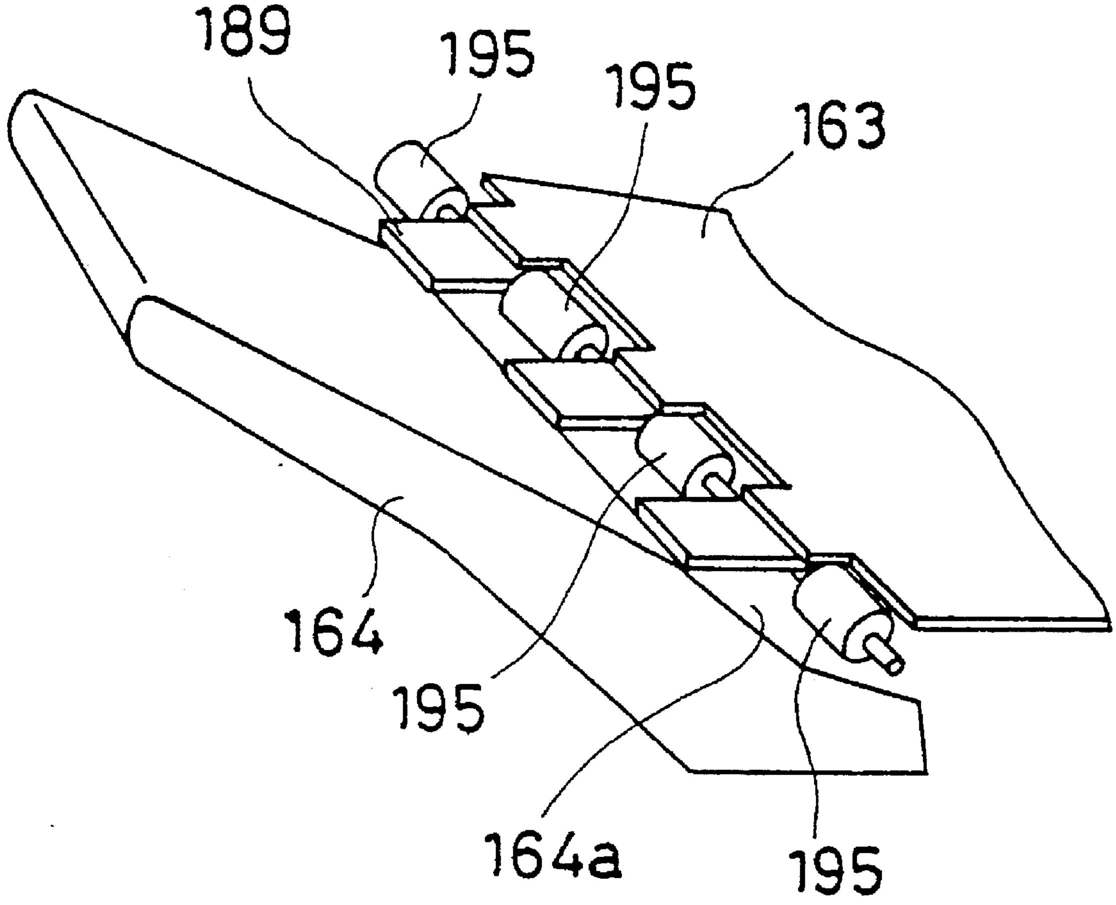
FIG. 51 is a perspective view showing the forward position of an auxiliary lower discharge plate of FIG. 45.

As shown in FIG. 45, an auxiliary lower discharge plate unit 188 is provided below the upper part of the bottom surface of the stapler plate 163. The auxiliary lower discharge plate unit 188 is composed of an auxiliary lower discharge plate 189 (auxiliary lower discharge member) and an auxiliary lower discharge plate drive unit 230 (auxiliary lower discharge member drive means). The auxiliary lower discharge plate 189 is provided under the upper part of the bottom surface of the stapler plate 163 so that it can move both upward and downward in the direction of $D_1$–$D_2$. The auxiliary lower discharge plate drive unit 230 moves the auxiliary lower discharge plate 189 over a recessed portion 164*a* of the discharge tray 164, i.e., in the direction of $D_1$ so as to cover the level difference between the discharge opening 234 and the discharge tray 164. The auxiliary lower discharge plate drive unit 230 also moves the auxiliary lower discharge plate 189 downward in the direction of $D_2$ toward the bottom surface of the stapler plate 163. The auxiliary lower discharge plate drive unit 230 is provided with a crank 190, a connecting rod 191, and a lower discharge plate drive motor 192 (to be described later) which drives the rotation of the crank 190. The connecting rod 191 connects the crank 190 and the auxiliary lower discharge plate 189 so that the auxiliary lower discharge plate 189 moves in the direction of $D_1$–$D_2$ with the rotation of the crank 190. As shown in FIG. 51, the auxiliary lower discharge plate 189 is arranged such that the front portions thereof, corresponding to the discharge rollers 195 are notched so that the auxiliary lower discharge plate 189 can move irrespective of the motion of the discharge rollers 195.

A sheet guide plate 193 is provided so as to connect the upper end of the stopper 169 on the stapler plate 163 and the bottom of the transport roller 165 provided under the main pass 162*b*. Furthermore, slots 169*a* are formed on the stopper 169, so that the push-out member 181 can pass therethrough as shown in FIG. 49.

As shown in FIG. 50, a rotation shaft 194 is provided at the front portion of the stapler plate 163, extending in the widthwise direction of the stapler plate 163. Furthermore, the rotation shaft 194 is provided with a plurality of discharge rollers 195. The rotation shaft 194 is connected to the discharge roller drive motor 196 (to be described later) which drives the rotation shaft 194. As the rotation shaft 194 is driven by the discharge roller drive motor 196, the discharge roller 195 rotates in the direction of $G_1$–$G_2$.

More concretely, with the rotation of the discharge roller 195 in the direction of $G_2$, the sheets S placed on the stapler plate 163 are moved towards the stopper 169 so as to aid in aligning the ends of the sheets S. Whereas, with the rotation of the discharge roller 195 in the direction of $G_1$, the complete set is discharged onto the discharge tray 164.

A driven roller 198, provided above the discharge roller 195, is rotatably supported by one end of the offset guide 197 (sheet discharge guide member) of the offset guide unit 200. The offset guide unit 200 is composed of the offset guide 197 and an offset guide drive unit 233 (sheet discharge guide member drive means). The other end of the offset guide 197 is rotatably supported by a fulcrum 199. The offset guide 197 is provided for guiding the top surface of the sheet S fed through the main pass 162*b* in the offset mode when the sheet S is discharged onto the discharge tray 164. The offset guide drive unit 233 drives the offset guide 197 both in the direction of $F_2$ to the position where the driven roller 198 is in contact with the discharge roller 195 and in the direction of $F_1$ (upward in the figure). The offset guide drive unit 233 is provided with an eccentric cam 231, which is in contact with the bottom surface of the offset guide 197, and an offset guide drive motor 232 which rotates the eccentric cam 231.

As shown in FIG. 46, the discharge tray 164 is arranged as follows. The bottom part, corresponding to the discharge roller 195, of the top surface of the discharge tray 164 is made concave to be the lowest part 164*a*. On the other hand, the slope of the upper part of the discharge tray 164 is set substantially the same as that of the stapler plate 163.

Figure 52:
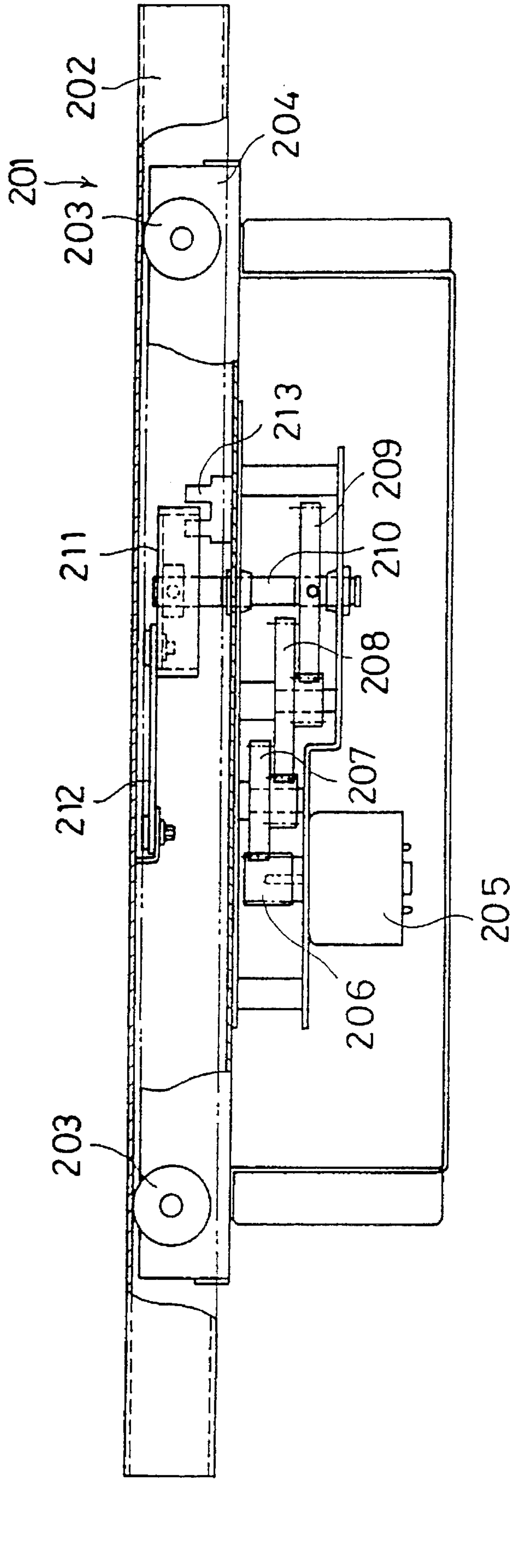
FIG. 52 is a front view showing the cross section of the tray shift unit.
Figure 53:
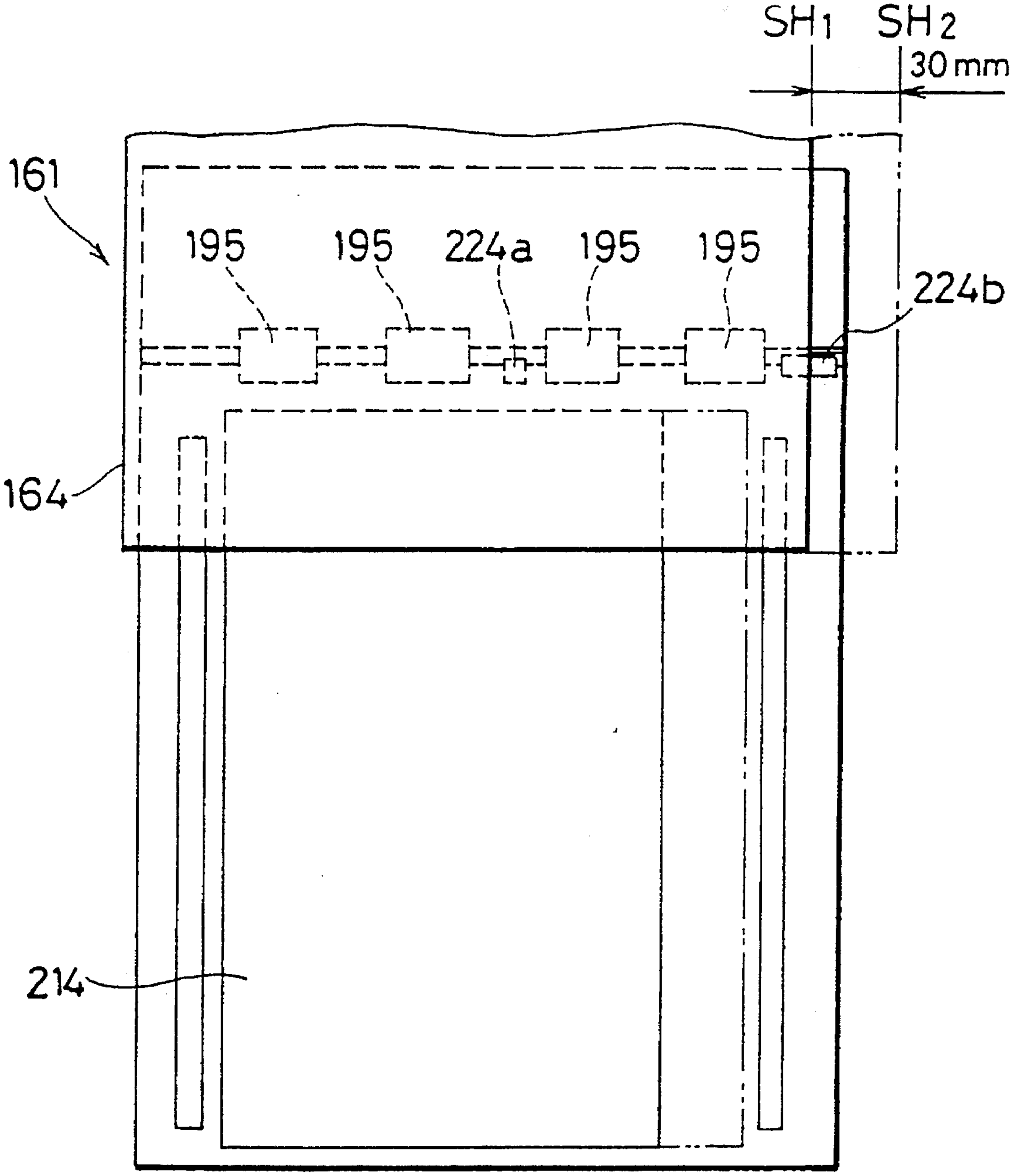
FIG. 53 is an explanatory view showing the shifting of a the discharge tray and tray back plate of FIG. 45.

Further, a discharge tray 164 is provided on the tray shift unit 201. As shown in FIG. 52, the tray shift unit 201 is provided with a shift upper frame 202 which extends in the widthwise direction of the stapler plate 163. The shift upper frame 202, provided on a shift lower frame 204, is supported by a plurality of rollers 203, so that it can move in the widthwise direction of the stapler plate 163. Then, as the power of the tray shift motor 205 is transmitted to the shift upper frame 202 via gears 206–209, a gear shaft 201, a shift wheel 211, and a shift rink 212, the shift upper frame 202 is shifted. As a result, the discharge tray 164 and the tray back plate 214 of FIG. 45 are integrally shifted in the widthwise direction of the stapler plate 163. The shift position of the discharge tray 164 is detected by an optical shift sensor 213 in which a light path is shut down by a shift wheel 211. In addition, the discharge tray 164 and a tray back plate 214 are shifted from the home position $SH_1$ to the shifted position $SH_2$ by 30 mm in the present embodiment as shown in FIG. 53.

The discharge tray 164 is moved up and down by a tray elevator unit 215 (drive means) as shown in FIG. 45. The tray elevator unit 215 is composed of a tray elevator motor 216 (to be described later), a belt 217, belt support rollers 218, an auxiliary elevator roller 219, a pulley 220, and a belt 211. The belt 217, which is supported by the belt support rollers 218, is provided in an up-down direction in the inner side of the tray back plate 214. The auxiliary elevator roller 219, which is provided in the tray shift unit 201, is pressurized on the outer surface of the tray back plate 214. The pulley 220 is provided on the drive axis of the tray elevator motor 216. The belt 211 is provided so as to surround the pulley 220 and the lower belt support roller 218. The tray shift unit 201 is connected to the belt 221, and as the belt 217 is driven by the tray elevator motor 216, the discharge tray 164 is raised and lowered.

Figure 54:
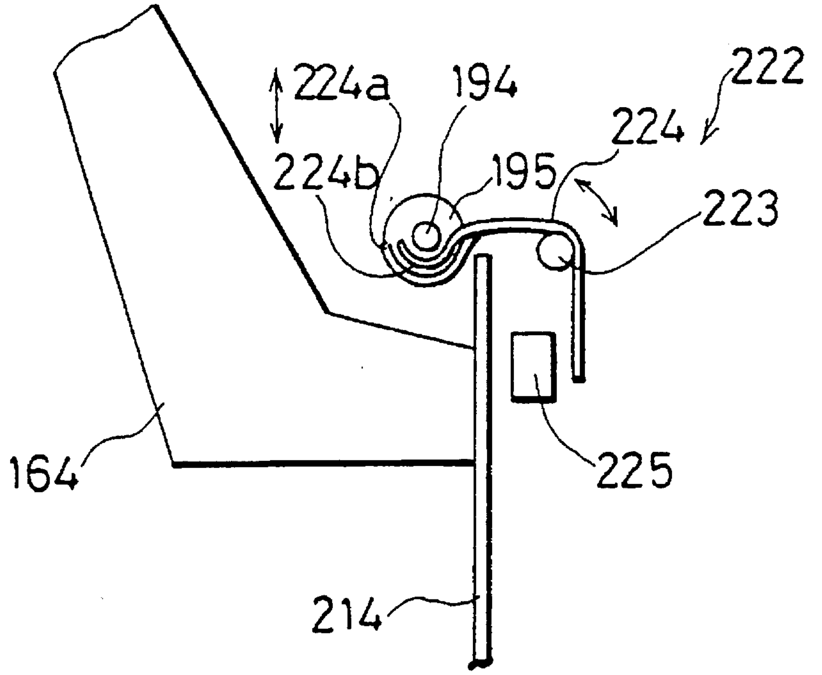
FIG. 54 is a side view showing a schematic configuration of the tray upper limit detector adopted in the device for further processing after copying of FIG. 45.

As shown in FIG. 54, a tray upper limit detector 222 (tray upper limit detection means) is provided in the vicinity of the rotation shaft 194 which supports the discharge rollers 195. The tray upper limit detector 222 detects the upper limit position as the discharge tray 164 is raised. The upper limit position is a position where the discharge roller 195 has appropriate pressure applied thereon by the top surface of the discharge tray 164 or the top surface of the sheet S placed on top of the discharge tray 164. In other words, the tray upper limit position is a position where the top surface of the discharge tray 164 or the top surface of the sheet S placed on top of the discharge tray 164 reaches a virtual plane including the top surface of the stapler plate 163. Namely, when the discharge tray 164 is set at the above upper limit position, the complete set, pushed out from the stapler plate 163, can be prevented from buckling downward due to the level difference between the stapler plate 163 and the discharge tray 164, thereby appropriately supporting the complete set.

Figure 55:
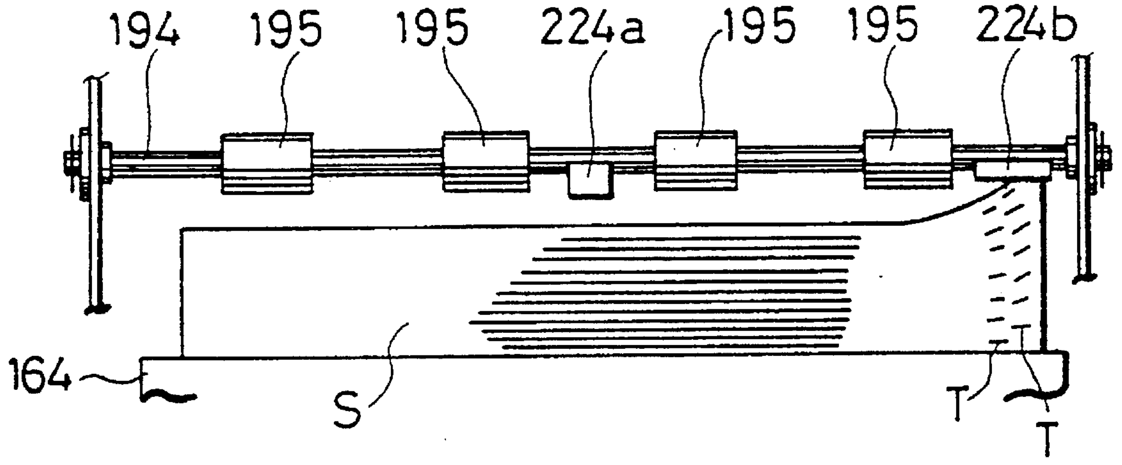
FIG. 55 is a schematic front view showing respective positions of the first and the second contact portions on the tray upper limit detector of FIG. 54.

The tray upper limit detector 222 is provided with an actuator 224 and an upper limit switch 225. The actuator 224 can be swung using a support pin 223 as a fulcrum. For the upper limit switch 225, for example, an optical upper limit switch may be used, which is turned ON/OFF by one end of the actuator 224. On the other end of the actuator 224, a first connection part **224*a* and a second connection part 224*b* are provided under the rotation shaft 194 along the arcs of the respective semicircles. The first connection part 224*a* has a larger arc than the second connection part 224*b*, and the bottom of the first connection part 224*a* is located below the bottom of the second connection part 224*b*. As shown in FIGS. 50, 53, and 55, the first connection part 224*a* is placed in the vicinity of the center of the rotation shaft 194, and the second connection part 224*b* is placed in the vicinity of the stapler 179 side end of the rotation shaft 194**.

The first connection part **224*a* is used in the offset mode wherein the sheets S are discharged onto the discharge tray 164 without going through the binding process. The first connection part 224*a* is also used in the staple mode if the height difference is small between the stapled corner St and the center of the complete set discharged onto the discharge tray 164. On the other hand, the second connection part 224*b* is used in the staple mode when the height difference is sufficient as shown in FIG. 55. The bottom of the second connection part 224*b* is located above the bottom of the first connection part 224*a* for the following reason. When a plurality of complete sets are discharged onto the discharge tray 164, the stapled corners St of the piled complete sets become thicker than the centers of the complete sets. Therefore, the second connection part 224*b* is pushed by the stapled corners St of the complete sets. As a result, the upper limit switch 225 is turned ON, and the discharge tray 164** is stopped at the upper limit position.

Therefore, every time a complete set is discharged onto the discharge tray 164, the discharge tray is lowered according to the thickness of the complete set. Here, the lower the position of the bottom of the second connection part **224*b*, the longer the distance which the discharge tray 164 descends from the position of the discharge roller 195, and the device 161 for further processing after copying becomes larger in size. Moreover, when the distance between the discharge roller 195 and the discharge tray 164 becomes long, if a soft material is used for the sheets S, the sheets S may buckle downward, which creates difficulty in discharging the sheets S. In considering the above problem, the second connection part 224*b*** is set at the described position.

As shown in FIG. 48, the stapler plate 163 is provided with the sheet detection switch $SW_3$ and the push-out sheet detection switch $SW_4$. The sheet detection switch $SW_3$ is provided at the leading edge in the direction of $D_1$ of the stapler plate 163, and detects the discharge of the sheets S onto the discharge tray 164. On the other hand, the push-out detection switch $SW_4$ is turned ON/OFF by the shift of the push-out member 181 in the push-out unit 180. When the sheet S placed on the stapler plate 163 is pushed out by the push-out member 181 onto the discharge tray 164, the push-out detection switch $SW_4$ detects the sheet S directly before the discharge of the sheet S has been completed. In addition, as to the means for detecting the above state of the sheet S, for example, a timer may be used rather than the push-out detection switch $SW_4$. Here, the timer counts the time passed when the shift of the push-out member 181 starts.

Figure 56:
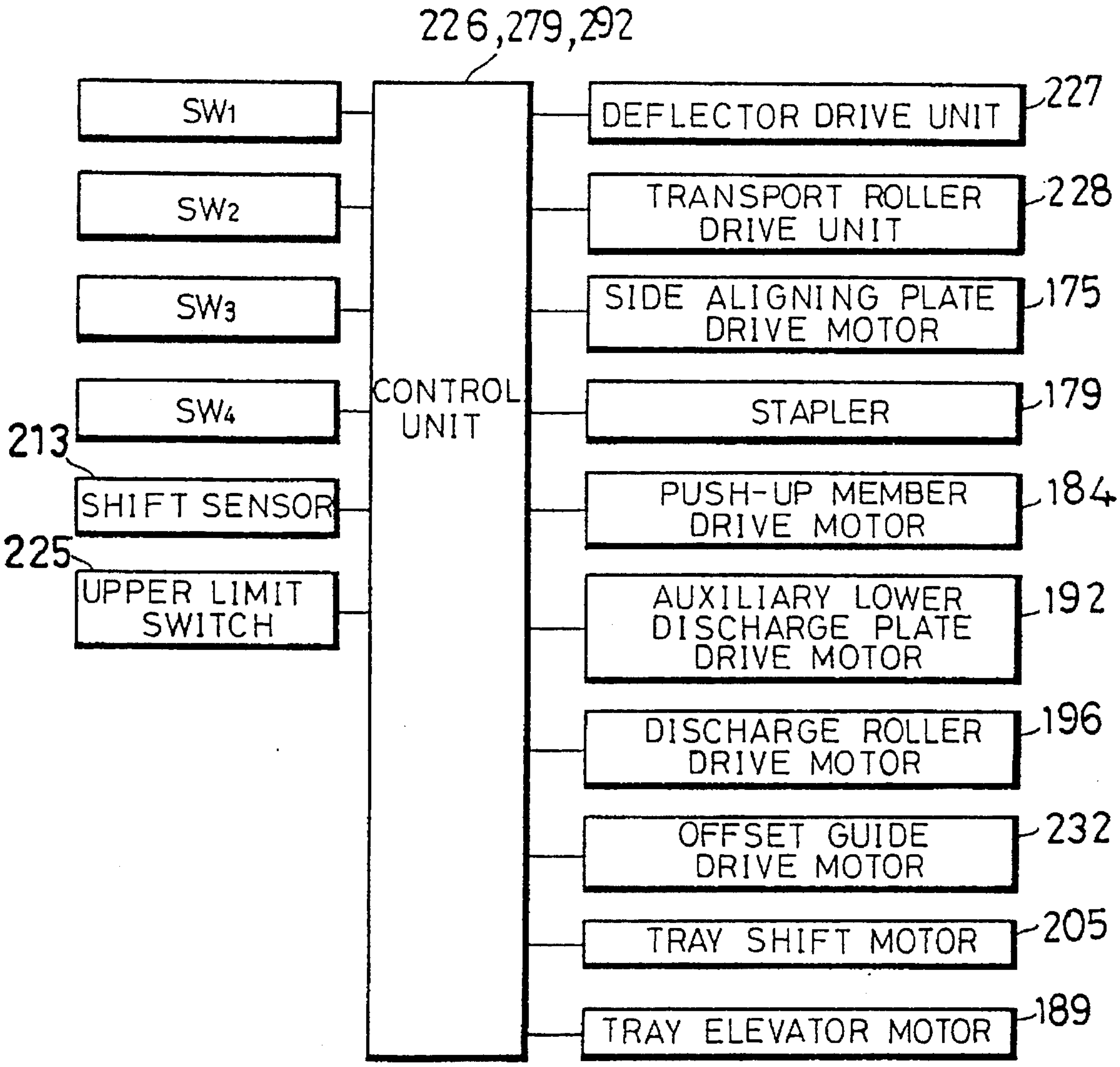
FIG. 56 is a block diagram showing the control device adopted in the device for further processing after copying of FIG. 45.

As shown in FIG. 56, the device 161 for further processing after copying is provided with a control unit 226 which controls a deflector drive unit 227, a transfer roller drive unit 228, a side aligning plate drive motor 175, a stapler 179, a push-out member drive motor 184, an auxiliary lower discharge plate drive motor 192, a discharge roller drive motor 196, an offset guide drive motor 232, a tray shift motor 205, and a tray escalator motor 216. The control unit 226 controls the above members based on the inputs from the sheet detection switches $SW_1$, $SW_2$, $SW_3$, the shift sensor 213, and the upper limit switch 225, and the input from the control device (not shown) on the side of the main body 121. The control unit 226 is composed of a memory device, and a micro computer provided with a counter and a timer, etc. The control unit 226 controls the above members as will be described later according to each of the offset mode, the single staple mode, and the multiple staple mode to be set in the main body 121.

In the offset mode, the sheets S, transported from the main body 121, are discharged one by one onto the discharge tray 164 without being further processed. Whereas, in the single staple mode, the sheets S, transported from the main body 121, go through a predetermined binding process. Then, the bound set of sheets S (hereinafter referred to as a complete set) is discharged onto the discharge tray 164, and accordingly, a plurality of complete sets are discharged set by set in the multiple staple mode.

With the above arrangement, the following will explain the operation of the device 161 for further processing after copying based on the control of the control unit 226.

Figure 57:
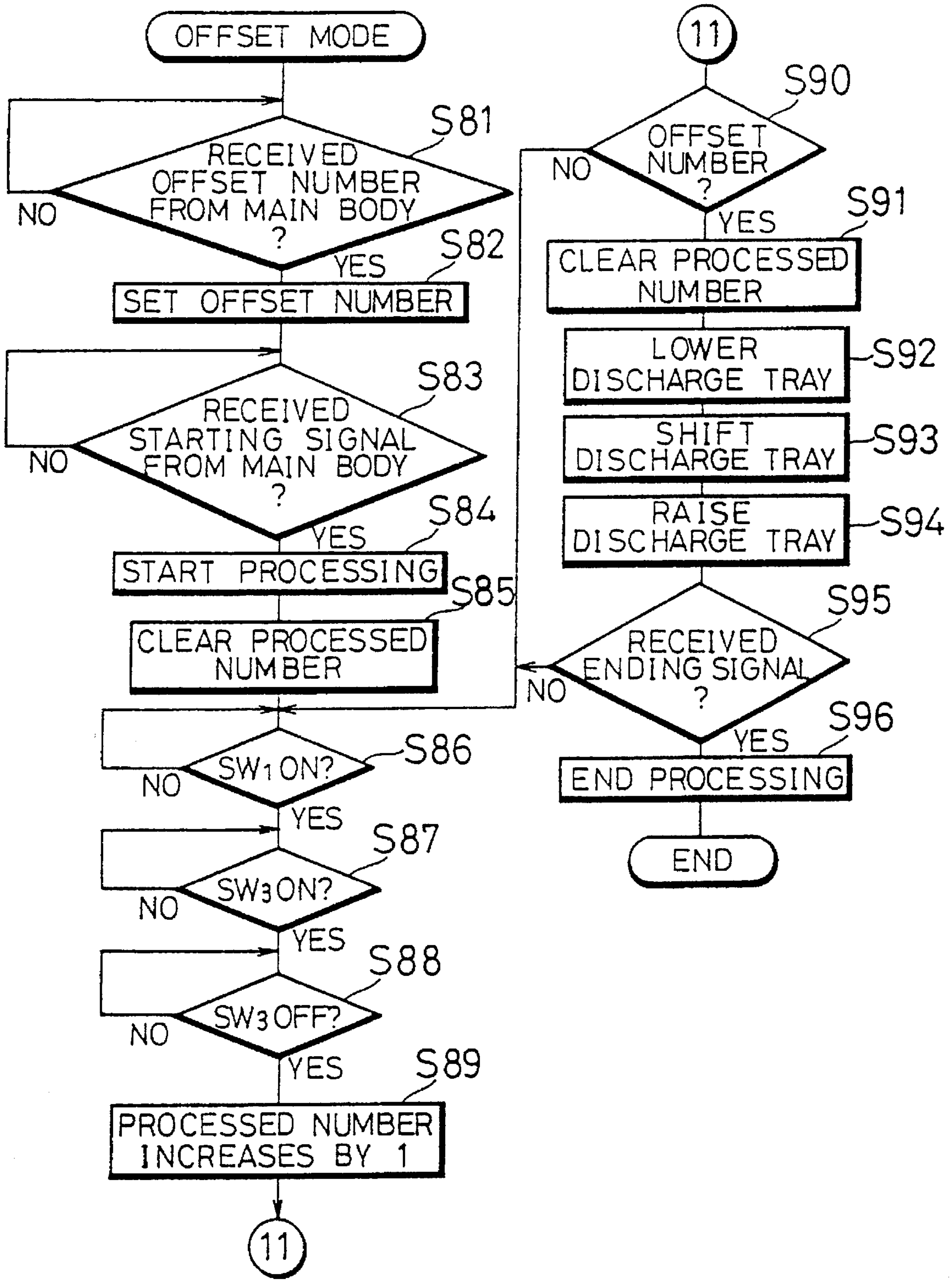
FIG. 57 is a flow chart showing a process in an offset mode with the device for further processing after copying of FIG. 45.

As shown in the flow chart of FIG. 57, in the offset mode, first, the offset number, i.e., the number of sheets to be copied, is set in the main body 121, and a signal indicating the offset number is sent from the control unit of the main body 121, and the control unit 225 of the device 161 for further processing after copying receives the signal (S81). Then, the offset number is set in the memory (S82). Next, the control unit 226 receives a signal to start the operation from the main body 121 (S83), and the process is started (S84). Then, the counter which counts the processed number is cleared (S85).

The starting process of S84 includes, for example, the following operations: the deflector 167 is driven in the direction of $B_2$ by the deflector drive unit 227; the discharge tray 164 is raised to the upper limit (detected by the tray upper limit detector 222) by the elevator unit 215; the offset guide 197 is driven in the direction of $F_2$ by the offset guide drive unit 233 so that the driven roller 198 is in contact with the discharge roller 195; the discharge roller 195 is rotated in the direction of $G_1$ by the discharge roller drive motor 196; and the transport rollers 165 are rotated by the transport roller drive unit 228.

Thereafter, when the sheet S, whereon the image on the document M has been copied, is fed through the entry opening 162*a* of the transport path 162 from the main body 121, the sheet S passes through the main pass 162*b*, and is then discharged onto the discharge tray 164 through a path between the discharge roller 195 and the driven roller 198. This transportation of the sheet S through the main pass 162*b* is detected as the sheet detection switch $SW_1$ is turned ON (S86). Similarly, the transportation of the sheet S between the rollers 195 and 198 is detected as the sheet detection switch $SW_3$ is turned ON (S87) and OFF (S88). Then, the processed number increases by 1 (S89).

Figure 58:
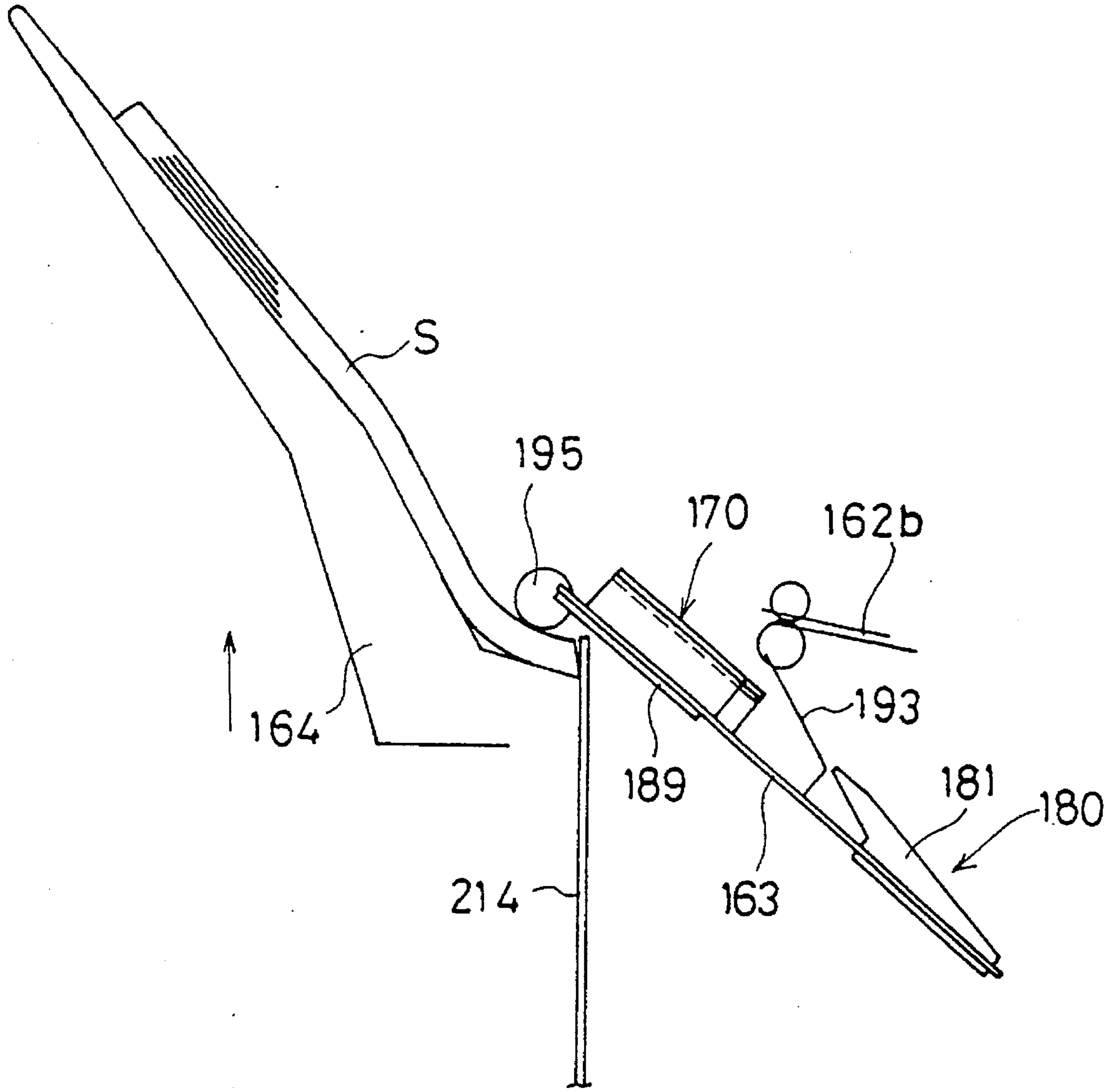
FIG. 58 is an explanatory view showing a state of the discharge tray of the device for further processing after copying of FIG. 45 when the discharge tray reaches an upper limit position after discharging a complete set.

Next, the control unit 226 determines whether or not the current processed number equals to the offset number (S90). If not, the sequence goes back to S86. If so, the processed number of the counter is cleared (S91), the discharge tray 164 is lowered (S92), and the tray shift unit 201 is shifted (S93). Thereafter, as shown in FIG. 58, the tray is raised to the upper limit position (detected by the tray upper limit detector) (S94).

Thereafter, it is determined whether or not a signal to stop the operation is received from the main body 121 (S95). If not, the sequence moves back to S86. If so, the process is ended (S96), thereby terminating the sequence.

Figure 59:
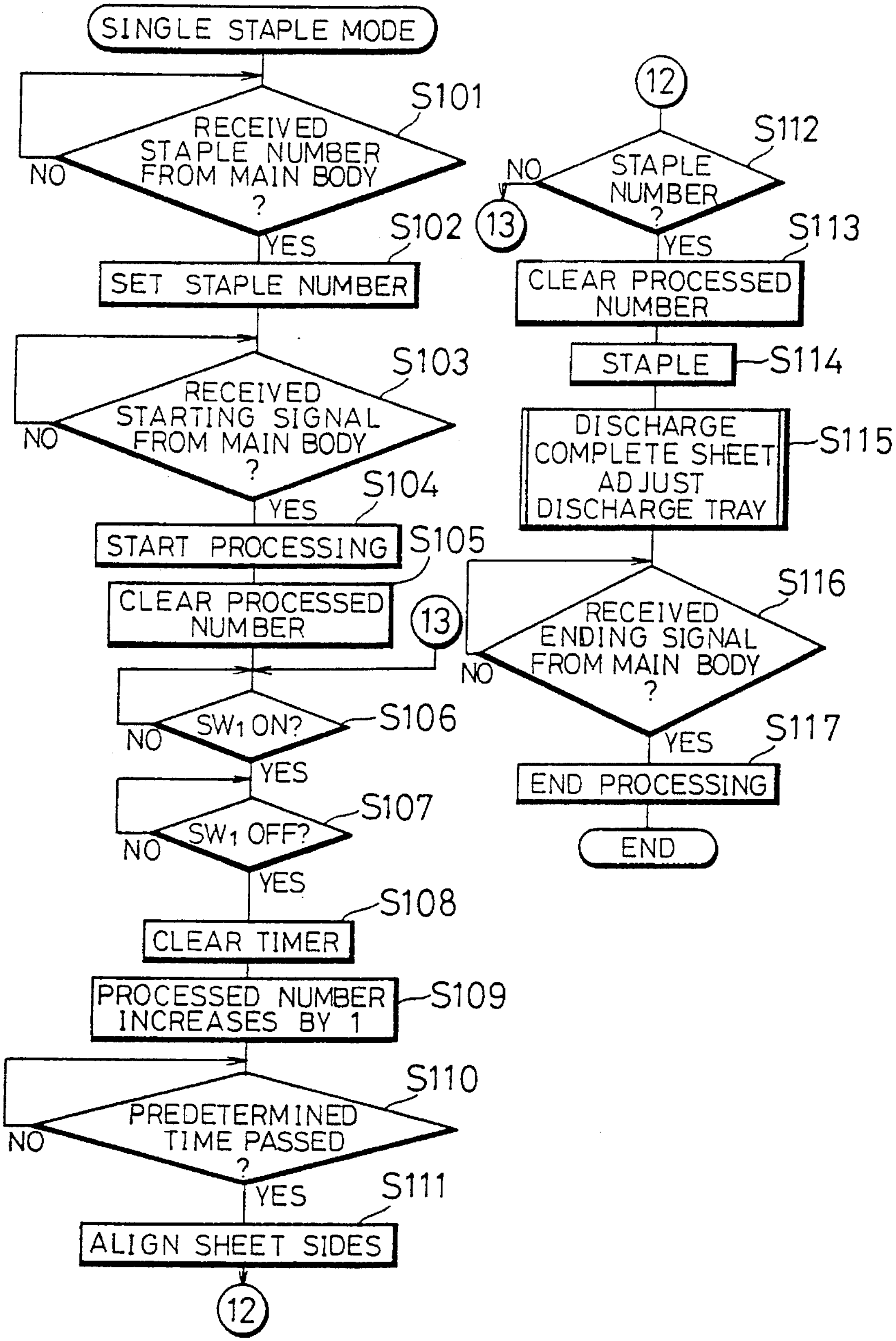
FIG. 59 is a flow chart showing a process in a single staple mode with the device for further processing after copying of FIG. 45.
Figure 60:
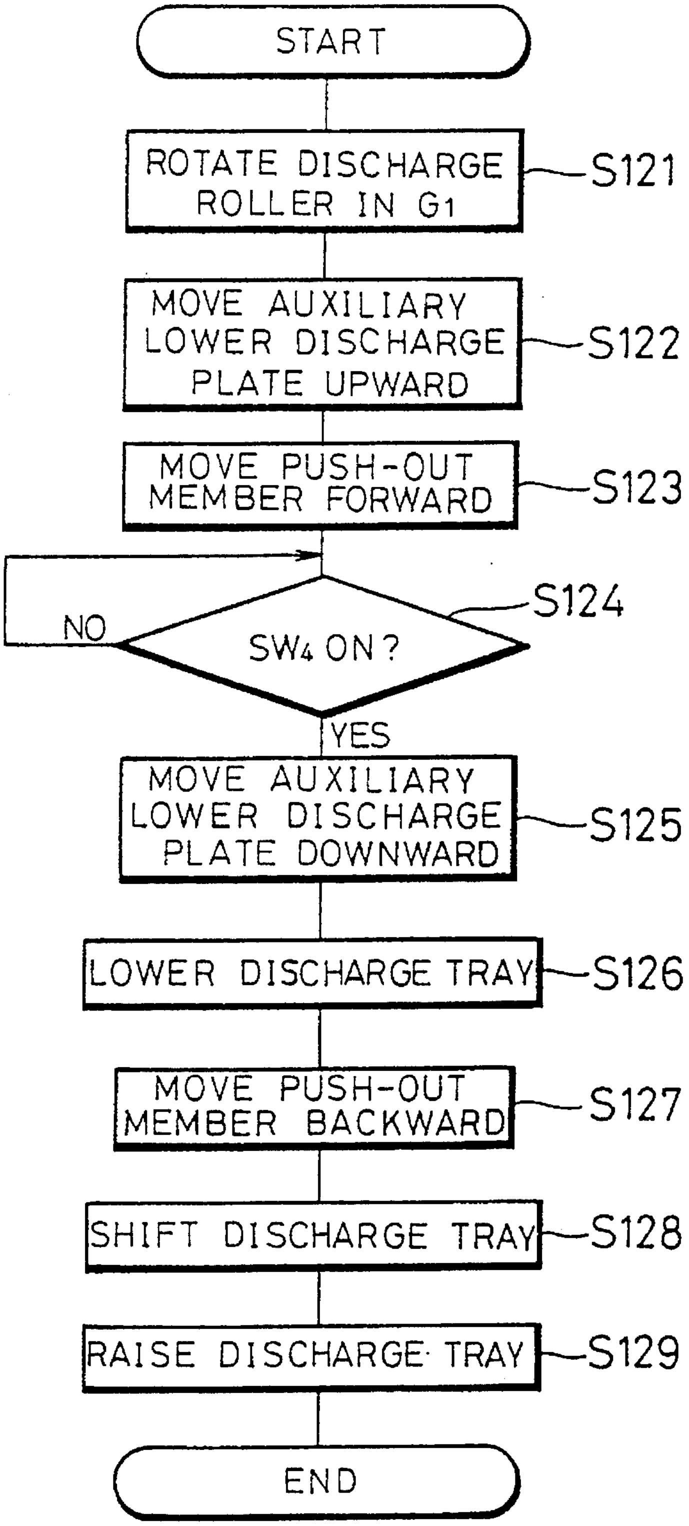
FIG. 60 is a flow chart showing the respective processes for discharging the complete set and adjusting the position of the discharge tray of FIG. 59.

As shown in the flow chart of FIG. 59, in the single staple mode, the control unit 226 receives a signal indicating the number of sheets to be stapled (S101), and the number to be stapled is set in the memory of the control unit 226 (S102). When a signal to start the operation is received from the main body 121 (S103), a predetermined starting process is carried out (S104), and the counter for counting the processed number is cleared (S105).

The starting process of 8104 includes, for example, the following operations: the deflector 167 is driven in the direction of $B_2$; the discharge tray 164 is raised to an upper limit; the offset guide 197 is driven in the direction of $F_1$; the discharge roller 195 is rotated in the direction of $G_2$; the paddler 168 is rotated in the direction of C; and the transport rollers 165 are rotated.

Thereafter, when the sheet S is fed from the main body 121 through the entry opening 162*a* of the transport path 192, the sheet S is sent out toward the discharge roller 195 by the transport rollers 165 through the main pass 162*b*. When the sheet S is placed on the stapler plate 163 by the discharge roller 195 rotating in the direction of $G_2$ and the paddler 168 rotating in the direction of C, the rear edge of the sheet S is in contact with the stopper 169.

Here, the transportation of the sheet S through the main pass 162*b* is detected as the sheet detection switch $SW_1$ is turned ON (S106) and OFF (S107). As a result, the timer of the control unit 226 is cleared (S108), and the processed number increases by 1 (S109).

Thereafter, when a predetermined time set by the timer has passed (S110), it is determined that the sheets S are placed on the stapler plate 163. The edge aligner 170 moves the sheets S to the reference position set by the positioning plate 171 and aligns the sides of the sheets S (S111).

Next, the control unit 226 determines whether or not the current processed number equals to the offset number set beforehand (S112). If not, the sequence moves back to S106. If so, the counter for counting the processed number is cleared (S113), and a stapling operation is carried out by the stapler 179 (S114). Additionally, the discharge tray 164 is shifted in S93 so as to distinguish the set of sheets S discharged on the discharge tray 164 by the current discharging operation from the set of sheets S discharged by the next discharging operation.

Next, the discharge of the complete set and the adjustment of the discharge tray are carried out (S115). As shown in the flow chart of FIG. 60, S115 is a sequential process for discharging the complete set on the stapler plate 163 onto the discharge tray 164 and for adjusting the position of the discharge tray 164. More concretely, first the discharge roller 195 rotates in the direction of $G_1$ (S121). Then, the auxiliary lower discharge plate 189 is pushed upward by the auxiliary lower discharge plate drive unit 230 onto the discharge tray 164 (S122), and the push-out member 181 is pushed upward in the direction of $D_1$ by the push-out member drive unit 229 (S123). The operation in S123 is for pushing out the complete set on the stapler plate 163 onto the discharge tray 164. Next, when the push-out detection switch $SW_4$ is turned ON by the shift of the push-out member 181 (S124), the auxiliary lower discharge plate 189 is moved downward (S125), and the discharge tray 164 is lowered (S126). Then, after the complete set has been pushed out by the push-out member 181, the push-out member 181 is moved downward in the direction of $D_2$ (S127). Next, the discharge tray 164 is shifted by the tray shift unit 201 (S128). Thereafter, the discharge tray 164 is raised to the upper limit position detected as the upper limit switch 225 is turned ON (S129).

When the device 161 receives a signal to stop the operation from the main body 121 (S116), the process is ended (S117), and the above sequence is terminated.

Figure 61:
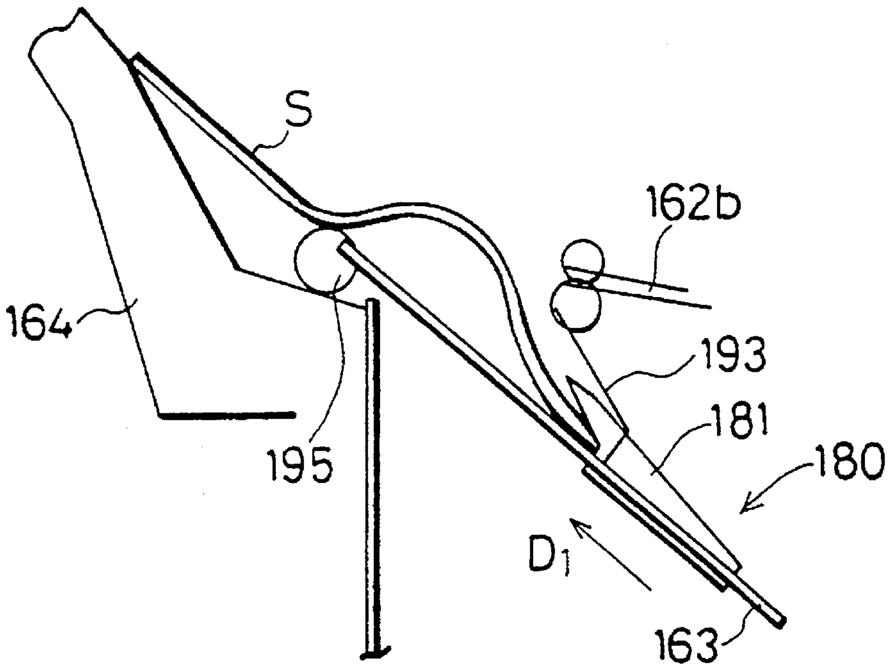
FIG. 61 is an explanatory view showing the upward buckling of the complete set when pushed out by the push-out unit of FIG. 45.
Figure 62:
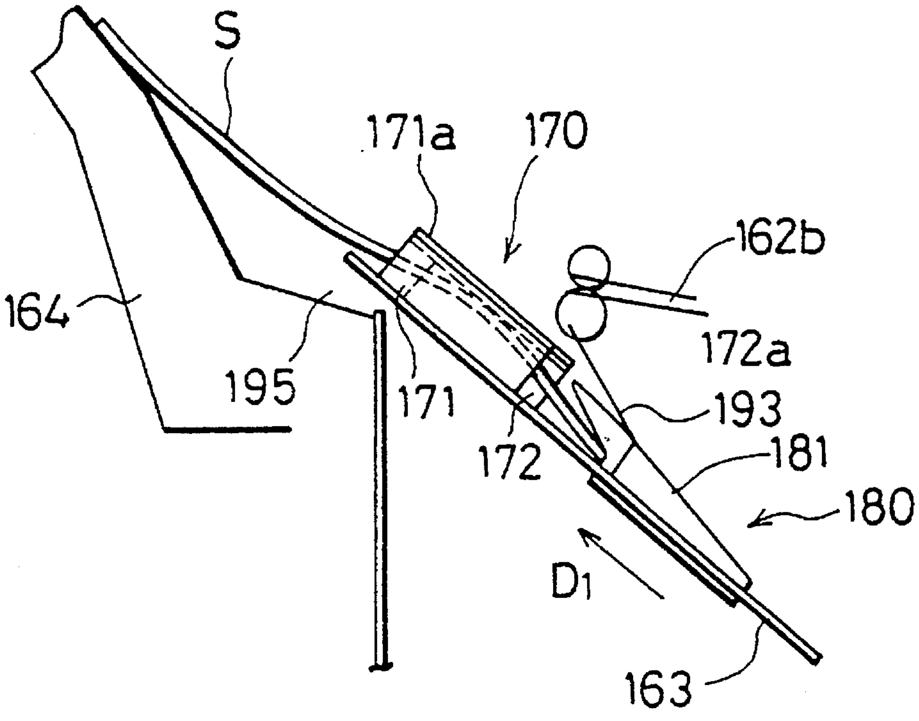
FIG. 62 is an explanatory view showing the control of the upward bucking of the complete set by the upper sheet guide section of the edge aligner of FIG. 45 when the complete set is pushed out.

When pushing out the complete set in S123, if the top surface of the complete set is not guided as shown in FIG. 61, and a soft material is used for the sheet S, the complete set, pushed out by the push-out member 181 of the push-out unit 180, may buckle downward. If this occurs, it is difficult to smoothly push out the complete set. In order to counteract this problem, the device 161 for further processing after copying of the present embodiment is provided with the upper sheet guide plate 171*a* formed on the positioning plate 171 of the edge aligner 170. As shown in FIG. 62, the upward buckling of the complete set is controlled by the upper sheet guide plate 171*a*. Therefore, the complete set can be smoothly pushed out.

Moreover, if the side aligning plate 172 on the sheet guide section 172*a* is used as well as the upper sheet guide plate 171*a*, the buckling of the complete set can be more efficiently controlled. In this case, after the sheets S are aligned by the edge aligner 170 in S111, if the number of sheets S does not equal the staple number in S112, the side aligning plate 172 is moved downward to the home position. If so, the side aligning plate 172 is controlled so as to be held at the position where the alignment of the sides of the sheets S is carried out until the pushing out operation has been completed by the push-out unit 180.

Figure 63:
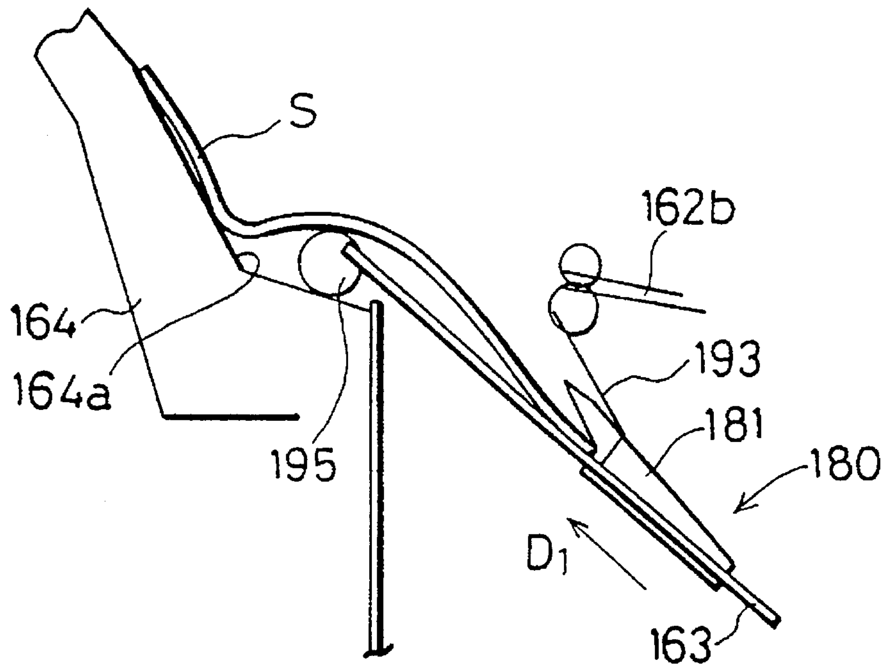
FIG. 63 is an explanatory view showing a state where the complete set drops into the recessed portion of the discharge tray when the complete set is pushed out by the push-out unit of FIG. 45.
Figure 64:
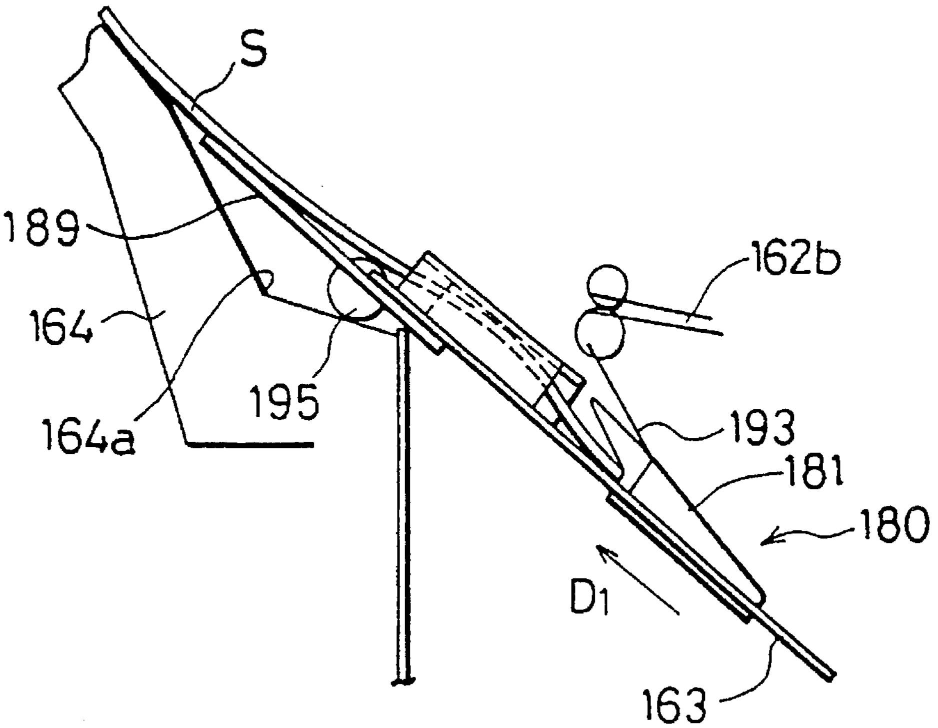
FIG. 64 is an explanatory view showing a control of a downward buckling of the complete set toward the recessed portion of the discharge tray by the auxiliary lower discharge plate of the auxiliary lower discharge plate unit of FIG. 45 when the complete set is pushed out.

As shown in FIG. 63, when pushing out the complete set in S123, if the bottom surface of the complete set is not guided to the position above the recessed portion 164*a* of the discharge tray 164, the complete set may buckle towards the recessed portion 164*a* if a soft material is used for the sheets S. If this occurs, it is difficult to smoothly discharge the complete set. In order to counteract this problem, the device 161 for further processing after copying of the present embodiment is arranged such that, when pushing out the complete set by the push-out unit 180, the auxiliary lower discharge plate 189 is pushed upward onto the recessed portion 164*a*. In this way, the buckling of the complete set toward the recessed portion 164*a* can be controlled by the auxiliary lower discharge plate 189 as shown in FIG. 64. Therefore, the complete set can be smoothly pushed out.

According to the device 161 of the present embodiment, the height adjustment of the discharge tray 164, required after the complete set has been discharged onto the discharge tray 164, is carried out in the following way. After the descent of the discharge tray 164, the discharge tray 164 is raised to the upper limit position detected by the upper switch 225. As described in S124 and S126, the descent of the discharge tray 164 is started when the push-out detection switch $SW_4$ is turned ON by the shift of the push-out member 181. This means that the descent of the discharge tray 164 is started directly before the discharge of the sheets S have been completed by the push-out member 181. Therefore, the front portion of the complete set pushed out from the stapler plate 163 is supported by the discharge tray 164. This prevents the front part of the complete set from buckling downward when discharged, thereby achieving a smooth discharging operation of the complete sets.

As to the descent timing of the discharge tray 164, if only the efficiency in discharging the complete set is considered, the discharge tray 164 preferably would start descending after the complete set has been discharged onto the discharge tray. In the present embodiment, since the processing speed in the successive operation is also considered, the descent timing is set as described above. However, the descent timing of the discharge tray 164 is not limited to the described timing. As long as the discharge tray 164 starts descending after the leading edge of the pushed out sheet S reaches either the top surface of the discharge tray 164 or the top surface of the top sheet S placed on the discharge tray 164, the discharging operation can be improved although there may be a slight difference for each descent timing.

The flow charts of FIGS. 65 through 69 explain the process in the multiple staple mode. Here, the discharge of the complete set and the adjustment of the discharge tray 164 in each flow chart are shown in the flow chart of FIG. 60.

Figure 65:
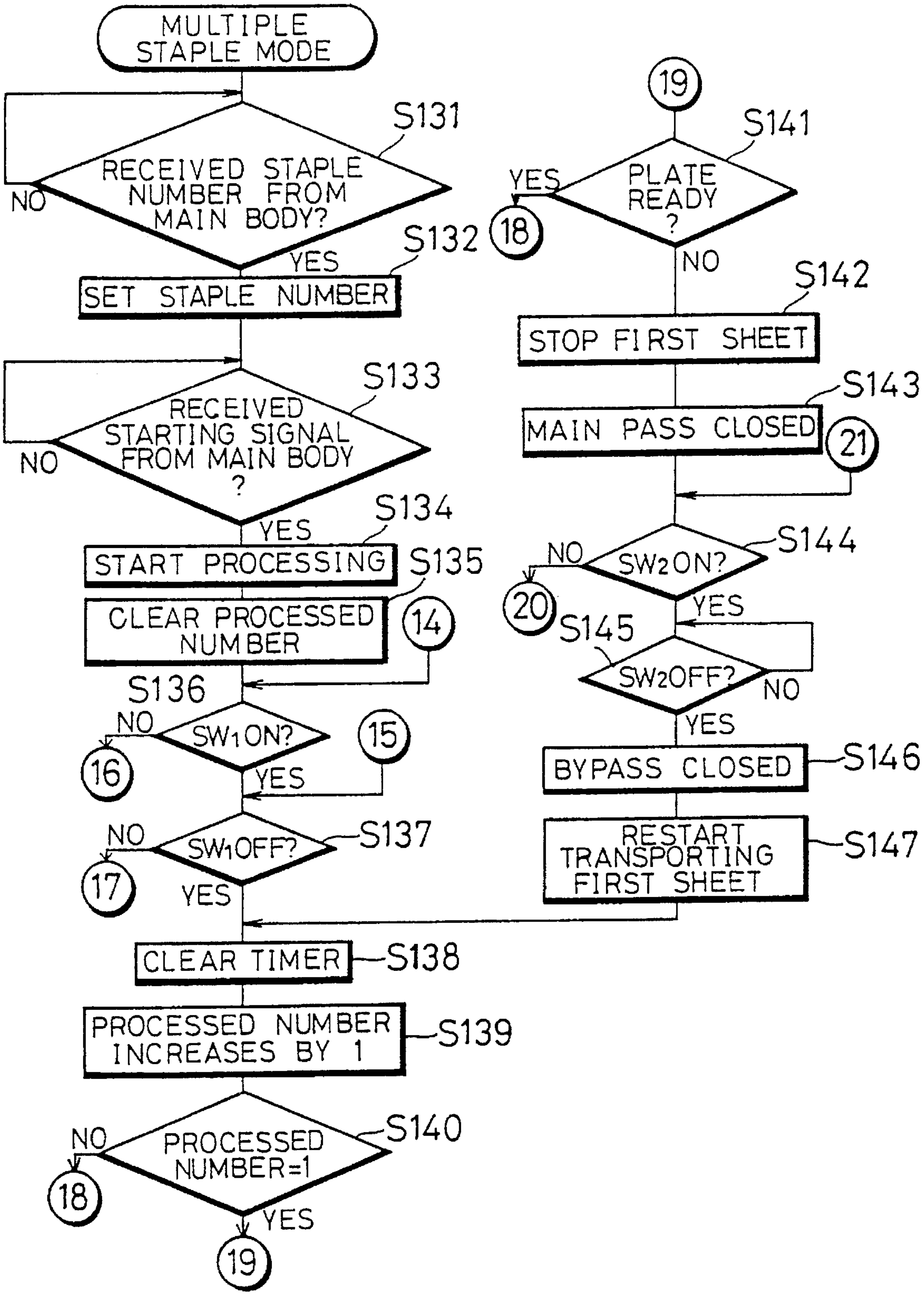
FIG. 65 is a flow chart showing a part of the process in the multiple staple mode with the device for further processing after copying of FIG. 45.
Figure 66:
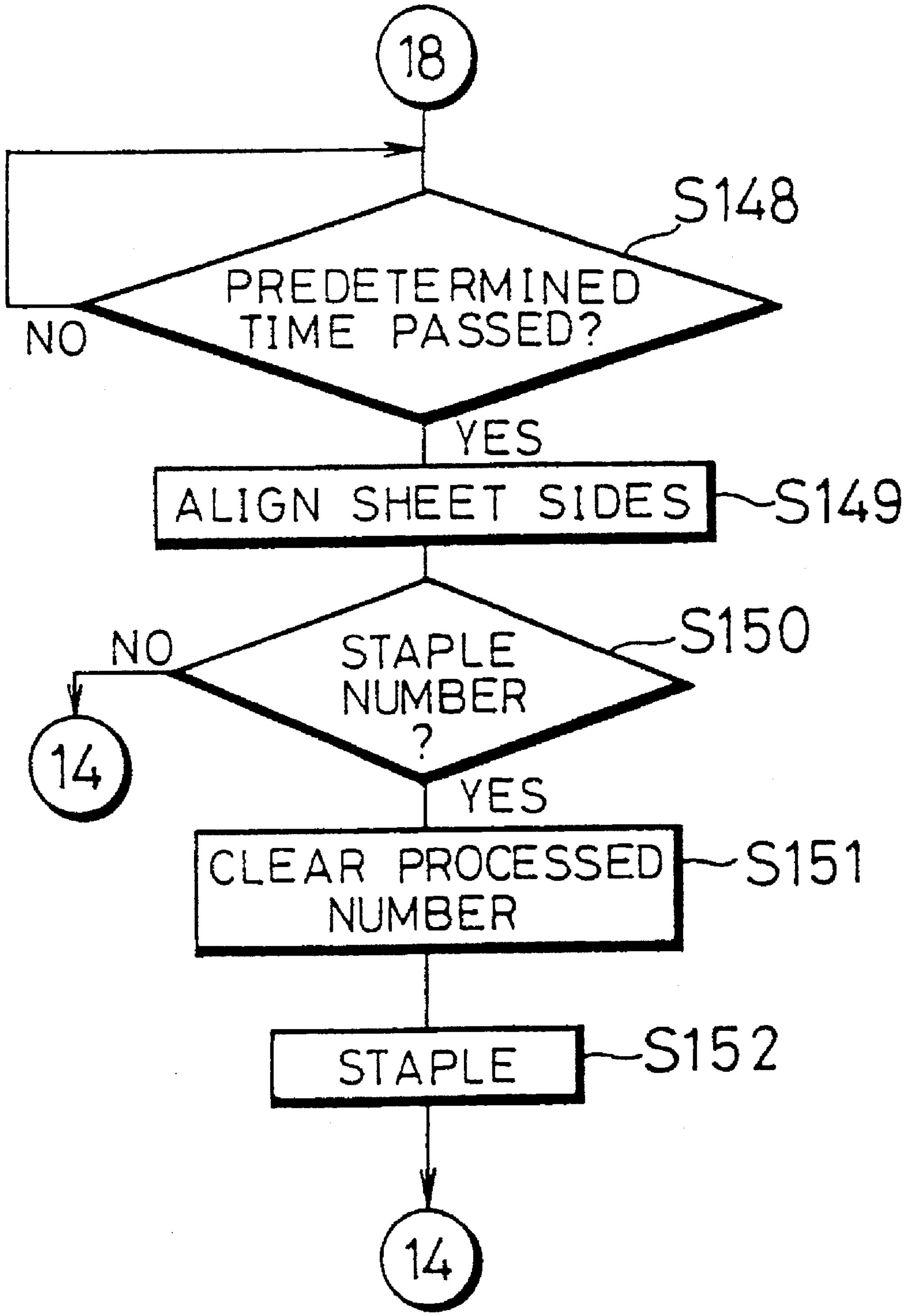
FIG. 66 is a flow chart showing a part of the process in the multiple staple mode with the device for further processing after copying of FIG. 45.

First, as shown in FIG. 65, when the control unit 226 receives a signal indicating the staple number for each complete set (S131), the staple number is set in the memory (S132). Next, the control unit 226 receives a signal to start the operation from the main body 121 (S133). Then, the process is started (S134), and the counter for counting the processed number is cleared (S135).

The starting process of S134 includes, for example, the following operations: the deflector 167 is driven in the direction of $B_2$; the discharge tray 164 is raised to the upper limit position; the offset guide 197 is driven in the direction of $F_1$; the discharge roller 195 is rotated in the direction of $G_2$; the paddler 168 is rotated in the direction of C; and the transport rollers 165 and 166 are rotated.

When the first sheet $S_1$ of the first set is fed from the main body 121 into the entry opening 162*a* of the transport path 162, the sheet S is sent out to the discharge roller 195 by the transport rollers 165 through the main pass 162*b*. Here, when the sheet S is placed on the stapler plate 163, the rear edge of the sheet S is in contact with the stopper 169 by the discharge roller 195 rotating in the direction of $G_2$ and the paddler 168 rotating in the direction of C.

The transportation of the sheet S through the main pass 162*b* is detected as the sheet detection switch $SW_1$ is turned ON (S136) and OFF (S137). Then, the control unit 226 clears the timer (S138), and the processed number increases by 1 (S139).

Here, since the sheet S which is being transported through the main pass 162*b* is the first sheet $S_1$ of the first set, the processed number is 1 (S140). Moreover, since the stapler plate 163 is ready whereon no sheet S is placed (S141), the sequence skips to S148 of FIG. 66. Then, after a predetermined time has passed, the sides of the sheets S are aligned by the edge aligner 170 (S149). Here, since the number of sheets S does not reach the staple number (S150), the sequence goes back to S136.

Next, as the second sheet $S_2$ of the first set is fed to the main pass 162*b*, the operations in S136–S139 are carried out. Here, as the processed number is 2 (S140), the sequence moves to S148 of FIG. 66. Then, after carrying out the operations in S148 and S149, if the number of sheets S reaches the staple number, i.e., when the set staple number equals 2 (S150), the counter for counting the processed number is cleared (S151). Then, the sequence moves back to S136 after carrying out the stapling operation by the stapler 179 (S152).

If the number of sheets S does not reach the staple number in S150, the operations in S136–S140 and S148–S150 are carried out until the number of sheets S reaches the staple number. When reached, the sequence moves back to S136 after carrying out the operations in S151 and S152.

Figure 67:
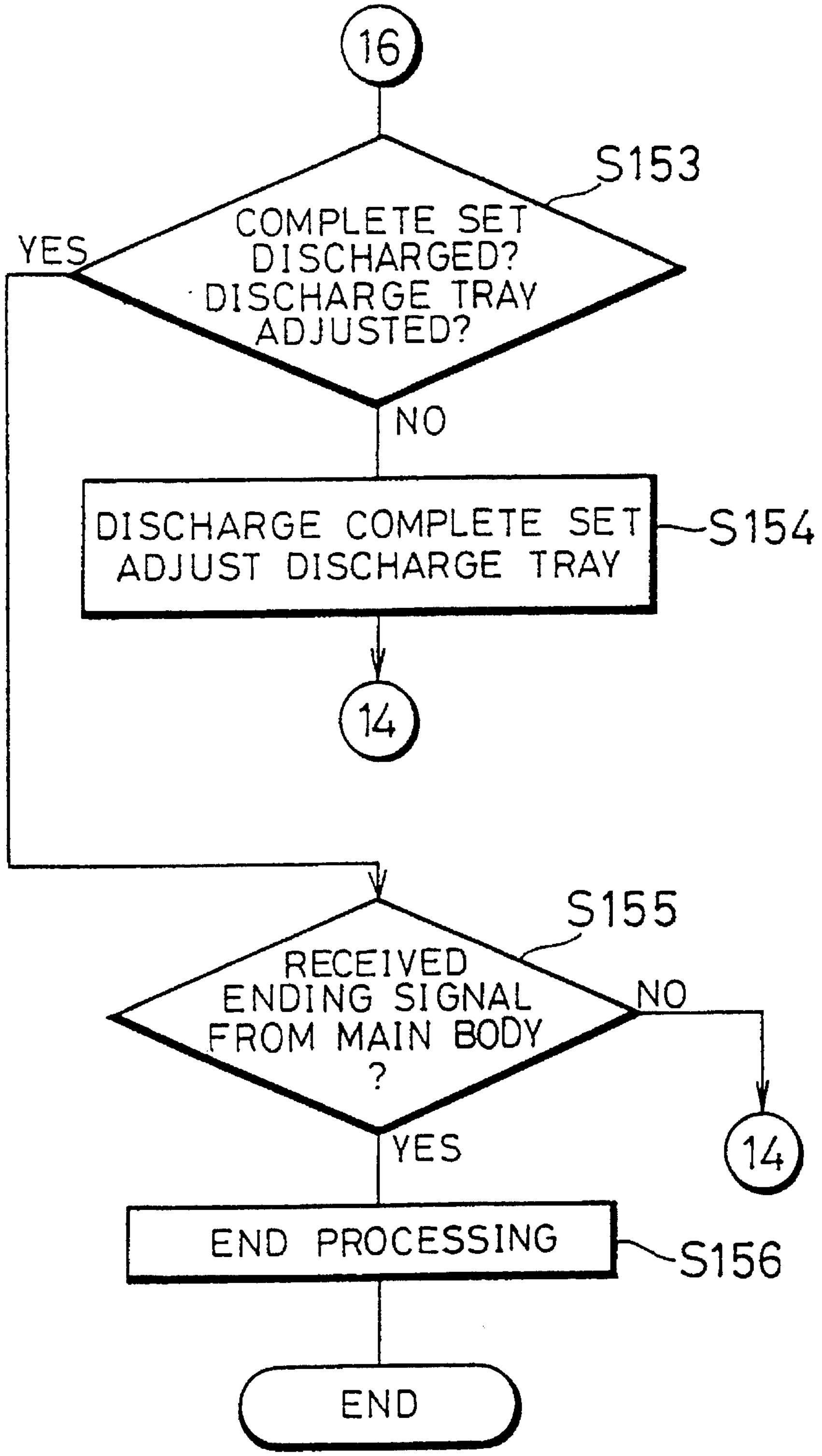
FIG. 67 is a flow chart showing a part of the process in the multiple staple mode with the device for further processing after copying of FIG. 45.

After the stapling operation of S152, if the sheet detection switch $SW_1$ is not turned ON in S136, the sequence moves onto S153 of FIG. 67. Here, if the discharge of the complete set and the adjustment of the discharge tray 164 have not been completed in S153, these operations are carried out before the sequence moves back to S136. On the other hand, if these operations have been completed in S153, it is determined whether or not the signal to stop the operation is received from the main body 121 (S155). If not, the sequence moves back to S136. If so, a predetermined ending process is executed (S156), and the above sequence is terminated.

Figure 68:
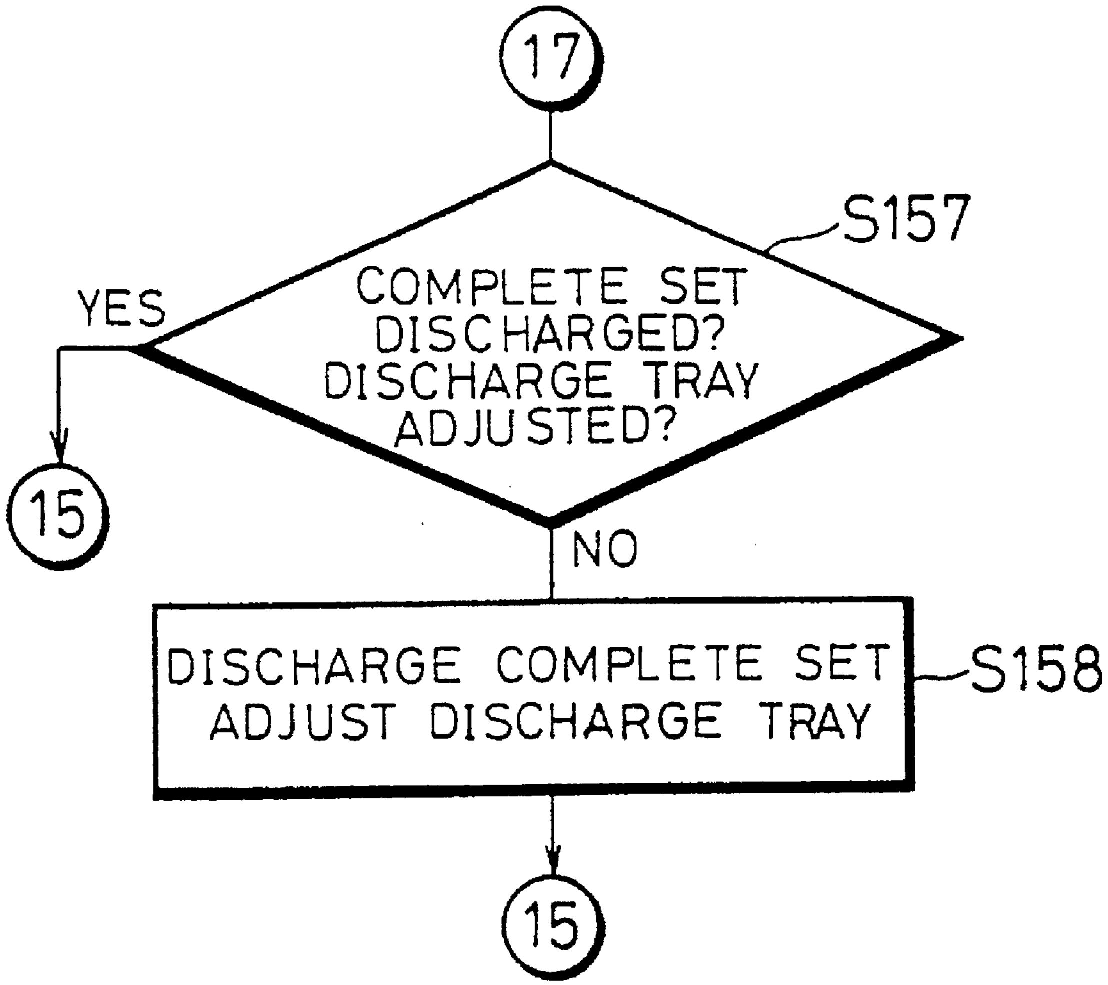
FIG. 68 is a flow chart showing a part of the process in the multiple staple mode with the device for further processing after copying of FIG. 45.

Moreover, after the stapling operation of S152, if the first sheet S of the second set is detected as the sheet detection switch $SW_1$ is turned ON in S136 and the sheet detection switch $SW_1$ is not turned OFF in S137, the sequence moves onto S157 of FIG. 68. Here, if the discharge of the complete set and the adjustment of the discharge tray 164 have not been completed in S157, these operations are carried out (S158) before the sequence goes back to S137. On the other hand, if these operations have been completed in S157, the sequence directly goes back to S137.

Next, based on the ON state and OFF state of the sheet detection switch $SW_1$ in S136 and S137, the operations in S138 and S139 are carried out. Here, if the sheet S which is being transported through the main pass **162*b* is the first sheet $S_1$ of the second set, the processed number in S140 is 1. Therefore, the sequence moves to S141. In S141, if the first complete set has been discharged from the stapler plate 163, and the stapler plate 163 is ready for the next binding operation, the sequence skips to S148 of FIG. 66**.

If the first complete set has not been discharged from the stapler plate 163 in S141, the transfer rollers 165 are stopped rotating so as to hold the first sheet $S_1$ of the second set in the main pass **162*b* (S142). Thereafter, the deflector drive unit 227 rotates the deflector 167 in the direction of $B_1$ so as to close the main pass 162*b* (S143). Therefore, the second sheet $S_2$ of the second set fed into the transport pass 162 is transported through the bypass 162*c*. Next, as the sheet detection switch $SW_2$ is turned ON (S144) and OFF (S145), the transportation of the second sheet $S_2$ of the second set can be detected, and the deflector 167 is rotated in the direction of $B_2$ so as to close the bypass 162*c* (S146). Then, the transfer rollers 165 are rotated so as to restart the transportation of the first sheet $S_1$ of the second set (S147). As a result, the first and the second sheets $S_1$ and $S_2$ of the second set are discharged onto the stapler plate 183** at the same time.

Figure 69:
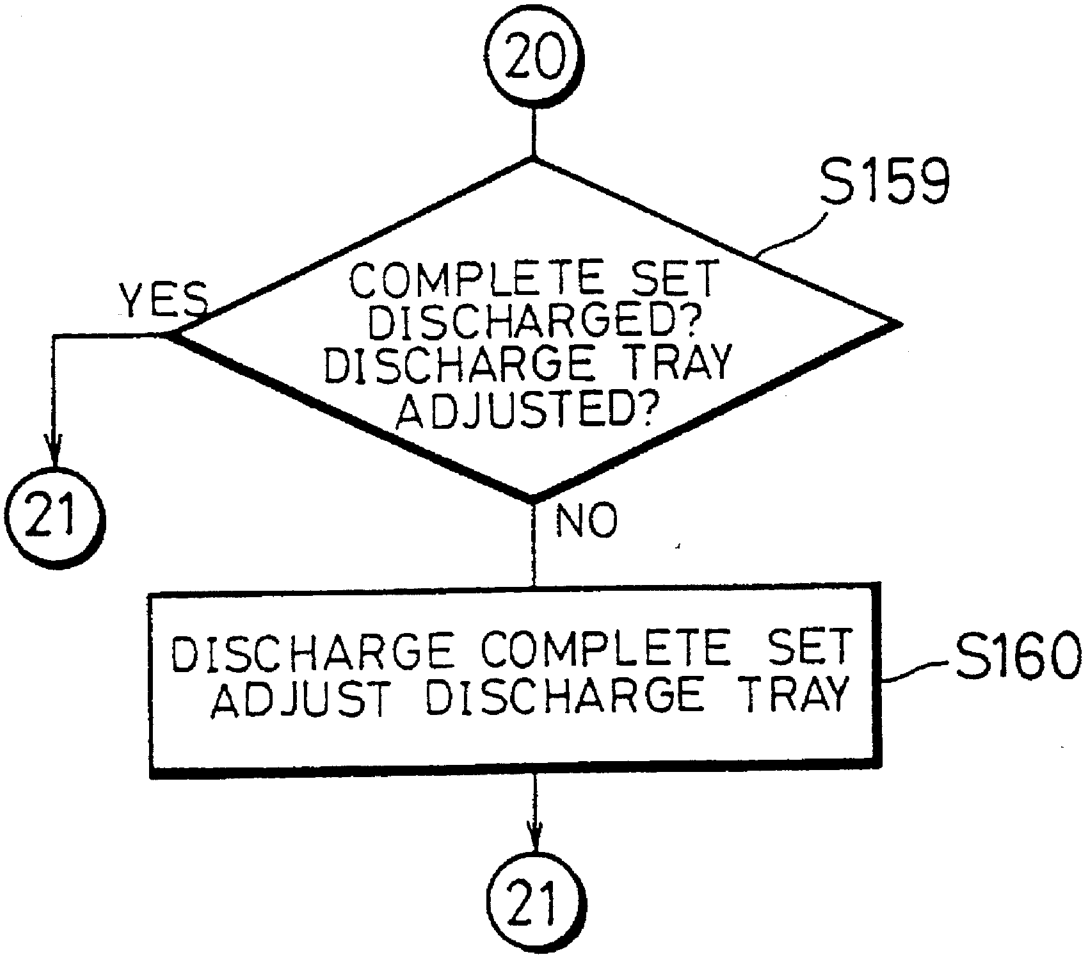
FIG. 69 is a flow chart showing a part of the process in the multiple staple mode with the device for further processing after copying of FIG. 45.

If the sheet detection switch $SW_2$ is not turned ON in S144, the sequence skips to S159 in FIG. 69. Then, if the discharge of the complete set and the adjustment of the discharge tray 164 are not completed in S159, the sequence goes back to S144 after completing these operations (S160). If they are completed in S159, the sequence directly goes back to S144.

Next, after carrying out the operations in S138–140, S148–152, or S138–140, S148–150, S136–140, and S148–152, the stapling operation is carried out. If the stapling operation is stopped after stapling the second set, the sheet detection switch $SW_1$ is not turned ON in S136. Thus, the sequence skips to the steps shown in FIG. 67, and the process is ended in the described manner. On the other hand, if the stapling operation is still carried out after stapling the second set, the operations in S136–140, S148–154, and S157–160 are repeated. Then, after going through the operations in S155 and 156, the sequence in the multiple staple mode is terminated.

As described, according to the device 161 for further processing after copying, in the multiple staple mode, when the complete set has not been discharged onto the discharge tray 164 and is thus still on the stapler plate 163, the discharge of the first sheet $S_1$ of the following set is lagged so that the first and the second sheets $S_1$ and $S_2$ of the following set can be discharged on the stapler plate 163 at the same time. As a result, a faster binding operation can be achieved.

[EMBODIMENT 7]

The following description will discuss another embodiment of the present invention with reference to FIGS. 70 through 75. For convenience, members having the same function as in the sixth embodiment will be designated by the same code and their description will be omitted.

Figure 70:
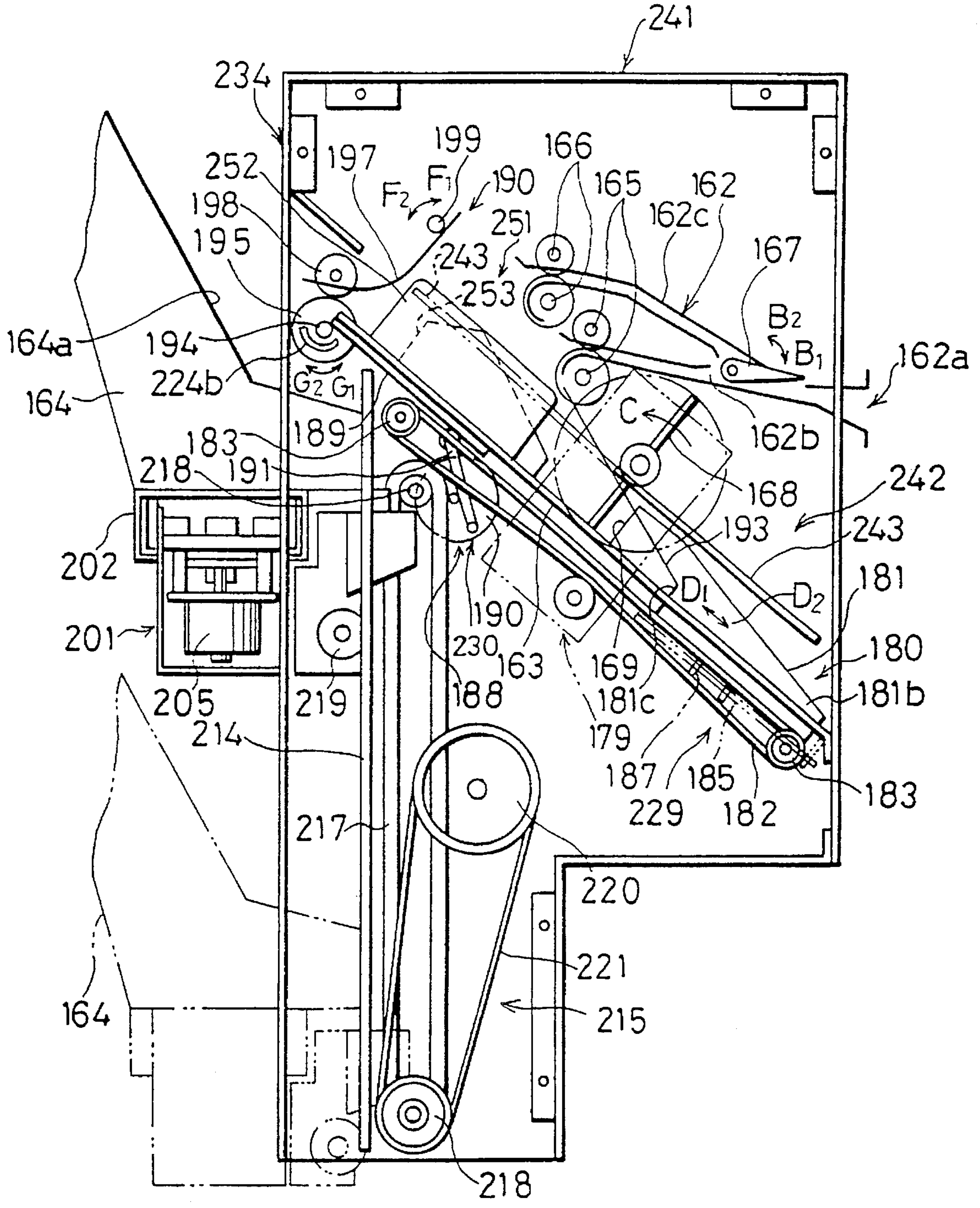
FIG. 70 is a view showing an entire configuration of a device for further processing after copying of another embodiment of the present invention.
Figure 71:
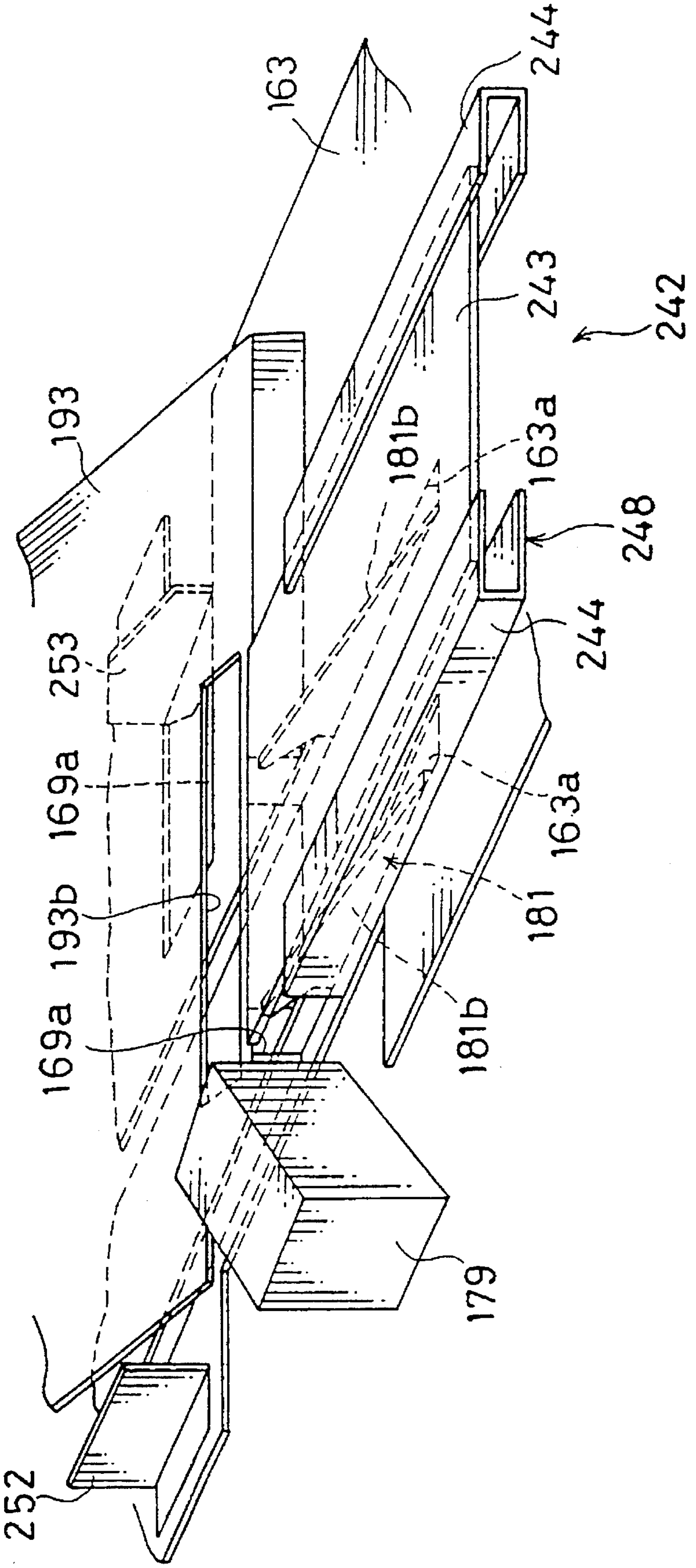
FIG. 71 is a perspective view showing the structure of the stapler plate without the paddler of FIG. 70 when looking at the back diagonally from the top.

As shown in FIGS. 70 and 71, the device 241 for further processing after copying of the present embodiment is provided with an auxiliary upper discharge plate unit 242 in replace of the upper sheet guide sections **171*a* and 172*a* of the edge aligning unit 170 shown in FIGS. 45 and 49**.

The auxiliary upper discharge plate unit 242 is composed of an auxiliary upper discharge plate 243 (auxiliary upper discharge means) and an auxiliary discharge plate drive unit 248 (auxiliary upper discharge member drive means). The auxiliary upper discharge plate 243 provided above the push-out member 181 is capable of moving in the direction of $D_1$–$D_2$ parallel to the stapler plate 163. The auxiliary upper discharge plate drive unit 248 pushes the auxiliary upper discharge plate 243 upward in the direction of $D_1$ so as to reach the front portion of the stapler plate 163. The auxiliary upper discharge plate drive unit 248 also pushes the auxiliary upper discharge plate 243 downward in the direction of $D_2$ to the position where the front portion of the auxiliary upper discharge plate 243 is at the lower position than the sheet guide plate 193.

Figure 72:
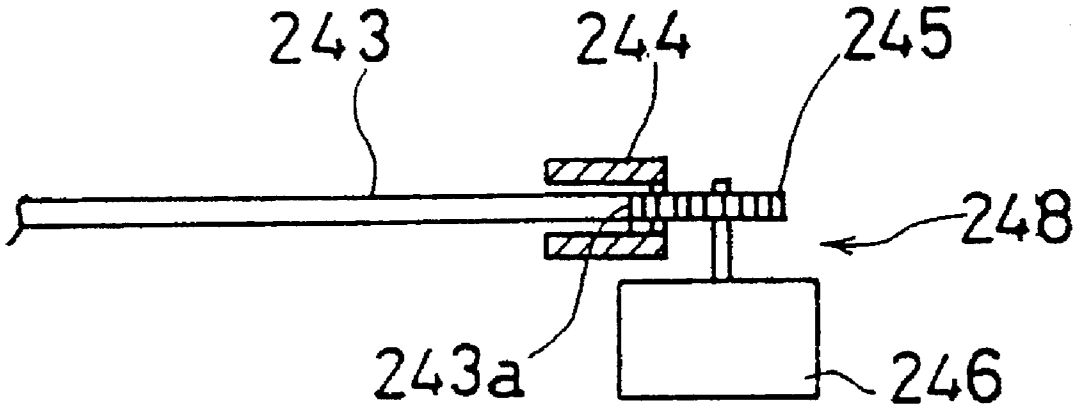
FIG. 72 is a sectional view showing a schematic configuration of the auxiliary upper discharge plate which drives the auxiliary upper discharge plate of FIG. 70.
Figure 73:
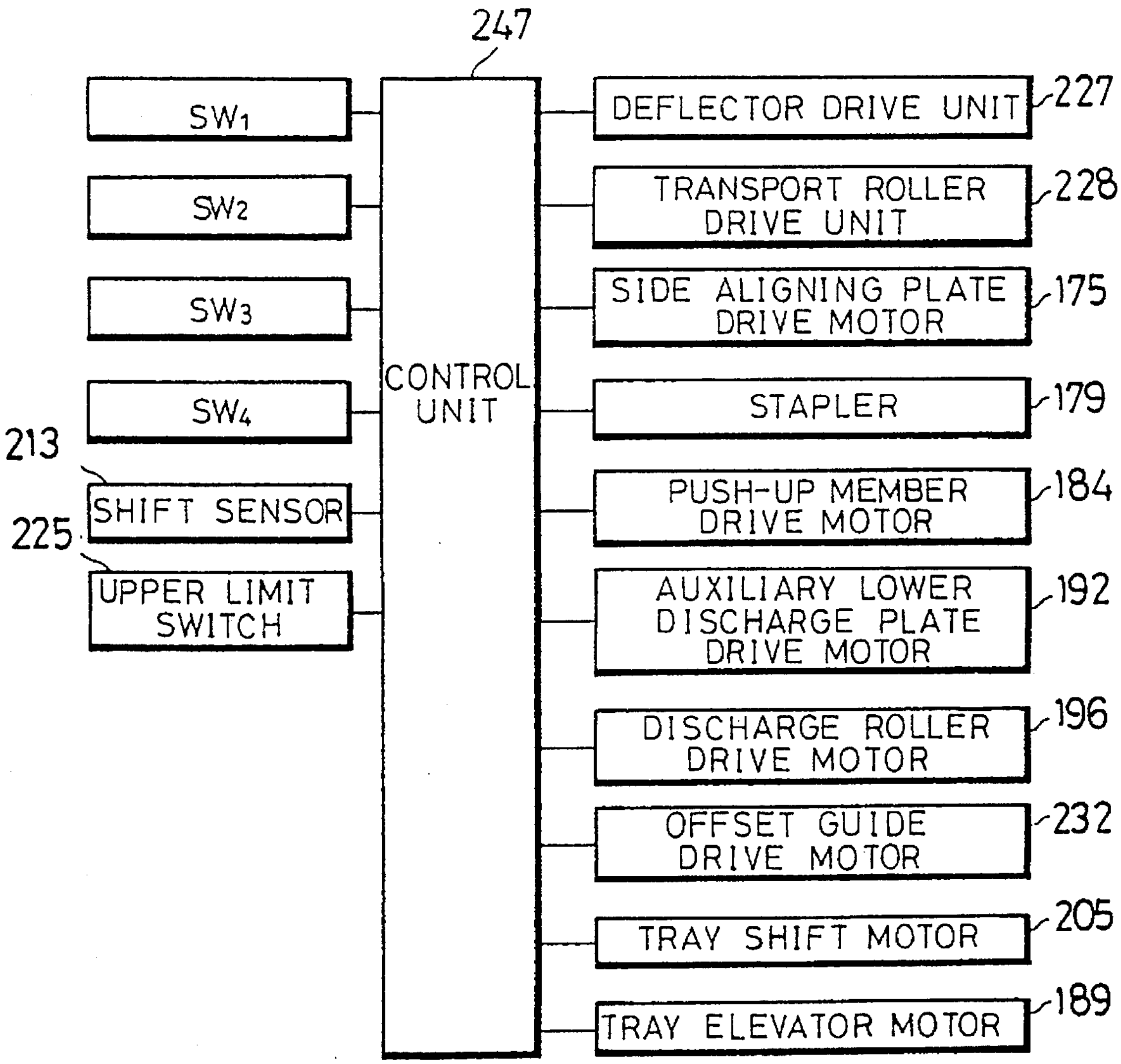
FIG. 73 is a block diagram showing a control device equipped in the device for further processing after copying of FIG. 70.
Figure 74:
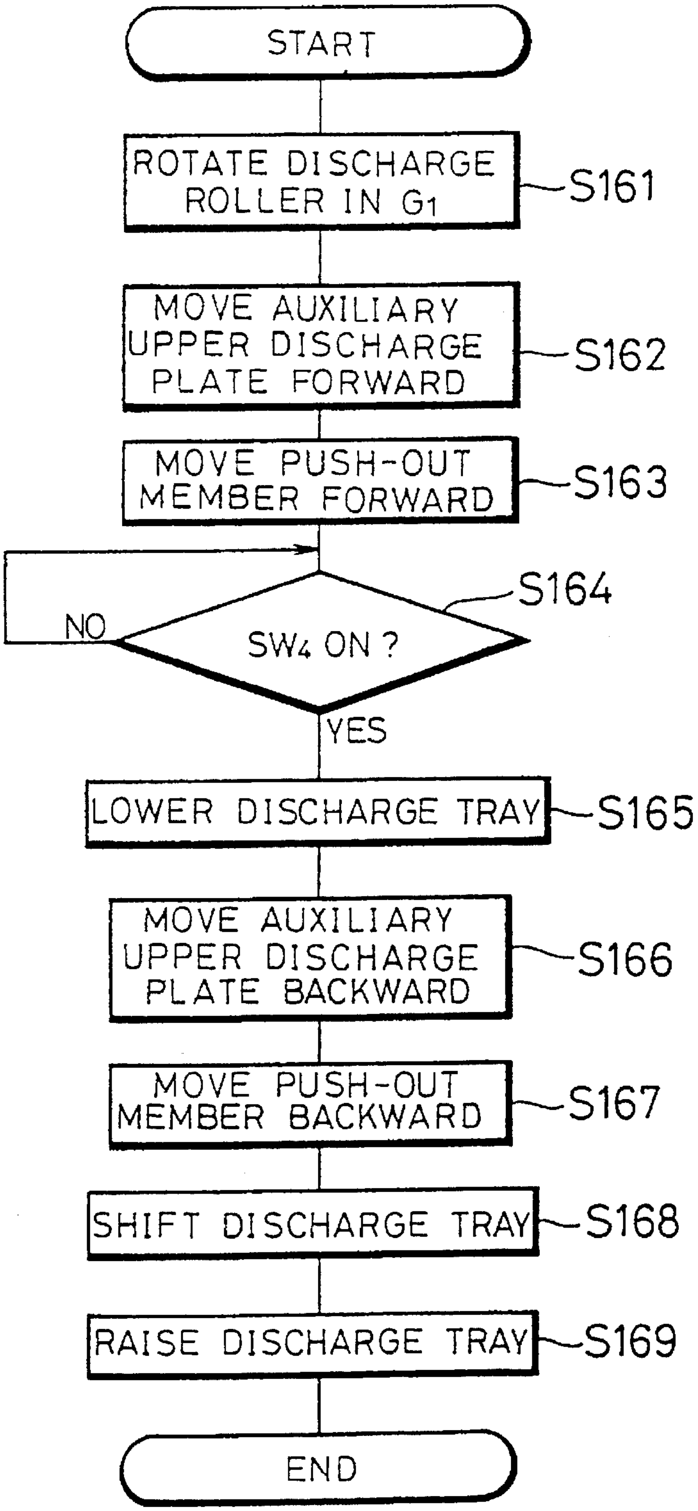
FIG. 74 is a flow chart showing the respective processes for discharging the complete set and adjusting the position of the discharge tray of the device for further processing after copying of FIG. 70.

The auxiliary upper discharge plate drive unit 248, provided on both sides of the auxiliary upper discharge plate 243, is provided with guide rails 244, a rack gear **243*a*, a pinion gear 245, and an auxiliary upper discharge plate drive motor 246 as shown in FIGS. 71 and 72. The guide rails 244 guide the movement of the auxiliary upper discharge plate 243. The rack gear 243*a* and the pinion gear 245 are the power transmission means, for example, formed on the auxiliary upper discharge plate 243 as shown in FIG. 72. The auxiliary upper discharge plate drive motor 246 rotates the pinion gear 245. As will be described later, the operation of the auxiliary upper discharge plate drive motor 246 is controlled by the control unit 247 (control means) shown in FIG. 73**.

As shown in FIG. 71, a plate entry slot **193*b* is provided on the sheet guide plate 193 on the stapler plate 163 so that the auxiliary discharge plate 243** is moved upwards and downwards.

In replace of the positioning plate 171 and the side aligning plate 172 of the edge aligner 170 of the sixth embodiment, another positioning plate 252, and another side aligning plate 253, which are not provided with the upper sheet guide pieces **171*a* and 172*a***, are provided. Other than the above, the configuration of the present embodiment is the Same as that of the sixth embodiment.

With the above arrangement, the operations of the device 241 for further processing after copying, which is based on the control of the control unit 247, are shown hereinbelow referring to the flow chart of FIG. 57 (offset mode), the flow chart of FIG. 59 (single staple mode), and the flow chart of FIG. 69 (multiple staple mode) as in the case of the sixth embodiment. In addition, the discharge of the complete set, the adjustment of the discharge tray 164 are shown in the flow chart of FIG. 74.

First, the discharge roller 195 is rotated in the direction of $G_1$ (S161). Then, the auxiliary upper discharge plate 243 is moved upward onto the discharge tray 164 by the auxiliary upper discharge plate drive unit 248 (S162), and the push-out member 181 is moved upward in the direction of $D_1$ by the push-out member drive unit 229 (S163). As a result, the complete set on the stapler plate 163 is pushed out onto the discharge tray 164. Next, as the push-out detection switch $SW_4$ is turned ON with the shift of the push-out member 181 (S164), the discharge tray 164 is lowered (S165). Thereafter, the auxiliary upper discharge plate 243, and the push-out member 181, which has pushed out the complete set, are moved downward at the same time (S166 and S167). Then, after the discharge tray 164 is shifted by the tray shift unit 201 (S168), the discharge tray 164 is raised to the upper limit position detected as the upper limit switch 225 is turned ON (S169).

Figure 75:
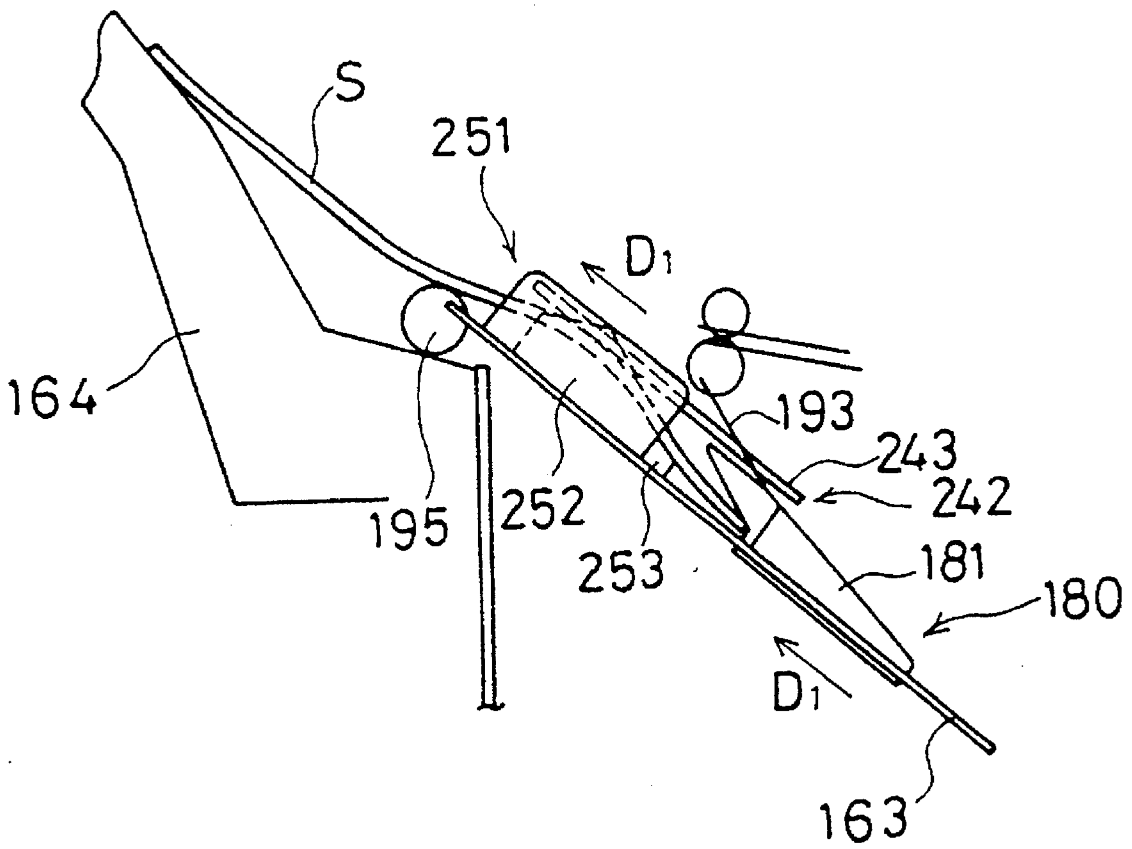
FIG. 75 is an explanatory view showing the control of the upward bucking of the complete set by the auxiliary upper discharge plate of the auxiliary upper discharge plate unit of FIG. 70 when the complete set is pushed out.

As described, according to the device 241 for further processing after copying of the present embodiment, when the complete set is pushed out in S163, the upward buckling of the complete set is controlled by the auxiliary upper discharge plate 243 on the auxiliary upper discharge plate unit 242 as shown in FIG. 75. Therefore, even if a soft material is used for the sheets S, the complete set can be smoothly pushed out. When the ability to discharge is tested using device having the above arrangement, the complete set of two thin sheets of A3 size with a density of 60 g/$m^2$ were smoothly pushed out.

In addition, the shift timing of the auxiliary upper discharge plate 243 in the upward direction is not limited to the above timing as long as the complete set can be prevented from buckling upward due to the upward motion of the auxiliary discharge plate 243 when the complete set is pushed out.

[EMBODIMENT 8]

The following description will discuss another embodiment of the present invention with reference to FIGS. 76 through 79. For convenience, members having the same function as in the sixth embodiment will be designated by the-same code and their description will be omitted.

Figure 76:
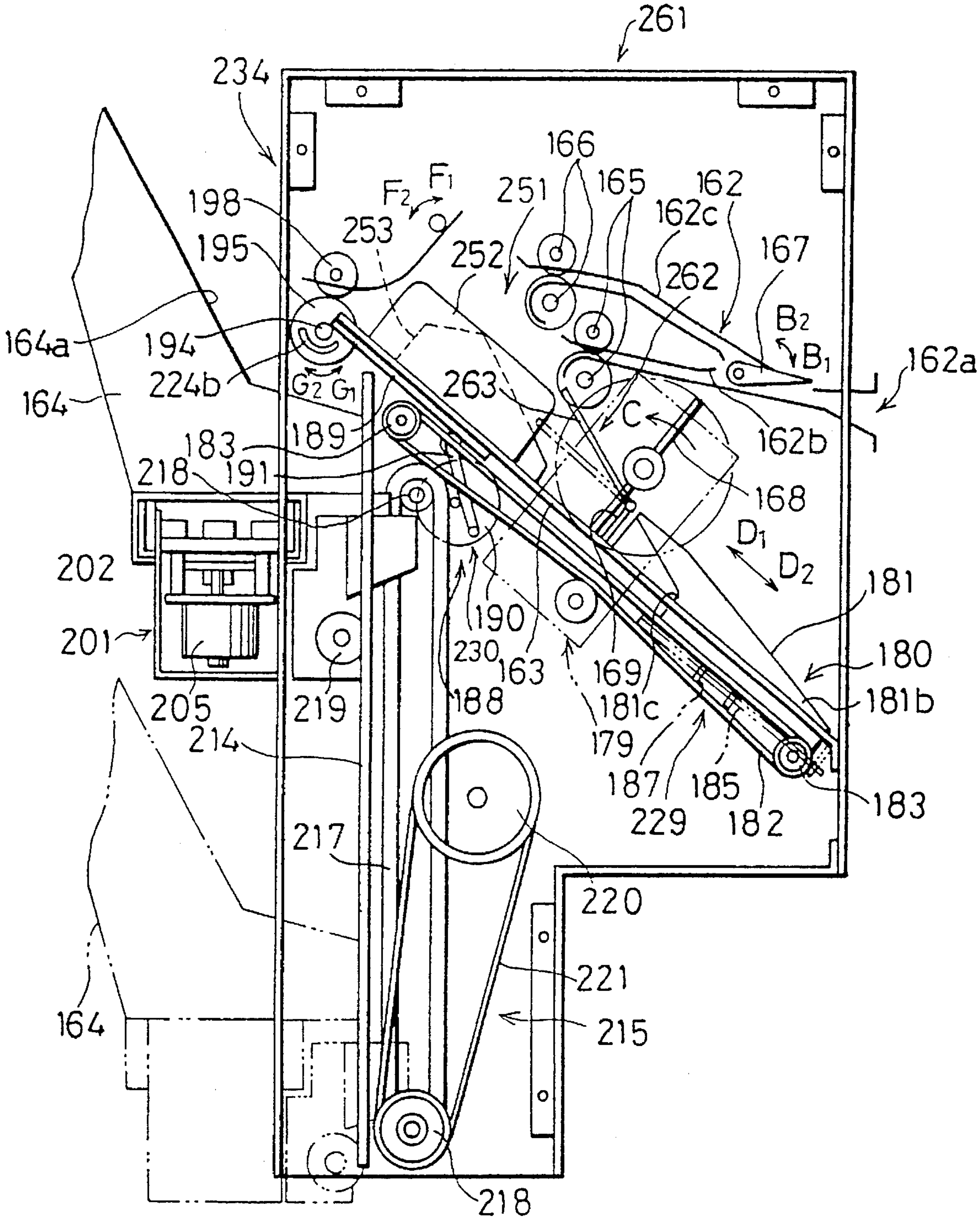
FIG. 76 is a view showing an entire configuration of a device for further processing after copying of another embodiment of the present invention.
Figure 77:
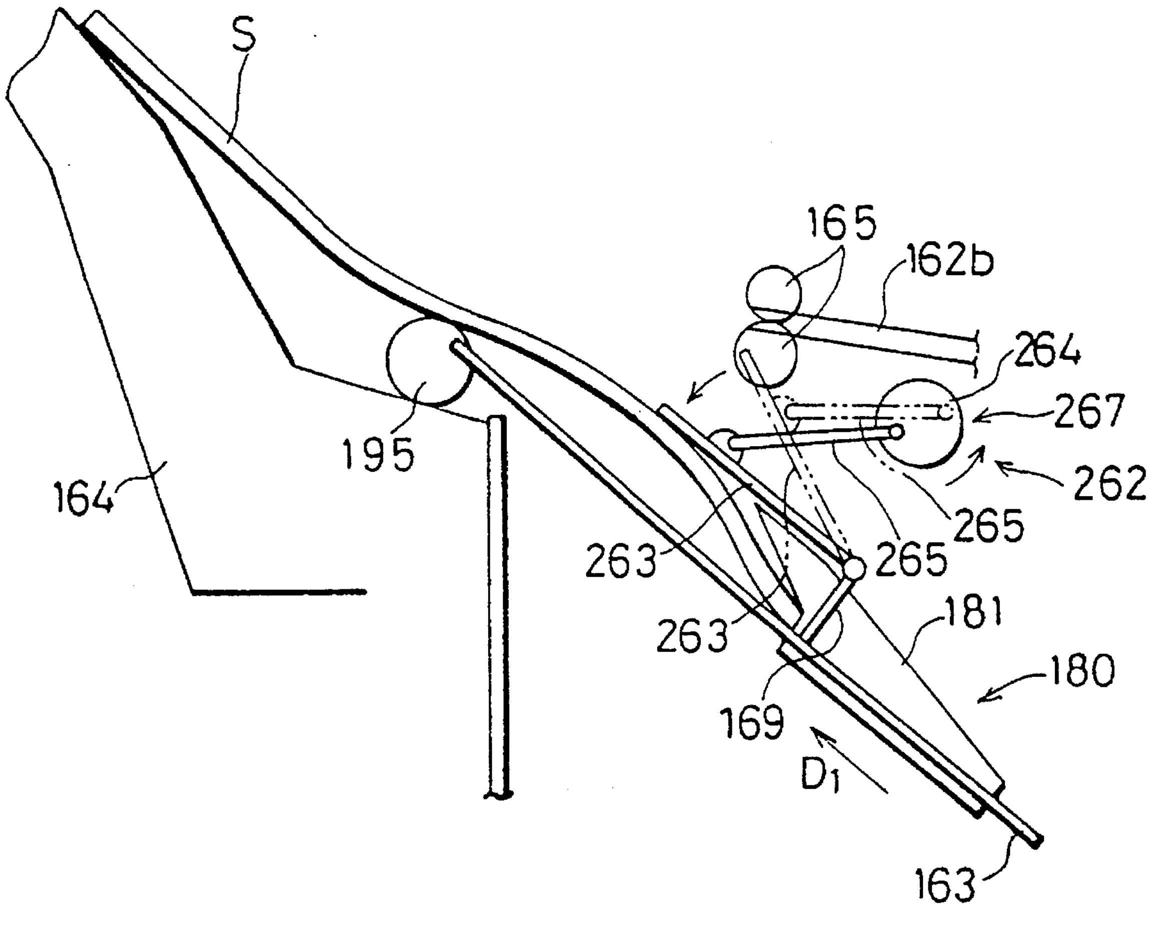
FIG. 77 which shows schematic configuration of the sheet guide unit of FIG. 76 is an explanatory view showing the control of the upward bucking of the complete set by the sheet guide of the sheet guide unit when the complete set is pushed out.

A device 261 for further processing after copying of the present embodiment is provided with a sheet guide unit 262 shown in FIGS. 76 and 77 in replace of the upper sheet guide pieces 171*a* of the edge aligner 170 shown in FIGS. 45 and 49.

The sheet guide unit 262 is composed of the sheet guide 263 (sheet guide member) and the sheet guide drive unit 267 (sheet guide member drive means). The sheet guide 263 is rotatably connected to the upper end of the stopper 169, and extends to the bottom of the transfer roller 165 disposed at the opening of the main pass 162*b* (sheet transport pass). Based on the control of the control unit 268 (to be described later), in the offset mode, the sheet guide drive unit 267 makes the sheet guide 263 fixed to the transport guide position between the stopper 169 and the transfer roller 165. In the single or the multiple staple mode, the sheet guide drive unit 267 moves the sheet guide 263 to the position parallel to the top surface of the stapler plate 163.

Figure 78:
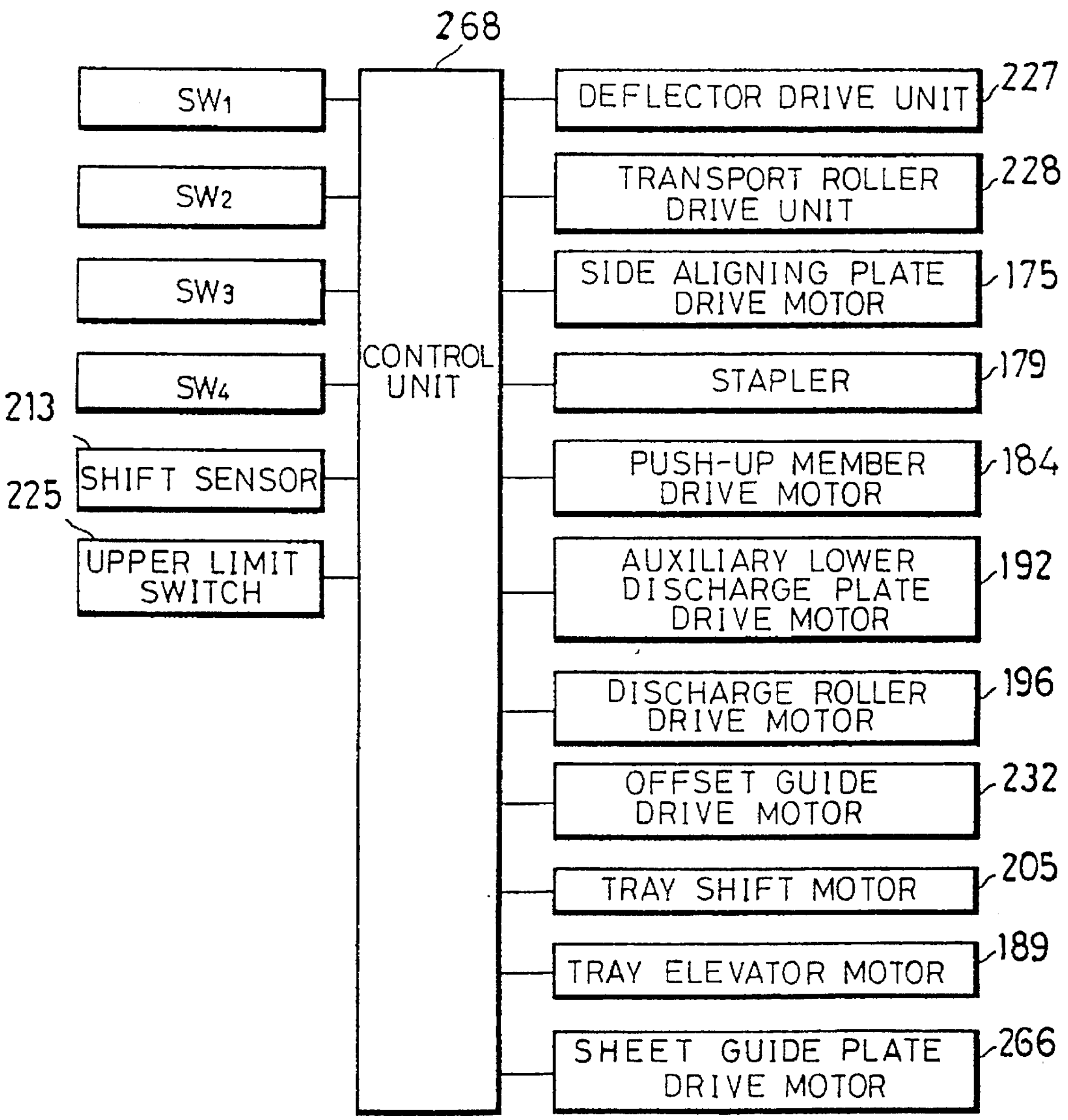
FIG. 78 is a block diagram of the control device equipped in the device for further processing after copying of FIG. 76.
Figure 79:
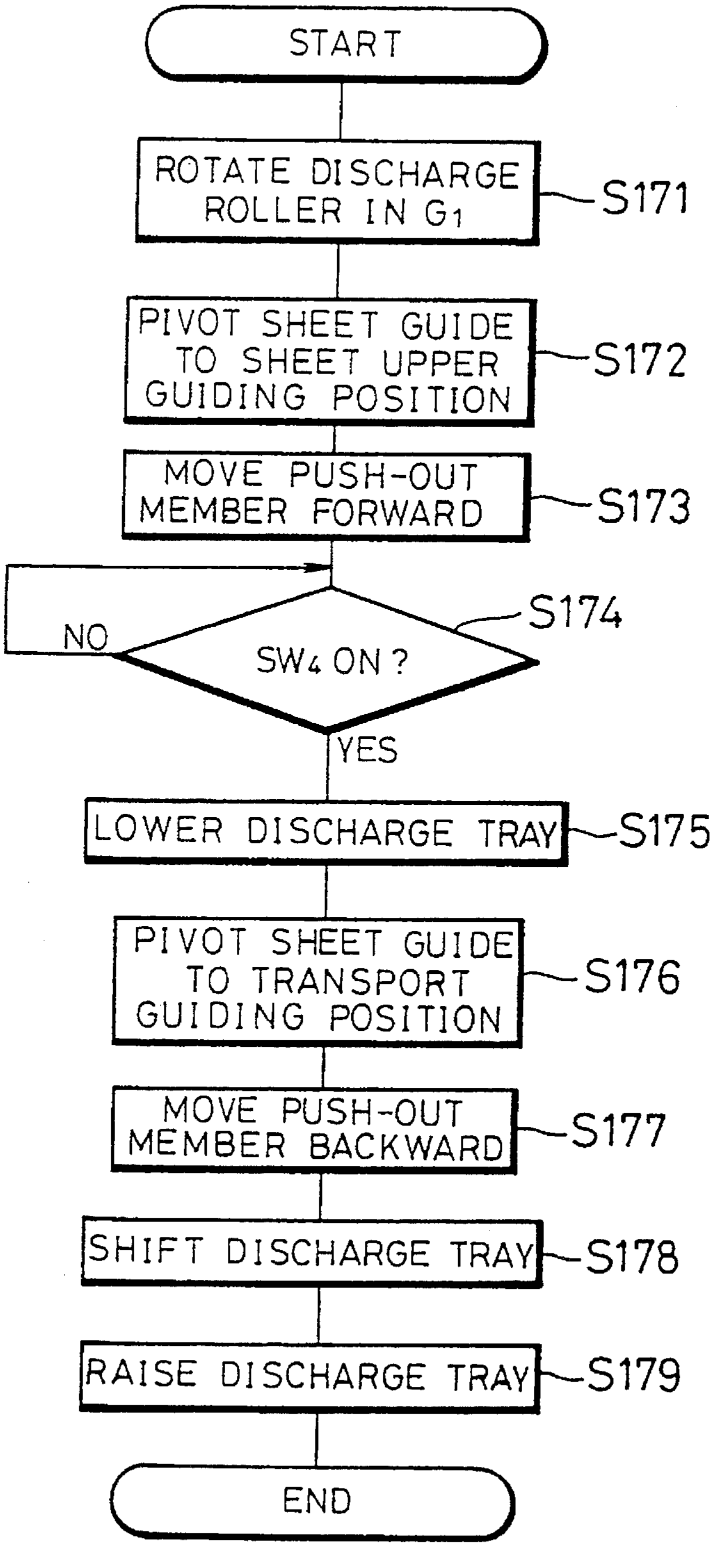
FIG. 79 is a flow chart showing the respective processes for discharging the complete set and adjusting the position of the discharge tray of the device for further processing after copying of FIG. 76.

As shown in FIG. 77, the sheet guide drive unit 267 is provided with a crank 264, a connecting rod 265 which connects the crank 264 and the sheet guide 263, and a sheet guide plate drive motor 266 shown in FIG. 78. The operation of the sheet guide plate drive motor 266 is controlled (as will be describe later) by the control unit 268 (control means) shown in FIG. 78.

In addition, the side aligning unit 251 is the same as that of the seventh embodiment shown in FIG. 70, and other members have the same configurations as those of the sixth embodiment.

With the above arrangement, the operations of the device 261 for further processing after copying, which is based on the control of the control unit 268, are shown hereinbelow referring to the flow chart of FIG. 57 (offset mode), the flow chart of FIG. 59 (single staple mode), and the flow chart of FIGS. 65 through 69 (multiple staple mode) as in the case of the sixth embodiment. In addition, the discharge of the complete set, the adjustment of the discharge tray 164 are shown in the flow chart of FIG. 79.

First, the discharge roller 195 is rotated in the direction of $G_1$ (S171). Then, the sheet guide 263 is rotated to the upper sheet guide position by the sheet guide drive unit 267 (S172), and the push-out member 181 is moved upward in the direction of $D_1$ by the push-out member drive unit 229 (S173). As a result, the complete set on the stapler plate 163 is pushed out onto the discharge tray 164. Next, as the push-out detection switch $SW_4$ is turned ON with the shift of the push-out member 181 (S174), the discharge tray 164 is lowered (S175). Thereafter, the sheet guide 263 is rotated to the transfer guide position (S176), and the push-out member 181, which has pushed out the complete set, is moved downward (S177). Then, after the discharge tray 164 is shifted by the tray shift unit 201 (S178), the discharge tray 164 is raised to the upper limit position detected as the upper limit switch 225 is turned ON (S179).

As described, according to the device 261 for further processing after copying of the present embodiment, when the complete set is pushed out in S173, the upward buckling of the complete set is controlled by the sheet guide 263 rotated to the upper sheet guide position in S172 as shown in FIG. 77. Therefore, even if the soft material is used for the sheets S, the complete set can be smoothly pushed out.

In addition, the rotation timing of the sheet guide 263 to the upper sheet guide position is not limited to the above timing as long as the complete set can be prevented from buckling upward due to the upward motion of the push-out member 181 when the complete set is pushed out.

[EMBODIMENT 9]

Figure 80:
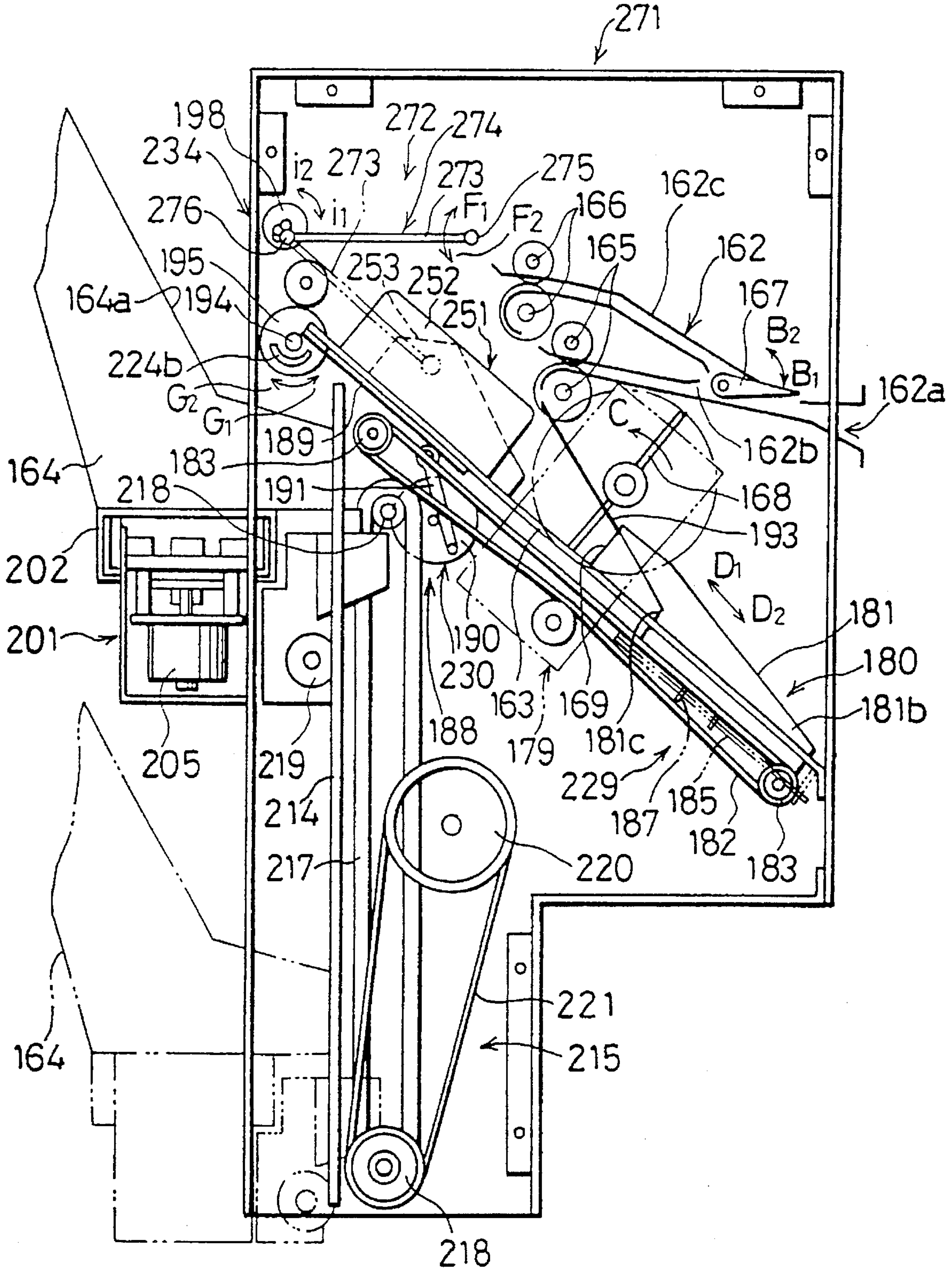
FIG. 80 is a view showing an entire configuration of a device for further processing after copying of another embodiment of the present invention.
Figure 81:
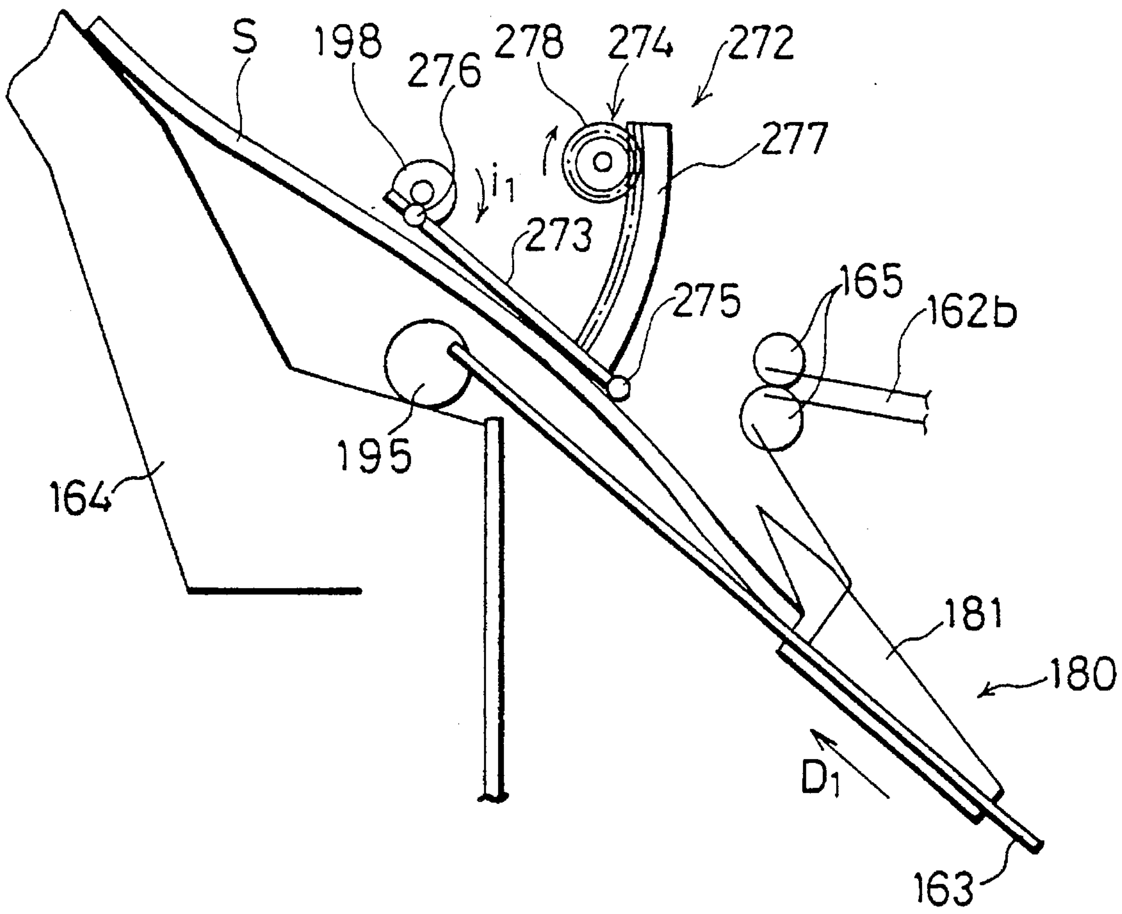
FIG. 81 is an explanatory view showing a schematic configuration of the offset guide unit of FIG. 80 and the control of the upward buckling of the complete set by the offset guide of the offset guide unit when the complete set is pushed out.
Figure 82:
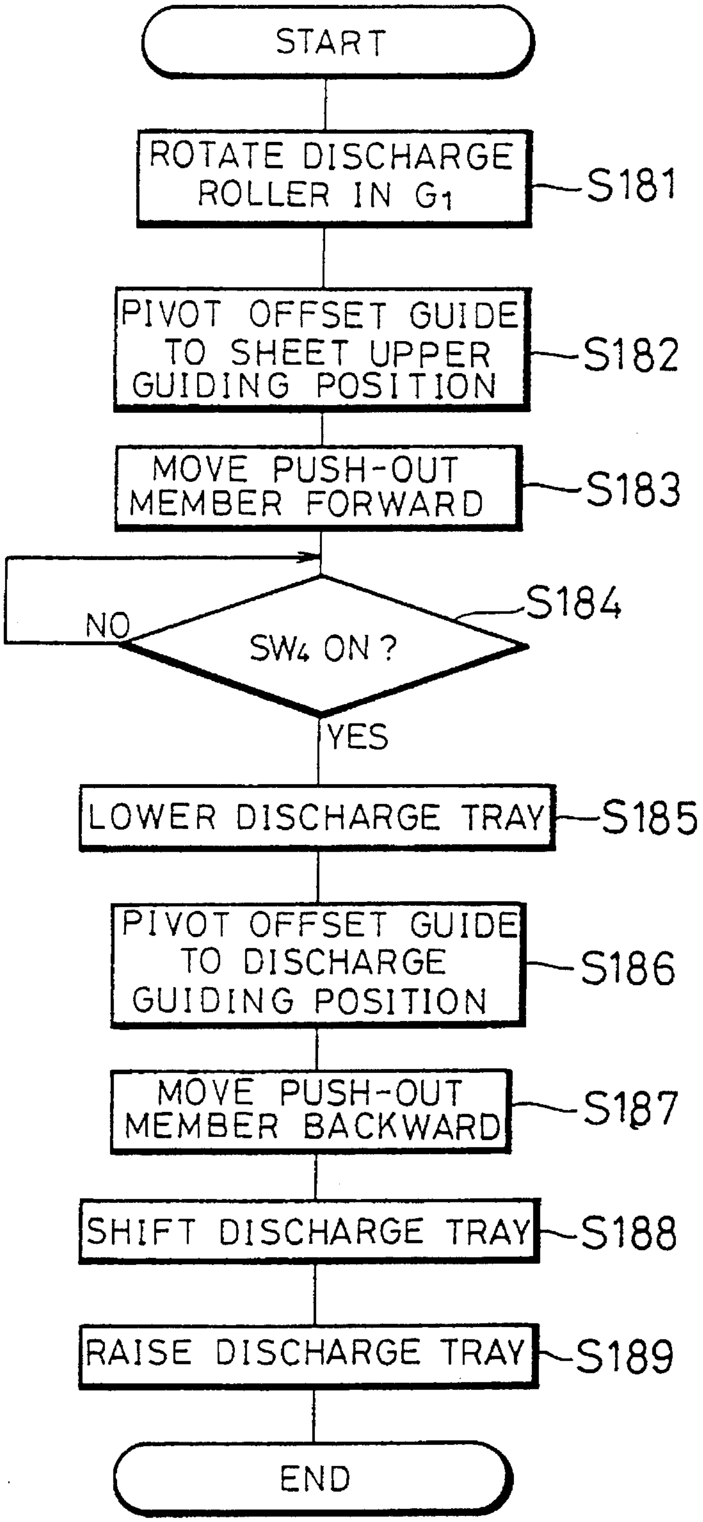
FIG. 82 is a flow chart showing the respective processes for discharging the complete set and adjusting the position of the discharge tray of the device for further processing after copying of FIG. 80.

The following description will discuss another embodiment of the present invention with reference to FIGS. 80 through 82. For convenience, members having the same function as in the sixth embodiment will be designated by the same code and their description will be omitted.

A device 271 for further processing after copying of the present embodiment is provided with another offset guide unit 272 shown in FIGS. 80 and 81 in replace of the upper sheet guide pieces 171*a* and 172*a* of the edge aligner 170 and the offset guide unit 200 shown in FIGS. 45 and 49. The offset guide unit 272 is composed of the offset guide 273, the offset guide drive unit 274, and the offset guide drive unit 233 (shown in FIG. 45 but not shown in FIGS. 80 nor 81).

The offset guide 273 for supporting the driven roller 198 is driven by the offset guide drive unit 233, and is rotated in the direction of $F_1$–$F_2$ around a shaft 275 at one side by the control of the control unit 279 (to be described later), as in the case of the offset guide 197 shown in FIG. 45. Furthermore, in the single or the multiple staple mode, the offset guide 273 is rotated in the direction of $i_1$ around a fulcrum 276 at the other end to the position substantially parallel to the stapler plate 163 by the offset guide drive unit 274. On the other hand, in the offset mode, the offset guide 273 is driven in the direction of $i_2$, and is fixed to the discharge guide position so as to guide the top surface of the sheet S fed through the main pass 162*b* onto the discharge tray 164. In this way, the position of the shaft 275 is fixed by the fixing means (not shown) in the offset mode, and the shaft 276 is released from the fixed position. On the other hand, in the single or the multiple staple mode, the position of the shaft 276 is fixed, and the shaft 275 is released from the fixed position.

As shown in FIG. 81, the offset guide drive unit 274 is composed of a rack gear 277, a pinion gear 278 engaging the rack gear 277, and the offset guide drive motor 232. The offset guide drive motor 232, which rotates the pinion gear 278 using the clutch mechanism and the gear mechanism (not shown), is used in common with the offset guide drive unit 233 of FIG. 45. In the single or the multiple staple mode, the rack gear 277, which is formed in an arc shape around the shaft 276, is connected to the offset guide 273 by the link mechanism (not shown). On the other hand, in the offset mode, the rack gear 277 is released from being linked to the offset guide 273. As will be described later, the operation of the offset guide drive motor 232 is controlled by the control unit 279 (control means) shown in FIG. 56. The separation of the linkage between the offset guide 273 and the offset guide drive unit 274 due to the difference in motion of the offset guide 273 between the offset mode and the single and multiple staple modes is not necessary to take place between the offset guide 273 and the rack gear 277 as long as it takes place in an appropriate position. Also, the arrangement may be made such that the offset guide 273 and the offset guide drive unit 274 are integrally moved without separating the linkage between them.

In addition, the side aligning unit 251 has the same configuration as that of the seventh embodiment shown in FIG. 70, and other members have the same configurations as those in the sixth embodiment.

With the above arrangement, the operations of the device 271 for further processing after copying, which is based on the control of the control unit 279, are shown hereinbelow referring to the flow chart of FIG. 57 (offset mode), the flow chart of FIG. 59 (single staple mode), and the flow chart of FIG. 69 (multiple staple mode) as in the case of the sixth embodiment. In addition, the discharge of the complete set, the adjustment of the discharge tray 164 are shown in the flow chart of FIG. 82.

First, the discharge roller 195 is rotated in the direction of $G_1$ (S181). Then, the sheet guide 273 is rotated to the upper sheet guide position by the sheet guide drive unit 274 (S182), and the push-out member 181 is moved upward in the direction of $D_1$ by the push-out member drive unit 229 (S183). As a result, the complete set on the stapler plate 163 is pushed out onto the discharge tray 164. Next, as the push-out detection switch $SW_4$ is turned ON with the shift of the push-out member 181 (S184), the discharge tray 164 is lowered (S185). Thereafter, the offset guide 273 is rotated to the discharge guide position (S186), and the push-out member 181, which has pushed out the complete set, is moved downward (S187). Then, after the discharge tray 164 is shifted by the tray shift unit 201 (S188), the discharge tray 164 is raised to the upper limit position detected as the upper limit switch 225 is turned ON (S189).

As described, according to the device 271 for further processing after copying of the present embodiment, when the complete set is pushed out in S183, the upward buckling of the complete set is controlled by the offset guide 273 rotated to the upper sheet guide position in S182 as shown in FIG. 81. Therefore, even if a soft material is used for the sheets S, the complete set can be smoothly pushed out.

In addition, the rotation timing of the offset guide 273 to the upper sheet guide position is not limited to the above timing-as long as the complete set can be prevented from buckling upward due to the upward motion of the push-out member 181 when the complete set is pushed out.

[EMBODIMENT 10]

The following description will discuss another embodiment of the present invention with reference to FIGS. 83 through 86. For convenience, members having the same function as in the sixth embodiment will be designated by the same code and their description will be omitted.

Figure 83:
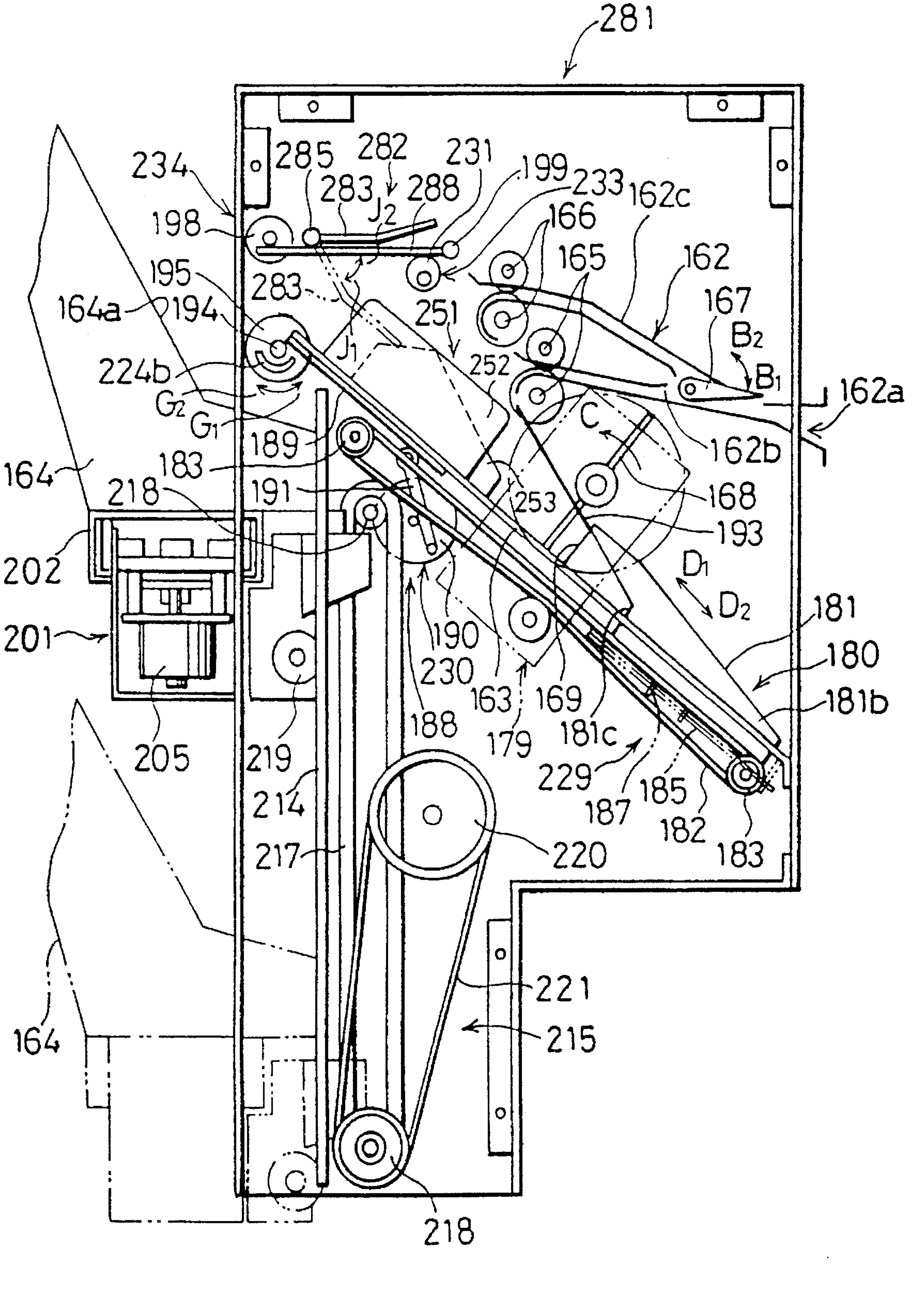
FIG. 83 is a view showing an entire configuration of a device for further processing after copying of another embodiment of the present invention.
Figure 84:
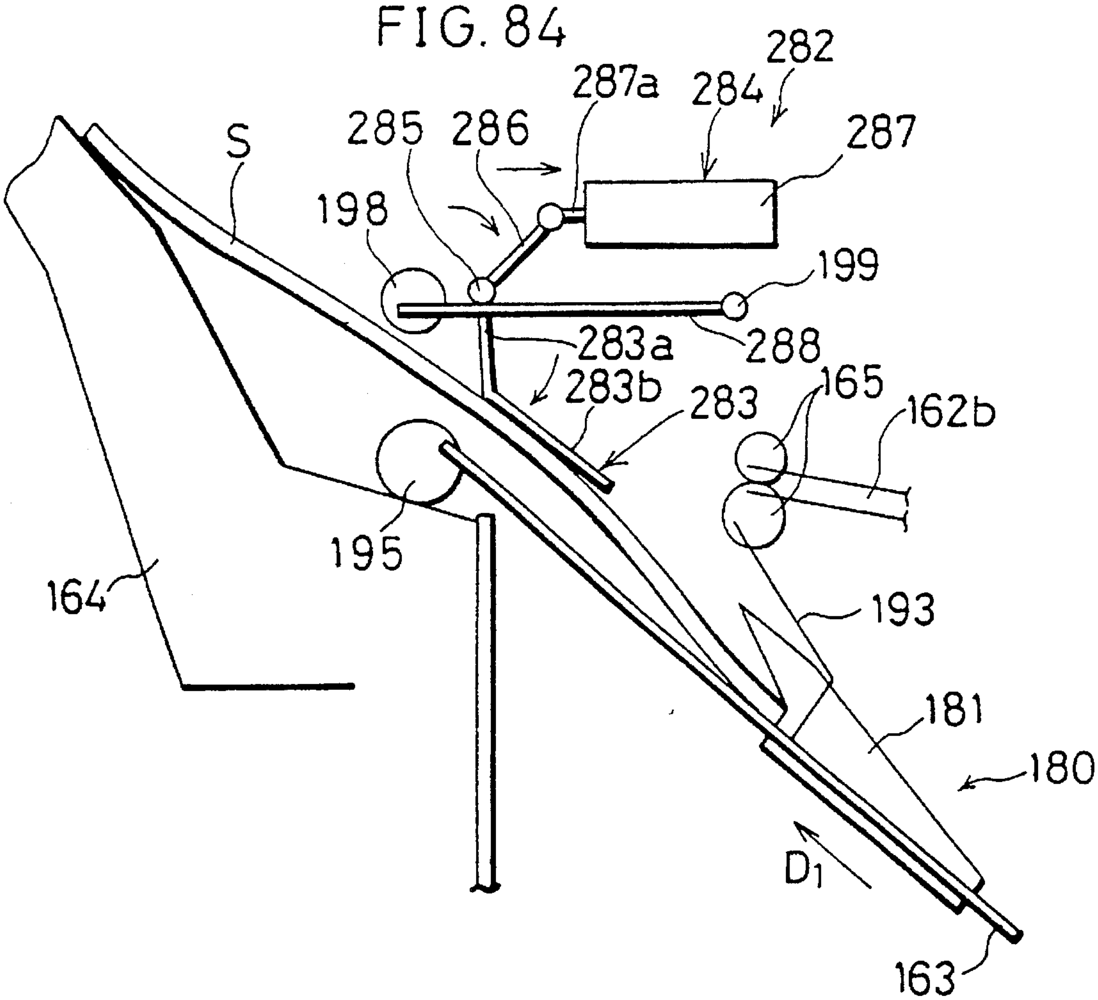
FIG. 84 is an explanatory view showing a schematic configuration of the auxiliary upper discharge guide unit of FIG. 83 and the control of the upward buckling of the complete set by the auxiliary upper discharge guide of the auxiliary upper discharge guide unit when the complete set is pushed out.
Figure 85:
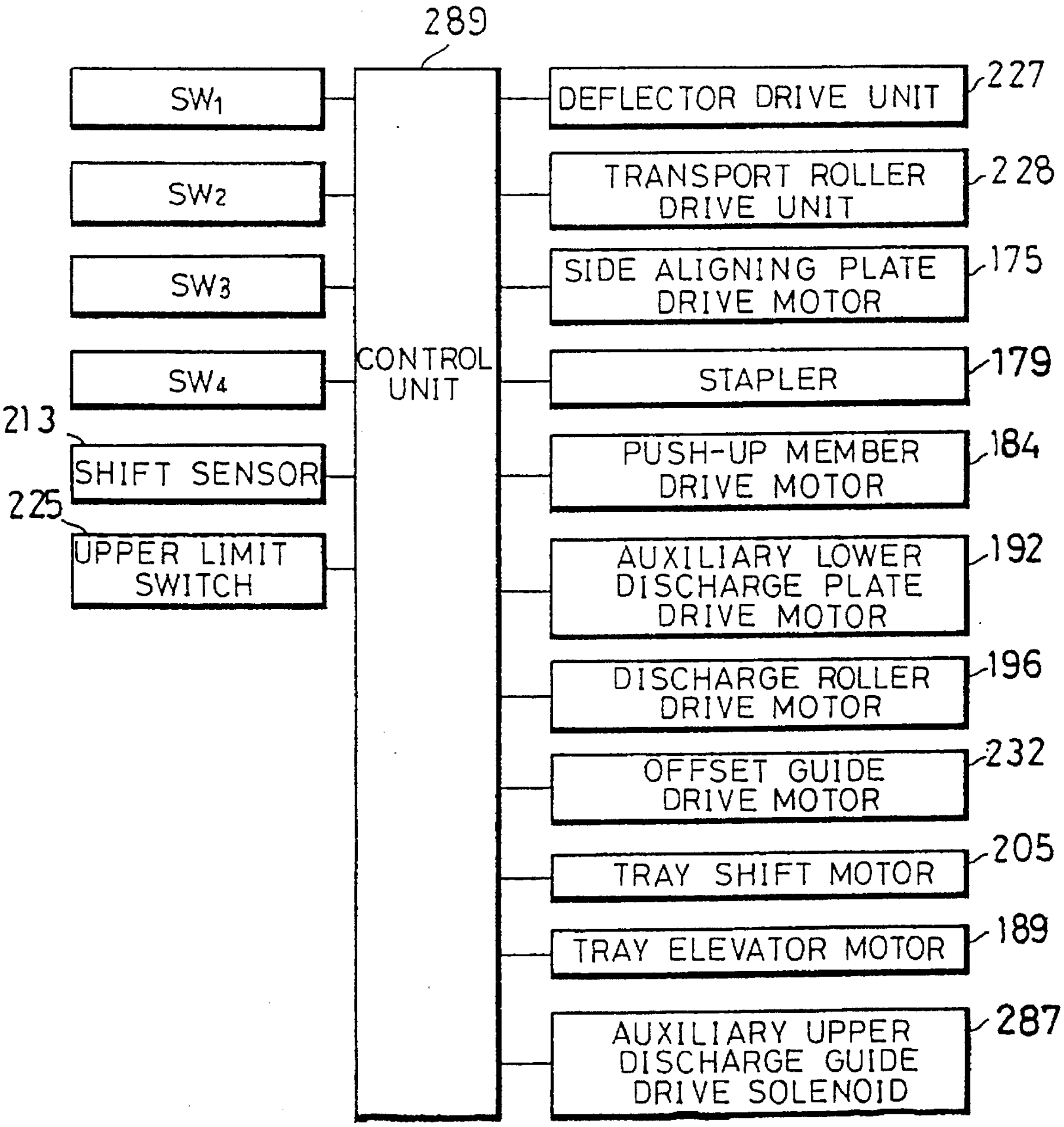
FIG. 85 is a block diagram of the control device equipped in the device for further processing after copying of FIG. 83.
Figure 86:
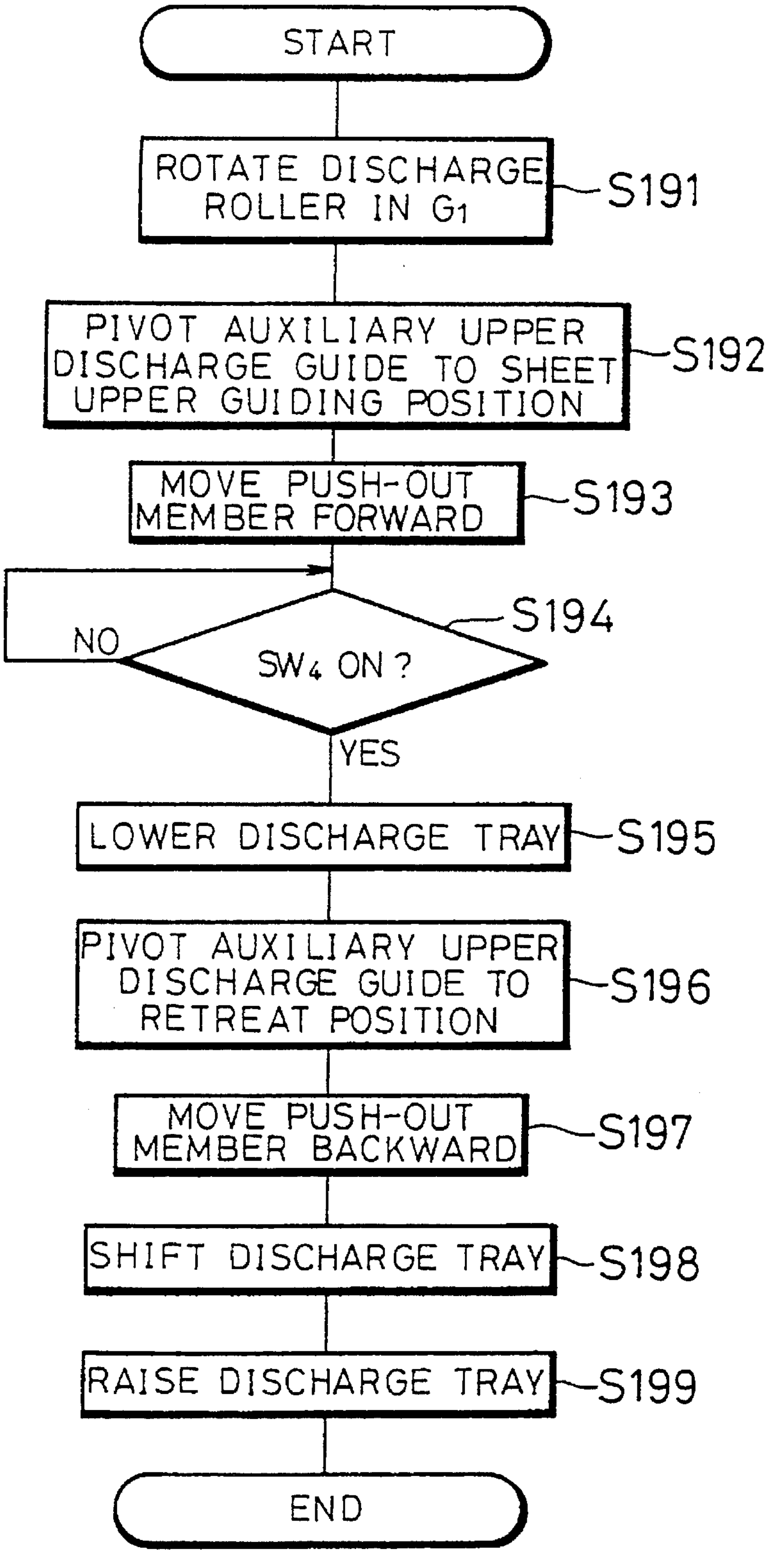
FIG. 86 is a flow chart showing the respective processes for discharging the complete set and adjusting the position of the discharge tray of the device for further processing after copying of FIG. 83.

A device 281 for further processing after copying of the present embodiment is provided with an auxiliary upper discharge guide unit 282 shown in FIGS. 83 and 84 in replace of the upper sheet guide pieces 171*a* and 172*a* of the edge aligner 170 shown in FIGS. 45 and 49. The auxiliary upper discharge guide unit 282 is composed of an auxiliary upper discharge guide 283 and an auxiliary upper discharge guide drive unit 284.

The auxiliary upper discharge guide 283, provided on the side of the leading end of the offset guide 288, is capable of rotating around the shaft 285 in the direction of $j_1$–$j_2$. The auxiliary upper discharge guide 283 is composed of a base piece 283*a* of the shaft 285 side and a sheet guide piece 283*b* of the leading end side. The sheet guide piece 283*b* is bent with respect to the base 283*a* so that when the auxiliary upper discharge guide 283 is rotated in the direction of $j_1$ to the upper sheet guide position, it is positioned substantially parallel to the stapler plate 163. In addition, the offset guide 288 has a slot (not shown) through which the auxiliary upper discharge guide 283 rotates. The offset guide 288 has the same function as the offset guide 197 shown in FIG. 45. The offset guide 288, which is rotated in the direction of $F_1$–$F_2$ around the shaft 199, is driven by the offset guide drive unit 233.

As shown in FIG. 84, the auxiliary upper discharge guide drive unit 284 is provided with a lever 286 and an auxiliary upper discharge guide drive solenoid 287. The lever 286 is fixed to a shaft 285 of the auxiliary upper discharge guide 283. The auxiliary upper discharge guide drive solenoid 287 has a rod 287a connected to the end of the lever 286. In the offset mode, the auxiliary upper discharge guide drive solenoid 287 drives the auxiliary upper discharge guide 283 in the direction of $j_2$ so as to be fixed to the upper released position above the offset guide 288 with the forward and backward motion of the rod 287*a* based on the control of the control unit 289 (control means) shown in FIG. 85. On the other hand, in the single or the multiple staple mode, the auxiliary upper discharge guide drive solenoid 287 drives the auxiliary upper discharge guide 283 in the direction of $j_1$ to the position substantially parallel to the stapler plate 163.

In addition, the side aligning unit 251 has the same configuration as that of the seventh embodiment shown in FIG. 70, and other members have the same configurations as those in the sixth embodiment.

With the above arrangement, the respective operations by the device 281 for further processing after copying, which is based on the control of the control unit 289, are shown hereinbelow referring to the flow chart of FIG. 57 (offset mode), the flow chart of FIG. 59 (single staple mode), and the flow chart of FIG. 69 (multiple staple mode) as in the case of the sixth embodiment. In addition, the discharge of the complete set, the adjustment of the discharge tray 164 are shown in the flow chart of FIG. 86.

First, the discharge roller 195 is rotated in the direction of $G_1$ (S191). Then, the auxiliary upper discharge guide 283 is rotated to the upper sheet guide position by the auxiliary upper discharge guide drive unit 284 (S192), and the push-out member 181 is moved upward in the direction of $D_1$ by the push-out member drive unit 229 (S193). As a result, the complete set on the stapler plate 163 is pushed out onto the discharge tray 164. Next, as the push-out detection switch $SW_4$ is turned ON with the shift of the push-out member 181 (S194), the discharge tray 164 is lowered (S195). Thereafter, the auxiliary upper discharge guide 283 is rotated to the retreat position (S196), and the push-out member 181, which has pushed out the complete set, is moved downward (S197). Then, after the discharge tray 164 is shifted by the tray shift unit 201 (S198), the discharge tray 164 is raised to the upper limit position detected as the upper limit switch 225 is turned ON (S199).

As described, according to the device 281 for further processing after copying of the present embodiment, when the complete set is pushed out in S193, the upward buckling of the complete set is controlled by the auxiliary upper discharge guide 283 rotated to the upper sheet guide position in S192 as shown in FIG. 84. Therefore, even if a soft material is used for the sheets S, the complete set can be smoothly pushed out.

In addition, the rotation timing of the auxiliary upper discharge guide 283 to the upper sheet guide position is not limited to the above timing as long as the complete set can be prevented from buckling upward due to the upward motion of the push-out member 181 when the complete set is pushed out.

[EMBODIMENT 11]

The following description will discuss another embodiment of the present invention with reference to FIGS. 45, 56, 87, and 88.

A device 291 for further processing after copying of the present embodiment has the same configuration as the device 161 for further processing after copying shown in FIG. 45, and is controlled by the control unit 292 (control means) in FIG. 56. In the offset mode, the control unit 292 rotates the offset guide 197 in the direction of $F_2$ by controlling the offset guide unit 200, so that the driven roller 198 is in contact with the discharge roller 195. Moreover, in the single or the multiple staple mode, the offset guide 197 is rotated to the released position in the direction of $F_1$ where the driven roller 198 is moved above the discharge roller 195 when the discharge of the complete set nor the adjustment of the discharge tray 164 are not carried out. When these operations are carried out, it is rotated to the closed position in the direction of $F_2$ of FIG. 45 where the driven roller 198 and the discharge roller 195 are in contact with as will be described later. In addition, since the offset guide 197 is capable of rotating around the shaft 199 even when the offset guide 197 is at the closed position, the discharge of the complete set onto the discharge tray 164 by the push-out member 181 is not disturbed. Other members of the device 291 are the same as those of the sixth embodiment.

Figure 87:
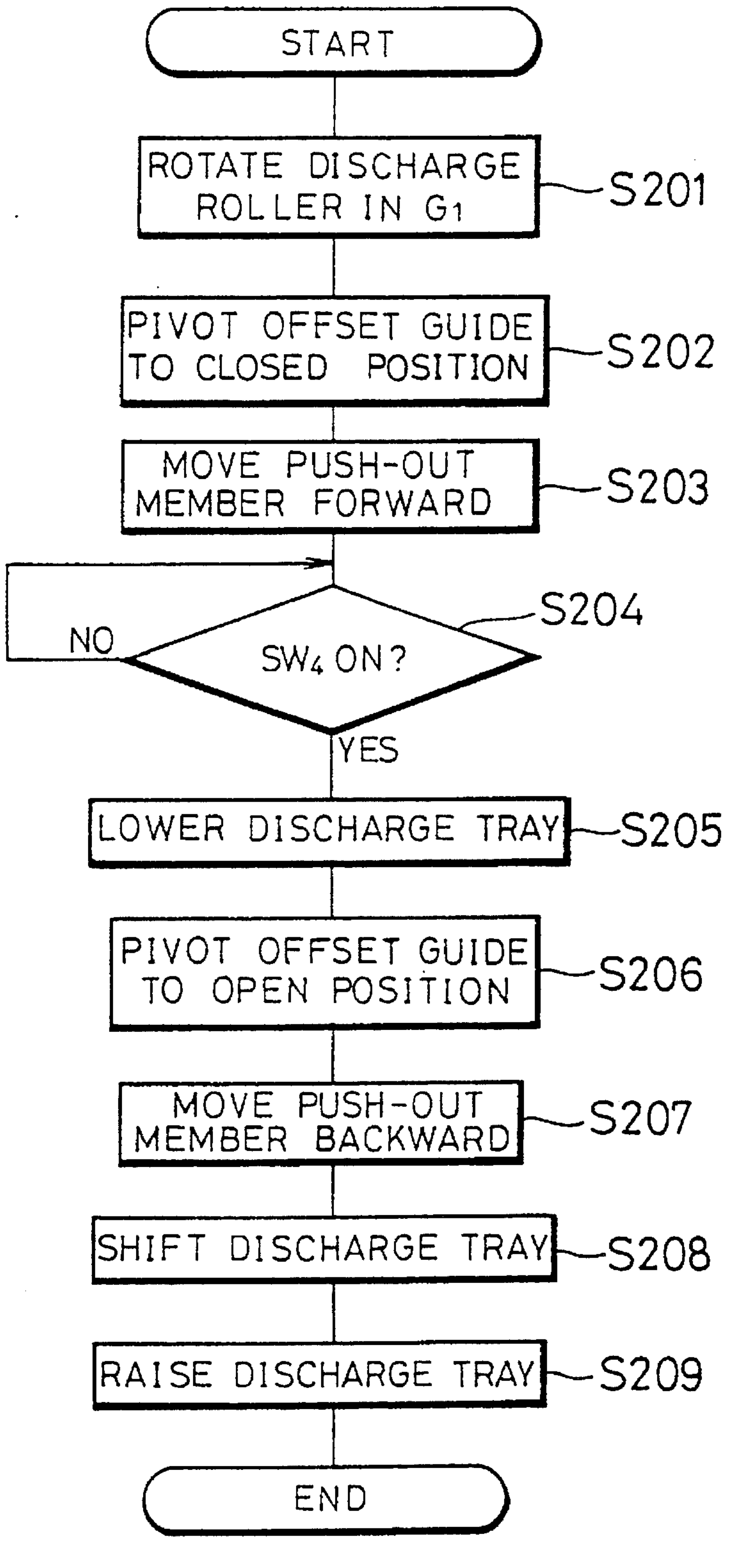
FIG. 87 which shows another embodiment of the preset invention is a flow chart showing the respective processes for discharging the complete set and adjusting the position of the discharge tray of the device for further processing after copying of FIG. 83.

With the above arrangement of the device 291 for further processing after copying, the process for the discharge of the complete set, and the adjustment of the discharge tray will be described hereinbelow referring to the flow chart of FIG. 87.

First, the discharge roller 195 is rotated in the direction of $G_1$ (S201). Then, the offset guide 197 is rotated to the closed position in the direction of $F_2$ by the offset guide drive unit 233 (S202), and the push-out member 181 is moved upward in the direction of $D_1$ by the push-out member drive unit 229 (S203). As a result, the complete set on the stapler plate 163 is pushed out onto the discharge tray 164. Next, as the push-out detection switch $SW_4$ is turned ON with the shift of the push-out member 181 (S204), the discharge tray 164 is lowered (S205). Thereafter, the offset guide 197 is rotated to the open position (S206), and the push-out member 181, which has pushed out the complete set, is moved downward (S207). Then, after the discharge tray 164 is shifted by the tray shift unit 201 (S208), the discharge tray 164 is raised to the upper limit position detected as the upper limit switch 225 is turned ON (S209).

Figure 88:
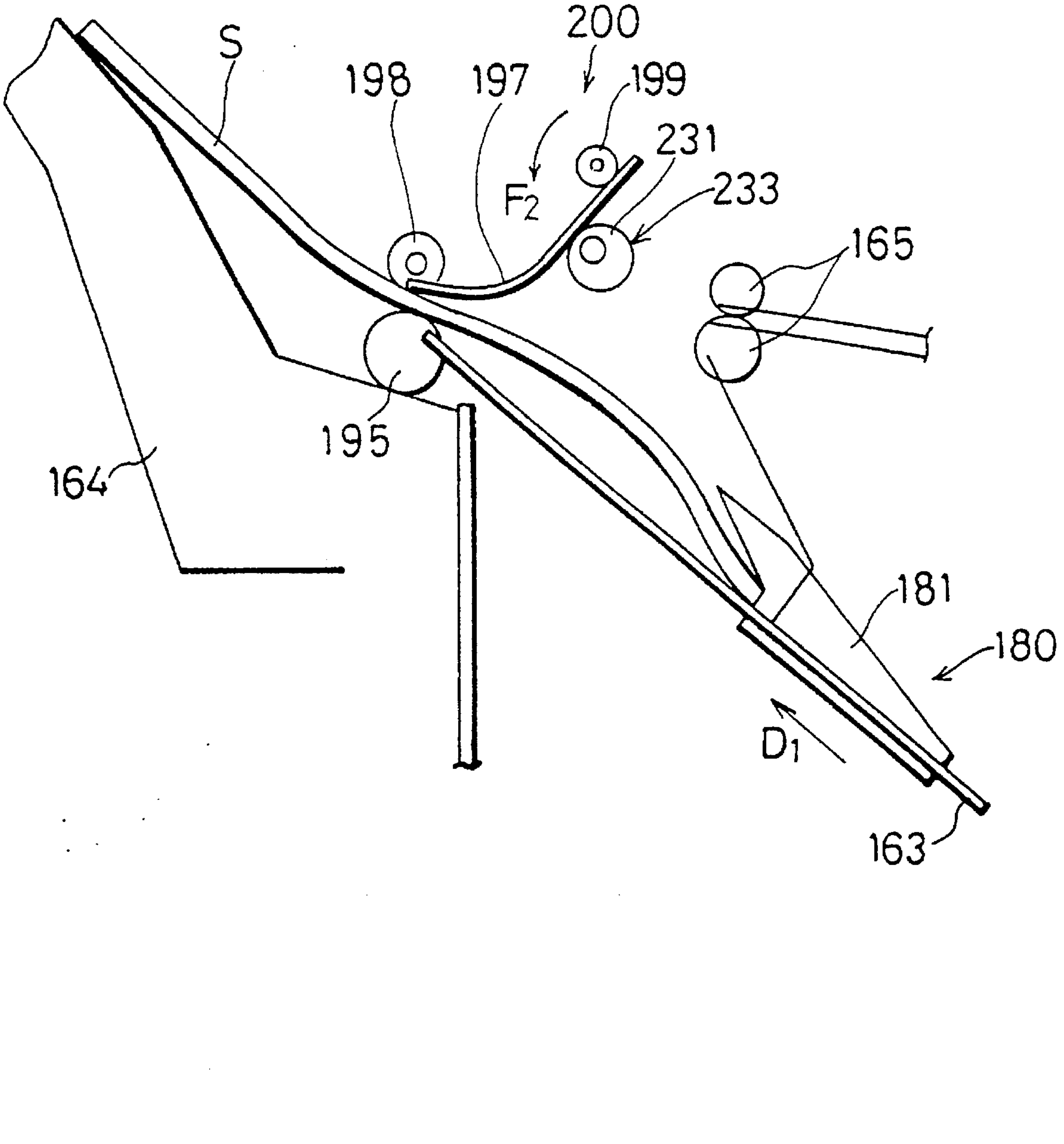
FIG. 88 is an explanatory view showing the state of the offset guide of the device for further processing after copying, which is moved to a closed position when the complete set is pushed out.
Figure 89A:
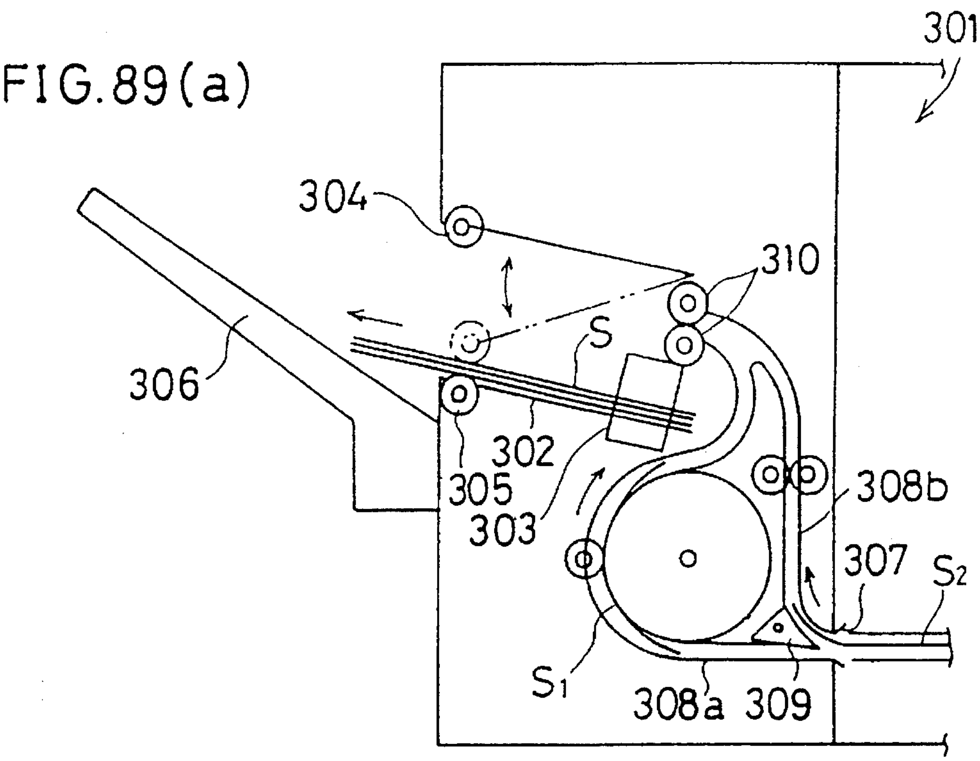
FIGS. 89(*a*)(*b*) are explanatory views respectively showing sheet transporting operations through the transport path in the conventional device for processing after copying.
Figure 89B:
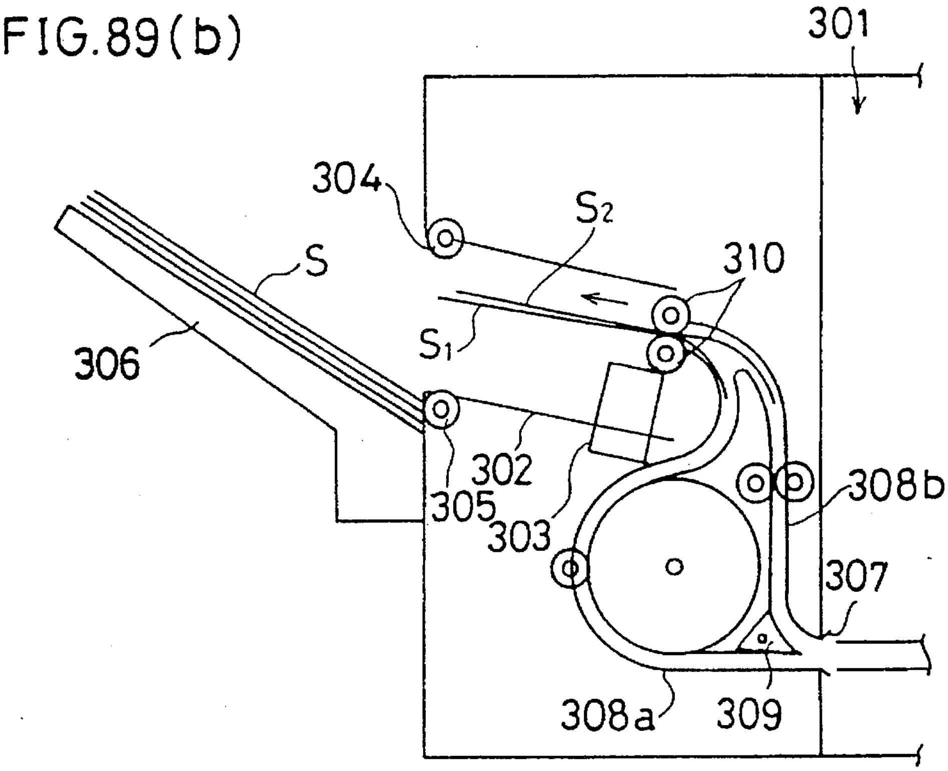
Figure 90:
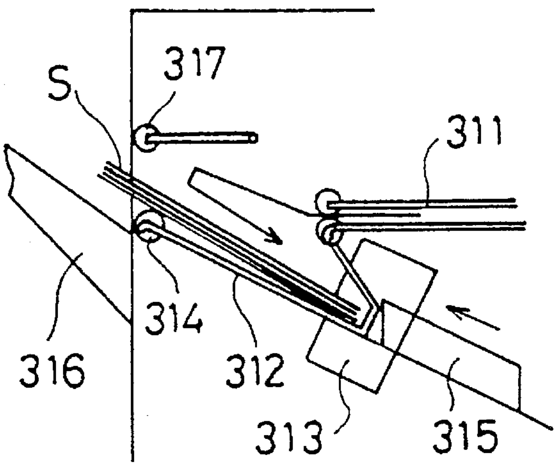
FIG. 90(*a*) is an explanatory view showing a process in the staple mode with the conventional device for further processing after copying.
Figure 90:
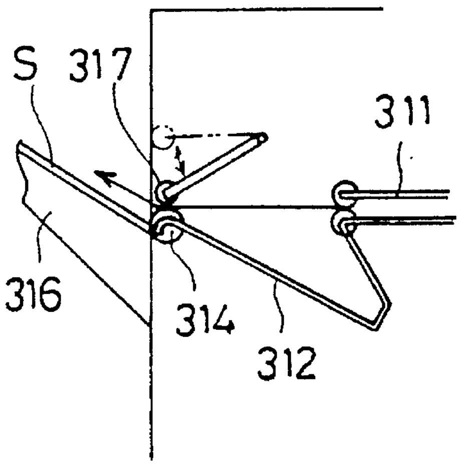
Figure 91:
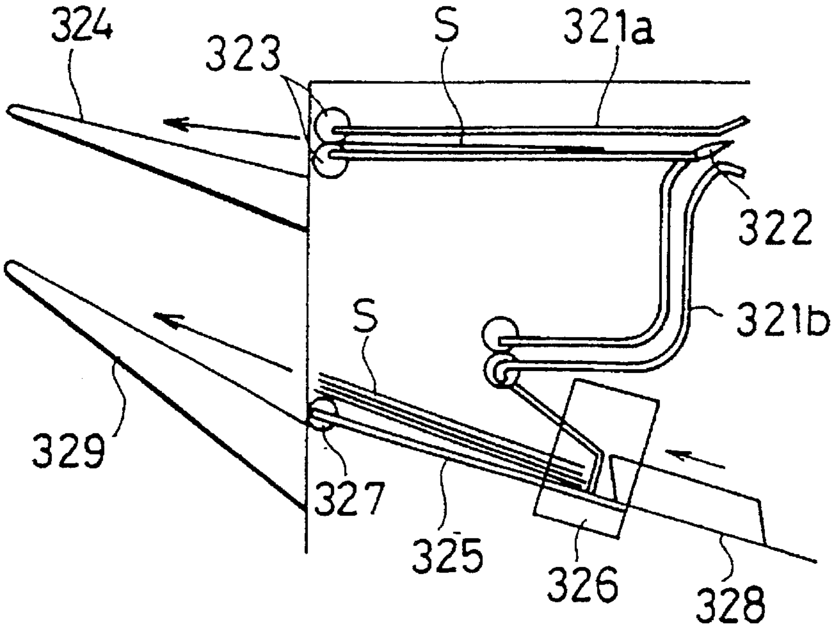
FIG. 91 is a longitudinal sectional view showing another conventional device for further processing after copying.
Figure 92:
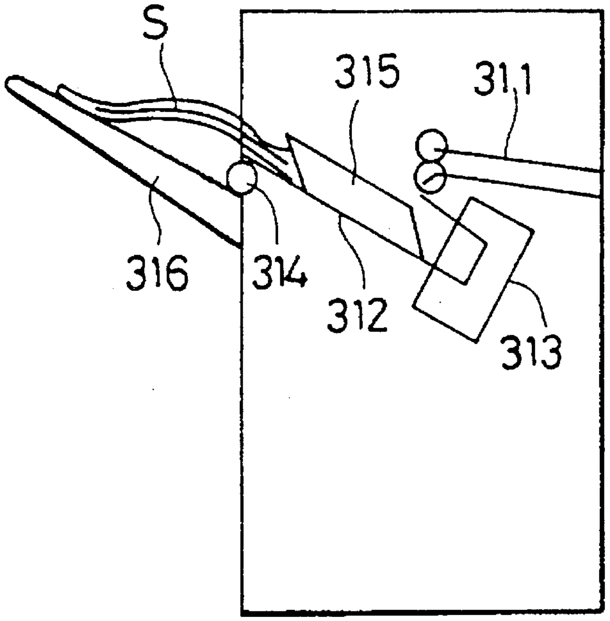
FIG. 92 is an explanatory view showing the state where the sheets are discharged onto the conventional discharge tray.
Figure 93:
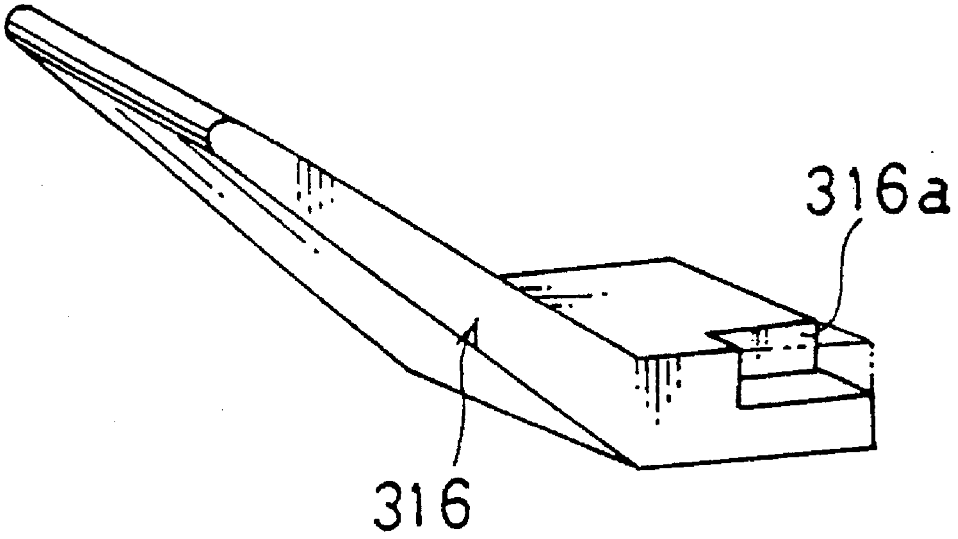
FIG. 93 is a perspective view showing the conventional discharge tray having a recessed portion.
Figure 94:
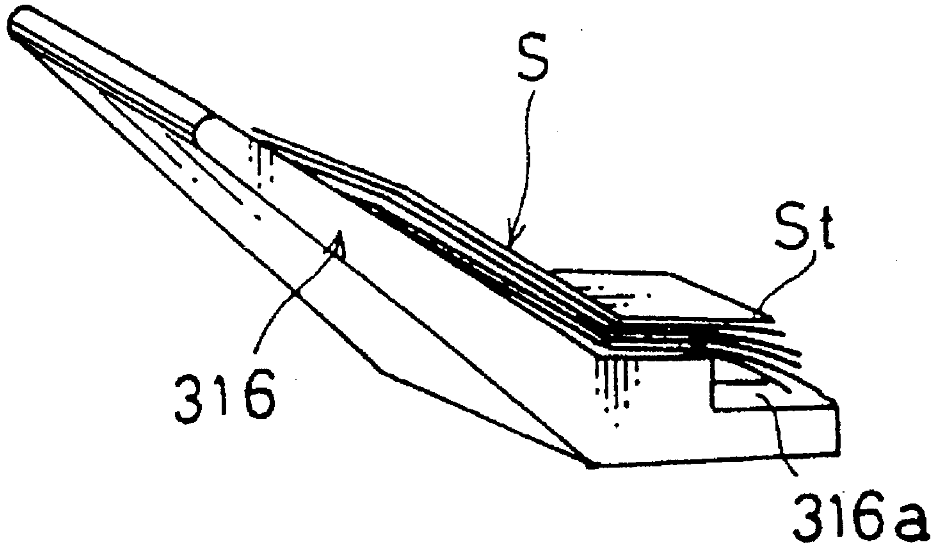
FIG. 94 is a perspective view showing the state where the complete set stacked on the discharge tray of FIG. 93.

As described, according to the device 291 for further processing after copying of the present embodiment, when the complete set is pushed out in S203, since the offset guide 197 is rotated to the contact position as shown in FIG. 88, even if the user pushes his hand into the discharge opening 234, the push-out member 181 will not hit his hand.

[EMBODIMENT 12]

The following description will discuss another embodiment of the present invention with reference to FIGS. 95 through 111. The embodiment is given through the case where a device for further processing after copying is contained in a copying machine.

Figure 97:
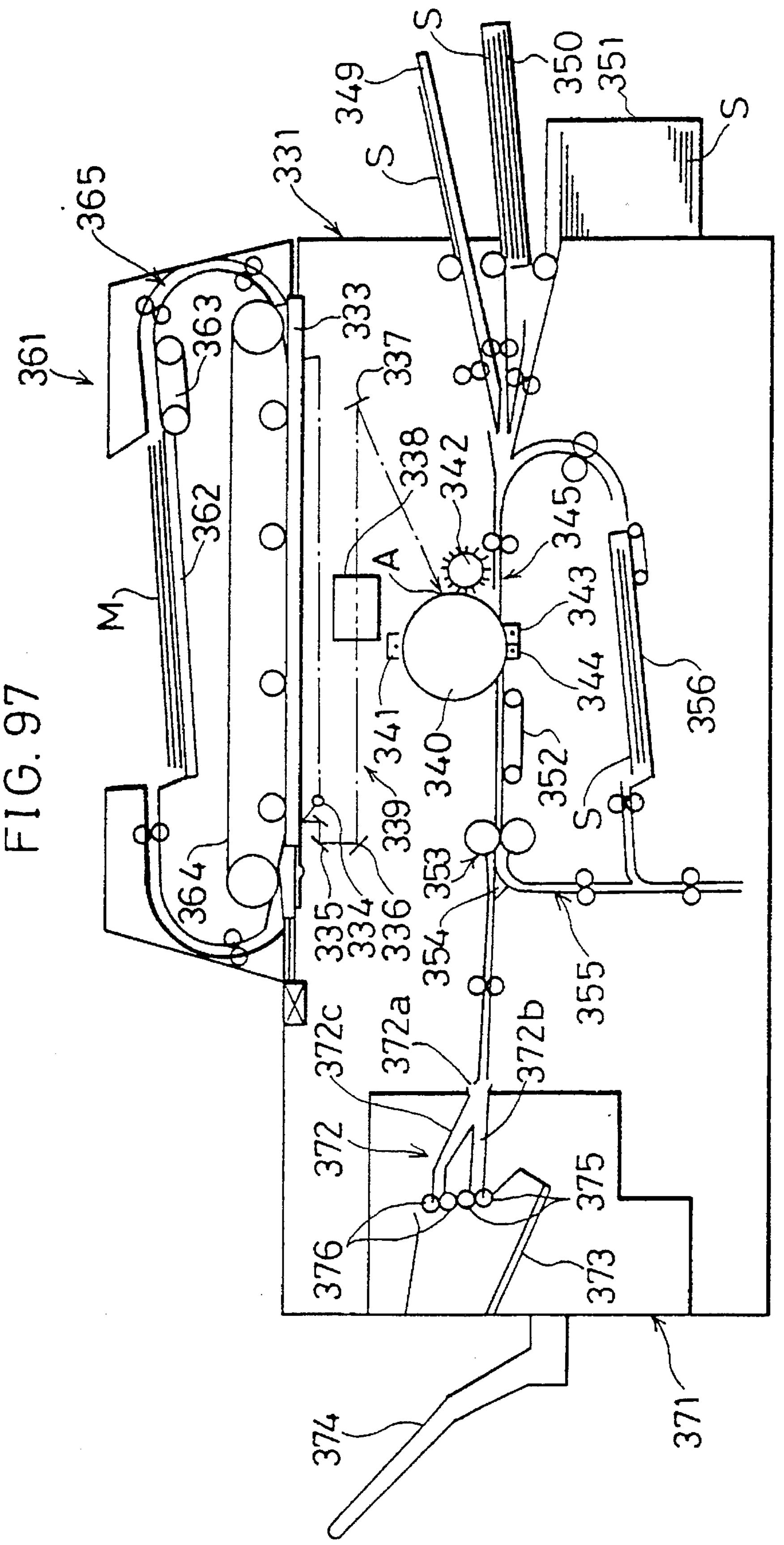
FIG. 97 is a view showing an entire configuration of the copying machine provided with the device for further processing after copying.

As shown in FIG. 97, a device 371 for further processing after copying is provided in a main body 331 of a copying machine. Further, a RDH (Recirculating Document Handler) 361, which is a kind of automatic document feeder, is provided on the main body 331, which transports a document M to a glass plate 333.

The glass plate 333 is placed on the upper side of the main body 331. Further, an optical system 339 and a photoreceptor drum 340 are placed under the glass plate 333. The optical system 339 includes a light source 334, mirrors 335, 336, and 337, and a lens 338. The optical system 339 is provided for scanning the document M using a light emitted from the light source 334, the document M being transported-onto the glass plate 333 by the RDH 151. Further, the reflected light from the document M is projected onto an exposure point A on the surface of the photoreceptor drum 340 through mirrors 335, 336 and 337, and the lens 338. As a result, a static latent image is formed on the surface of the photoreceptor drum 340 which is uniformly charged by a main charger unit 341, the static latent image corresponding to the image on the document M.

A main charger unit 341, a developer unit 342, a transfer charger 343, and a separation charger 344 are provided along the circumference of the photoreceptor drum 340. The developer unit 342 develops the electrostatic latent image formed on the surface of the photoreceptor drum 340 to be a toner image. Then, the transfer charger 343 transfers the toner image onto the sheet S. Then, the separation charger 344 separates the sheet S from the photoreceptor drum 340.

A sheet transport path 345 is provided under the photoreceptor drum 340, for transporting the sheets S to the photoreceptor drum 340. Further, a feed board 349, a feed cassette 350, and a feed deck 351, for feeding the sheets S, are placed respectively on the upstream of the sheet transport path 345. On the downstream of the sheet transport path 345, a transport belt 352 and a fuser 353 are provided. The transfer belt 352 transports the sheets S whereon the toner image has been transferred. The toner image is made permanent on the sheet S by the fuser 353.

On the downstream of the fuser 353, a deflector 354 is provided by which the transport path for the sheets S is branched into both a path connected to the device 371 for further processing after copying, and a re-transport path 355. The re-transport path 355 serves as a recirculation path through which the sheet S, whereon the toner image has been transferred by the photoreceptor drum 340, is transported again to the photoreceptor drum 340. Further, an intermediate tray 356 is provided along the path, which allows copying on both sides of the sheet S.

The RDH 361 includes a document tray 362 (located on top), a feed belt 363 (placed at one end of the document tray 362), and a feed belt 364 (placed on the glass plate 333), which are all connected by a document feed path 365 serving as a recirculation path. The RDH 361 feeds the document M placed on the document tray 362 onto the glass plate 333. Further, the RDH 361 sets the document M to a predetermined position on the glass plate 333 by the transport belt 364, and sends back the document M onto the document tray 362 after the document M has been scanned by the optical system 339.

Figure 95:
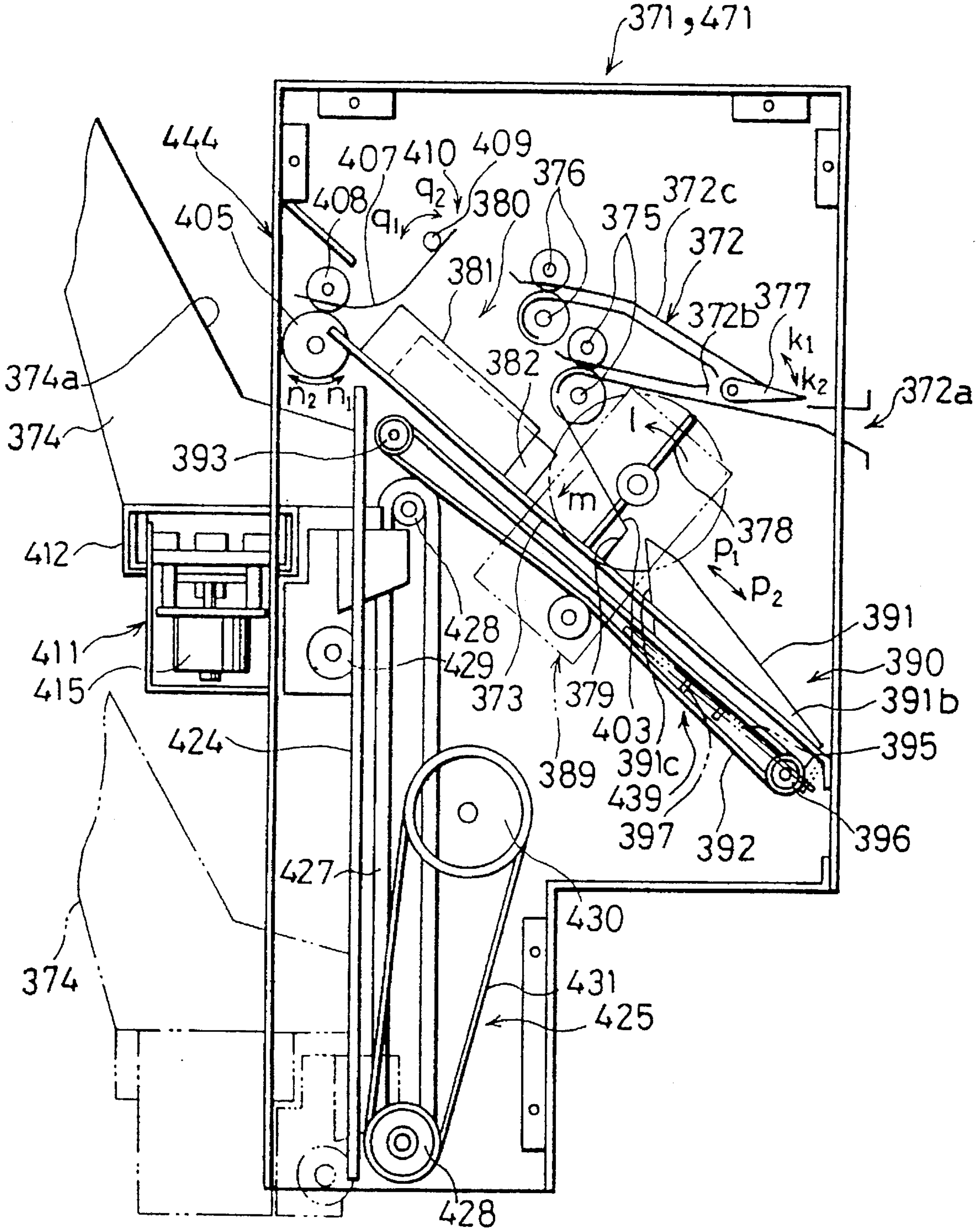
FIG. 95 is a view showing an entire configuration of a device for further processing after copying of another embodiment of the present invention, and is an enlarged view of the essential part of FIG. 96.
Figure 96:
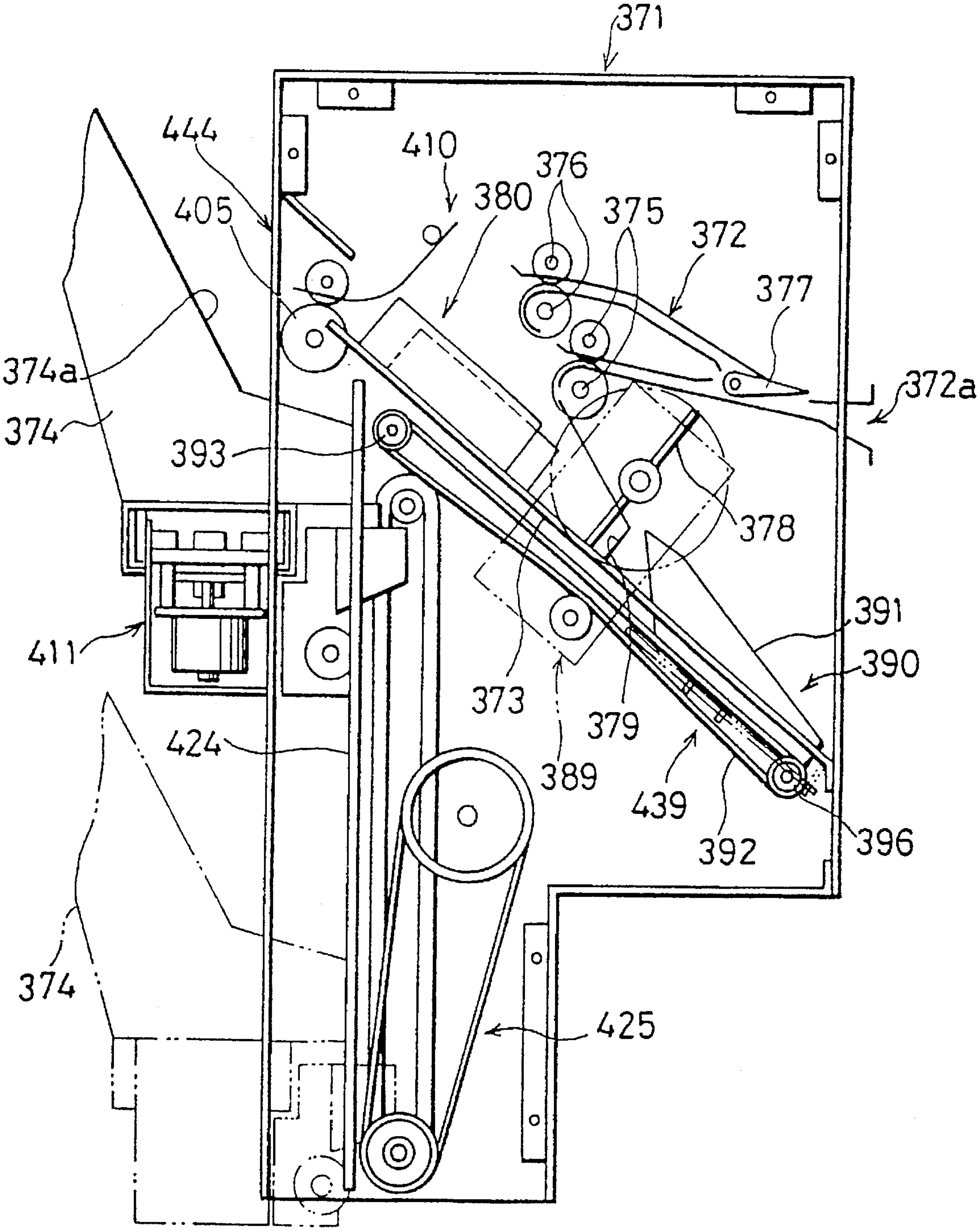
FIG. 96 is a view showing an entire configuration of the device for further processing after copying of FIG. 95.

As shown in FIGS. 95 and 96, the device 371 of the present embodiment is provided with a transport path 372, which transports the sheet S fed from the main body 331 within the device 371. In the transport direction of the sheet S through the transport path 372, a stapler plate 373 is provided on which the sheets S are to be placed. Furthermore, a discharge tray 374 is provided in the transport direction for the sheets S having come from the stapler plate 373.

Figure 98:
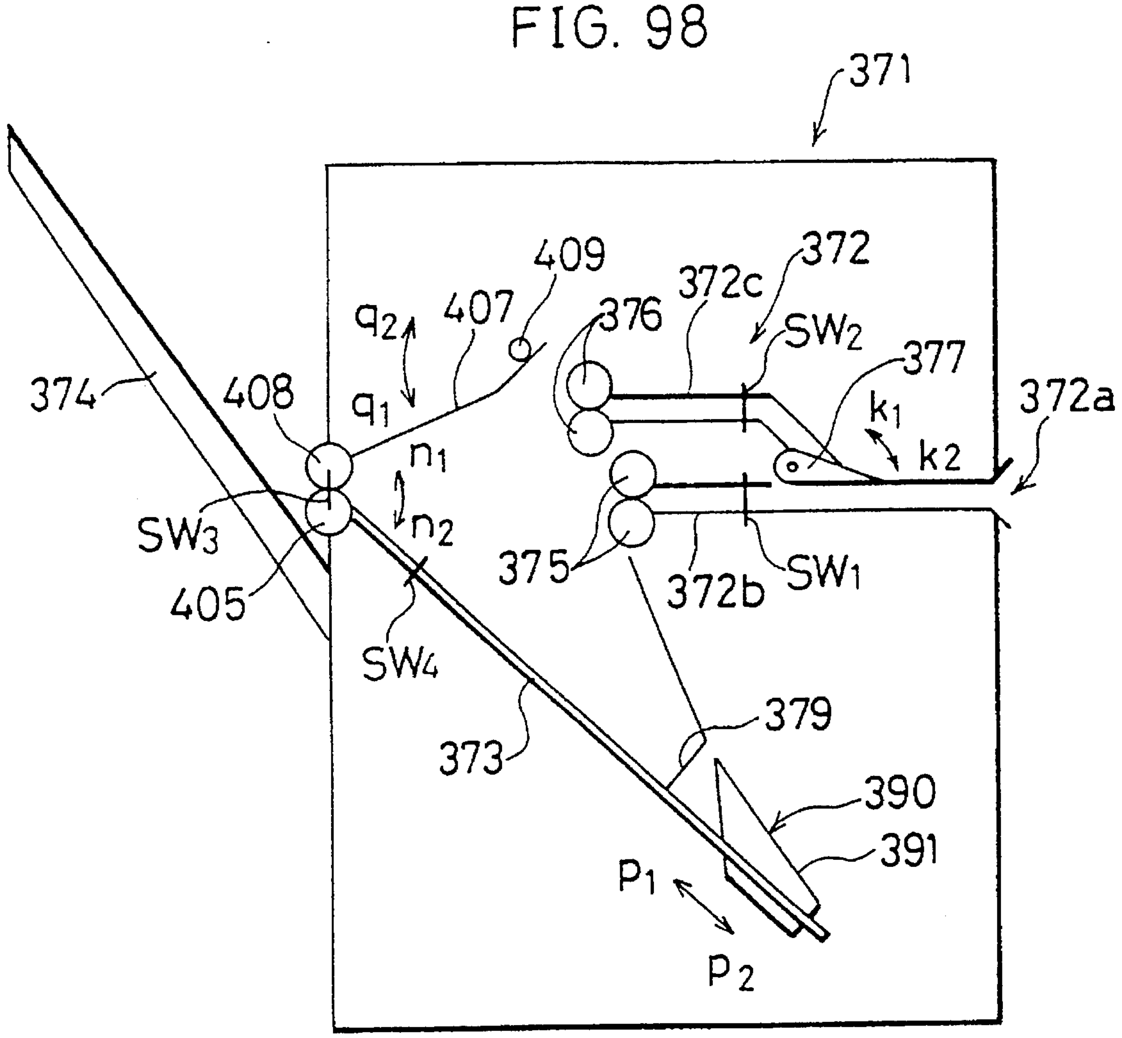
FIG. 98 is an explanatory view showing the respective positions of the detection switches of the device for further processing after copying of FIG. 95.

The transport path 372 has an entry opening 372*a* formed on one end thereof, through which the sheets S are fed from the main body 331. The transport path 372 is branched into upper and lower paths, i.e., a bypass 372*c* and a main pass 372*b*. The transport path 372 is further provided with a pair of upper and lower transport rollers 375 and transport rollers 376, placed at respective ends of the main pass 372*b* and the bypass 372*c*, and a deflector 377 placed at a branch point between the bypass 372*c* and the main pass 372*b*. The deflector 377, which serves as a means for switching the path, is capable of rotating in the direction of $k_1$–$k_2$, and switches the transport path for the sheet S either to the bypass 372*c* or to the main pass 372*b*. As shown in FIG. 98, for detecting the sheets S, the sheet detection switches $SW_1$ and $SW_2$ are respectively provided along the main pass 372*b* and the bypass 372*c*.

The stapler plate 373 is provided for placing thereon the sheets S to be bound (stapled) among those passed through the transport path 372. The stapler plate 373 is arranged such that the front portion in the transport direction of the sheets S is placed at a higher level than the end portion so as to form a slope. Further, the front portion reaches to the vicinity of the discharge opening 444 for the sheet S. A paddler 378 is provided on the stapler plate 373 such that the lower end of the blade section thereof is in contact with the top surface of the stapler plate 373 while being rotated in the direction of C. When the paddler 378 rotates, the blade section thereof releases the sheets S to the position where the rear edges of the sheets S are in contact with the stopper 379, thereby aligning the ends of the sheets S.

Figure 99:
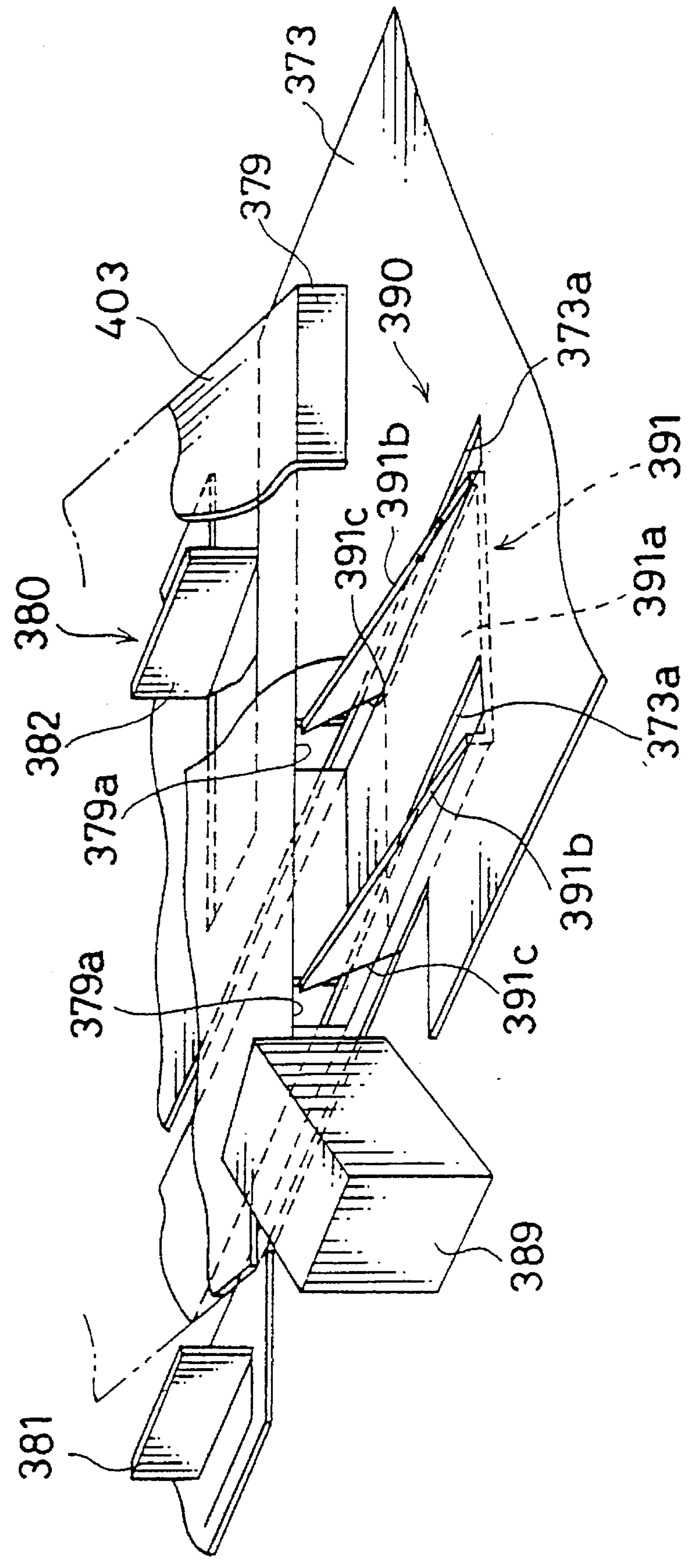
FIG. 99 is a perspective view showing the structure of the stapler plate without the paddler when looking at the back diagonally from the top.
Figure 100:
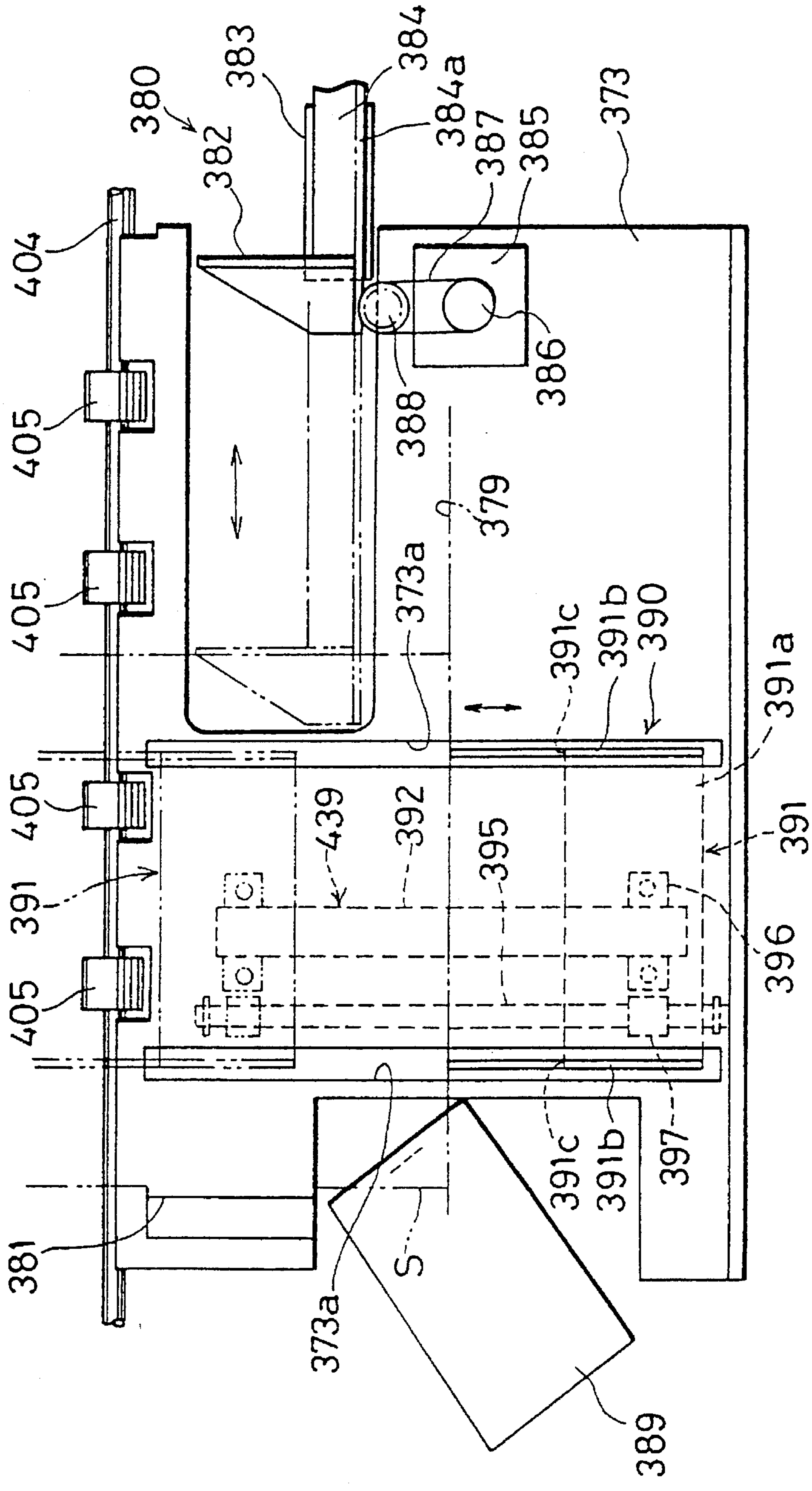
FIG. 100 is a perspective view of FIG. 95 in the direction of m.

As shown in FIGS. 99 and 100, an edge aligner 380 (aligning means) is provided on both sides of the stapler plate 373. FIG. 99 is a perspective view showing the structure of the stapler plate 373 without a paddler 378 when looking at the back diagonally from the top. FIG. 100 is a perspective view of FIG. 95 in the direction of m. The edge aligner 380 is composed of a positioning plate 381 and a side aligning plate 382, each serving as a sheet aligning member. The positioning plate 381 is fixed to one side of the stapler plate 373. The side aligning plate 382 is capable of moving in the widthwise direction of the sheet S so as to align the sides of the sheets S.

As shown in FIG. 100, the side aligning plate 382 is provided on a support plate 384 which is capable of moving in the widthwise direction of the stapler plate 373 by a guide rail 383. Along the side of the support plate 384, a rack gear 384*a* is provided. Furthermore, the power from a side aligning plate drive motor 385 is transmitted to the rack gear 384*a* via a pulley 386, a belt 387 and a pinion gear 388. As a result, the side aligning plate 382 is moved in the widthwise direction of the stapler plate 373, and aligns the sheets S so as to fit them to the reference position set by the positioning plate 381. When the edge aligning plate 382 aligns the sheets S, the edge aligning plate drive motor 385 is controlled by the control unit (not shown), which serves as the control means. Therefore, the edge aligning plate 382 aligns the sheets S according to the width of the sheets S.

At the back of the positioning plate 381 in the edge aligner 380, a stapler 389 is provided, which staples the corner between the stopper 379 side and the positioning plate 381 side of the sheets S aligned on the stapler plate 373.

As shown in FIG. 100, a rotation shaft 404 is provided at the front portion of the stapler plate 373, extending in the widthwise direction of the stapler plate 373. Furthermore, the rotation shaft 404 is provided with a plurality of discharge rollers 405. The rotation shaft 404 is connected to a discharge roller drive motor (not shown) which drives the rotation shaft 404. As the rotation shaft 404 is driven by the discharge roller drive motor, the discharge roller 405 rotates in the direction of $n_1$–$n_2$ as shown in FIG. 95. More concretely, with the rotation of the discharge roller 405 in the direction of $n_2$, the sheets S placed on the stapler plate 373 are moved towards the stopper 379 so as to aid in aligning the ends of the sheets S. Whereas, with the rotation of the discharge roller 405 in the direction of $n_1$, the complete set is discharged onto the discharge tray 374.

A driven roller 408, provided above the discharge roller 405, is rotatably supported by one end of the offset guide 407 of the offset guide unit 410. The offset guide unit 410 is composed of the offset guide 407 and an offset guide drive unit (not shown). The other end of the offset guide 407 is rotatably supported by a fulcrum 409. The offset guide 407 is provided for guiding the top surface of the sheet S fed through the main pass 372*b* in the offset mode when the sheet S is discharged onto the discharge tray 374.

As shown in FIG. 96, the discharge tray 374 is arranged as follows. The bottom part, corresponding to the discharge roller 405, of the top surface of the discharge tray 374 is made concave to be the lowest part 374*a*. On the other hand, the slope of the upper part of the discharge tray 374 is set substantially the same as that of the stapler plate 373.

Further, a discharge tray 374 is provided on the tray shift unit 411. The tray shift unit 411 is provided with a shift frame 412 which extends in the widthwise direction of the stapler plate 373. The shift frame 412 is supported so as to be movable in the widthwise direction of the stapler plate 373. Then, as the power of the tray shift motor 415 is transmitted to the shift frame 412 via a plurality of gears, the shift frame 412 is shifted. As a result, the discharge tray 374 and the tray back plate 424 of FIG. 95 are integrally shifted in the widthwise direction of the stapler plate 373.

The discharge tray 374 is moved up and down by a tray elevator unit 425 as shown in FIG. 95. The tray elevator unit 425 is composed of a tray elevator motor (not shown), a belt 427, belt support rollers 428, an auxiliary elevator roller 429, a pulley 430, and a belt 431. The belt 427, which is supported by the belt support rollers 428, is provided in an up-down direction in the inner side of the tray back plate 424. The auxiliary elevator roller 429, which is provided in the tray shift unit 411, is pressurized on the outer surface of the tray back plate 424. The pulley 430 is provided on the drive axis of the tray elevator motor. The belt 431 is provided so as to surround the pulley 430 and the lower belt support roller 428. The tray shift unit 411 is connected to the belt 427, and as the belt 427 is driven by the tray elevator motor, the discharge tray 374 is raised and lowered.

As shown in FIGS. 99 and 100, the push-out unit 390 (sheet push-out means) is provided at the lower end of the stapler plate 373. The push-out unit 390 is composed of a push-out member 391 and a push-out member drive unit 439 (push-out member drive means) in FIG. 95. The push-out member 391 is provided for pushing out the sheets S, placed on the stapler plate 373, onto the discharge tray 374. The push-out member drive unit 439 controls the push-out member 391 so as to push up the sheet S on the stapler plate 373 in the direction of $p_1$, and moves downward in the direction of $p_2$ along the stapler plate 373 as shown FIG. 95. The push-out member drive unit 439 is provided with a push-out belt 392 connected to a push-out member 391, belt support rollers 393 and a push-out member drive motor (not shown), and it is also provided with a guide shaft 395, a connection member 396, and a sliding member 397 as shown in FIG. 100.

The push-out member 391 has a base plate 391*a* with edges 391*b* of the same length along the sides thereof. Furthermore, sheet contact faces 391*c* are respectively provided in front of the edges 391*b*, so that the rear edges of the sheets S are in contact therewith. The sheet contact face 391*c* of the push-out member is arranged such that the upper end thereof is projected toward the discharge tray 374 with respect to the lower end. This projection of the upper end prevents the rear edge of the complete set from being caught by the sheet contact face 391*c* of the push-out member 391. Therefore, the complete set can be smoothly discharged onto the discharge tray 374.

Figure 101:
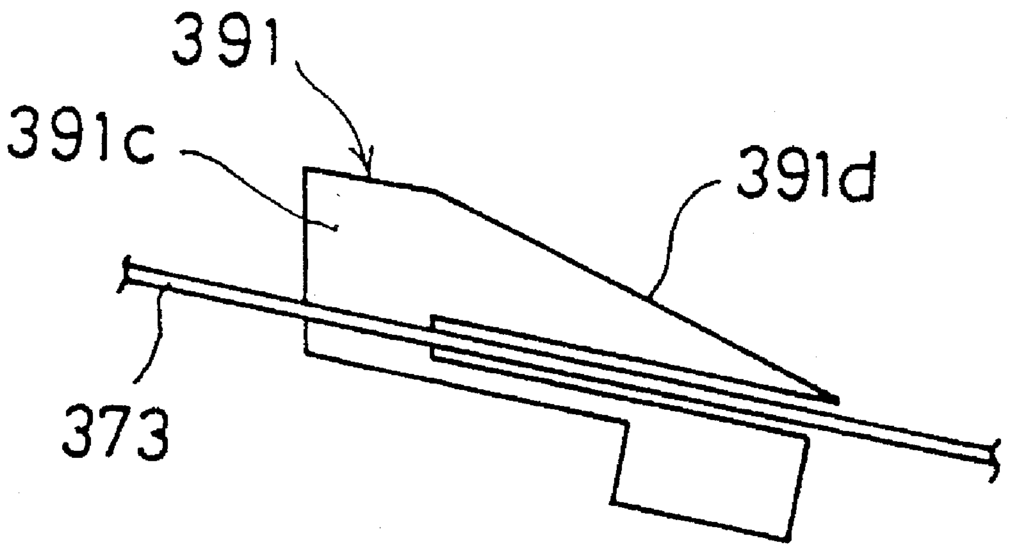
FIG. 101 is an explanatory view showing the shape of a push-out member of the device for further processing after copying.

As shown in FIG. 101, a guide section 391*d* is provided on the lower side of the push-out member 391. The guide section 391*d* is formed so as to slope downward from substantially the center of the push-out member 391 toward the lower end of the push-out member 391. As described, since the guide section 391*d* is provided on the push-out member 391, the sheet S, discharged through the transport rollers 375 shown in FIG. 96, is prevented from being transported backward by the downward motion of push-out member 391 to the retreat position in the direction of $p_2$. As a result, a smooth movement of the push-out member 391 can be obtained.

The push-out member 391 is arranged such that the edges 391*b* are projected through slots 373*a* formed on the stapler plate 373.

The push-out belt 392, provided under the stapler plate 373, is supported so as to be moved in the direction of $p_1$–$p_2$ parallel to and along the top surface of the stapler plate 373 by belt support rollers 393. The push-out belt 392 is connected to the base plate 391*a* of the push-out member 391 by the connection member 396. Furthermore, the push-out member drive motor (not shown) is connected to either one of the belt support rollers 393. The guide shaft 395 is supported by the bottom surface of the stapler plate 373. As the sliding member 397, which is capable of sliding along the guide shaft 395, is connected to the base plate 391*a* of the push-out member 391, the push-out member 391 is guided by the guide shaft 395, and the push-out member 391 can move both upward and downward in the direction of $p_1$–$p_2$.

A sheet guide plate 403 is provided so that the lower end thereof is connected to the stopper 379 between upper end of the stopper 379 on the stapler plate 373 and the bottom of the transport roller 375 under the main pass 372*b*. Furthermore, slots 379*a* are formed on the stopper 379, so that the push-out member 391 can pass therethrough as shown in FIG. 99.

As shown in FIG. 98, the stapler plate 373 is provided with the sheet detection switch $SW_3$ and the push-out sheet detection switch $SW_4$. The sheet detection switch $SW_3$ is provided at the leading edge in the direction of $p_1$ of the stapler plate 373, and detects the discharge of the sheets S onto the discharge tray 374. On the other hand, the push-out detection switch $SW_4$ is turned ON/OFF by the shift of the push-out member 391 in the push-out unit 390. When the sheet S placed on the stapler plate 373 is pushed out by the push-out member 391 onto the discharge tray 374, the push-out detection switch $SW_4$ detects the sheet S directly before being completely pushed out. In addition, as to the means for detecting the above state of the sheet S, for example, a timer may be used rather than the push-out detection switch $SW_4$. Here, the timer counts the time passed when the shift of the push-out member 391 starts.

The device 371 for further processing after copying is provided with a control unit which controls the above units based on the inputs from the sheet detection switches $SW_1$, $SW_2$, $SW_3$, the push-out detection switch $SW_4$, and the input from a control unit (not shown) in the main body 331. The control unit is composed of a memory device, and a micro computer provided with a counter and a timer, etc. The control unit controls the above members as will be described later according to each of the offset mode, the single staple mode, and the multiple staple mode to be set in the main body 331.

In the offset mode, the sheets S, transported from the main body 331, are discharged one by one onto the discharge tray 374 without being further processed. Whereas, in the single staple mode, the sheets S, transported from the main body 331, go through a predetermined binding process. Then, the bound set of sheets S (hereinafter referred to as a complete set) is discharged onto the discharge tray 374, and accordingly, a plurality of complete sets are discharged set by set in the multiple staple mode.

With the above arrangement, the following will explain the operation of the device 371 for further processing after copying based on the control of the control unit.

Figure 102:
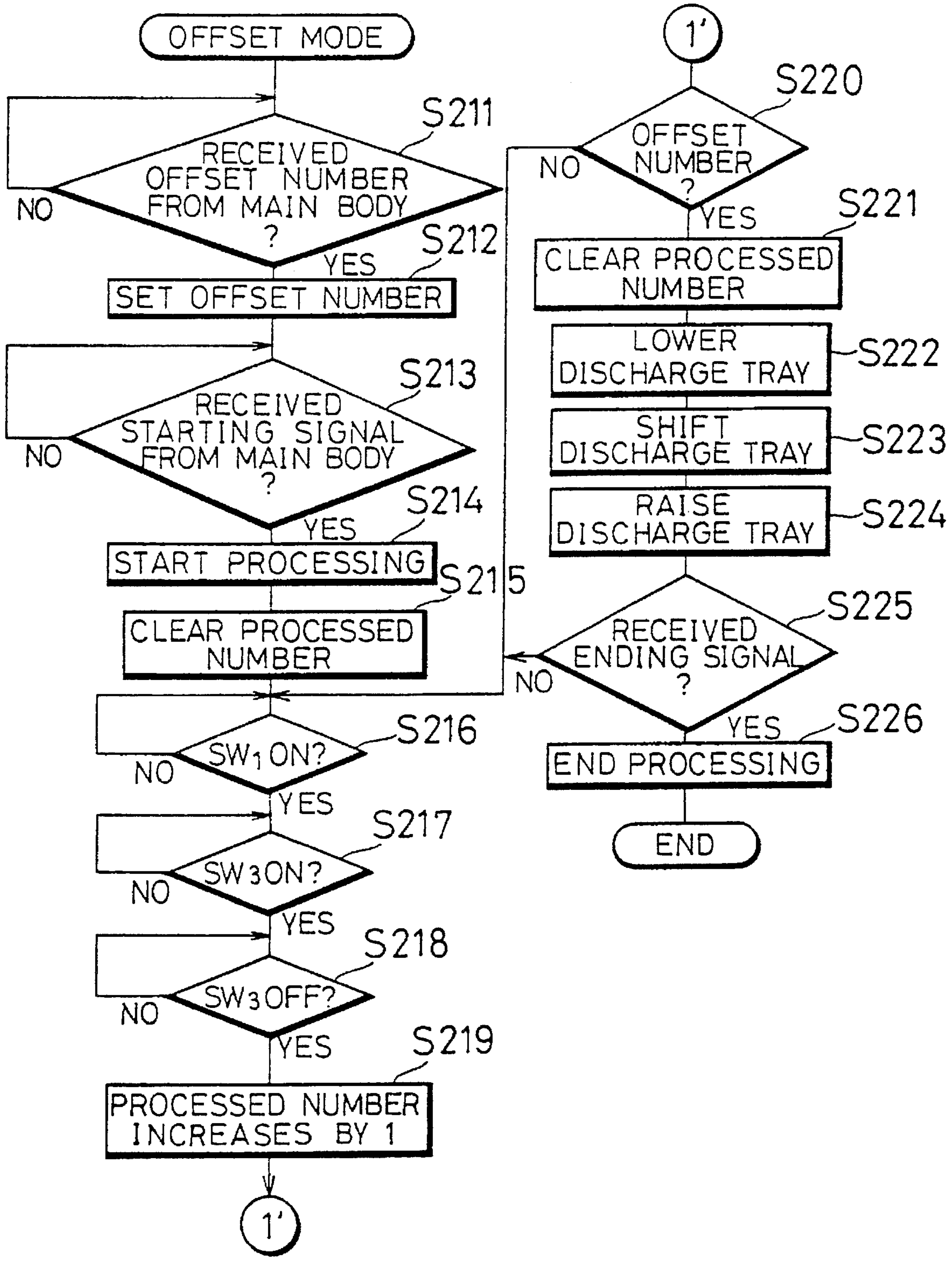
FIG. 102 is a flow chart showing a process in an offset mode with the device for further processing after copying of FIG. 95.

As shown in the flow chart of FIG. 102, in the offset mode, first, the offset number, i.e., the number of sheets to be copied, is set in the main body 331, and a signal indicating the offset number is sent from the control unit of the main body 331. When the control unit of the device for further processing after copying 371 receives the signal (S211), the offset number is set in the memory (S212). Next, the control unit of the device 371 receives a signal to start the operation from the main body 331 (S213), and the starting process is executed (S214). Then, the counter which counts the processed number is cleared (S215).

The starting process of S214 includes, for example, the following operations: the deflector 377 is driven in the direction of $k_1$; the discharge tray 374 is shifted to a predetermined position by the elevator unit 425; the offset guide 407 is driven in the direction of $q_1$ by the offset guide drive unit so that the driven roller 408 is in contact with the discharge roller 405; the discharge roller 405 is rotated in the direction of $n_1$; and the transport rollers 375 are rotated.

Thereafter, when the sheet S, whereon the image on the document M has been copied, is fed through the entry opening 372*a* of the transport path 372 from the main body 331, the sheet S passes through the main pass 372*b*, and is then discharged through a path between the discharge roller 405 and the driven roller 408. This transportation of the sheet S through the main pass 372*b* is detected as the sheet detection switch $SW_1$ is turned ON (S216). Similarly, the transportation of the sheet S between the rollers 405 and 408 is detected as the sheet detection switch $SW_3$ is turned ON (S217) and OFF (S218). Then, the processed number increases by 1 (S219).

Next, the control unit of the device 371 determines whether or not the current processed number equals to the offset number (S220). If not, the sequence goes back to S216. If so, the processed number of the counter is cleared (S221), the discharge tray 374 is lowered (S222), and the tray shift unit 411 is shifted (S223). Thereafter, the tray is raised back to the predetermined position (S224). Additionally, the discharge tray 374 is shifted in S223 so as to distinguish the set of sheets S discharged on the discharge tray 374 by the current discharging operation from the set of sheets S discharged by the next discharging operation.

Thereafter, it is determined whether or not a signal to stop the operation is received from the main body 331 (S225). If not, the sequence moves back to S226. If so, the process is ended (S216), thereby terminating the sequence.

Figure 103:
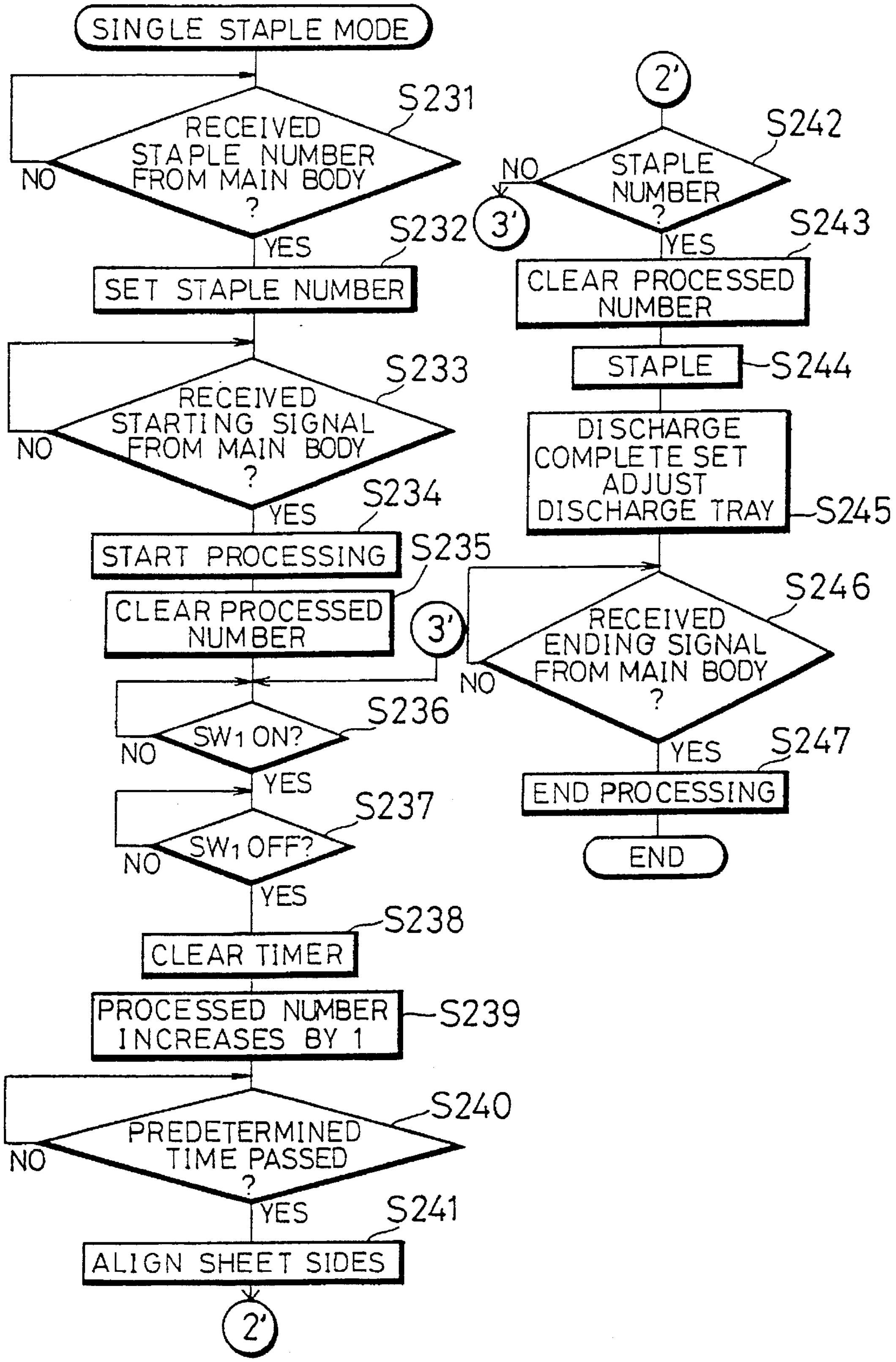
FIG. 103 is a flow chart showing a process in a single staple mode with the device for further processing after copying of FIG. 95.

As shown in the flow chart of FIG. 103, in the single staple mode, a signal indicating the number of sheets to be stapled is received from the control unit of the device 371 (S231), and the number to be stapled is set in the memory (S232). When a signal to start the operation is received from the main body 331 (S233), a predetermined starting process is carried out (S234), and the counter for counting the processed number is cleared (S235).

The starting process of S234 includes, for example, the following operations: the deflector 377 is driven in the direction of $k_1$; the discharge tray 374 is moved to the predetermined position; the offset guide 407 is driven in the direction of $q_2$; the discharge roller 405 is rotated in the direction of $n_2$; the paddler 378 is rotated in the direction of l; and the transport rollers 375 are rotated.

Thereafter, when the sheet S is fed from the main body 331 through the entry opening 372*a* of the transport path 372, the sheet S is sent out toward the discharge roller 405 by the transport rollers 375 through the main pass 372*b*. When the sheet S is placed on the stapler plate 373 by the discharge roller 405 rotating in the direction of $n_2$ and the paddler 378 rotating in the direction of l, the rear edge of the sheet S is in contact with the stopper 379.

Here, the transportation of the sheet S through the main pass 372*b* is detected as the sheet detection switch $SW_1$ is turned ON (S236) and OFF (S237). As a result, the timer of the control unit is cleared (S238), and the processed number increases by 1 (S239).

Thereafter, when a predetermined time set by the timer has passed (S240), it is determined that the sheets S are placed on the stapler plate 373. The edge aligner 380 moves the sheets S to the reference position set by the positioning plate 381 and aligns the sides of the sheets S (S241).

Next, the control unit determines whether or not the current processed number equals to the offset number set beforehand (S242). If not, the sequence moves back to S236. If so, the counter for counting the processed number is cleared (S243), and a stapling operation is carried out by the stapler 389 (S244).

Next, the discharge of the complete set and the adjustment of the discharge tray 164 are carried out (S245). As shown in the flow chart of FIG. 104, S245 is a sequential process for discharging the complete set from the stapler plate 373 onto the discharge tray 374 and for adjusting the position of the discharge tray 374. More concretely, first the discharge roller 405 rotates in the direction of $n_1$ (S251). Then, the push-out member 391 is pushed upward in the direction of $p_1$ by the push-out member drive unit 439 (S252). The operation in S252 is for pushing out the complete set on the stapler plate 373 onto the discharge tray 374. Next, when the push-out detection switch $SW_4$ is turned ON by the shift of the push-out member 391 (S253), the discharge tray 374 is lowered (S254). Then, after the complete set has been pushed out by the push-out member 391, the push-out member 391 is moved downward (S255). Next, the discharge tray 374 is shifted by the tray shift unit 411 (S256). Thereafter, the discharge tray 374 is raised to the predetermined position (S257).

When the device 371 receives a signal to stop the operation from the main body 331 (S246), the process is ended (S247), and the above sequence is terminated.

When pushing out the complete set in S252, if the upper end of the sheet contact face 391*c* is not projected toward the discharge tray 374 with respect to the lower end thereof, the rear edge of the complete set, pushed out by the push-out member 391 of the push-out unit 390, would likely to be caught by the sheet contact face 391 on the discharge tray 374, and the complete set may not be smoothly pushed out.

Figure 105:
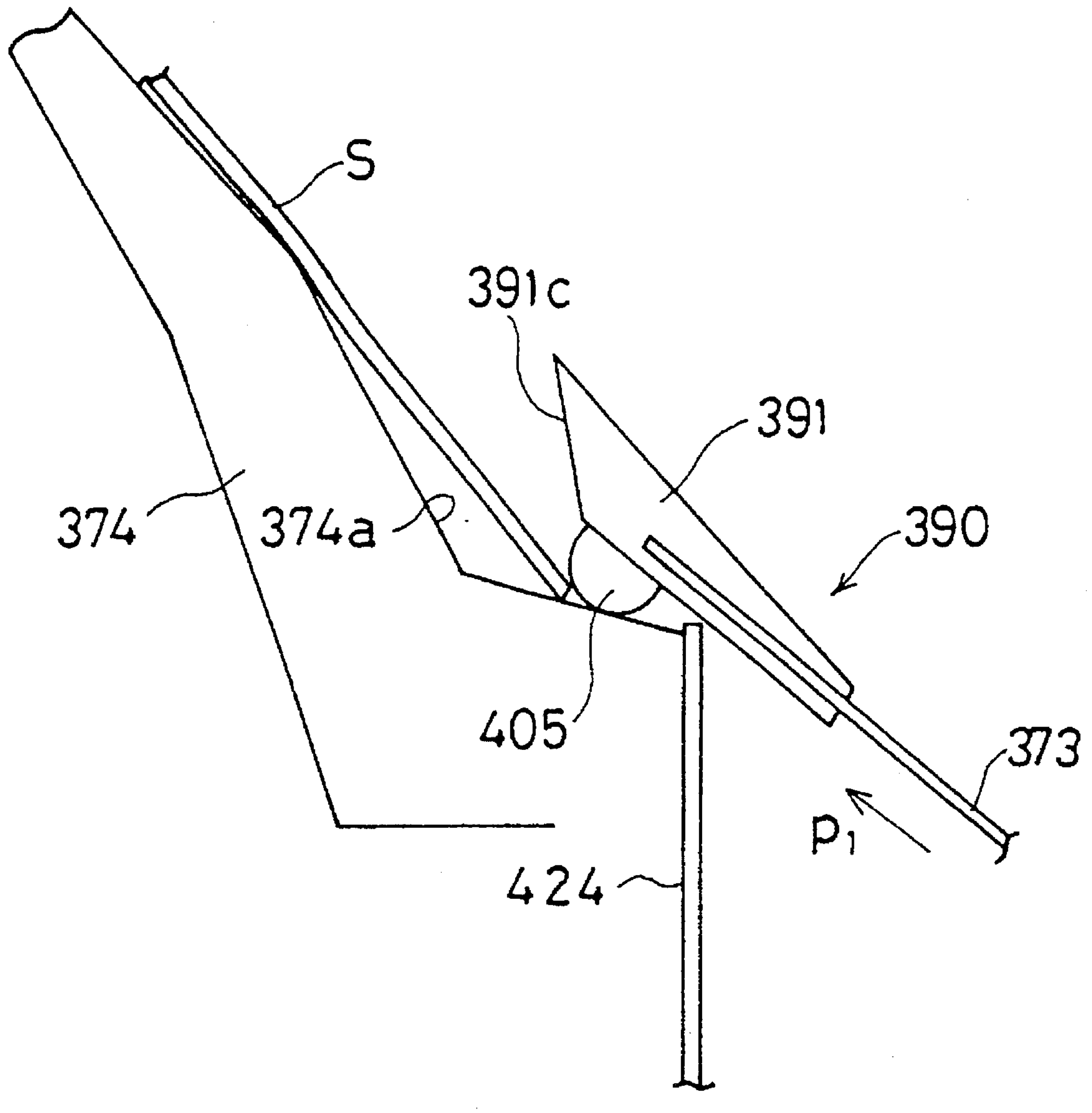
FIG. 105 is an explanatory view showing the complete set when pushed out by the push-out unit.

According to the device 371 for further processing after copying, the sheet contact face 391*c* of the push-out member is arranged such that the upper end thereof is projected toward the discharge tray 374 with respect to the lower end. As shown in FIG. 105, this projection of the upper end prevents the rear edge of the complete set from being caught by the sheet contact face 391*c* of the push-out member 391. Therefore, the complete set can be smoothly pushed out.

The flow charts of FIGS. 106 through 110 explain the process in the multiple staple mode. Here, the discharge of the complete set and the adjustment of the discharge tray in each flow chart are shown in the flow chart of FIG. 104.

Figure 106:
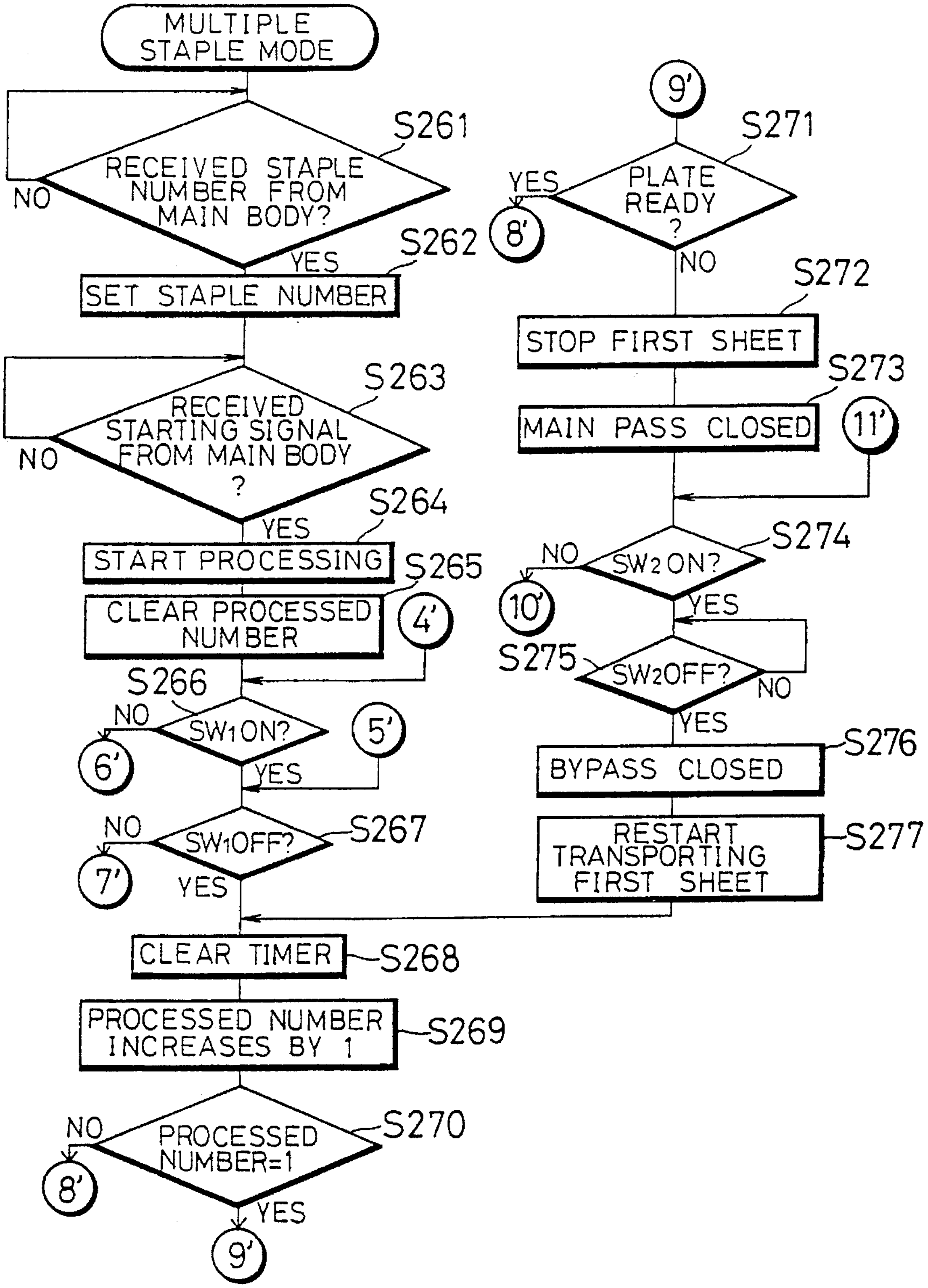
FIG. 106 is a flow chart showing a part of a process in a multiple staple mode with the device for further processing after copying.
Figure 107:
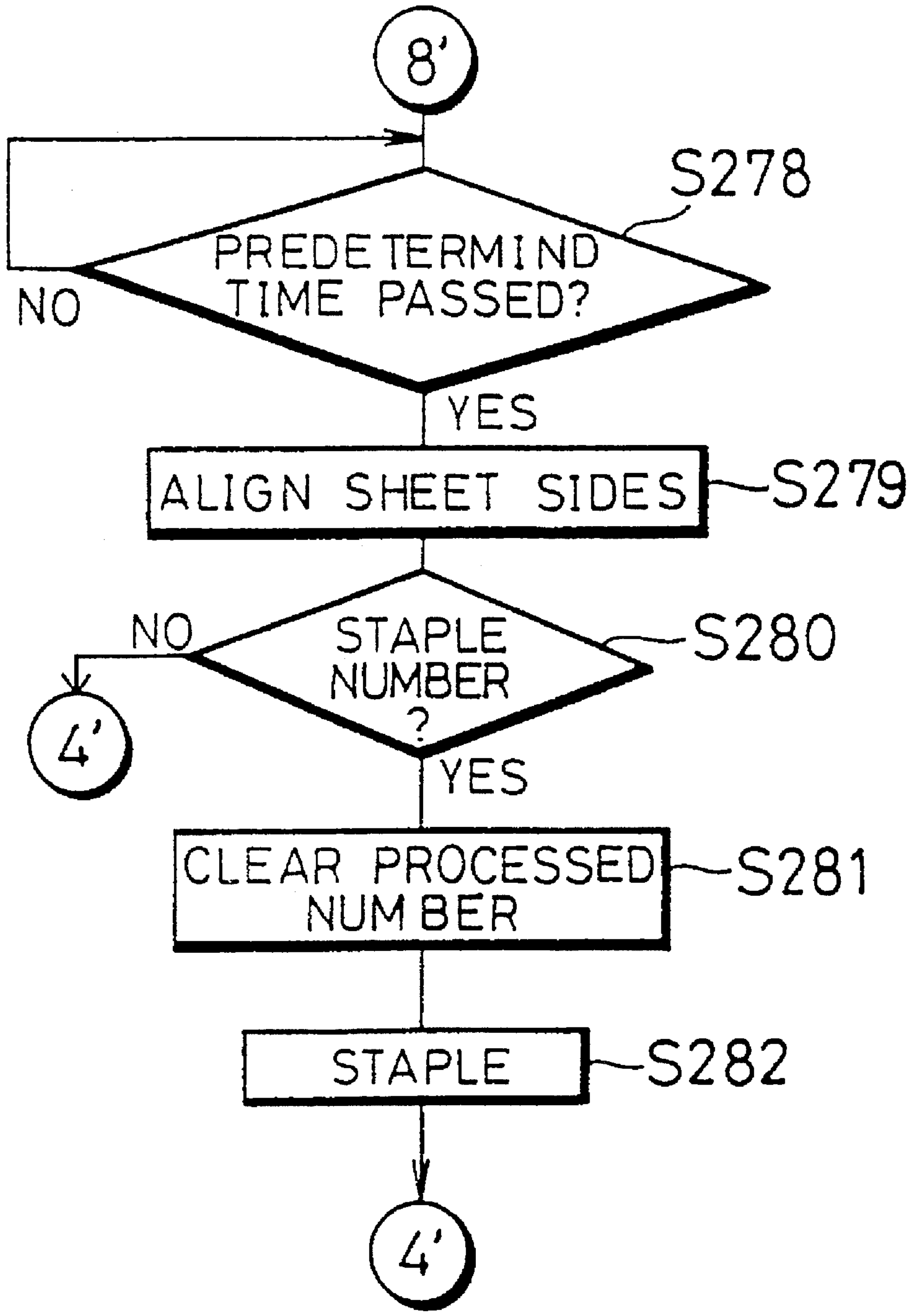
FIG. 107 is a flow chart showing a part of a process in a multiple staple mode with the device for further processing after copying.

First, as shown in FIG. 106, when the control unit of the device 371 receives a signal indicating the staple number for each complete set (S261), the staple number is set in the memory (S262). Next, the control unit receives a signal to start the operation from the main body 331 (S263). Then, the starting process is executed (S264), and the counter for counting the processed number is cleared (S265).

The starting process of S264 includes, for example, the following operations: the deflector 377 is driven in the direction of $k_1$, the discharge tray 374 is positioned to the predetermined position; the offset guide 407 is driven in the direction of $q_2$; the discharge roller 405 is rotated in the direction of $n_2$; the paddler 378 is rotated in the direction of l; and the transport rollers 375 and 376 are rotated.

When the first sheet $S_1$ of the first set is fed from the main body 331 into the entry opening 372*a* of the transport path 372, the sheet S is sent out to the discharge roller 405 by the transport rollers 375 through the main pass 372*b*. Here, when the sheet S is placed on the stapler plate 373, the rear edge of the sheet S is in contact with the stopper 379 by the discharge roller 405 rotating in the direction of $n_2$ and the paddler 378 rotating in the direction of l.

The transportation of the sheet S through the main pass 372*b* is detected as the sheet detection switch $SW_1$ is turned ON (S266) and OFF (S267). Then, the control unit clears the timer (S268), and the processed number increases by 1 (S269).

Here, since the sheet S which is being transported through the main pass 372*b* is the first sheet $S_1$ of the first set, the processed number is 1 (S270). Moreover, since the stapler plate 273 is ready whereon no sheet S is placed (S271), the sequence skips to S278 of FIG. 107. Then, after a predetermined time has passed, the sides of the sheets S are aligned by the edge aligner 380 (S279). Here, since the number of sheets S does not reach the staple number (S280), the sequence goes back to S266.

Next, as the second sheet $S_2$ of the first set is fed to the main pass 372*b*, the operations in S266–S269 are carried out. Here, as the processed number is 2 (S270), the sequence moves to S278 of FIG. 107. Then, after carrying out the operations in S278 and S279, if the number of sheets S reaches the staple number, i.e., when the set staple number equals 2 (S280), the counter for counting the processed number is cleared (S281). Then, the sequence moves back to S266 after carrying out the stapling operation by the stapler 389 (S282).

If the number of sheets S does not reach the stapler number in S280, the operations in S266–S270 and S278–S280 are carried out until the number of sheets S reaches the stapler number. When reached, the sequence moves back to S266 after carrying out the operations is S281 and S282.

Figure 108:
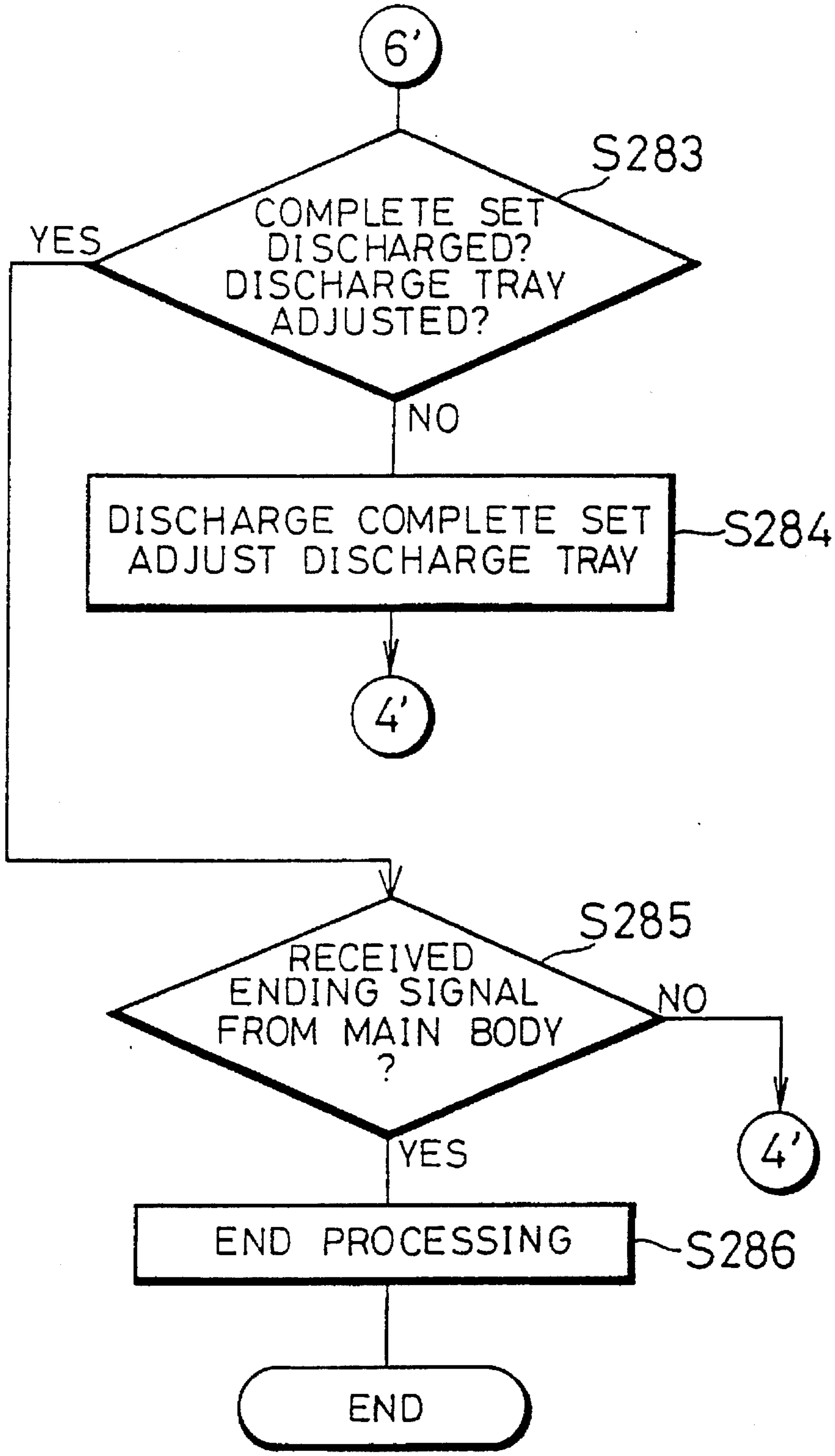
FIG. 108 is a flow chart showing a part of a process in a multiple staple mode with the device for further processing after copying.

After the stapling operation of S282, if the sheet detection switch $SW_1$ is not turned ON in S266, the sequence moves onto S283 of FIG. 108. Here, if the discharge of the complete set and the adjustment of the discharge tray have not been completed in S283, these operations are carried out before the sequence moves back to S266. On the other hand, if these operations have been completed in S S283, it is determined whether or not the signal to stop the operation is received from the main body 331 (S285). If not, the sequence moves back to S266. If so, a predetermined ending process is executed (S286), and the above sequence is terminated.

Figure 109:
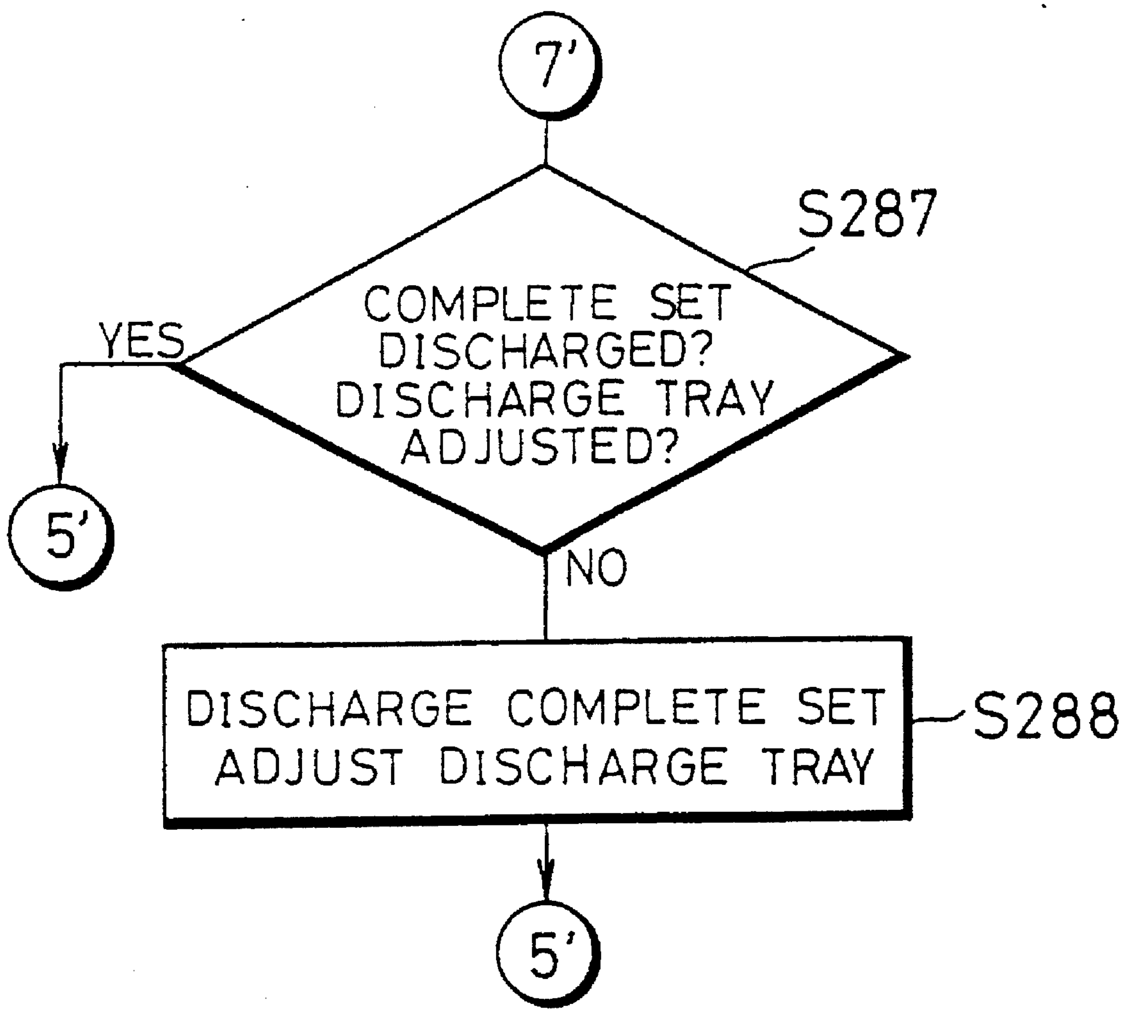
FIG. 109 is a flow chart showing a part of a process in a multiple staple mode with the device for further processing after copying.

Moreover, after the stapling operation of S282, if the first sheet $S_1$ of the second set is detected as the sheet detection switch $SW_1$ is turned ON in S266 and the sheet detection switch $SW_1$ is not turned OFF in S267, the sequence moves onto S287 of FIG. 109.

In the discharge of the complete set and the adjustment of the discharge tray have not been completed in S287, these operations are carried out (S288) before the sequence goes back to S267. On the other hand, if these operations have been completed in S287, the sequence directly moves back to S267.

Next, based on the ON state and OFF state of the sheet detection switch $SW_1$ in S266 and S267, the operations in S268 and 269 are carried out. Here, if the sheet S which is being transported through the main pass **372*b* is the first sheet $S_1$ of the second set, the processed number in S270 is 1. Thereafter, the sequence moves to S271. In S271, if the first complete set has been discharged from the stapler plate 273, and the stapler plate 273 is ready for the next binding operation, the sequence skips to S278 of FIG. 107**.

If the first complete set has not been discharged from the stapler plate 273 in S271, the transfer rollers 375 are stopped rotating so as to hold the first sheet $S_1$ of the second set in the main pass **372*b* (S272). Thereafter, the deflector 377 is rotated in the direction of $k_2$ so as to close the main pass 372*b* (S273). Therefore, the second sheet $S_2$ of the second set fed into the transport pass 372 is transported through the bypass 372*c*. Next, as the sheet detection switch $SW_2$ is turned ON (S274), and OFF (S275), the transportation of the second sheet $S_1$ of the second set can be detected, and the deflector 377 is rotated in the direction of $k_1$ so as to close the bypass 372*c* (S277). Then, the transfer rollers 375 are rotated so as to restart the transportation of the first sheet $S_1$ of the second set (S277). As a result, the first and the second sheets $S_1$ and $S_2$ of the second set are discharged onto the stapler plate 373** at the same time.

Figure 110:
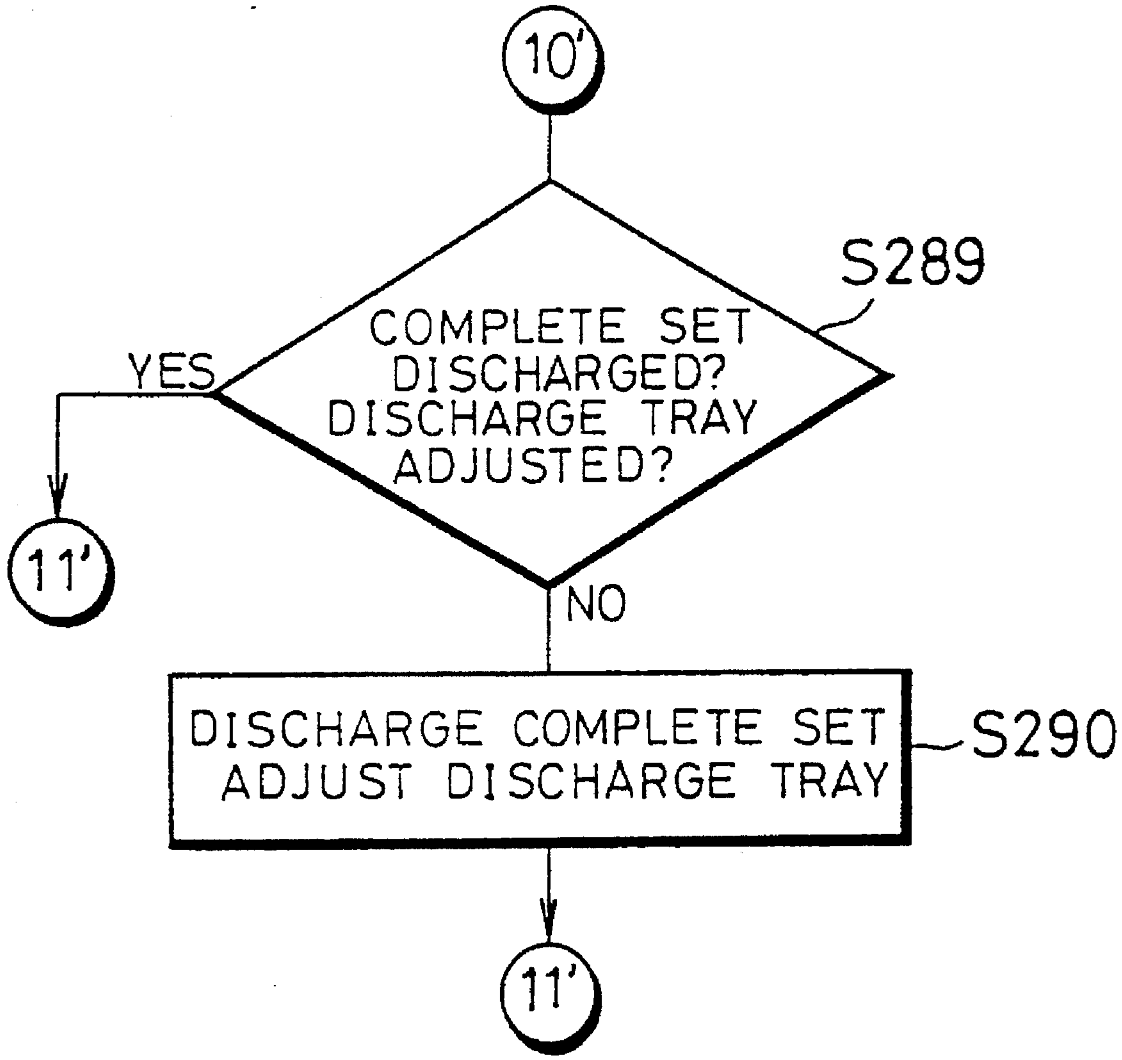
FIG. 110 is a flow chart showing a part of a process in a multiple staple mode with the device for further processing after copying.

If the sheet detection switch $SW_2$ is not turned ON in S274, the sequence skips to S289 in FIG. 110. Then, if the discharge of the complete set and the adjustment of the discharge tray 374 are not completed in S289, the sequence goes back to S274 after completing these operations (S290). If they are completed in S289, the sequence directly goes back to S274.

Next, after carrying out the operations in S268–270, S278–282, or S268–270, S278–280, S266–270, and S278–282, the stapling operation is carried out. If the stapling operation is stopped after stapling the second set, the sheet detection switch $SW_1$ is not turned ON in S266. Thus, the sequence skips to the step 283 of FIG. 108, and the process is ended in the described manner. On the other hand, if the stapling operation is still carried out after stapling the second set, the operations in S266–270, S278–284, and S287–290 are repeated. Then, after going through the operations in S285 and 286, the sequence in the multiple staple mode is terminated.

As described, according to the device 371 for further processing after copying, in the multiple staple mode, when the complete set has not been discharged onto the discharge tray 374 and is thus still on the stapler plate 373, the discharge of the first sheet $S_1$ of the following set is lagged so that the first and the second sheets $S_1$ and $S_2$ of the following set can be discharged on the stapler plate 373 at the same time. As a result, a faster binding operation can be achieved.

Figure 111:
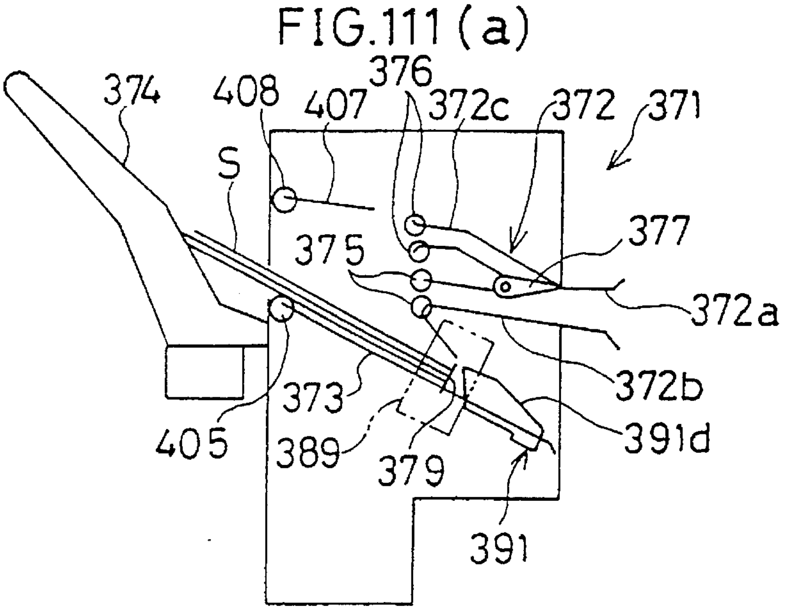
FIGS. 111(*a*)(*b*)(*c*) are explanatory views respectively showing the relative positions between the push-out member and the sheets discharged through the main pass of the transport path.
Figure 111B:
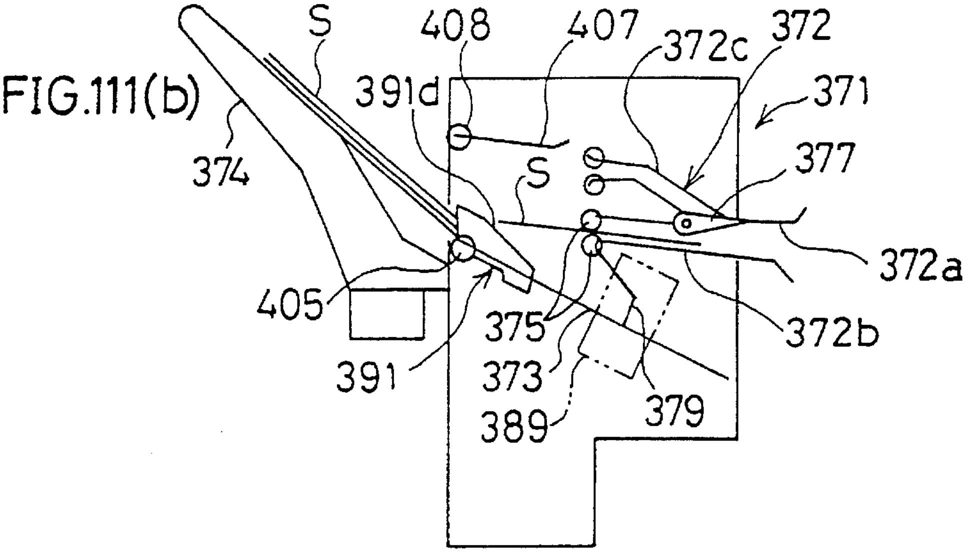
Figure 111C:
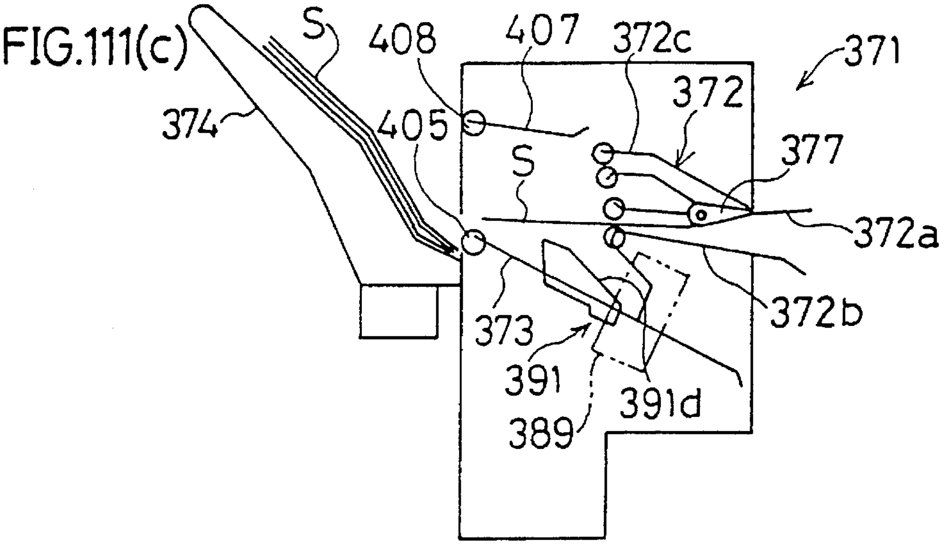

According to the device 371 for further processing after copying, when it is set in the multiple staple mode, the complete set on the stapler plate 373 is pushed out by the push-out member 391 as shown in FIG. 111(*a*). With this arrangement, when the push-out member 391 is positioned at the upper end of the stapler plate 373, the first sheet $S_1$ of the next set is held in the main pass **372*b* of the transport path 372 as the transport rollers 375** stops rotating.

As described, since the guide section **391*d* is provided so as to slope downward from substantially the center of the push-out member 391 toward the lower end of the push-out member 391, the sheet S, discharged through the transport rollers 375 is prevented from being transported backward by the downward movement of push-out member 391 to the retreat position in the direction of $p_2$. As a result, the push-out member 391** is moved under the first sheet $S_1$ of the next set, thereby preventing the problem of lowering the quality of the sheets by being stuck in the device.

[EMBODIMENT 13]

Figure 112:
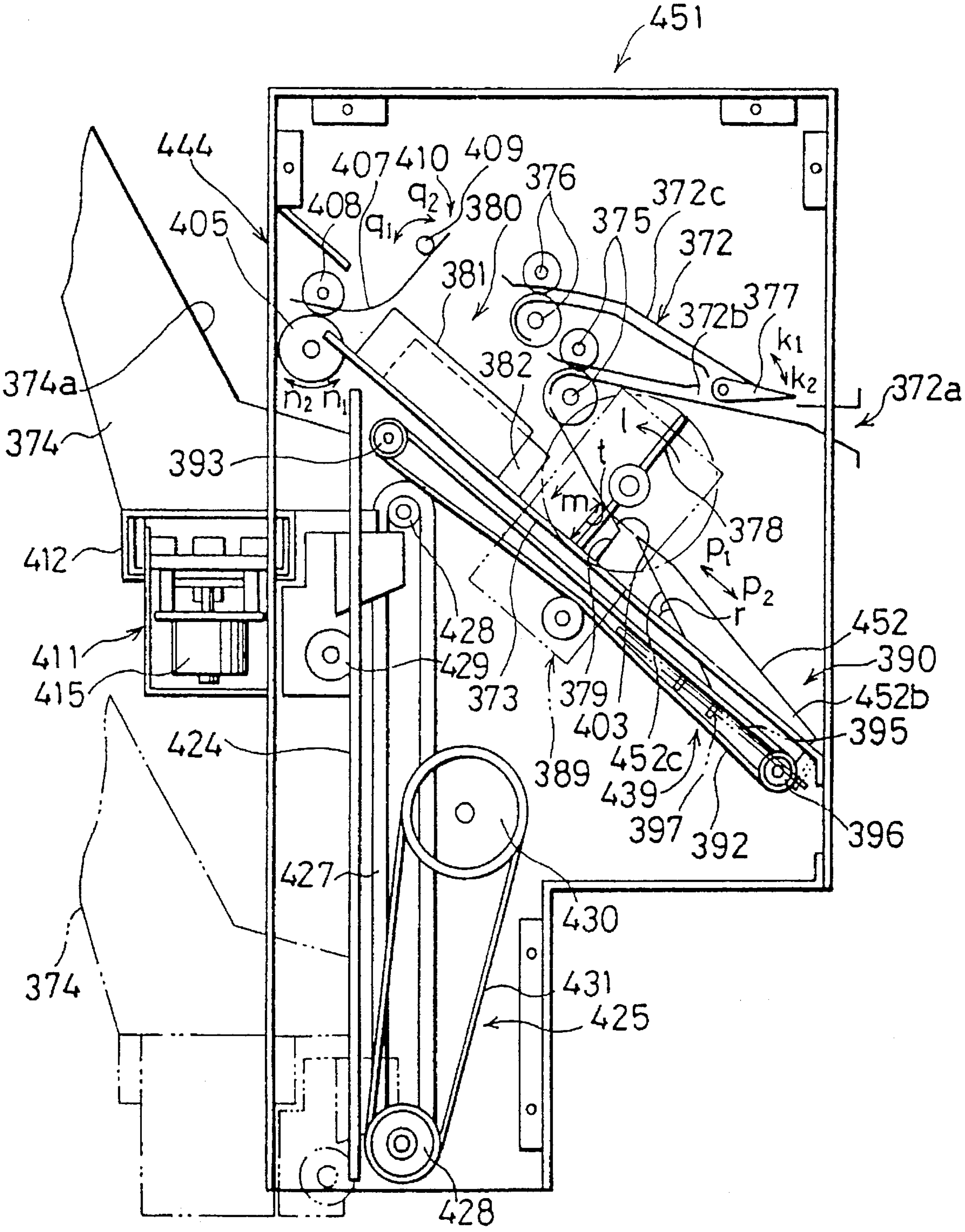
FIG. 112 is a view showing an entire configuration of a device for further processing after copying of another embodiment of the present invention.
Figure 113:
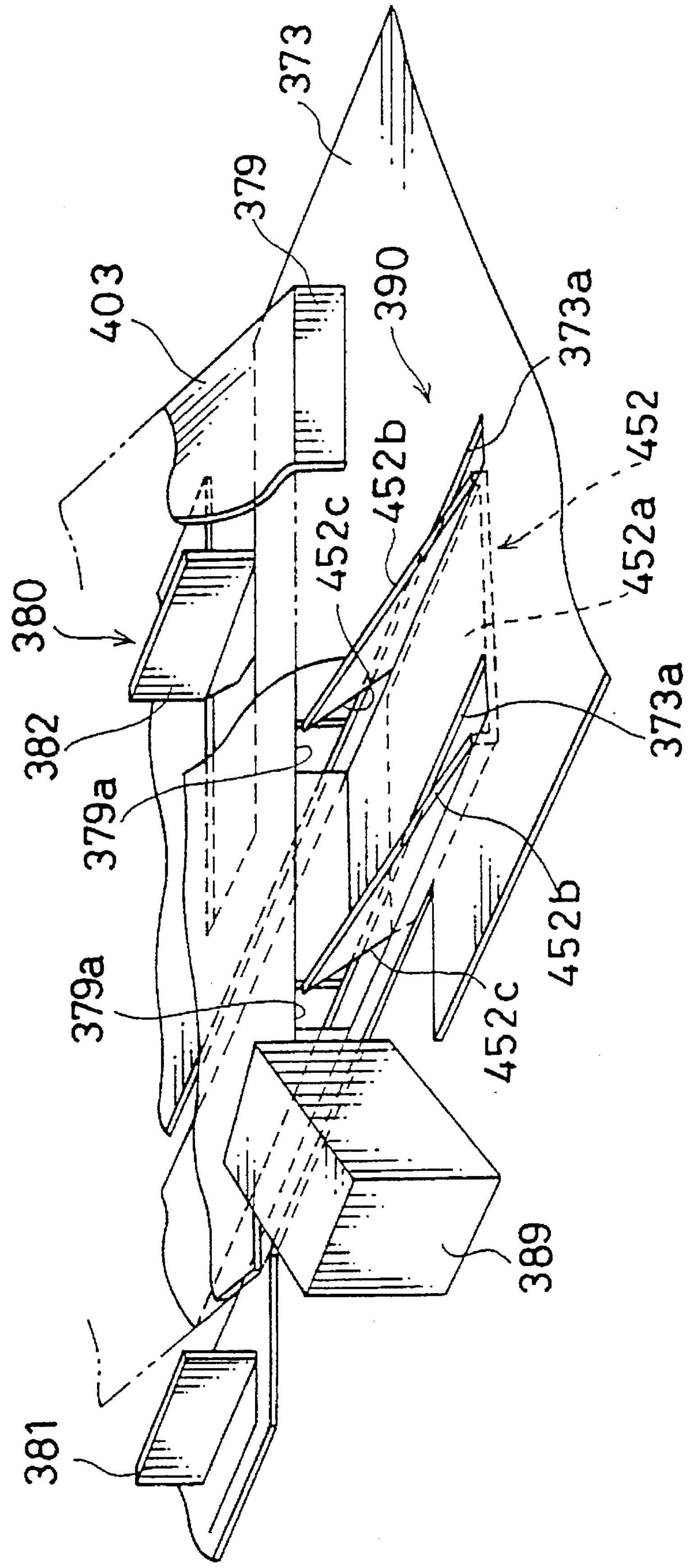
FIG. 113 is a perspective view showing the structure of the stapler plate without the paddler when looking at the back diagonally from the top.
Figure 114:
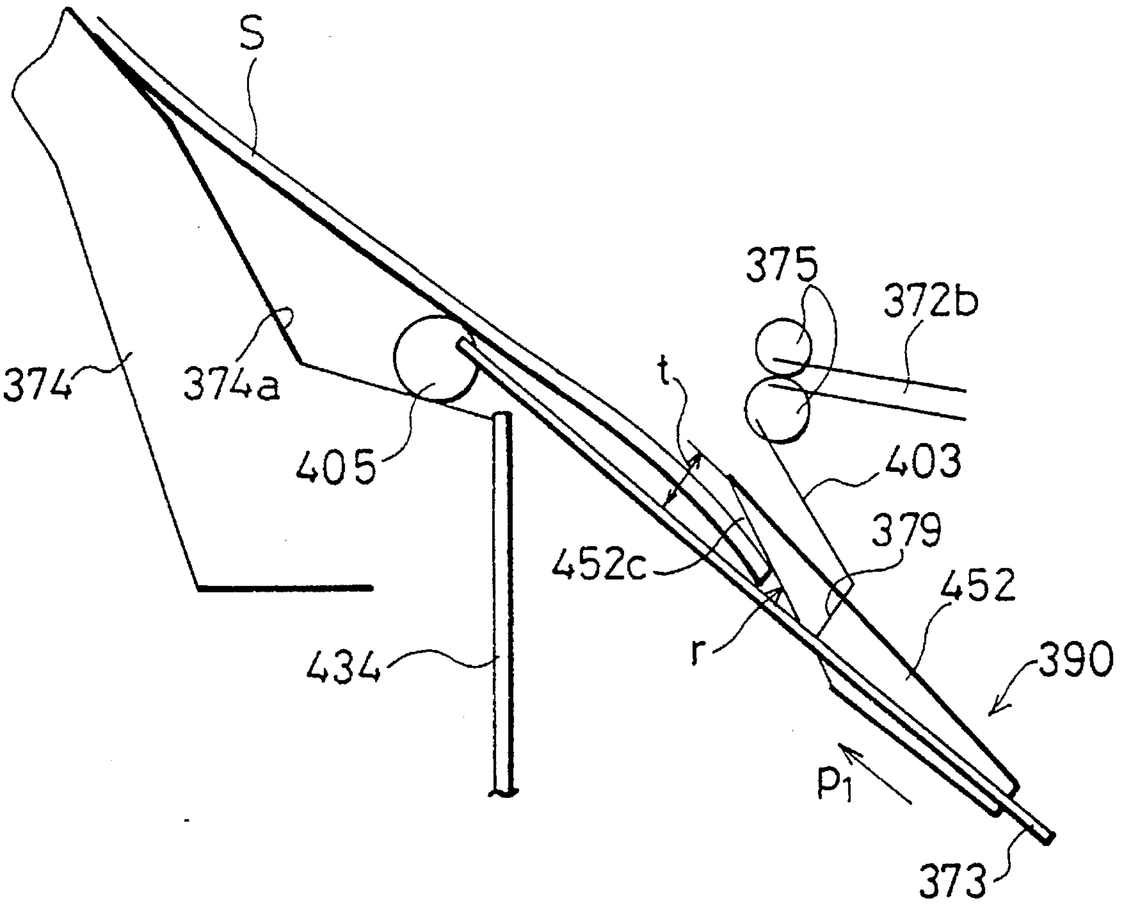
FIG. 114 is an explanatory view showing the complete set when pushed out by the push-out unit.

The following description will discuss another embodiment of the present invention with reference to FIGS. 112 through 114. For convenience, members having the same function as in the twelfth embodiment will be designated by the same code and their description will be omitted.

As shown in FIG. 112 and 113, a device 451 for further processing after copying of the present embodiment is further provided with a push-out member 452 having a predetermined angle and distance (to be described later) with respect to the stapler plate 373 in replace of the push-out member 391 of the push-out unit shown in FIGS. 95 and 99.

The sheet contact face **452*c* of the push-out member 452 is arranged such that the upper end thereof is projected toward the discharge tray 374 with respect to the lower end. The sheet contact face 452*c* forms an angle r with respect to the stapler plate 373** in the range between 15° and 50°, more preferably, in the range between 35° to 45°.

In addition, the distance t between the upper end of the sheet contact face **452*c* and the stapler plate 373 is set between 1.5–4 times, more preferably, 2–3 times the maximum height of the piled sheets S which the push-out member 452 can push out. For example, when the maximum height which the push-out member 452** can push out is 12 mm, the distance t is set between 18–48 mm, more preferably, between 24–36 mm.

Furthermore, the stapler plate 373 forms an angle of substantially 40° with respect to the horizontal direction so that the alignment of the sheets S in the transport direction or the discharge of the complete set onto the discharge tray 374 can be smoothly carried out. Other than the above, the device 451 has the same configuration as the twelfth embodiment.

With the above arrangement, the operation of the device 451 for further processing after copying based on the control of a control unit (not shown) is shown in the flow charts for each of the offset mode (FIG. 102), the single staple mode (FIG. 103), and the multiple staple mode (FIG. 106–110) as in the case of the twelfth embodiment. Here, the discharge of the complete set and the adjustment of the discharge tray 374 in each flow chart are shown in the flow chart of FIG. 104.

As described, the device 451 of the present embodiment is arranged such that the sheet contact face 452*c* forms an angle r with respect to the stapler plate 373 in the range between 15° and 50°, and the distance t between the upper end of the sheet contact face 452*c* and the stapler plate 373 is set between 1.5–4 times the maximum height of the piled sheets S which the push-out member 452 can push out. With this arrangement, when pushing out the complete set in S252 in the flow chart of FIG. 104, the upward buckling of the complete set is controlled as shown in FIG. 114. Therefore, even if a soft material is used for the sheets S, the complete set can be smoothly pushed out.

[EMBODIMENT 14]

Figure 115:
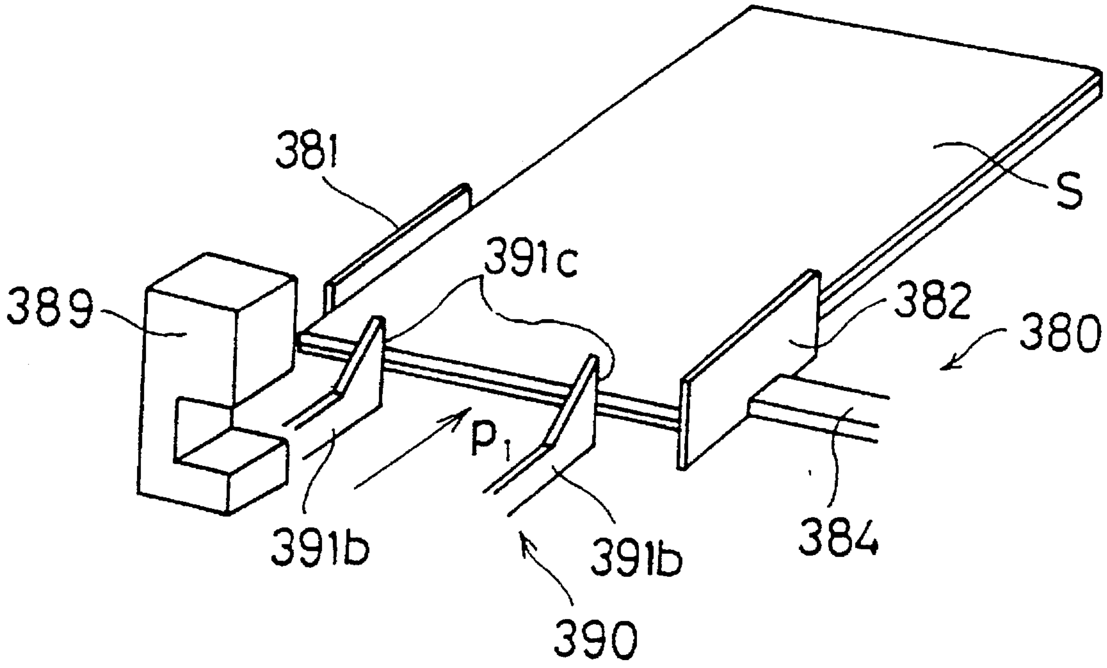
FIG. 115 is an explanatory view showing the controlling operation of the tilt of the complete set in a widthwise direction when pushed out by the side aligner of the device for further processing after copying of another embodiment of the present invention.

The following description will discuss another embodiment of the present invention with reference to FIGS. 95 and 115.

A device 471 for further processing after copying of the present embodiment has the same configuration as the device 451 shown in FIG. 95. The operation of the device 471 for further processing after copying based on the control of a control unit (not shown) is shown in the flow charts for each of the offset mode (FIG. 102), the single staple mode (FIG. 103), and the multiple staple mode (FIGS. 106–110) as in the case of the twelfth embodiment. Here, the discharge of the complete set and the adjustment of the discharge tray 374 in each flow chart are shown in the flow chart of FIG. 104.

With the control unit of the device 471 of the present embodiment, in aligning the sides of the sheets S in S241 in the single staple mode, if it has not reached the staple number in S242 when the sides of the sheets S have been aligned by the edge aligner 380, the side aligning plate 382 is moved backward to the home position. If reached, the side aligning plate 382 is controlled so as to be held at the position where the alignment has been carried out until the sheet S has been completely pushed out by the push-out unit 390. In addition, the control unit also conducts the described control in the case of aligning the sides of the sheets S in the multiple staple mode.

As described, the device 471 for further processing after copying of the present embodiment is arranged such that when pushing out the complete set in S252, the sliding of the complete set in the widthwise direction is controlled by the side aligning plate 382 which is held at the position where the alignment has been carried out in S241 as shown in FIG. 115. Therefore, even if a soft material is used for the sheets S, the complete set can be smoothly pushed out without sliding in the widthwise direction.

[EMBODIMENT 15]

The following description will discuss another embodiment of the present invention with reference to FIGS. 116 through 119. For convenience, members having the same function as in the twelfth embodiment will be designated by the same code and their description will be omitted.

Figure 116:
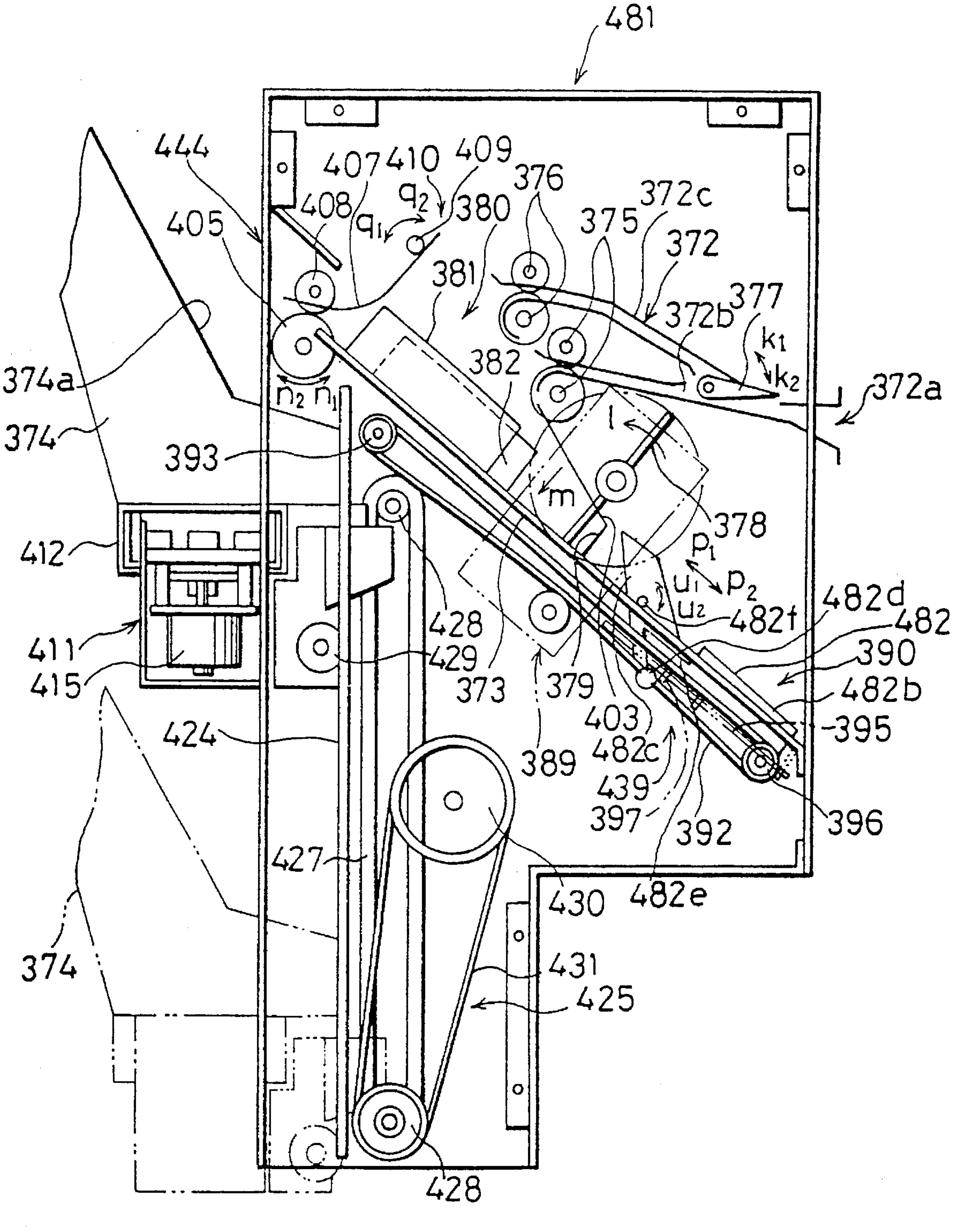
FIG. 116 is a view showing an entire configuration of a device for further processing after copying of another embodiment of the present invention.
Figure 117:
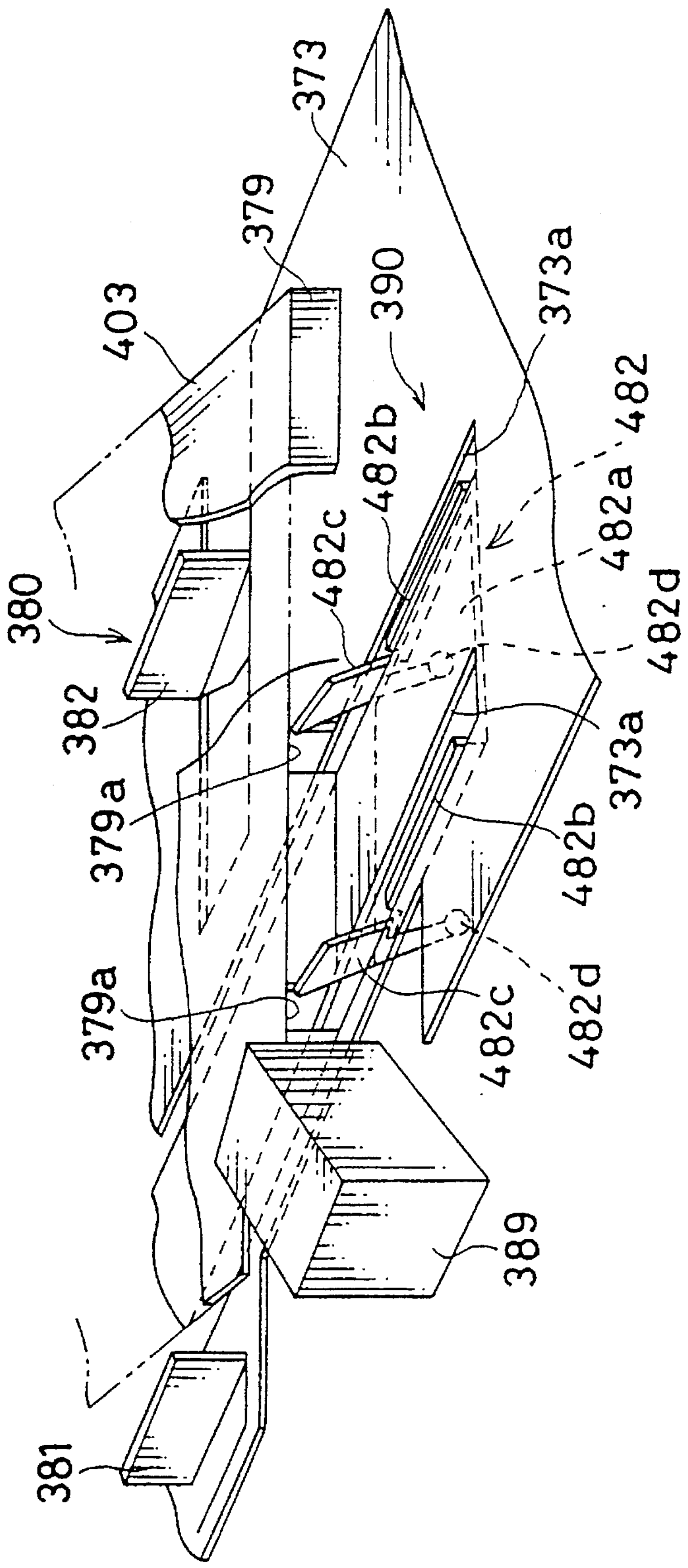
FIG. 117 is a perspective view showing the structure of the stapler plate without the paddler when looking at the back diagonally from the top.
Figure 118:
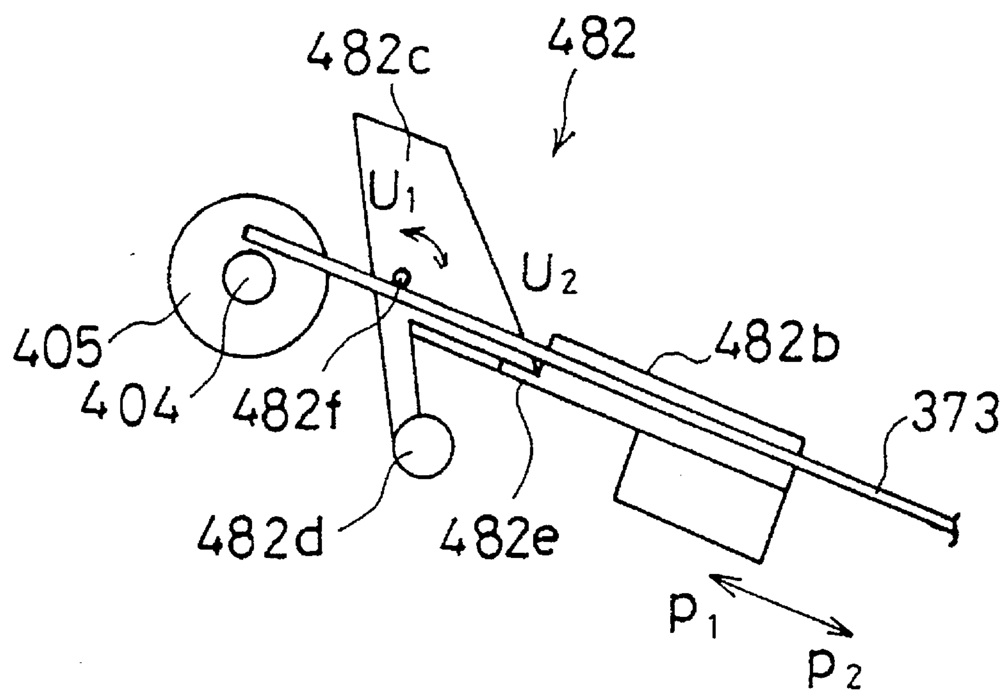

As shown in FIGS. 116 through 118, the device 481 for further processing after copying of the present embodiment is provided with a push-out member 482 in replace of the push-out member 381 of the push-out unit 380 shown in FIGS. 95 and 99. The push-out member 482 has a base plate 482*a* with edges 482*b* of the same length along the sides thereof. Furthermore, sheet contact faces 482*c* are respectively provided in front of the edges 482*b* of the push-out member 482, so that the rear edges of the sheets S are in contact therewith. The sheet contact faces 482*c* are respectively weighted by a weight 482*d*, and are supported by edges 482*b* (see FIG. 116) so as to be capable of rotating around a fulcrum 482*f* in the direction of $u_1$–$u_2$. Here, the rotation of the sheet contact face 482*c* in the direction of $u_2$ is controlled by a projected portion 482*e* provided with the edge 482*b*. More concretely, when a pressure is applied to the lower end of the sheet contact face 482*c* in the direction of $p_2$, the sheet contact face 482*c* is rotated in the direction of $u_1$. When the application of the pressure in the direction of $p_2$ is stopped, the sheet contact face 482*c* is rotated in the direction of $u_2$ using the weight 482d provided at the lower end, further, it is stopped at the original position by the projected portion 482*e*. Other members have the same configurations as those in the twelfth embodiment.

The operation of the device 481 for further processing after copying based on the control of a control unit (not shown) is shown in the flow charts for each of the offset mode (FIG. 102), the single staple mode (FIG. 103), and the multiple staple mode (FIGS. 106–110) as in the case of the twelfth embodiment. Here, the discharge of the complete set and the adjustment of the discharge tray 374 in each flow chart are shown in the flow chart of FIG. 104.

Figure 104:
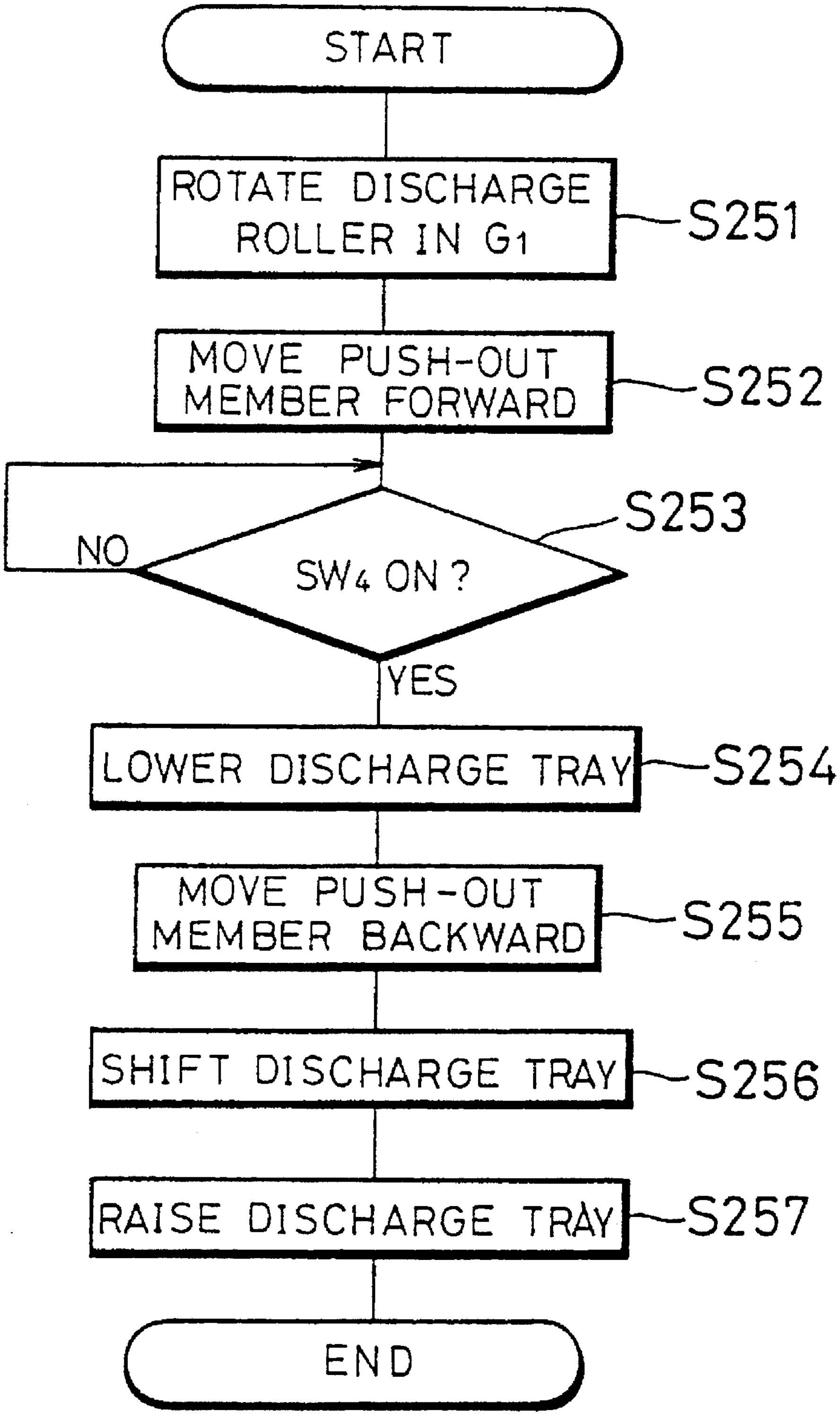
FIG. 104 is a flow chart showing the respective processes for discharging the complete set and adjusting the position of the discharge tray.
Figure 119:
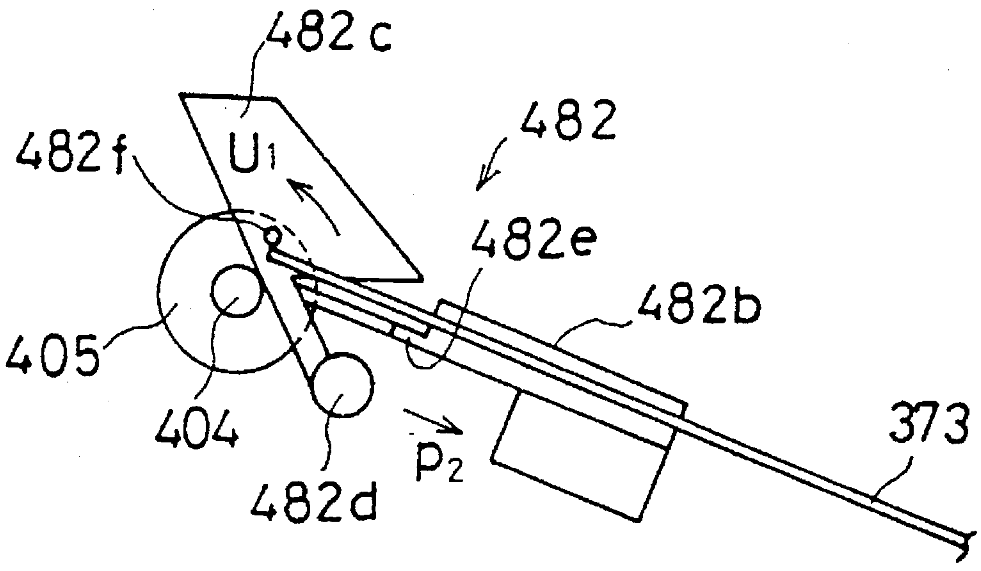

The device 481 for further processing after copying of the present embodiment is arranged such that in pushing out the complete set in S252 of the flow chart in FIG. 104, when the sheet contact face 482*c* of the push-out member 482 is pushed upward to the front portion of the stapler plate 373, as shown in FIG. 119, the lower end of the sheet contact face 482*c* is in contact with the rotation axis 404 (sheet contact face rotating member) of the discharge roller 405 provided at the upper end of the stapler plate 373, and the pressure is applied to the lower end of the sheet contact face 482*c* in the direction of $p_2$. Then, as the sheet contact face 482*c* of the push-out member 482 is rotated in the direction of $u_1$, the complete set is pushed out onto the discharge tray 374. With the backward motion of the push-out member 482 in S255, as the lower end of the sheet contact face 482*c* is separated from the rotation axis 404 of the discharge roller 405, the application of the pressure in the direction of $u_2$ is stopped. Then, the sheet contact face 482*c* is rotated in the direction of $u_2$ using the weight 482*d* provided at the lower end, further, it is stopped at the original position by the projected portion 482*e*.

With the arrangement of the device 481, when pushing out the complete set from the stapler plate 373 onto the discharge tray 374, the rear edges of the sheets S can be prevented from being caught by the sheet contact face 482*c*, the discharge roller 405, etc. Therefore, even if a soft material is used for the sheets S, the complete set can be smoothly discharged onto the discharge tray 374.

[EMBODIMENT 16]

The following description will discuss another embodiment of the present invention with reference to FIGS. 120 through 123. A device 491 for further processing after copying of the present embodiment has the same configuration as the device 371 of the twelfth embodiment except the push-out member 391. Thus, other members having the same function as in the twelfth embodiment will be designated by the same code and their description will be omitted.

The device 491 for further processing after copying of the present embodiment is provided with another push-out member 492 (sheet push-out means) as shown in FIG. 120 in replace of the push-out member 391 shown in FIG. 95. As shown in FIG. 121(*a*), the push-out member 492 is provided with a sheet contact face 492*a* and a fixed piece 492*e*. The sheet contact face 492*a* which is capable of tilting in the direction of $v_1$–$v_2$ around a fulcrum 492*b*. The fixed piece 492*e* is connected to the push-out belt 392 (see FIG. 120) which moves the push-out member 492. In the vicinity of the fulcrum 492*b* of the sheet contact face 492*a*, a stop tab 492*d* is provided which mates with the upper end of the fixed piece 492*e* when pushing out the sheet S. Furthermore, the sheet contact face 492*a* is provided with a lock 492*f* and a foot 492*g* for releasing the lock. When the sheet contact face 492*a* falls in the direction of $v_1$, the lock 492*f* is attracted to a magnet 492*c* (lock member) provided at substantially the center of the fixed piece 492*e*. Here, the magnet 492*c*, the stop tab 492*d*, the lock 492*f*, the foot 492*g*, etc., constitute push-out bar switching means which moves the sheet contact face 492*a*.

With the above arrangement, when pushing out the complete set from the stapler plate 373, the push-out member 492 moves upward in the direction of $p_1$ while the sheet contact face 492*a* is in contact with the rear edge of the complete set on the stapler plate 373. Here, as the stop tab 492*d* of the sheet contact face 492*a* matches the upper end of the fixed piece 492*e*, the sheet contact face 492*a* is held at the position where it is projected upward with respect to the stapler plate 373. Therefore, the complete set can be smoothly pushed-out.

As the push-out member 492 is further moved upward in the direction of $p_1$ so as to complete the discharge of the complete set, and is reached the upper end of the stapler plate 373 as shown in FIG. 121(*b*), the sheet contact face 492*a* is in contact with the rotation axis 404 of the discharge roller 405 provided at the upper end of the stapler plate 373, thereby rotating in the direction of $v_1$.

As a result, the sheet contact face 492*a* is tilted in the direction of $v_1$ substantially parallel to and below the stapler plate 373. Further, the lock 492*f* provided at the lower end of the sheet contact face 492*a* is attracted to the magnet 492*c* of the fixed piece 492*e*, and is locked.

As described, with the tilted state of the sheet contact face 492*a*, as the push-out member 492 moves downward in the direction of $p_2$, the foot 492*g* for releasing the locked state is in contact with a fixed shaft 493 (lock cancelling member) for cancelling the locked state provided in the device 491, the sheet contact face 492*a* is released from the locked state by its dead weight. Then, the sheet contact face 492*a* rotates in the direction of $v_1$ to the original position where it is projected upward from the stapler plate 373 so that the complete set on the stapler plate 373 can be discharged.

As described, the device 491 for further processing after copying of the present embodiment is provided with the push-out member 492 having the sheet contact face 492*a*. When the complete set is pushed out from the stapler plate 373 by the upward motion in the direction of $p_1$ of the push-out member 492, the sheet contact face 492*a* is held at the position projected upward with respect to the stapler plate 373 as shown in FIG. 122(*a*). When the complete set has been completely pushed out by the push-out member 492, the push-out member 492 starts moving downward in the direction of $p_2$ to the original retreat position. With this downward motion of the push-out member 492, the sheet contact face 492*a* is tilted parallel to and under the stapler plate 373, and the sheet contact face 492*a* is locked at the position as shown in FIG. 122(*b*). Therefore, when the push-out member 492 is moved downward to the retreat position, the sheets S can be prevented from being transported backward, i.e., in the opposite direction to the sheet transporting direction. As a result, the problem of lowering the quality of the sheets being stuck in the device can be prevented.

As shown in FIG. 123(*a*), in the conventional device, the sheet contact face 492*a*' of the push-out member 492' is always projected upward from the stapler plate 373'.

Therefore, for example, in the multiple staple mode wherein a plurality of stapling process are carried out, the sheet S transported through the transport path 372' is held by stopping the rotation of the transport rollers 375' until the push-out member 492' has moved back to the original retreat position in the direction of $p_2$. This means that, the discharge of the sheet S to the stapler plate 373' by rotating the transport rollers 375' cannot be started until the push-out member 492' has moved back to the retreat position even if the sheet S has completely pushed out by the' push-out member 492' as shown in FIG. 123(*b*), thereby creating the time loss.

As shown in FIG. 122(*b*), the device 491 for further processing after copying of the present embodiment operates such that when the push-out member 492 is moved downward in the direction of $p_2$, the sheet contact face 492*a* is held at the position under the stapler plate 373 and is not projected from the stapler plate 373. With this arrangement, only if the sheets S have been pushed out to the stapler plate 373, the rotation of the transport rollers 375 can be restarted even if the push-out member 492 is still moving downward so as to discharge the sheet $S_1$ of the next set onto the stapler plate 373. The discharge of the sheet $S_1$ of the next set needs not be lagged until the push-out member 492 has been moved back to the retreat position, thereby reducing the time loss.

[EMBODIMENT 17]

The following description will discuss another embodiment of the present invention with reference to FIGS. 124 through 127. A device 501 for further processing after copying of the present embodiment has the same configuration as the device 371 of the twelfth embodiment except the transport path 372. Thus, other members having the same function as in the twelfth embodiment will be designated by the same code and their description will be omitted.

As shown in FIG. 124, the device 501 for further processing after copying of the present embodiment is provided with a transport path 502 in replace of the transport path 372 shown in FIG. 95. Further, the transport path 502 has an entry opening 502*a* at one end, through which the sheets S are fed from the main body 331. The transport path 502 is further provided with a pair of upper and lower transport rollers 503, and a deflector 504. The deflector 504, which serves as a means for switching the path, is capable of rotating in the direction of $w_1$–$w_2$, and switches the transport path for the sheet S. The transport rollers 503 are driven by the transport roller drive unit (not shown), and the deflector 504 is driven by the deflector drive unit (not shown).

For detecting the sheets S, a sheet detection switch SWa and a sheet detection switch SWb are respectively provided on the transport path 502 and the stapler plate 373. The sheet detection switch SWa is provided for detecting the transportation of the sheet S through the transport path 502. On the other hand, the sheet detection switch SWb is provided for detecting that the sheets S have been stapled on the stapler plate 373, and the discharge of the sheets S has been completed.

In addition, the discharge roller 405 and the driven roller 408 become the sheet detection switch SWc for detecting the sheet S when they are in contact with one another as shown in FIG. 126.

As shown in FIG. 127(*a*), with the above arrangement of the device 501 of the present embodiment, in the multiple staple mode, i.e., when stapling a plurality of sets of sheets S, a first sheet $S_1$ of the next set, fed from the main body 331 while the current set of sheets S is being stapled, is transported under the deflector 504 in the transport path 502. Then, the transport rollers 503 are stopped rotating, thereby temporarily stopping the transportation of the sheet $S_1$.

As shown in FIG. 127(*b*), with the rotation of the deflector in the direction of $w_2$, the second sheet $S_2$ of the next set is transported above the deflector 504 through the transport path 502. Then, when the rotations of the transport rollers 503 are restarted, the first sheet $S_1$ and the second sheet $S_2$ of the next set are released onto the stapler plate 373 at the same time as in the case of the device 371 for further processing after copying in the twelfth embodiment.

Therefore, the first sheet $S_1$ of the next set can be held while the previous set is being stapled. The time loss in stapling a plurality of sets of sheets S can be reduced without making larger the size of the device, nor the quality of the sheets lowered. This permits a simplification of the shapes of the components, reduction in the number of the components, trimming the size of the device, and the cost down.

This invention being thus described, it will be obvious that the same way be varied in many ways. Such variations are not to be regarded as a departure from the spirit and scope of the invention, and all such modifications as would be obvious to one skilled in the art are intended to be included within the scope of the following claims.

What is claimed is:

1. A device for further processing after copying, comprising:

sheet holding means for placing thereon a plurality of sheets;

means for processing after copying which carries out a predetermined process on a plurality of copied sheets stacked on said sheet holding means;

sheet push-out means for pushing out the sheets processed by said means for processing after copying, to be discharged out of the device through the discharge opening;

a discharge tray, fitted to the device at a lower level than a sheet discharge opening, for placing thereon the sheets pushed out by said sheet push-out means;

drive means for driving said discharge tray up and down;

auxiliary lower discharge means capable of moving upward and downward between a forward position and a retreat position, the forward position being a position where a level difference between the discharge opening and said discharge tray is covered; and control means for controlling the movement of said auxiliary lower discharge means so as to start moving upward before the sheets have been completely pushed out by said sheet push-out means onto said discharge tray.

2. The device for further processing after copying as set forth in claim 1, wherein said sheet push-out member includes:

push-out member capable of moving upward and downward along said sheet holding means; and drive means for driving said push-out member upwards and downwards.

3. The device for further processing after copying as set forth in claim 2, wherein said drive means includes:

a push-out belt connected to said push-out member;

a pair of belt support rollers around which said push-out belt is engaged;

a drive motor serving as a drive source of said push-out member; and a control member for controlling the movement of said push-out member both in upward and downward directions.

4. The device for further processing after copying as set forth in claim 1, wherein said auxiliary lower discharge means includes:

an auxiliary lower discharge plate capable of moving upward to a forward position and downward to a retreat position; and drive means for driving said auxiliary lower discharge plate upwards and downwards.

5. The device for further processing after copying as set forth in claim 4, wherein said drive means includes:

a drive motor serving as a drive source of said auxiliary lower discharge plate;

a crank being rotated by said drive motor; and a connecting rod which transmits a force, generated by rotating said crank, by moving said auxiliary lower discharge plate.

6. A method for controlling a discharge of sheets by a sheet discharge means and an adjustment of a discharge tray position using a device for further processing after copying, comprising the steps of:

rotating a discharge roller in a sheet discharge direction and moving a push-out member upward in the sheet discharge direction; and raising the discharge tray back to an upper limit position at which the sheets are to be placed thereon after temporarily being lowered.

7. The method of controlling as set forth in claim 6, further comprising the steps of:

moving an auxiliary lower discharge plate upward on the discharge tray by rotating the discharge roller;

moving the auxiliary lower discharge plate downward directly before the sheet has been completely pushed out by the push-out member; and moving the push-out member downward after the discharge tray is lowered.

8. The method of controlling as set forth in claim 6, further comprising the steps of:

moving an auxiliary upper discharge plate upward on the discharge tray by rotating the discharge roller;

lowering the discharge tray directly before the sheet has been completely pushed out by the push-out member;

moving both the auxiliary upper discharge plate and the push-out member downward at the same time.

9. The method of controlling as set forth in claim 6, further comprising the steps of:

rotating a sheet guide to an upper sheet guide position by rotating the discharge roller;

lowering the discharge tray directly before the sheet has been completely pushed out by the push-out member; and rotating the sheet guide to a transport guide position and moving the push-out member downward.

10. The method of controlling as set forth in claim 6, further comprising the steps of:

rotating an offset guide to an upper sheet guide position by rotating the discharge roller;

lowering the discharge tray directly before the sheet has been completely pushed out by the push-out member; and rotating the offset guide to a discharge guide position and moving the push-out member downward.

11. The method of controlling as set forth in claim 6, further comprising the steps of:

rotating an auxiliary upper sheet guide to an upper sheet guide position by rotating the discharge roller;

lowering the discharge tray directly before the sheet has been completely pushed out by the push-out member; and rotating the auxiliary upper sheet guide to a retreat position and moving the push-out member downward.

12. The method as set forth in claim 6, further comprising the steps of:

rotating an offset guide to a closed position by rotating the discharge roller;

lowering the discharge tray directly before the sheet has been completely pushed out by the push-out member; and rotating the offset guide to an open position and moving the push-out member downward.

* * * * *